(12) United States Patent
Park et al.

(10) Patent No.: US 10,216,312 B2
(45) Date of Patent: Feb. 26, 2019

(54) MOBILE TERMINAL

(71) Applicant: LG ELECTRONICS INC., Seoul (KR)

(72) Inventors: Sanggil Park, Seoul (KR); Seongwoo Choi, Seoul (KR); Sungtaek Oh, Seoul (KR); Hyuksoo Chang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 3 days.

(21) Appl. No.: 14/731,213

(22) Filed: Jun. 4, 2015

(65) Prior Publication Data

US 2016/0098138 A1    Apr. 7, 2016

(30) Foreign Application Priority Data

Oct. 7, 2014 (KR) .......................... 10-2014-0135131
Oct. 10, 2014 (KR) .......................... 10-2014-0136562

(51) Int. Cl.
*G06F 3/041*     (2006.01)
*G06F 3/0488*    (2013.01)
(Continued)

(52) U.S. Cl.
CPC ............ *G06F 3/0416* (2013.01); *G06F 1/163* (2013.01); *G06F 1/1686* (2013.01);
(Continued)

(58) Field of Classification Search
CPC .... G06F 3/0416; G06F 3/0412; G06F 3/0488; G06F 3/04817; G06F 3/04886;
(Continued)

(56) References Cited

U.S. PATENT DOCUMENTS 8,570,424 B2   10/2013 Moriyama
8,842,180 B1*  9/2014 Kasmir ................. H04N 7/186
                                              348/143
(Continued)

FOREIGN PATENT DOCUMENTS

CN   101285941 A   10/2008
CN   202475562 U   10/2012
(Continued)

OTHER PUBLICATIONS

"Not knowing of this should not be carried out and iPhone should not be told! An iPhone delicate technique and a SUGO work exercise hall," iPhoneMagazine, Japan, Oct. 19, 2012, vol. 31, 5 pages (pp. 34-36).

*Primary Examiner* — Charles Hicks
(74) *Attorney, Agent, or Firm* — Birch, Stewart, Kolasch & Birch, LLP

(57) ABSTRACT

A mobile terminal including a wearable device including a first wireless communication device, a sound output unit, and at least one camera; a second wireless communication device configured to perform wireless communication with the wearable device via the first wireless communication device; a touch screen configured to display information; and a control unit configured to display an icon on the touch screen for controlling the wearable device, and display a control screen including both a first control area including at least one sound control object for controlling sound output by the mobile terminal and a second control area including at least one camera control object for controlling the at least one camera of the wearable device, in response to a selection of the displayed icon.

10 Claims, 75 Drawing Sheets

(51) Int. Cl.
  *G06F 3/0481* (2013.01)
  *H04N 5/232* (2006.01)
  *H04N 5/77* (2006.01)
  *H04N 7/18* (2006.01)
  *G06F 1/16* (2006.01)
  *H04N 7/14* (2006.01)
  *H04N 5/44* (2011.01)
  *H04M 1/02* (2006.01)
  *H04M 1/05* (2006.01)
  *H04M 1/725* (2006.01)
  *H04N 5/225* (2006.01)
  *H04M 1/60* (2006.01)

(52) U.S. Cl.
  CPC .......... *G06F 3/0412* (2013.01); *G06F 3/0488* (2013.01); *G06F 3/04817* (2013.01); *G06F 3/04886* (2013.01); *H04M 1/7253* (2013.01); *H04N 5/2251* (2013.01); *H04N 5/2258* (2013.01); *H04N 5/23216* (2013.01); *H04N 5/23293* (2013.01); *H04N 5/772* (2013.01); *H04N 7/142* (2013.01); *H04N 7/18* (2013.01); *G06F 2203/04803* (2013.01); *G06F 2203/04808* (2013.01); *H04M 1/0264* (2013.01); *H04M 1/05* (2013.01); *H04M 1/6066* (2013.01); *H04M 1/72558* (2013.01); *H04M 2250/20* (2013.01); *H04N 7/183* (2013.01); *H04N 2005/443* (2013.01); *H04N 2005/4428* (2013.01); *H04N 2007/145* (2013.01)

(58) Field of Classification Search
  CPC ........ G06F 1/1686; G06F 2203/04803; G06F 2203/04808; G06F 1/163; H04M 2250/20; H04M 1/0264; H04M 1/05; H04M 1/6066; H04M 1/7253; H04M 1/72558; H04N 5/23293; H04N 5/772; H04N 7/18; H04N 2007/145; H04N 2005/4428; H04N 2005/443
  See application file for complete search history.

(56) References Cited

U.S. PATENT DOCUMENTS

| | | | |
|---|---|---|---|
| 2008/0125164 A1* | 5/2008 | Singh | H04M 1/0258 455/550.1 |
| 2010/0053371 A1 | 3/2010 | Karimoto | |
| 2010/0118158 A1* | 5/2010 | Boland | H04N 5/23203 348/211.2 |
| 2010/0245585 A1* | 9/2010 | Fisher | H04M 1/6066 348/164 |
| 2011/0249166 A1 | 10/2011 | Moriyama | |
| 2011/0254964 A1 | 10/2011 | Zhang | |
| 2011/0270522 A1 | 11/2011 | Fink | |
| 2012/0094601 A1 | 4/2012 | Li | |
| 2013/0321340 A1* | 12/2013 | Seo | G06F 1/1641 345/174 |
| 2014/0164968 A1* | 6/2014 | Aalami | G06F 19/321 715/771 |
| 2014/0184801 A1 | 7/2014 | Choi et al. | |
| 2014/0233752 A1 | 8/2014 | Seo et al. | |
| 2014/0239065 A1* | 8/2014 | Zhou | G06F 1/163 235/380 |
| 2014/0368688 A1* | 12/2014 | John Archibald | H04N 5/23241 348/222.1 |
| 2015/0085059 A1 | 3/2015 | Fisher et al. | |
| 2015/0133190 A1 | 5/2015 | Fisher et al. | |
| 2015/0268730 A1* | 9/2015 | Walline | G06F 3/017 345/168 |
| 2015/0309691 A1 | 10/2015 | Seo et al. | |
| 2015/0378503 A1 | 12/2015 | Seo et al. | |
| 2016/0162240 A1* | 6/2016 | Gu | H04N 21/4402 345/1.3 |

FOREIGN PATENT DOCUMENTS

| | | | |
|---|---|---|---|
| EP | 2 746 726 A1 | 6/2014 | |
| EP | 2746726 A1 * | 6/2014 | ............. G01C 21/32 |
| JP | 2002-57934 A | 2/2002 | |
| JP | 23011-223465 A | 11/2011 | |
| JP | 3172921 U | 1/2012 | |
| JP | 2012-156760 A | 8/2012 | |
| JP | 2012-519422 A | 8/2012 | |
| JP | 2013-54770 A | 3/2013 | |
| KR | 10-2004-0106964 A | 12/2004 | |
| KR | 10-2011-0111247 A | 12/2011 | |
| KR | 10-2012-0092034 A | 8/2012 | |
| KR | 10-1250951 B1 | 4/2013 | |
| KR | 10-1386728 B1 | 4/2014 | |
| KR | 10-2014-0064590 A | 5/2014 | |

* cited by examiner

FIG. 62
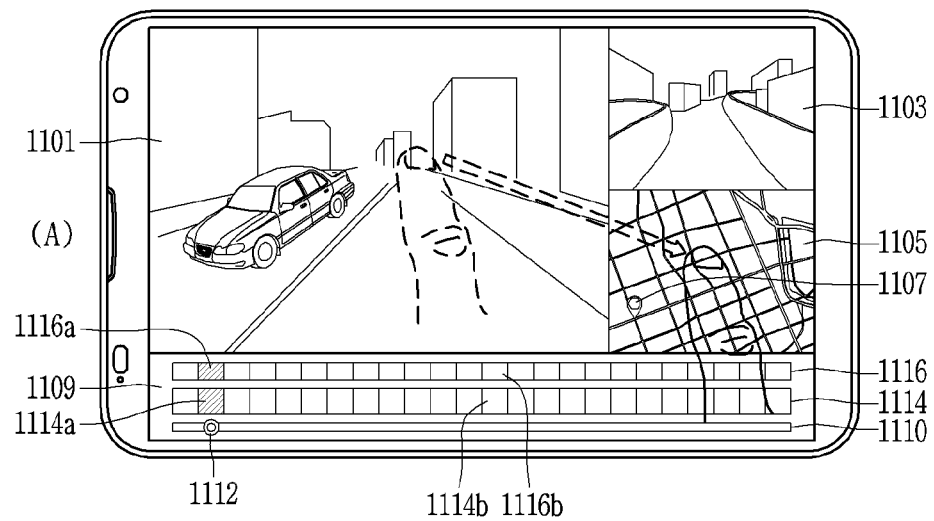
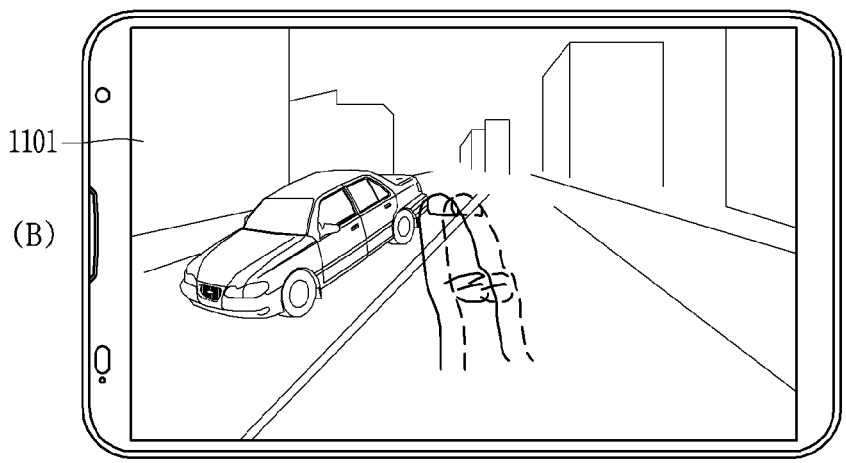
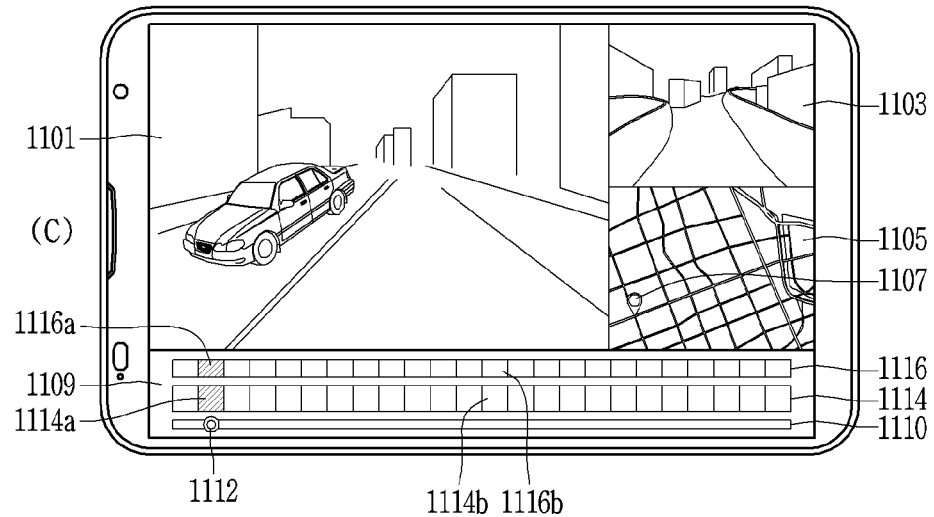

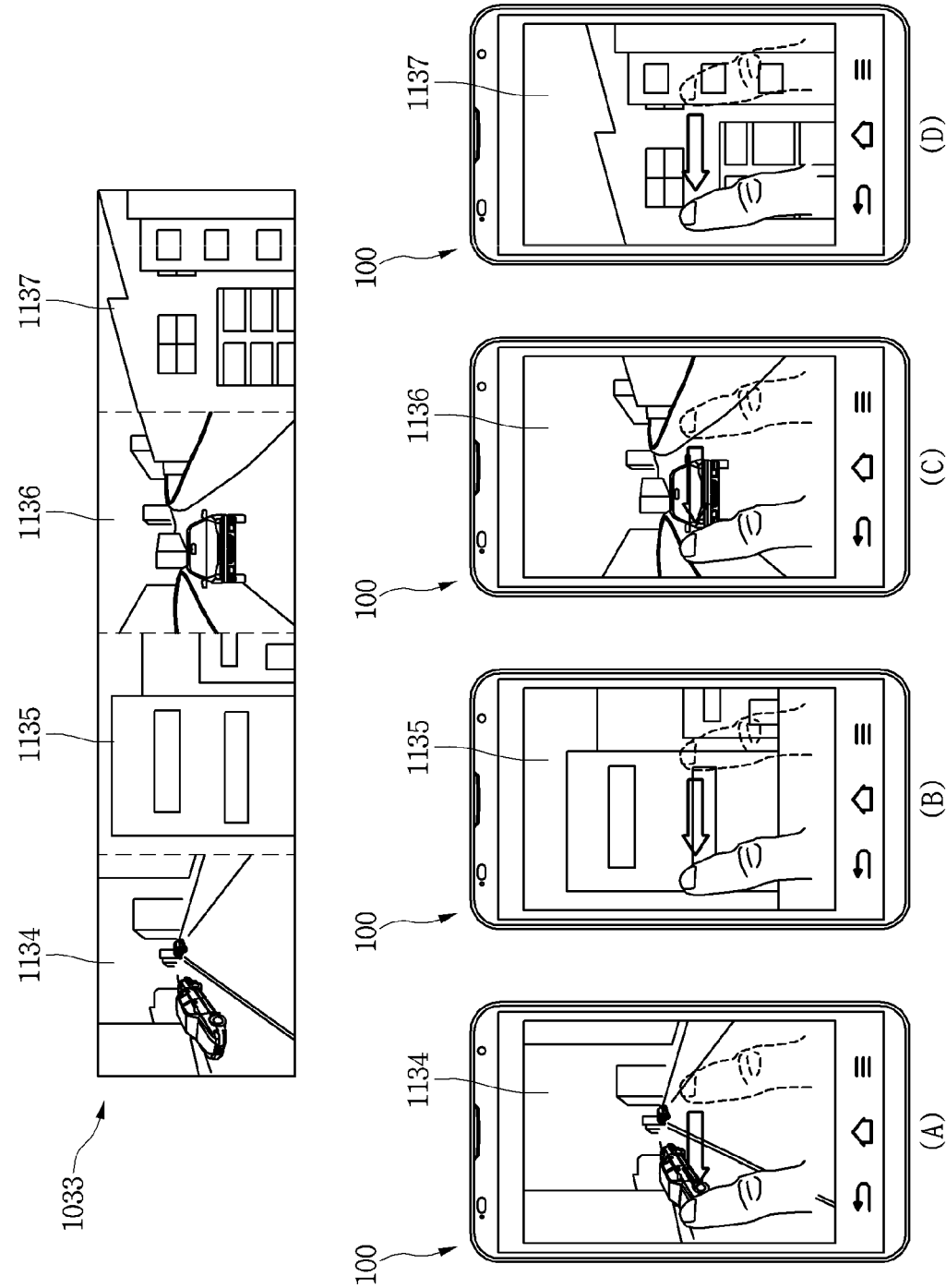

MOBILE TERMINAL

CROSS-REFERENCE TO RELATED APPLICATIONS

The present application claims priority under 35 U.S.C. 119 and 35 U.S.C. 365 to Korean Patent Application No. 10-2014-0135131 (filed on Oct. 7, 2014) and Korean Patent Application No. 10-2014-0136562 (filed on Oct. 10, 2014), which is hereby incorporated by reference in its entirety.

BACKGROUND OF THE INVENTION

Field of the Invention

The present invention relates to a mobile terminal capable of implementing terminal usage by further considering a user's convenience.

Discussion of the Related Art

Depending on whether terminals are movable, the terminals are divided into mobile/portable terminals and stationary terminals. Again, the mobile terminals may be divided into handheld terminals and vehicle mounted terminals depending on whether users can carry the mobile terminals personally.

Functions of the mobile terminals become diversified. For example, the functions include data and voice communication, picture capturing and video recording through a camera, voice recording, music file playback through a speaker system, and image or video output to a display unit (screen). Some terminals may have an additional electronic game play function or a multimedia player function. Especially, recent mobile terminals may receive multicast signals providing visual contents such as broadcasts and videos.

As functions of a terminal are diversified, such a terminal may be implemented in a form of a multimedia player having multi-functions, for example, picture image or video capturing, playback of music or video files, game playing, and broadcast reception.

As one type of a terminal, there is a wireless sound device. The wireless sound device may be worn on a user's neck and interoperate with a mobile device to implement various functions. Since the wireless sound device is worn on a user's neck, the user does not need to hold it separately and also the wireless sound device is light. Therefore, it receives attention as a wearable device. Adding various functions to the wireless sound device is attempted and furthermore, researches on configuration and/or user experience (UX) optimized for the wireless sound device are in progress.

SUMMARY

Embodiments provide a mobile terminal capable of improving user convenience by using a camera function of a wearable device.

Embodiments also provide a user's safety by checking and dealing a peripheral movement or risk in real time through a screen of a mobile terminal where a front image and/or a real image provided from a wearable device while a user listens to music or radio broadcast.

Embodiments also provide a significant evidence for vehicle accident or crime scene as a front image and/or a rear image provided from a wearable device are/is recorded in real time so that a user views an image corresponding to a specific time slot at any time by using the recorded image.

Embodiments also provide a way of finding a business name that a user wants or a place where a user wants to go by using a front image and/or a rear image provided from a wearable device and the user's current location information.

Embodiments also provide memories for a trip to a user by guiding a path that the user travels and providing picture images taken from a travel place based on a front image and/or a rear image provided from a wearable device.

In one embodiment, a mobile terminal includes: a wearable device including: a first wireless communication device, a sound output unit, and at least one camera; a second wireless communication device configured to perform a wireless communication with the wearable device; a touch screen configured to display information and receiving a touch input, wherein the touch screen has an icon to display a control screen for controlling the wearable device and the control screen includes a first control area for controlling sound and a second control area for controlling the at least one camera; and a control unit configured to simultaneously display the first control area and the second control area on the touch screen when a touch for the icon is input.

In another embodiment, a mobile terminal includes: a wearable device including a first wireless communication device, a sound output unit, and at least one camera; a second wireless communication device configured to perform a wireless communication with the wearable device; a touch screen configured to display information and receiving a touch input, wherein the touch screen has an icon to display a control screen for controlling the wearable device and the control screen includes a sound control screen for controlling sound and a button for controlling the at least one camera; and a control unit configured to simultaneously display the sound control screen and the control button on the touch screen when a selection for the icon is input.

The details of one or more embodiments are set forth in the accompanying drawings and the description below. Other features will be apparent from the description and drawings, and from the claims.

BRIEF DESCRIPTION OF THE DRAWINGS

The present invention will become more fully understood from the detailed description given hereinbelow and the accompanying drawings, which are given by illustration only, and thus are not limitative of the present invention, and wherein:

FIG. 62 is a first screen illustrating a method of varying a front image playback area shown in FIG. 60.

FIG. 67 is a screen illustrating a method of displaying a picture image provided from a wearable device, on a mobile terminal.

DETAILED DESCRIPTION OF THE EMBODIMENTS

Figure 1:
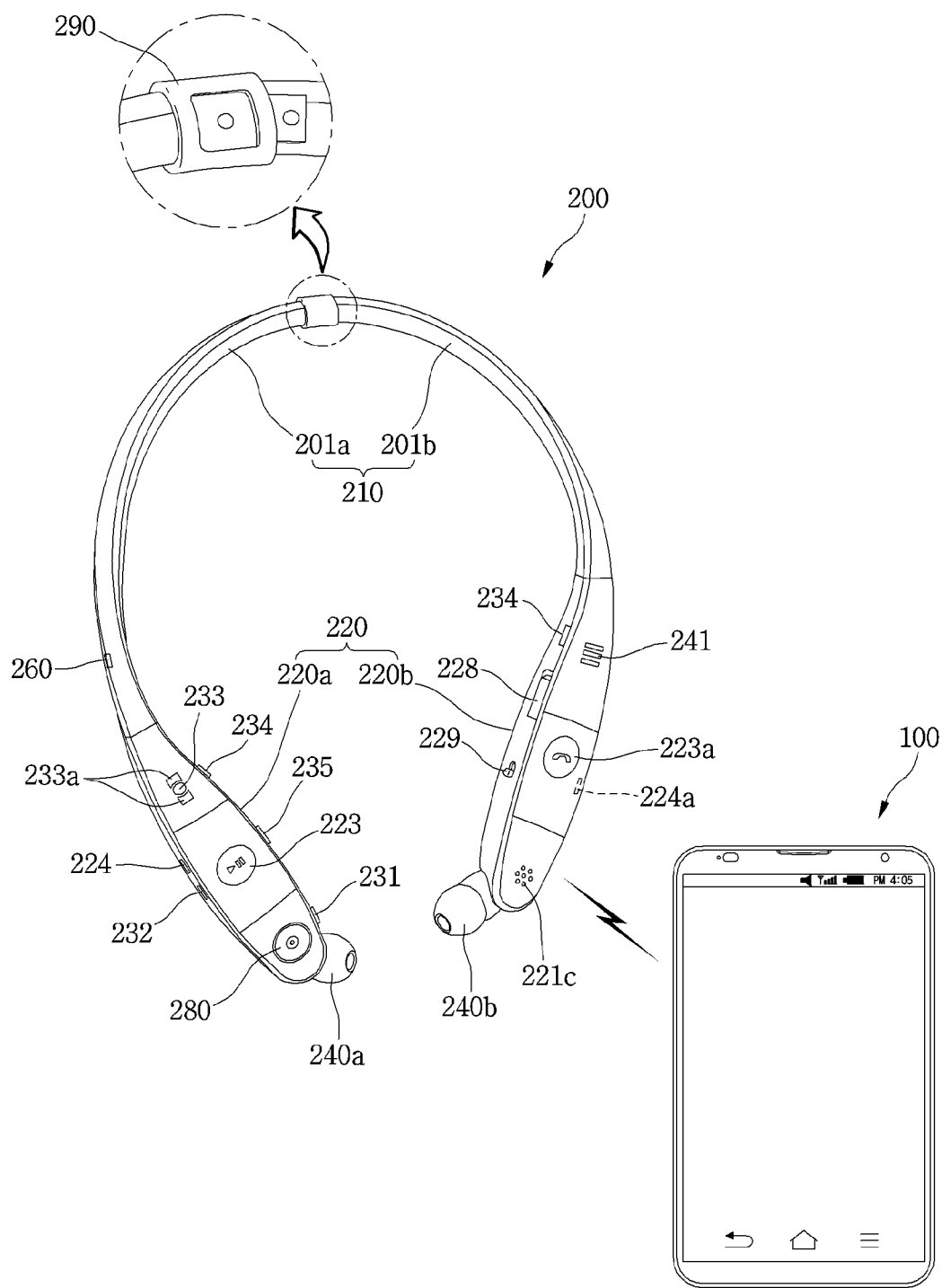
FIG. 1 is a system diagram illustrating a sound system including a wearable device according to a first embodiment of the present invention.

Hereinafter, a wearable device according to an embodiment of the present invention will be described in more detail with reference to the drawings.

Hereinafter, embodiments of the present invention are described in more detail with reference to accompanying drawings and regardless of the drawings symbols, same or similar components are assigned with the same reference numerals and thus overlapping descriptions for those are omitted. The suffixes "module" and "unit" for components used in the description below are assigned or mixed in consideration of easiness in writing the specification and do not have distinctive meanings or roles by themselves. Additionally, the accompanying drawings are used to help easily understanding embodiments disclosed herein but the technical idea of the present invention is not limited thereto. It should be understood that all of variations, equivalents or substitutes contained in the concept and technical scope of the present invention are also included.

FIG. 1 is a system diagram illustrating a sound system including a wearable device according to a first embodiment of the present invention. Referring to FIG. 1, the wireless sound system according to the first embodiment of the present invention includes a wearable device 200 and a mobile terminal 100 wirelessly communicable with the wearable device 200.

The wearable device 200 may be included in the mobile terminal 100. In more detail, the wearable device 200 is a sound device for allowing a user to receive and listen to music or radio broadcast played in the mobile terminal 100 while worn on the user's neck. Then, it is characterized that a plurality of camera modules are mounted on the wearable device 200.

In relation to a camera module mounted on the wearable device 200, a user can directly manipulate and operate a capture button equipped at the wearable device 200 and also may manipulate the camera module wirelessly through an application or program equipped in the mobile terminal 100. For example, when a camera focus adjustment or a direction adjustment of a camera lens, and a capture command are input by executing an application installed at the mobile terminal 100, the command is transmitted to the wearable device 200 wirelessly and the camera module operates according to the transmitted command.

Then, an image or video captured through a camera module equipped at the wearable device 200 is transmitted to the mobile terminal 100 wirelessly so that it may be displayed on a display unit of the mobile terminal 100 or may be stored in a memory of the mobile terminal 100.

Additionally, an image formed in a camera of the wearable device 200 is displayed in a preview form on the display unit of the mobile terminal 100, so that it may be checked by a user through the display unit of the mobile terminal 100. The exterior of the wearable device 200 is schematically examined as follows.

The wearable device 200 may include a band part 210 hung on the user's neck, one pair of body parts 220 coupled to both ends of the band part 210, one pair of earphones 240a and 240b coupled to be drawn from the one pair of body parts 220 and put into the user's ear to listen to sound, and one or more camera modules for capturing. The one or more camera modules may include a front camera module 280 mounted at one or both of the body parts 220 of one pair and a rear camera module 190 mounted at the center part of the band part 210. Then, the band part 210 includes a member having elasticity.

Additionally, the band part 210 includes a first band 210a put on the user's right neck part and shoulder part and a second band 210b put on the user's left neck part and shoulder part. One end parts of the first band 210a and the second band 210b are connected as one body by the rear camera module 290 to form the band part 210. However, the form of the band part 210 is not limited to the above-suggested example. For example, the band part 210 may be formed of a single body and the rear camera module 290 may be rotatably wound on the outer peripheral surface of the band part 210.

Additionally, the body parts 220 of one pair are respectively connected to the other end parts of the first band 210a and the second band 210. In more detail, the one pair of body parts 220 may include a first body part 220a connected to the other end of the first band 210a and a second body part 220b connected to the other end of the second band 210a.

Then, one or more illumination sensor 260 may be mounted at the outer peripheral surface of the band part 210. It is possible to detect a brightness change by the illumination sensor 260 to notify an alarm in sound to a user. For example, when a user plugs the earphones 240a and 240b in the ear and listening to music at night while walking, if a vehicle approaches toward the user, the illumination sensor 260 detects the light emitted from the headlights of the vehicle. Then, as an alarm sound or vibration is generated through the earphones 240a and 240b, the user can quickly detect an accident risk.

Further, the front camera module 280 is mounted at one portion of the body part 220 and the lens part of the front camera module 280 may be exposed to the top surface of the body part 220. Then, a play button 223 for music playback and stop may be disposed at the top surface of the body part 220 corresponding to a point spaced from the front camera module 280. Then, a button part for an operation of the rear camera module 290 may be equipped at the top surface of the body part 220 corresponding to a point spaced from the play button 223. The button part for an operation of the rear camera module 290 may include a capture button 233 and an angle adjustment button 233a respectively disposed at the front and rear of the capture button 233. The angle adjustment button 233a is a button for tilting or rotating the rear camera module 290 vertically and as pressing a button located at the front of the capture button 233, the rear camera module 190 is tilted or rotated toward the upper side and as pressing a button located at the rear, the rear camera module 190 may be tilted or rotated toward the lower side. A configuration of the rear camera module 290 will be described below in more detail with reference to the drawings.

Various buttons in addition to the above-mentioned buttons may be equipped at one side of the body part 220. For example, the body part 220 may include a mode selection button 235 for selecting one of music and radio broadcast, a channel selection button for selecting a broadcast station channel when a radio broadcast is selected, a capture button 231 for capturing by using the front camera module 280, a volume button 224 for adjusting the size of a sound output through the earphones 240a and 240b, and a reel button for automatically winding a sound cable of the earphones 240a and 240b. The buttons may be installed to be exposed to the outer peripheral surface of the body part 220 or protrude. Then, various forms of button structures including a push button form for applying pressure to a dome switch of a circuit board as a user presses it by a finger, a wheel key form for inputting a command by rotating a predetermined amount to the front or back, a touch type button using a capacitance change, or a vibration button form for receiving a command by detecting a vibration occurring as a user taps using a finger may be applicable to the buttons.

Additionally, the other one of the body parts 220 of one pair may include a call button 223a, a volume button 224a for adjusting the size of a call volume, and a reel button 234 for automatically winding a sound cable connected to the earphones 240a and 240b. In more detail, the call button 223a may be disposed at one side of the top surface of the body part 220 and the volume button 224a and the reel button 234 may be disposed at a side of the body part 220. Then, as a power switch 229 for turning on/off the power of the wearable device 200 is equipped at a side of the body part 220, when the wearable device 200 is not in use, battery consumption amount may be minimized.

Additionally, an interface such as a universal serial bus (USB) port 228 may be equipped at a side of the body part 220. The USB port 228 is blocked by a cover when not in use and in order to connect a USB cable for charging, a cable terminal is inserted into the USB port 228 after opening the cover. Herein, a magnet is attached to the cover for opening/closing the USB port 228 and an edge part of the USB port 228 is formed of metal material, so that even when a user does not close the cover, the cover may block the USB port 228 by magnetism.

Herein, the positions of the buttons are not limited to the positions shown in the drawings and it should be clarified that the buttons are installed at appropriate positions to maximize user's convenience. Additionally, the above-mentioned buttons are identically applied to a wearable device according to another embodiment suggested below. Accordingly, even when there is no additional description for some of the buttons in another embodiment suggested below, they are components of corresponding embodiments.

Moreover, a speaker hole 241 for outputting sound to the outside during a voice call may be formed at the top surface of the body part 220. That is, a call voice is output to any one of the earphones 240a and 240 and the speaker hole 241 by a user's selection and a button for such a selection may be additionally equipped at one side of the outer peripheral surface of the body part 220. Then, a speaker module may be mounted at the inside of the body part 220 corresponding to a lower side of the speaker hole 241.

Additionally, a microphone hole 221c is formed at one side of the outer peripheral surface of the body part 220, specifically, one side of the top surface, so that a user can input his/her voice during a phone call.

Hereinafter, a control configuration of the wearable device 200 having the above external configuration will be described in more detail by using a block diagram. Some of components disclosed in a block diagram suggested below may not be clearly illustrated in an exploded diagram of a wearable device disclosed in FIG. 4. However, it should be clarified that all components disclosed only in a block diagram are components that are equipped in a module form or an electronic device form at a circuit board installed at a body part of wearable devices according to an embodiment of the present invention or electrically connected to the circuit board in an additional part or device form.

Figure 2:
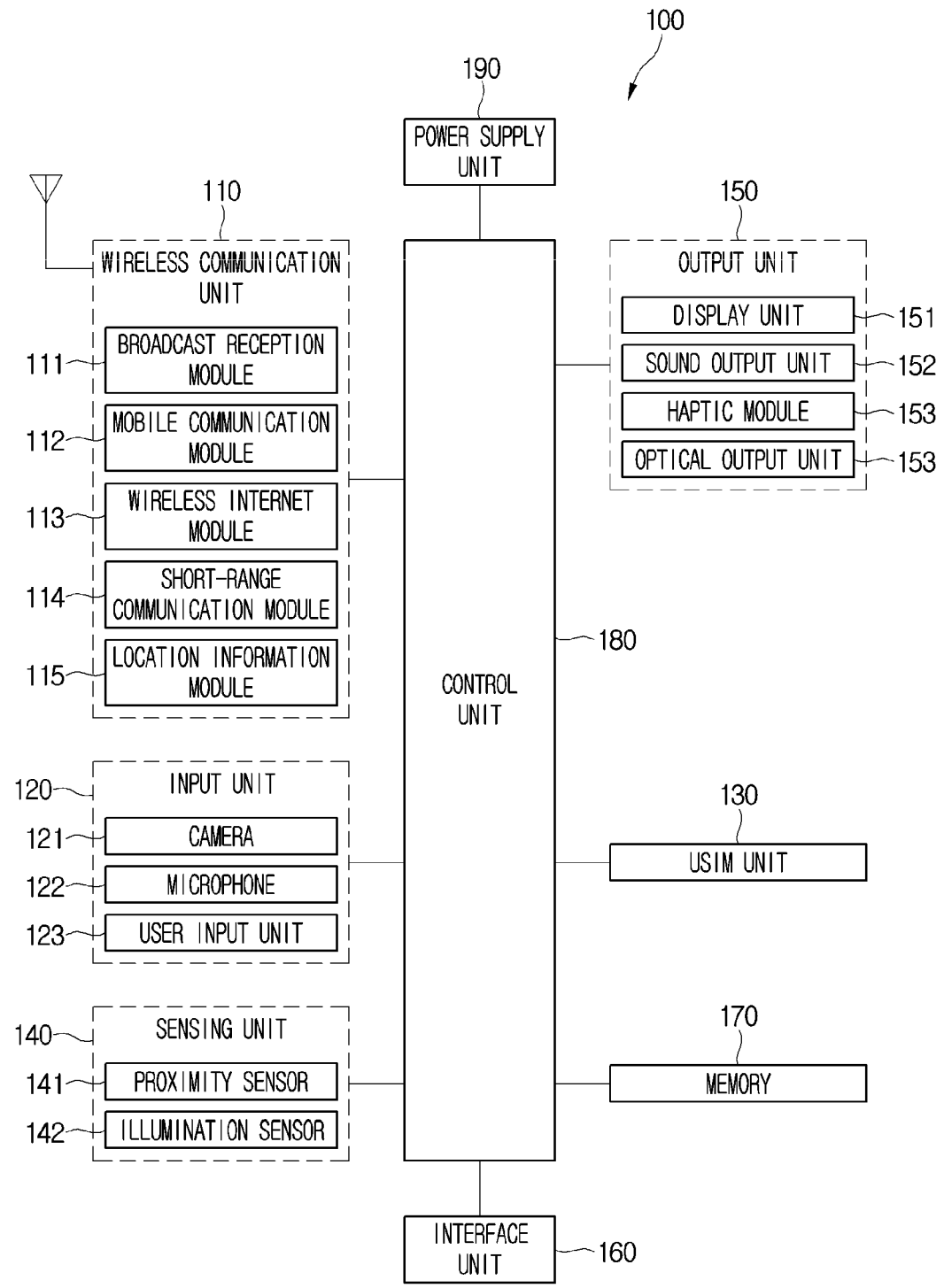
FIG. 2 is a block diagram illustrating a control configuration of a mobile terminal wirelessly communicating with a wearable device according to an embodiment of the present invention.

FIG. 2 is a block diagram illustrating a control configuration of a mobile terminal wirelessly communicating with a wearable device according to an embodiment of the present invention. Referring to FIG. 2, a mobile terminal 100 wirelessly communicating with the wearable device 200 may include a wireless communication unit 110, an input unit 120, a sensing unit 140, an output unit 150, an interface unit 160, a memory 170, a control unit 180, a USIM unit 130, and a power supply unit 190. Components disclosed in FIG. 2 may be more or less than the components listed above.

In more detail, the wireless communication unit 110 in the components may include at least one module allowing wireless communication between the mobile terminal 100 and a wireless communication system, between the mobile terminal 100 and another mobile terminal 100, or between the mobile terminal 100 and an external server. Additionally, the wireless communication unit 110 may include at least one module connecting the mobile terminal 100 to at least one network.

The wireless communication unit 110 may include at least one of a broadcast reception module 111, a mobile communication module 112, a wireless internet module 113, a short-range communication module 114, and a location information module 115. The input unit 120 may include a camera 121 or an image input unit for image signal input, a microphone 122 or an audio input unit for audio signal input, and a user input unit 123 (for example, a touch key and a mechanical key)) for receiving information from a user. Voice data or image data collected by the input unit 120 are analyzed and processed as a user's control command.

The sensing unit 140 may include at least one sensor for sensing at least one of information in a mobile terminal, environmental information around a mobile terminal, and user information. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, an ultrasonic sensor, an optical sensor (for example, a camera), a microphone, a battery gauge, an environmental sensor (for example, a barometer, a hygrometer, a thermometer, a radiation sensor, a thermal sensor, and a gas sensor), and a chemical sensor (for example, an electronic noise, a healthcare sensor, and a biometric sensor). Moreover, a mobile terminal disclosed in this specification may combines information sensed by at least two or more sensors among such sensors and may then utilize it.

The output unit 150 is used to generate a visual, auditory, or haptic output and may include at least one of a display unit 151, a sound output unit 152, a haptic module 153, and an optical output unit 154. The display unit 151 may be formed with a mutual layer structure with a touch sensor or formed integrally, so that a touch screen may be implemented. Such a touch screen may serve as the user input unit 123 providing an input interface between the mobile terminal 100 and a user and an output interface between the mobile terminal 100 and a user at the same time.

The interface unit 160 may serve as a path to various kinds of external devices connected to the mobile terminal 100. The interface unit 160 may include at least one of a wired/wireless headset port, an external charger port, a wired/wireless data port, a memory card port, a port connecting a device equipped with an identification module such as the USIM card 130, an audio Input/Output (I/O) port, a video I/O port, and an earphone port. In correspondence to that an external device is connected to the interface unit 160, the mobile terminal 100 may perform an appropriate control relating to the connected external device.

Additionally, the memory 170 may store data supporting various functions of the mobile terminal 100. The memory 170 may store a plurality of application programs (for example, application programs or applications) running on the mobile terminal 100 and also data and commands fir operations of the mobile terminal 100. At least part of such an application program may be downloaded from an external server through a wireless communication. Additionally, at least part of such an application program may be included in the mobile terminal 100 from the time of shipment in order to perform a basic function (for example, an incoming call, a transmission function, and a message reception) of the mobile terminal 100. Moreover, an application program may be stored in the memory 170 and installed on the mobile terminal 100, so that it may run to perform an operation (or a function) of the mobile terminal 100 by the control unit 180.

The control unit 180 may control overall operations of the mobile terminal 100 generally besides an operation relating to the application program. The control unit 180 may provide appropriate information or functions to a user or process them by processing signals, data, and information input/output through the above components or executing application programs stored in the memory 170.

Additionally, in order to execute an application program, stored in the memory 170, the control unit 180 may control at least part of the components. Furthermore, in order to execute the application program, the control unit 180 may combine at least two of the components in the mobile terminal 100 and may then operate it.

The power supply unit 190 may receive external power or internal power under a control of the control unit 180 and may then supply power to each component in the mobile terminal 100. The power supply unit 190 includes a battery and the battery may be a built-in battery or a replaceable battery.

At least part of the each component may operate cooperatively in order to implement operations, controls, or control methods of a mobile terminal 100 according to various embodiments of the present invention described below. Additionally, the operations, controls, or control methods of a mobile terminal 100 may be implemented on the mobile terminal 100 by executing at least one application program stored in the memory 170.

The broadcast reception module 111 of the wireless communication unit 110 may receive a broadcast signal and/or broadcast related information from an external broadcast management server through a broadcast channel. The broadcast channel may include a satellite channel and a terrestrial channel. At least two radio reception modules for simultaneous broadcast reception for at least two broadcast channels or broadcast channel switching may be provided to the mobile terminal 100.

The broadcast management server may refer to a server for generating and transmitting broadcast signals and/or broadcast related information or a server for receiving pre-generated broadcast signals and/or broadcast related information and transmitting them to a terminal. The broadcast signals may include TV broadcast signals, radio broadcast signals, and data broadcast signals and also may include broadcast signals in a combination format thereof.

The broadcast signal may be encoded according to at least one of technical standards (or broadcast methods, for example, ISO, IEC, DVB, and ATSC) for transmitting/receiving digital broadcast signals and the broadcast reception module 111 may receive the digital broadcast signals by using a method appropriate to the technical specifications set by the technical standards.

The broadcast related information may refer to information relating to broadcast channels, broadcast programs, or broadcast service providers. The broadcast related information may be provided through a mobile communication network. In such a case, the broadcast related information may be received by the mobile communication module 112.

The broadcast related information may exist in various formats such as Electronic Program Guide (EPG) of Digital Multimedia Broadcasting (DMB) or Electronic Service Guide (ESG) of Digital Video Broadcast-Handheld (DVB-H). Broadcast signals and/or broadcast related information received through the broadcast reception module 111 may be stored in the memory 170.

The mobile communication module 112 may transmit/receive a wireless signal to/from at least one of a base station, an external terminal, and a server on a mobile communication network established according to the technical standards or communication methods for mobile communication (for example. Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), and Long Term Evolution-Advanced (LTE-A)).

The wireless signal may include various types of data according to a voice call signal, a video call signal, or text/multimedia message transmission.

The wireless internet module 113 refers to a module for wireless internet access and may be built in or external to the mobile terminal 100. The wireless interact module 113 may be configured to transmit/receive a wireless signal in a communication network according to wireless internet technologies.

The wireless internet technology may include Wireless LAN (WLAN), Wireless-Fidelity (Wi-Fi), Wi-Fi Direct, Digital Living Network Alliance (DLNA), Wireless Broadband (WiBro), World Interoperability for Microwave Access (WiMAX). High Speed Downlink Packet Access (HSDPA), High Speed Uplink Packet Access (HSUPA), Long Term Evolution (LTE), and Long Term Evolution-Advanced (LTE-A) and the wireless internet module 113 transmits/receives data according at least one wireless internet technology including internet technology not listed above.

From the viewpoint that wireless Internet access by WiBro, HSDPA, HSUPA, GSM, CDMA, WCDMA, LTE, and LTE-A is achieved through a mobile communication network, the wireless internet module 113 performing wireless internet access through the mobile communication network may be understood as one type of the mobile communication module 112.

The short-range communication module 114 may support short-range communication by using at least one of Bluetooth™. Radio Frequency Identification (RFID), Infrared Data Association (IrDA), Ultra Wideband (UWB). ZigBee, Near Field Communication (NFC), Wireless-Fidelity (Wi-Fi), Wi-Fi Direct, and Wireless Universal Serial Bus (USB) technologies. The short-range communication module 114 may support wireless communication between the mobile terminal 100 and a wireless communication system, between the mobile terminal 100 and another mobile terminal 100, or between networks including the mobile terminal 100 and another mobile terminal 100 (or an external server) through wireless area networks. The wireless area networks may be wireless personal area networks.

Here, the other mobile terminal 100 may be a wearable device (for example, the wearable device 200, a smart watch, a smart glass, and an HMD) that is capable of exchanging data (or interworking) with the mobile terminal 100. The short-range communication module 114 may detect (or recognize) a wearable device around the mobile terminal 100, which is capable of communicating with the mobile terminal 100. Furthermore, if the detected wearable device is a device authenticated to communicate with the mobile terminal 100, the control unit 180 may transmit at least part of data processed in the mobile terminal 100 to the wearable device through the short-range communication module 114. Accordingly, a user of the wearable device may use the data processed in the mobile terminal 100 through the wearable device. For example, according thereto, when a call is received by the mobile terminal 100, a user can perform a phone call through the wearable device or when a message is received by the mobile terminal 100, a user can check the received message.

The location information module 115 is a module for obtaining the location (or the current location) of a mobile terminal and its representative examples include a global positioning system (GPS) module or a Wi-Fi module. For example, the mobile terminal may obtain its position by using a signal transmitted from a GPS satellite through the GPS module. As another example, the mobile terminal may obtain its position based on information of a wireless access point (AP) transmitting/receiving a wireless signal to/from the Wi-Fi module, through the Wi-Fi module. If necessary, the position information module 115 may perform a function of another module in the wireless communication unit 110 in order to obtain data on the location of the mobile terminal substitutionally or additionally. The location information module 115 is a module for obtaining the position (or the current position) of the mobile terminal and is not limited to a module directly calculating and obtaining the position of the mobile terminal.

Then, the input unit 120 is used for inputting image information (or signal), audio information (or signal), data, or information input from a user and the mobile terminal 100 may include at least one camera 121 in order for inputting image information. The camera 121 processes image frames such as a still image or a video obtained by an image sensor in a video call mode or a capturing mode. The processed image frame may be displayed on the display unit 151 or stored in the memory 170. Moreover, a plurality of cameras 121 equipped in the mobile terminal 100 may be arranged in a matrix structure and through the camera 121 having such a matrix structure, a plurality of image information having various angles or focuses may be input to the input terminal 100. Additionally, the plurality of cameras 121 may be arranged in a stereo structure to obtain the left and right images for implementing a three-dimensional image.

The microphone 122 processes external sound signals as electrical voice data. The processed voice data may be utilized variously according to a function (or an application program being executed) being performed in the mobile terminal 100. Moreover, various noise canceling algorithms for removing noise occurring during the reception of external sound signals may be implemented in the microphone 122.

The user input unit 123 is to receive information from a user and when information is input through the user input unit 123, the control unit may control an operation of the mobile terminal 100 to correspond to the input information. The user input unit 123 may include a mechanical input means (or a mechanical key, for example, a button, a dome switch, a jog wheel, and a jog switch at the front, back or side of the mobile terminal 100) and a touch type input means. For example, the touch type input means may include a virtual key displayed on a touch screen through software processing, a soft key, a virtual key, or a touch key arranged at a portion other than the touch screen. Moreover, the virtual key or the visual key may be displayed on the touch screen in various forms and for example, may include graphic, text, icon, video, or a combination thereof.

Moreover, the sensing unit 140 may sense at least one of information in a mobile terminal, environmental information around a mobile terminal, and user information and may then generate a sensing signal corresponding thereto. Based on such a sensing signal, the control unit 180 may control the drive or control of the mobile terminal 100 or may perform data processing, functions, or operations relating to an application program installed in the mobile terminal 100. Representative sensors among various sensors included in the sensing unit 140 will be described in more detail.

First, the proximity sensor 141 refers to a sensor detecting whether there is an object approaching a predetermined detection surface or whether there is an object around by using the strength of an electromagnetic field or infrared, without mechanical contact. The proximity sensor 141 may disposed in an inner area of a mobile terminal surrounded by the touch screen or around the touch screen.

Examples of the proximity sensor 141 may include a transmission-type photoelectric sensor, a direct reflective-type photoelectric sensor, a mirror reflective-type photoelectric sensor, a high-frequency oscillation-type proximity sensor, a capacitive-type proximity sensors, a magnetic-type proximity sensor, and an infrared proximity sensor, if the touch screen is a capacitive type, the proximity sensor 141 may be configured to detect the proximity of an object by changes in an electric field according to the proximity of the object having conductivity. In this instance, the touch screen (or a touch sensor) itself may be classified as a proximity sensor.

Moreover, for convenience of description, an action for recognizing the position of an object on the touch screen as the object is close to the touch screen without contacting the touch screen is called "proximity touch" and an action that the object actually contacts the touch screen is called "contact touch". A position that an object is proximity-touched on the touch screen is a position that the object vertically corresponds to the touch screen when the object is proximity-touched. The proximity sensor 141 may detect a proximity touch and a proximity touch pattern (for example, a proximity touch distance, a proximity touch direction, a proximity touch speed, a proximity touch time, a proximity touch position, and a proximity touch movement state). Moreover, the control unit 180 processes data (for information) corresponding to a proximity touch operation and a proximity touch pattern, detected through the proximity sensor 141, and furthermore, may output visual information corresponding to the processed data on the touch screen. Furthermore, according to whether a touch for the same point on the touch screen is a proximity touch or a contact touch, the control unit 180 may control the mobile terminal 100 to process different operations or data (or information).

The touch sensor detects a touch (or a touch input) applied to the touch screen. (or the display unit 151) by using at least one of various touch methods, for example, a resistive film method, a capacitive method, an infrared method, an ultrasonic method, and a magnetic field method.

For example, the touch sensor may be configured to convert a pressure applied to a specific portion of the touch screen or changes in capacitance occurring at a specific portion into electrical input signals. The touch sensor may be configured to detect a position and area that a touch target applying a touch on the touch screen touches the touch sensor, a pressured when touched, and a capacitance when touched. Here, the touch target, as an object applying a touch on the touch sensor, may be a finger, a touch pen, a stylus pen, or a pointer, for example.

In such a manner, when there is a touch input on the touch sensor, signal(s) corresponding thereto are sent to a touch controller. The touch controller processes the signal(s) and then transmits corresponding data to the control unit 180. Therefore, the control unit 180 may recognize which area of the display unit 151 is touched. Herein, the touch controller may be an additional component separated from the control unit 180 or may be the control unit 180 itself.

Moreover, the control unit 180 may perform different controls or the same control according to types of a touch target touching the touch screen (or a touch key equipped separated from the touch screen). Whether to perform different controls or the same control according to types of a touch target may be determined according to a current operation state of the mobile terminal 100 or an application program in execution.

Moreover, the above-mentioned touch sensor and proximity sensor are provided separately or combined and may thus sense various types of touches, for example, short (or tap) touch, long touch, multi touch, drag touch, flick touch, pinch-in touch, pinch-out touch, swipe touch, and hovering touch for the touch screen.

The ultrasonic sensor may recognize position information of a detection target by using ultrasonic waves. Moreover, the control unit 180 may calculate the position of a wave source through information detected by an optical sensor and a plurality of ultrasonic sensors. The position of the wave source may be calculated by using the property that light is much faster than ultrasonic wave, that is, a time that light reaches an optical signal is much shorter than a time that ultrasonic, wave reaches an ultrasonic sensor. In more detail, the position of the wave source may be calculated by using a time difference with a time that ultrasonic wave reaches by using light as a reference signal.

Moreover, the camera 121 described as a configuration of the input unit 120 may include at least one of a camera sensor (for example, CCD and CMOS), a photo sensor (or an image sensor), and a laser sensor.

The camera 121 and the laser sensor may be combined to detect a touch of a detection target for a three-dimensional image. The photo sensor may be stacked on a display device and is configured to scan a movement of a detection target close to the touch screen. In more detail, the photo sensor mounts a photo diode and a transistor (TR) in a row/column and scans content disposed on the photo sensor by using an electrical signal changing according to an amount of light applied to the photo diode. That is, the photo sensor may calculate the coordinates of a detection target according to the amount of change in light and through this, may obtain the position information of the detection target.

The display unit 151 may display (output) information processed in the mobile terminal 100. For example, the display unit 151 may display execution screen information of an application program running on the mobile terminal 100 or user interface (UI) and graphic user interface (GUI) information according to such execution screen information.

Additionally, the display unit 151 may be configured as a three-dimensional display unit displaying a three-dimensional image. A three-dimensional display method, for example, a stereoscopic method (a glasses method), an autostereoscopic (no glasses method), a projection method (a holographic method) may be applied to the three-dimensional display unit The sound output unit 152 may output audio data received from the wireless communication unit 110 or stored in the memory 170 in a call signal reception or call mode, a recording mode, a voice recognition mode, or a broadcast reception mode. The sound output unit 152 may output a sound signal relating to a function (for example, a call signal reception sound and a message reception sound) performed by the mobile terminal 100. The sound output unit 152 may include a receiver, a speaker, and a buzzer.

The haptic module 153 generates various haptic effects that a user can feel. A representative example of a haptic effect that the haptic module 153 generates is vibration. The intensity and pattern of vibration generated by the haptic module 153 may be controlled by a user's selection or a setting of a control unit. For example, the haptic module 153 may synthesize and output different vibrations or output different vibrations sequentially.

The haptic module 153 may generate various haptic effects, for example, effects by a pin arrangement moving vertical to a contact skin surface, injection power or suction power of air through an injection port or a suction port, rubbing a skin surface, electrode contact, stimulus of electrostatic force and effects by the reproduction of cold/warm sense by using a device absorbing or emitting heat. The haptic module 153 may be implemented to deliver a haptic effect through a direct contact and also allow a user to feel a haptic effect through a muscle sense such as a finger or an arm. The haptic module 153 may be more than two according to a configuration aspect of the mobile terminal 100.

The optical output unit 154 outputs a signal for notifying event occurrence by using light of a light source of the mobile terminal 100. An example of an event occurring in the mobile terminal 100 includes message reception, call signal reception, missed calls, alarm, schedule notification, e-mail reception, and information reception through an application.

A signal output from the optical output unit 154 is implemented as a mobile terminal emits single color of multi-color to the front or the back. The signal output may be terminated when a mobile terminal detects user's event confirmation.

The interface unit 160 may serve as a path to all external devices connected to the mobile terminal 100. The interface unit 160 may receive data from an external device, receive power and deliver it to each component in the mobile terminal 100, or transmit data in the mobile terminal 100 to an external device. For example, the interface unit 160 may include a wired/wireless headset port, an external charger port, a wired/wireless data port, a memory card port, a port connecting a device equipped with an identification module, an audio I/O port, a video I/O port, and an earphone port.

Moreover, the identification module, as a chip storing various information for authenticating usage authority of the mobile terminal 100, may include a user identity module (UIM), a subscriber identity module (SIM), and a universal subscriber identity module (USIM). A device equipped with an identification module (hereinafter referred to as an identification device) may be manufactured in a smart card form. Accordingly, the identification device may be connected to the terminal 100 through the interface unit 160.

Additionally, when the mobile terminal 100 is connected to an external cradle, the interface unit 160 may become a path through which power of the cradle is supplied to the mobile terminal 100 or a path through which various command signals input from the cradle are delivered to the mobile terminal 100 by a user. The various command signals or the power input from the cradle may operate as a signal for recognizing that the mobile terminal 100 is accurately mounted on the cradle.

The memory 170 may store a program for an operation of the control unit 180 and may temporarily store input/output data (for example, a phone book, a message, a still image, and a video). The memory 170 may store data on various patterns of vibrations and sounds output during a touch input on the touch screen.

The memory 170 may include at least one type of storage medium among flash memory type, hard disk type, Solid State Disk (SSD) type, Silicon Disk Drive (SDD) type, multimedia card micro type, card type memory (for example, SD or XD memory type), random access memory (RAM) type, static random access memory (SRAM) type, read-only memory (ROM) type, electrically erasable programmable read-only memory (EEPROM) type, programmable read-only memory (PROM) type, magnetic memory type, magnetic disk type, and optical disk type. The mobile terminal 100 may operate in relation to a web storage performing a storage function of the memory 170 on internet.

Moreover, as mentioned above, the control unit 180 may control operations relating to an application program and overall operations of the mobile terminal 100 in general. For example, if a state of the mobile terminal 100 satisfies set conditions, the control unit 180 may execute or release a lock state limiting an output of a control command of a user for applications.

Additionally, the control unit 180 may perform a control or processing relating to a voice call, data communication, and a video call may perform pattern recognition processing for recognizing handwriting input or drawing input on the touch screen as a text and an image, respectively. Furthermore, the control unit 180 may use at least one or a combination of the above components to perform a control in order to implement various embodiments described below on the mobile terminal 100.

The power supply unit 190 may receive external power or internal power under a control of the control unit 180 and may then supply power necessary for an operation of each component. The power supply unit 190 includes a battery. The battery is a rechargeable built-in battery and may be detachably coupled to a terminal body in order for charging Additionally, the power supply unit 190 may include a connection port and the connection port may be configured as one example of the interface unit 160 to which an external charger supplying power for charging of the battery is electrically connected.

As another example, the power supply unit 190 may be configured to charge a battery through a wireless method without using the connection port. In this instance, the power supply unit 190 may receive power from an external wireless power transmission device through at least one of an inductive coupling method based on a magnetic induction phenomenon, and a magnetic resonance coupling method based on an electromagnetic resonance phenomenon.

Moreover, various embodiments described herein may be implemented in recording media that can be readable by computers or devices similar thereto through software, hardware, or a combination thereof.

Figure 3:
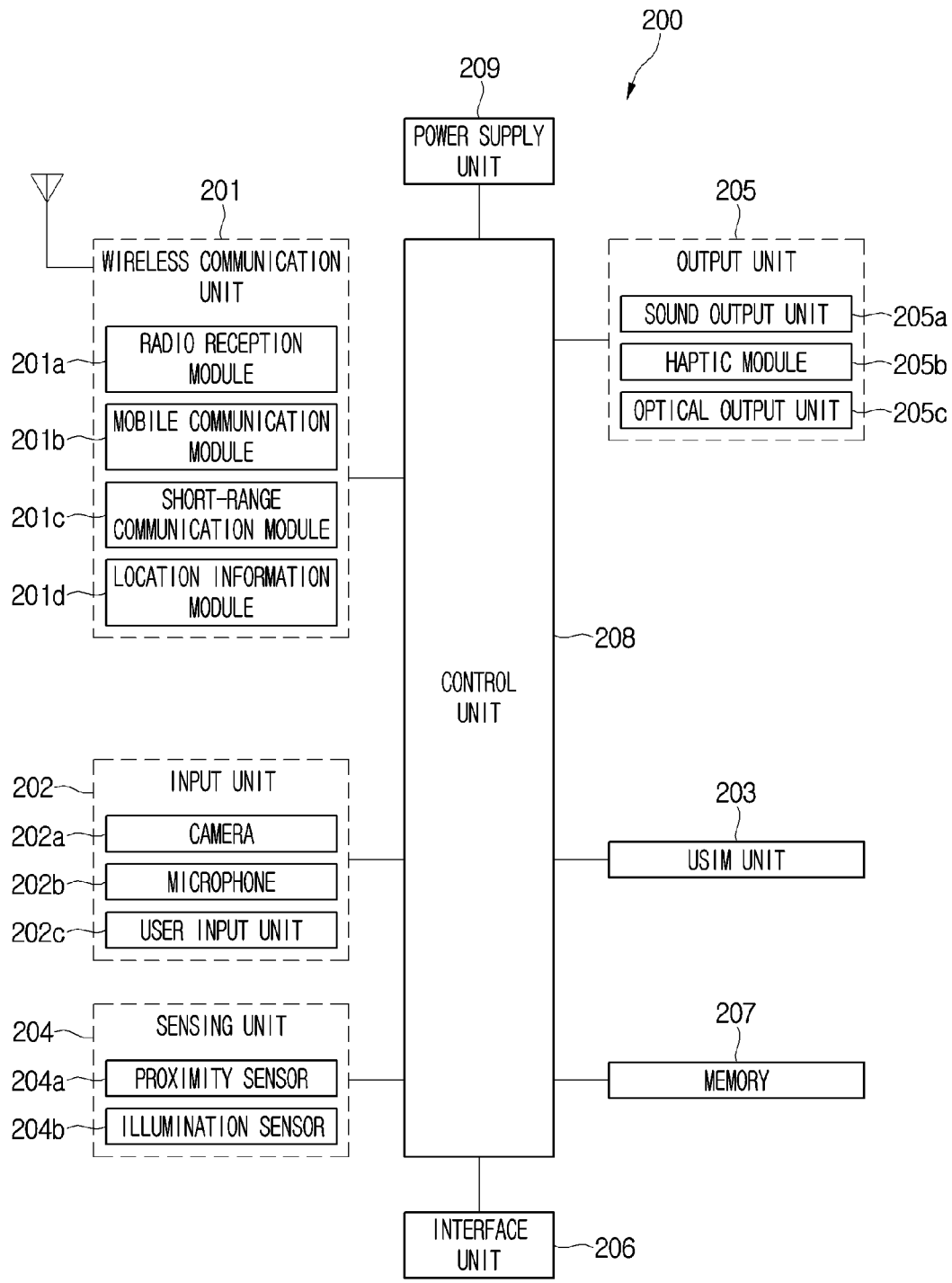
FIG. 3 is a block diagram illustrating a control configuration of a wearable device according to an embodiment of the present invention.

FIG. 3 is a block diagram illustrating a control configuration of a wearable device according to an embodiment of the present invention. Referring to FIG. 3, configurations of the wearable device 200 according to an embodiment of the present invention described below may be commonly equipped in wearable devices according to all embodiments described below.

Additionally, some of components described below may be components having the same functions and operations as the components equipped in the mobile terminal 100. In more detail, the wearable device 200 may include a wireless communication unit 201, an input unit 202, a sensing unit 204, an output unit 205, an interface unit 206, a memory 207, a control unit 208, a USIM unit 203, and a power supply unit 209.

The wireless communication unit 201 may include at least one module allowing wireless communication between the wearable device 200 and the mobile terminal 100 or between the wearable device 200 and an external server. The wireless communication unit 201 may include at least one of a radio reception module 201a, a mobile communication module 201b, a short-range communication module 201c, and a location information module 201d.

The input unit 202 may include a camera 202a or an image input unit for image signal input, a microphone 202b or an audio input unit for audio signal input, and a user input unit 202c for receiving information from a user. The camera 202a includes a front camera module 280 and a rear camera module 290 equipped at the wearable device 200 according to an embodiment of the present invention. Then, the user input unit 202c includes the above-described various buttons. Then, the microphone 202b includes a microphone 248 (see FIG. 4) equipped at the wearable device 200.

Also, the sensing unit 204 may include at least one of a proximity sensor 204a, an illumination sensor 240b, a touch sensor, an acceleration sensor, a magnetic sensor, a CT-sensor, a gyroscope sensor, a motion sensor, an RUB sensor, an infrared (IR) sensor, a finger scan sensor, and an ultrasonic sensor. Then, the sensors may be identical to the sensor equipped in the mobile terminal 100. Especially, the illumination sensor 204b may include the illumination sensor 260 equipped at the band part 210 of the wearable device 200. The output unit 205 may include at least one of a sound output unit 205a, a haptic module 205b, and an optical output unit 205c. Then, the sound output unit 205a may include a speaker module 243 (see FIG. 4) equipped at the body part 220 of the wearable device 200 and a speaker module equipped at the earphones 204a and 204b.

The interface unit 206 may serve as a path to various kinds of external devices connected to the wearable device 200. Such the interface unit 206 may include at least one of an external charger port, a data port such as the USB port 228, a memory card port, and a port connecting a device equipped with an identification module such as the USIM unit 203. Additionally, the memory 207 may store data supporting various functions of the wearable device 200. The memory 207 may store a plurality of application programs executed in the wearable device 200, and data and commands for operations of the wearable device 200. At least part of such an application program may be downloaded from an external server through a wireless communication.

The control unit 208 may control overall operations of the wearable device 200 in addition to an operation relating to the application program. The control unit 208 may provide appropriate information or functions to a user or process them by processing signals, data, and information input/output through the above components or executing application programs stored in the memory 207.

The power supply unit 209 may receive external power or internal power under a control of the control unit 208 and may then supply power to each component in the wearable device 200. The power supply unit 209 includes a battery 270 (see FIG. 4) and the battery may be a built-in battery or a replaceable battery.

Moreover, the radio reception module 201a of the wireless communication unit 110 may receive a broadcast signal and/or broadcast related information from an external broadcast management server through a broadcast channel. The broadcast channel may include a satellite channel and a terrestrial channel. At least two radio receiving modules for simultaneous broadcast reception for at least two broadcast channels or broadcast channel switching may be provided to the mobile terminal 100.

The broadcast management server may refer to a server for generating and transmitting broadcast signals and/or broadcast related information or a server for receiving pre-generated broadcast signals and/or broadcast related information and transmitting them to a terminal.

The mobile communication module 201b may transmit/receive a wireless signal to/from at least one of a base station an external terminal, and a server on a mobile communication network established according to the technical standards or communication methods for mobile communication (for example, Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), and Long Term Evolution-Advanced (LTE-A)). As the mobile communication module 201b and a USIM card are installed in the wearable device 200, the wearable device 200 itself may perform a function of a mobile phone.

The wireless signals may include various types of data according to a voice call signal or text/multimedia message transmission. When a display window is equipped in the wearable device 200, text/multimedia message transmission and reception may be possible.

The short-range communication module 201c may support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies. The short-range communication module 201c may support wireless communication between the wearable device 200 and another wireless communication system or between the wearable device 200 and the mobile terminal 100 through short-range wireless communication network (e.g., wireless area networks). The wireless area networks may be wireless personal area networks.

The location information module 201d is a module for obtaining the location (or the current location) of the wearable device 200 and its representative examples include a global positioning system (UPS) module or a wireless fidelity (Wi-Fi) module. For example, in the case of the UPS module, the location of the wearable device 200 may be obtained by using a signal transmitted from a UPS satellite. As another example, in the case of the Wi-Fi module, the location of the wearable device 200 may be obtained based on information of a wireless access point (AP) transmitting/receiving a wireless signal to/from the Wi-Fi module.

Then, the input unit 202 is used for inputting image information, audio information (or signal), data, or information input from a user and the wearable device 200 may include one or more camera modules in order for inputting image information.

The one or more camera modules process image frames such as a still image or a video obtained by an image sensor in a capturing mode. The processed image frame may be stored in the memory 207. Then, the processed image frame 207 is transmitted to the mobile terminal 100 through the short-range communication module 201c and then may be stored in the memory 170. Additionally, the camera 202a equipped in the mobile terminal 100, that is, a plurality of camera modules, may be arranged in a stereo structure to obtain the left and right images for implementing a three-dimensional image.

The microphone 202b processes a user's voice signal input during a call process as electrical voice data. The processed voice data is transmitted to the mobile terminal 100 and transmitted from the mobile terminal 100 to the mobile terminal 100 of the other party. Moreover, various noise canceling algorithms for removing noise occurring during the reception of external sound signals may be implemented in the microphone 202b.

The user input unit 202c may include a button, a dome switch, a jog wheel, a jog switch, and a touch type input means. Moreover, the sensing unit 204 may sense at least one of information in the wearable device 200, environmental information around the wearable device 200, and user information, and may then generate a sensing signal corresponding thereto. Based on such a sensing signal, the control unit 208 may control the drive or control of the wearable device 200 or may perform data processing, functions, or operations relating to an application program installed in the wearable device 200. Then, the sensing unit 204 may correspond to a sensing unit having the same concept as a sensing unit equipped in the mobile terminal 100.

Moreover, the camera 202a described as a component of the input unit 202 may include at least one of a camera sensor (for example, CCD and CMOS), a photo sensor (or an image sensor), and a laser sensor. The sound output unit 205a may output audio data received from the wireless communication unit 201 or stored in the memory 170 in a call signal reception or call mode, a recording mode, a voice recognition mode, or a broadcast reception mode. The sound output unit 205a may output a sound signal relating to a function (for example, a call signal reception sound) performed by the mobile terminal 100. Such the sound output unit 205a may include the earphones 240a and 240b and the speaker module 243.

The haptic module 205b generates various haptic effects that a user can feel. A representative example of a haptic effect that the haptic module 205b generates is vibration. The intensity and pattern of vibration generated by the haptic module 205b may be controlled by a user's selection or a setting of a control unit. For example, an image capturing operation may be performed by generating vibration as a user taps the body part 220 of the wearable device 200 with a finger and detecting the vibration through the haptic module 205b.

The haptic module 205b may be implemented to deliver a haptic effect through a direct contact and also allow a user to feel a haptic effect through a muscle sense such as a finger or an arm. The haptic module 205b may be more than two according to a configuration aspect of the mobile terminal 100.

The optical output unit 205c outputs a signal for notifying event occurrence by using the light emitted from a light source equipped in the wearable device 200. For example, a notification event may include a call signal reception, a missed call, and an alarm.

Moreover, the identification module including the USIM module 130 may include a user identity module (UIM) and a subscriber identity module (SIM) in addition to the universal subscriber identity module (USIM) unit. A device equipped with an identification module (hereinafter referred to as an identification device) may be manufactured in a smart card form. Accordingly, the identification device may be connected to the wearable device 200 through the interface unit 206.

The memory 207 may include at least one type of storage medium among flash memory type, hard disk type, Solid State Disk (SSD) type, Silicon Disk Drive (SDD) type, multimedia card micro type, card type memory (for example, SD or XD memory type), random access memory (RAM) type, static random access memory (SRAM) type, read-only memory (ROM) type, electrically erasable programmable read-only memory (EEPROM) type, programmable read-only memory (PROM) type, magnetic memory type, magnetic disk type, and optical disk type.

<Detailed Structure Description of Wearable Device>

Figure 4:
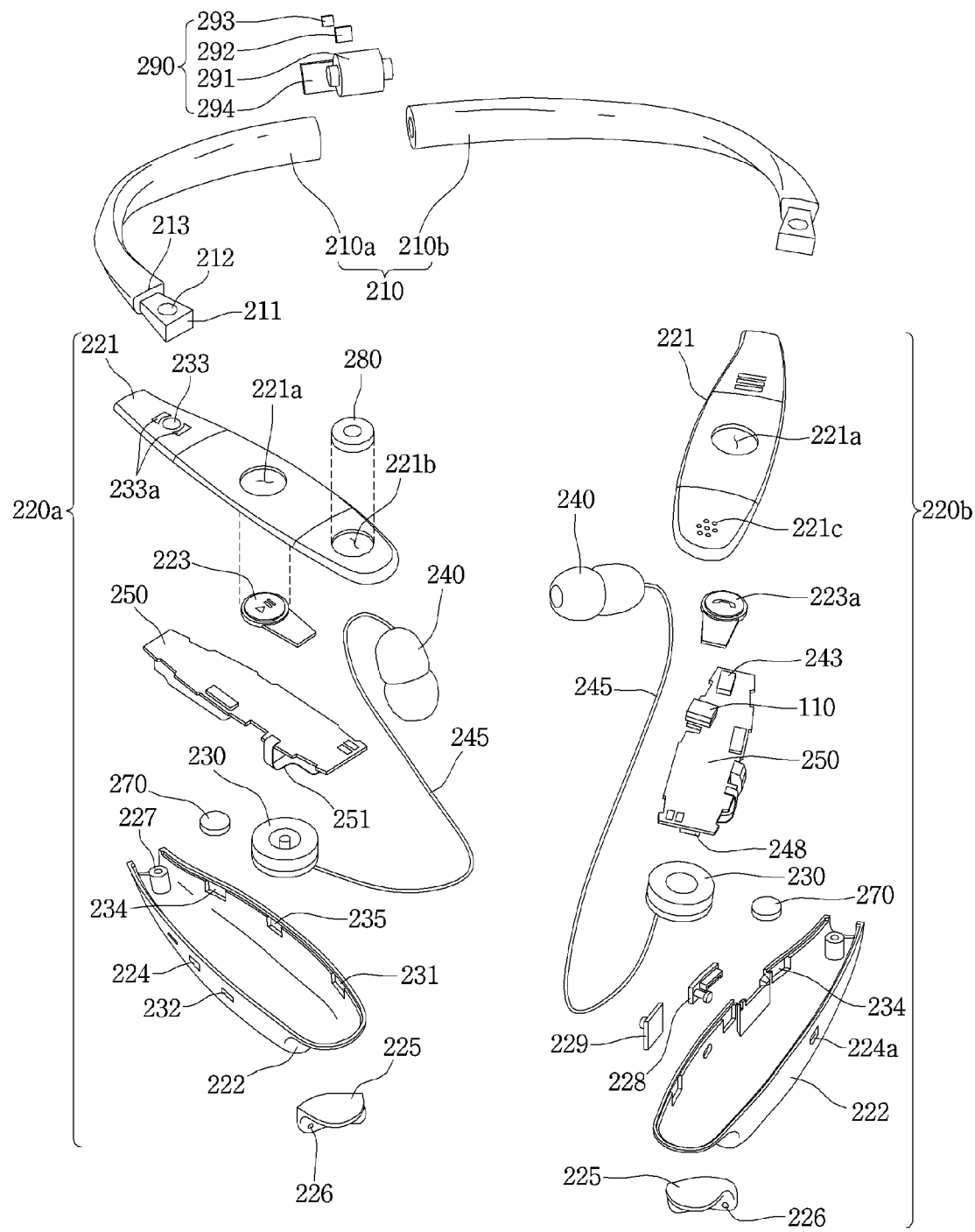
FIG. 4 is an exploded perspective view of a wearable device according to a first embodiment of the present invention.

FIG. 4 is an exploded perspective view of a wearable device according to a first embodiment of the present invention. Referring to FIG. 4, a wearable device 200 according to the first embodiment of the present invention, as mentioned above, may include a band part 210, body parts 220 respectively disposed at both end parts of the band part 210, and a camera module mounted at at least one side of the body part 220 and the band part 210.

In more detail, the band part 210, as mentioned above, may be formed a first band 210 and a second band 210b and the body part 220 may be formed of a first body part 220a and a second body part 22b. In more detail, each of the body parts 220a and 220b of one pair has an appearance formed by an upper part housing 221 and a lower part housing 222. Then, various electric parts are mounted in an inner space formed by the coupling of the upper part housing 221 and the lower part housing 222. Then, the earphones 240a and 240b are withdrawably mounted at the end parts of the body parts 221a and 22b of one pair, respectively.

Herein, the first body part 220a may be defined as a right body part and the second body part 220b may be defined as a left body part. The capture button 233 and the angle adjustment button 233a for manipulating the rear camera module 290 are installed at the upper part housing 221 configuring the right body part. Then, a button hole 221a where the play button 233 is inserted and a camera hole 221b where the front camera module 280 is inserted are formed at the upper housing 221 of the right body part.

Additionally, a circuit board 250 may be mounted at the inside of the right body part and various electric parts may be mounted at the circuit board 250 and a flexible printed circuit board 251 may be connected to one end of the circuit board 250. Additionally, a battery 270 corresponding to the power supply unit 209 may be mounted at the inside of the right body part. Then, a reel 230 for winding or unwinding the sound cable 245 connected to the earphones 240a and 240b is mounted at the inside of the right body part. A sound circuit board may be mounted at the inside of the reel 230 and the sound circuit board may be electrically connected to the circuit board 250 by the flexible printed circuit board 251 to output sound to the earphones 240a and 240b.

Moreover, a reel button 234, a volume button 224, a channel selection button 232, a mode selection button 235, and a capture button 231 are received at the inside of the lower part housing 222 configuring the right body part. Then, holes where the buttons are to be formed may be divided and formed at the right side and right side of the lower part housing 222 of the right body part.

Additionally, an earphone holder 225 may be mounted at the front end part of the lower part housing 222 and may be formed to be recessed and rounded to appropriately wrap and protect the outer peripheral surfaces of the earphones 240a and 240b. Then, an earphone switch 226 may be mounted at the rear surface of the earphone holder 225. In more detail, when the earphones 240a and 240b are seated at the earphone holder 226, the earphone switch 226 detects this to stop sound output.

Additionally, a magnet may be attached to any one side of the earphone holder 225 and the earphones 240a and 240b and a metallic conductor attached to the magnet may be equipped at the other side. Then, while the earphones 240a and 240b are seated at the earphone holder 226, they may be prevented from being separated from the earphone holder 226 due to its own weight or shaking of the wearable device 200.

Moreover, each extension end 211 protrudes from both end parts of the band part 210 and an insertion hole 212 is formed in the extension end 211. Then, additionally, a coupling boss 227 may protrude at the bottom surface of the lower part housing 222 and the body part 220 may be fixedly coupled to the end part of the band part 210 as the coupling boss 227 is inserted into the insertion hole 212. Then, the extension end 211 is formed to be stepped from the band part 210 so that the body part 220 may be prevented from spinning with no traction as being connected to the band part 210.

Additionally, a button hole 221a where the call button 223a is inserted is formed at the upper part housing 221 configuring the left body part. Then, the speaker hole 241 and the microphone hole 221c are formed around the button hole 221a. The volume button 224a, the power switch 229, and the USB port 228 are mounted at the inside space formed by the upper part housing 221 and the lower part housing 222 configuring the left body part and holes where the volume button 224a, the power switch 229, and the USB port 228 are to be mounted may be divided and formed at the left surface and right surface of the lower part housing 221.

Of course, an earphone holder structure equipped at the right body part is mounted at the end part of the left body part. Additionally, the circuit board 250 may be installed at the inside of the left body part and the speaker module 243, the wireless communication unit 110, and the microphone 248 may be mounted at the circuit board 250. The speaker module 243 is disposed directly under the speaker hole 241 and when the earphones 240a and 240b are not in use, sound is output through the speaker hole 241.

Additionally, the reel 230 is mounted at the inside of the left body part so that it winds or unwinds the sound cable 245 connected to the earphones 240a and 240b. Then, a sound circuit board equipped at the inside of the reel 230 is electrically connected to the flexible printed circuit board 251 connected to one end of the circuit board 250.

Moreover, as mentioned above, a plurality of function modules and electric parts are divided and formed at the left body part and the right body part and their mounting positions are changed appropriately. For example, the wireless communication unit 201 and the speaker module 243 may be installed at the right body part and the front camera module 280 may be installed at the left body part. That is, the fact that the above-described various configurations are equipped at the inside of the wearable device 200 is the main idea of the present invention and a specific design structure for which body part the configurations are mounted at is a an accessory idea.

Most of all, the inventive feature of the wearable device 200 according to an embodiment of the present invention is that one or more camera modules are installed at the wearable device 200. Moreover, the band part 210 is formed of a second band 210a and a first band 210b and the end parts of the second band 210a and the first band 210b are connected as one body by the rear camera module 290. That is, it may be said that the rear camera module 190 serves as connection member of the second band 210a and the first band 210b.

In more detail, the rear camera module 290 may include a hinge 291, a camera 292 mounted at the hinge 291, a lens 293 mounted at the front of the camera 292, and an auto focusing sensor (e.g., a laser detecting auto focusing sensor) 294 mounted at one side of the hinge 291.

Then, the end part of the second band part 210a and the end part of the right band part 210b are respectively connected to the left surface and right surface of the hinge 291. Then, the hinge 291 is rotatably mounted at the band part 210 and also rotatable upwardly or downwardly through the manipulation of the angle adjustment button 233a installed at the body part 220. As another method, an angle of the hinge 291 may be adjusted by using an application installed at the mobile terminal 100 that is wirelessly connected to the wearable device 200.

For example, a capture application for image or video capturing by using the front camera module 280 and the rear camera module 290 may be installed in the mobile terminal 100. Then, when the capture application is executed, a menu for controlling operations of the front camera module 280 and the rear camera module 290 may be programmed in advance and displayed on a display unit according to a user's selection. For example, a touch icon for an upward rotation command input of a rear camera and a touch icon for a downward rotation command input are displayed and when any one of the icons is touched by a user, an operation command that a corresponding icon has may be received by the wireless communication unit 110 of the wearable device 200 through the wireless communication unit 110. Then, the control unit 208 of the wireless sound device 200 transmits a command to a driving unit for driving the rear camera module 290, so that the rear camera module 290 may rotate upwardly or downwardly. A driving mechanism of the rear camera module 290 will be described below in more detail with reference to the drawings.

The auto focusing sensor 294, as an infrared sensor for detecting a distance to an object at the front of the camera 292 by using laser, may accurately focus the object in a short time by detecting the distance between the object and the camera 292.

Figure 5:
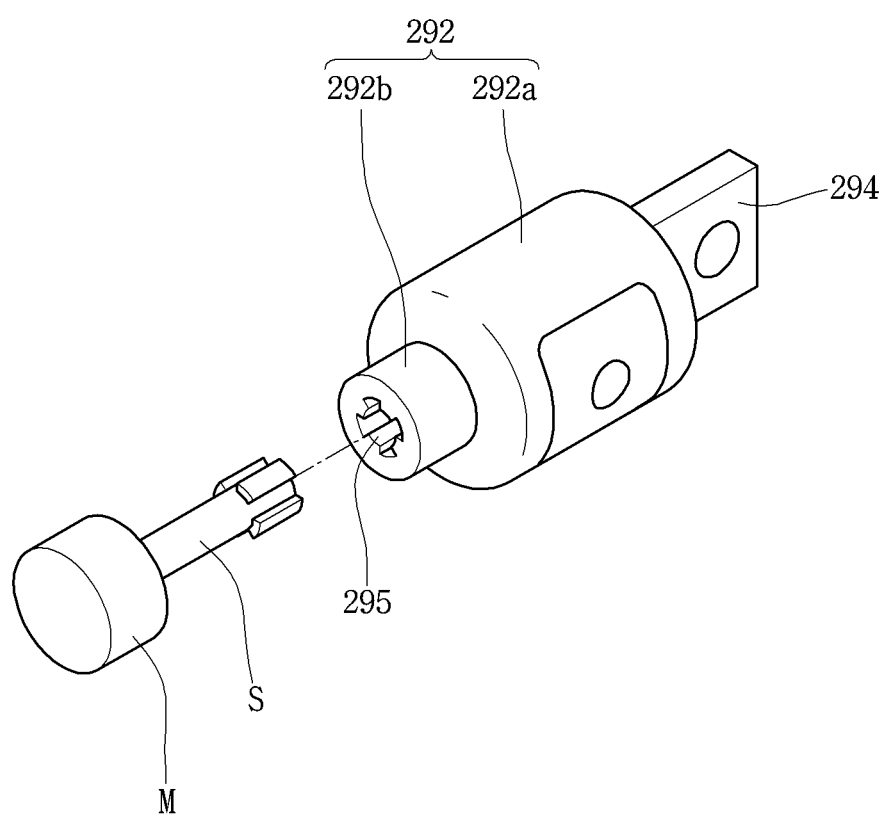
FIG. 5 is an exploded perspective view illustrating a driving mechanism of a rear camera module equipped at a wearable device according to an embodiment of the present invention.

FIG. 5 is an exploded perspective view illustrating a driving mechanism of a rear camera module equipped at a wearable device according to an embodiment of the present invention. Referring to FIG. 5, the rear camera module 290 may rotate upwardly or downwardly by a forward and reverse rotatable drive motor M. In more detail, the drive module M may include a small size of a servo motor or step motor that is built-in in the band part 210.

Additionally, the hinge 291 includes a hinge body 292a where the camera 292 is mounted and a hinge shaft 292b protruding from each of both sides of the binge body 292a. One pair of the hinge shafts 292b is inserted into the second band 210a and the first band 210b to connect the second and first bands 210a and 210b. Then, an axis insertion hole 295 may be formed at one side of one pair of the hinge shafts 292b. Then, a rotation shaft S of the drive module M is inserted into the axis insertion hole 295, so that the rotation axis S and the hinge 292 rotate as one body.

The drive motor M rotates forwardly or reversely by receiving a drive command from the control unit 208 of the wearable device 200. Of course, it is apparent that a driver IC for controlling the rotation of the drive motor M is equipped in the control unit 208.

Figure 6:
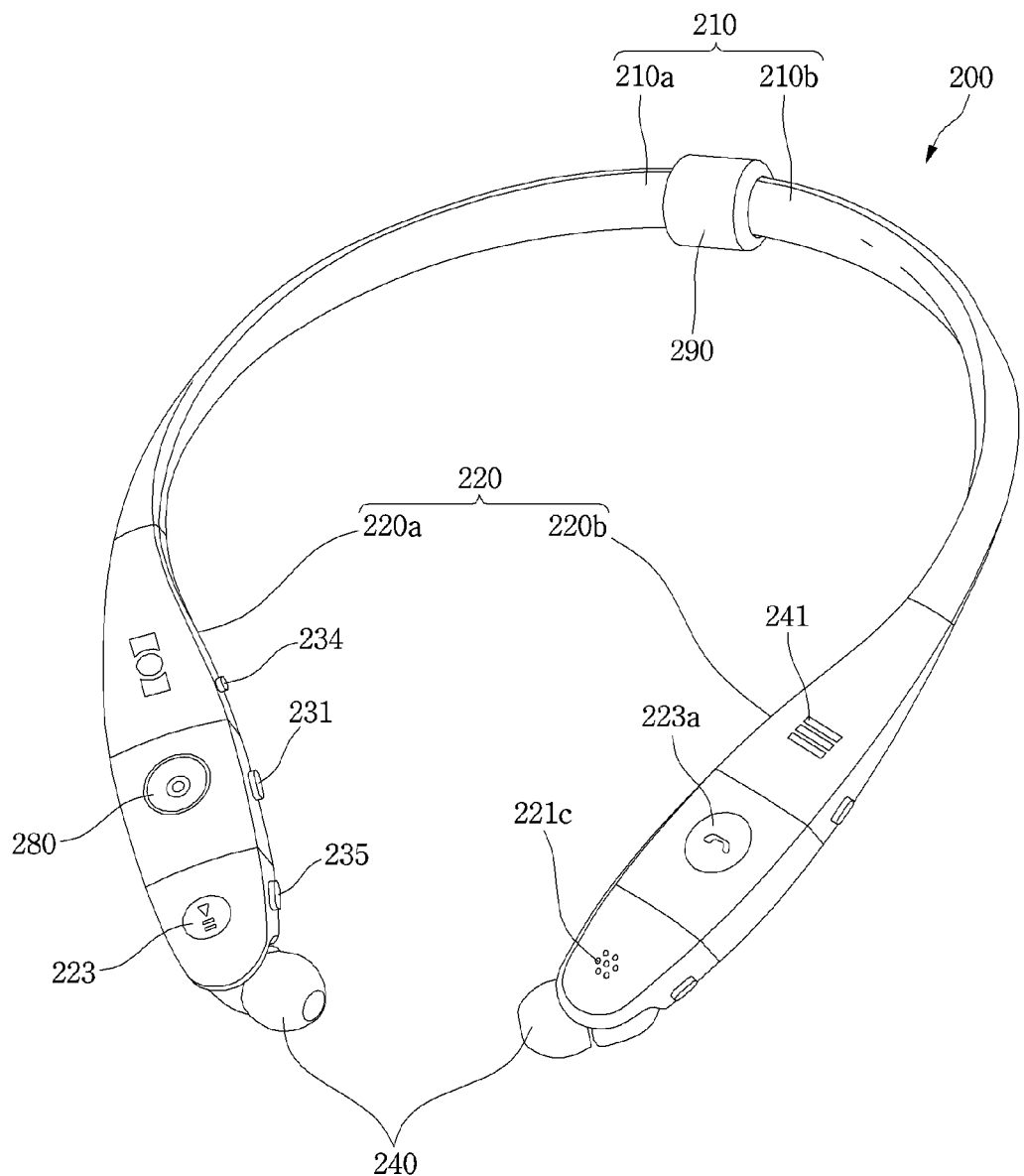
FIG. 6 is a perspective view of a wearable device according to a second embodiment of the present invention.

FIG. 6 is a perspective view of a wearable device according to a second embodiment of the present invention. Referring to FIG. 6, a wearable device 200 according to the embodiment has a configuration that is mostly identical to that of the wearable device 200 according to the first embodiment but there is a difference in a mounting position of the front camera module 280. That is, the play button 223 and the mode selection button 235 are equipped at the front end part of the body part 220 and the front camera module 280 is equipped at the rear side of the play button 223. As another suggested possible example, the front camera module 280 may be equipped at the left body part 220. That is, according to a suggested possible embodiment, the front camera module 280 may be equipped at the left body part 220 and may be disposed at the front or rear of the call button 223a.

Figure 7:
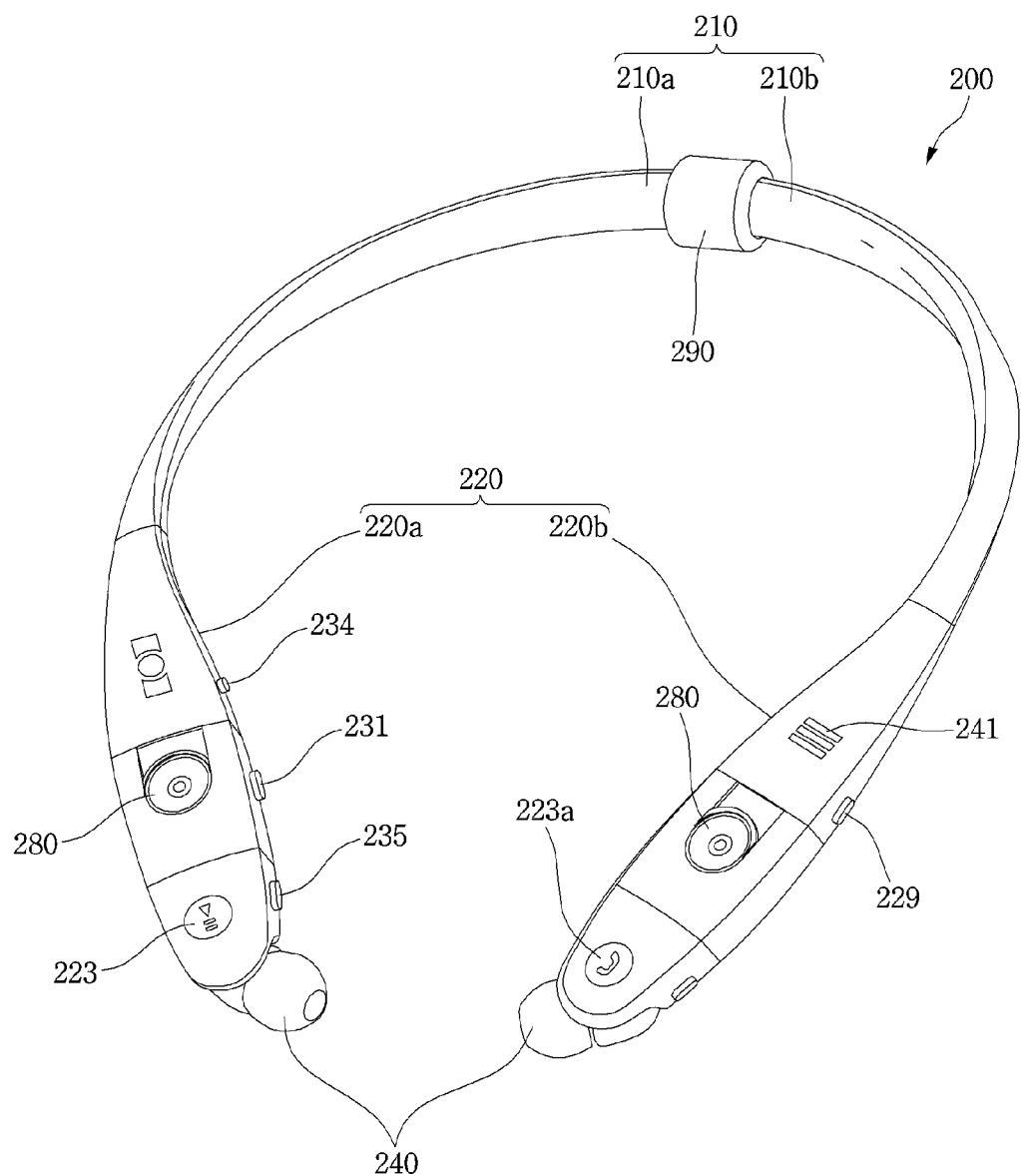
FIG. 7 is a perspective view of a wearable device according to a third embodiment of the present invention.
Figure 8:
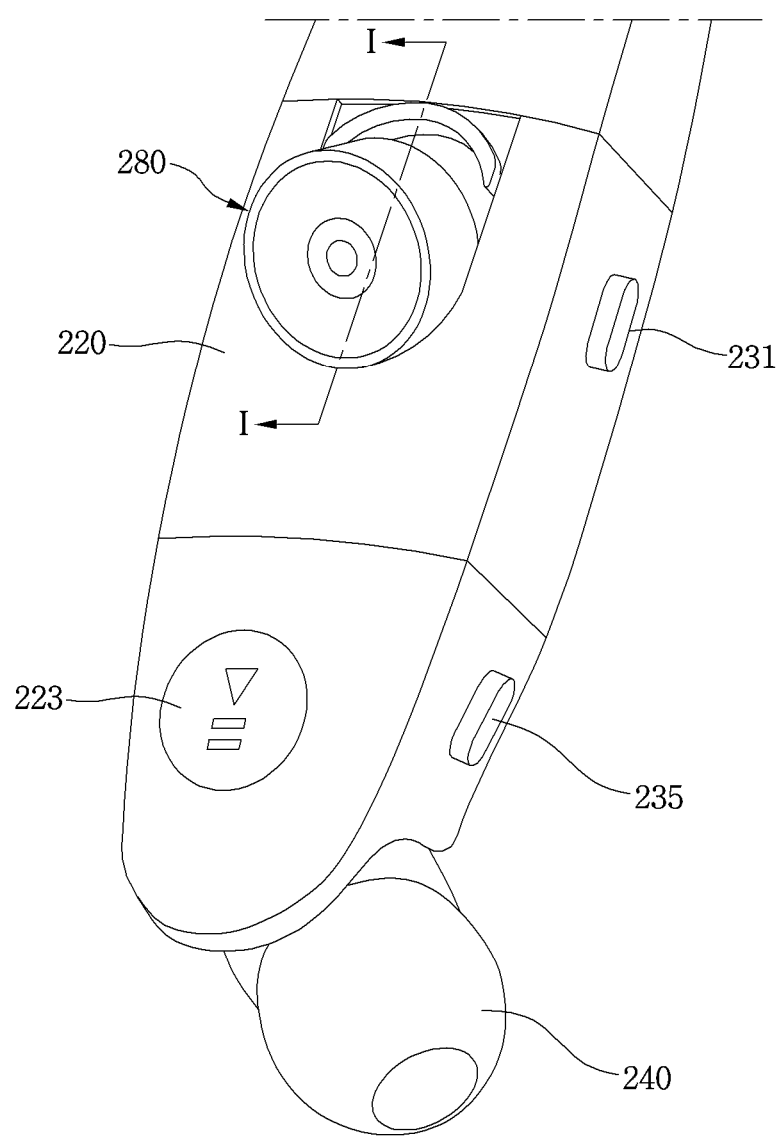
FIG. 8 is an exploded perspective view illustrating a state in which a front camera module is tilted toward the front according to a third embodiment of the present invention.

FIG. 7 is a perspective view of a wearable device according to a third embodiment of the present invention and FIG. 8 is an enlarged perspective view illustrating a state in which a front camera module equipped at a wearable device according to the third embodiment is tilted toward the front.

Referring to FIGS. 7 and 8, the wearable device 200 according to this embodiment has a configuration that is mostly identical to that of the wearable device 200 according to the first embodiment but there is a difference in a structure in which the front camera module 280 is mounted at each of a left body part and a right body part and is tilted toward the front.

In more detail, the front part (or upper part) of the front camera module 280, that is, a lens part, substantially may form the same plane as the front part (or upper part) of the body part 220 and may be tilted toward the front at a predetermined angle by a user's manipulation.

In more detail, when a user wears the wearable device 200 on the neck, the body part 220 is placed on the user's collar bone and chest. At this state, when the front camera module 280 is turned on for capturing, a subject that a user wants to capture does not come into the camera lens. In addition, when a user can manually manipulate the front camera module 280 or inputs a tilting command through a capture application of the mobile terminal 100, the front camera module 280 is tilted toward the front at a predetermined angle. Hereinafter, a driving mechanism of the front camera module 280 will be described below in more detail with reference to the drawings.

Figure 9:
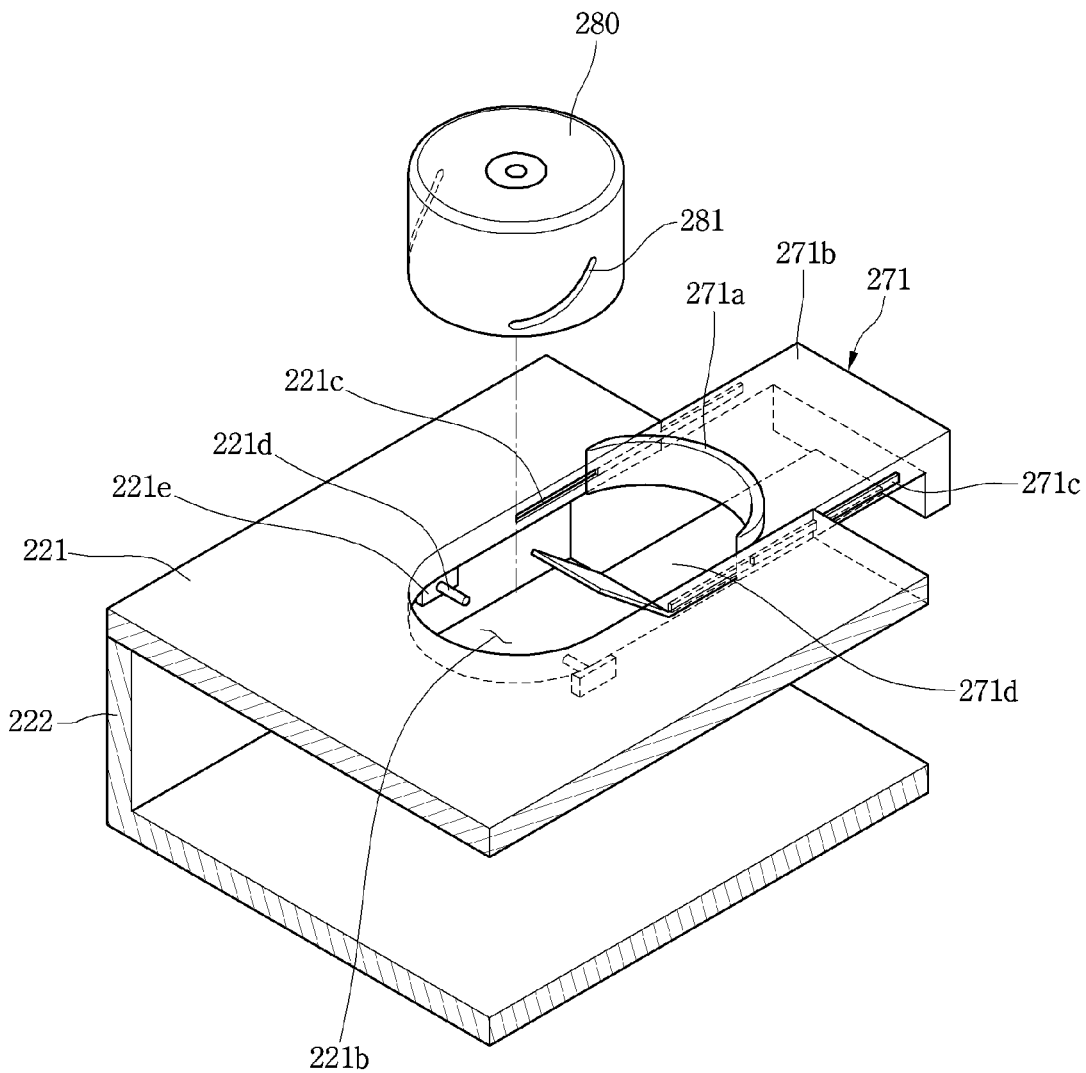
FIG. 9 is an exploded perspective view illustrating a tilting mechanism of a front camera module equipped at a wearable device according to a third embodiment of the present invention.

FIG. 9 is an exploded perspective view illustrating a tilting mechanism of a front camera module equipped at a wearable device according to a third embodiment of the present invention. Referring to FIG. 9, looking at a tilting structure of a front camera module according to an embodiment of the present invention, a camera hole 221b of a long hole form where the front camera module 280 is received is formed at the center part of the upper part housing 221 configuring the body part 220. A tilting member 271 is slidably mounted at the rear of the camera hole 221b. When the front camera module 280 is in a state before tilting, the tilting member 271 surrounds the rear side part of the front camera module 280 to prevent it from shaking. Then, the front end part of the camera module 221b is formed to be rounded in a form of surrounding the front side part of the front camera module 280.

In more detail, the tilting member 271 includes a cover part 271b bent in a form of "]" to cover the rear portion of the camera hole 221b, a grip part 271a bent toward the top surface at the front end of the cover part 271b and rounded in an arc form along the side surface of the front camera module 280, a pressing part 271d of a form extending toward the front at the lower end of the cover part 271b and then bending and extending upwardly to be inclined toward the top side, and a slide rib 274c protruding at both sides of the cover part 271b to extend in a predetermined length.

Additionally, a slide groove 221c extends and is formed with a predetermined depth and length at the side edge of the camera hole 221b and the slide rib 271c is inserted into the slide groove 221c. Accordingly, as the slide rib 271c moves in a longitudinal direction while being inserted into the slide groove 221e, the tilting member 271 slidably moves in a longitudinal direction.

Additionally, each support end 221e extends downwardly at the both side edges of the camera hole 221b. Then, each guide protrusion 221d protrudes horizontally at the surfaces of the support ends 221e facing each other. Then, one pair of guide grooves 281 are respectively formed at the left and right side surface of the front camera module 280 and the support ends 221e are respectively inserted into the guide grooves 281.

In more detail, the guide groove 281 extends from the top surface of the front camera module 280 toward the bottom surface but extends in a curved form that is inclined downwardly as it goes toward the front end part of the front camera module.

Figure 10:
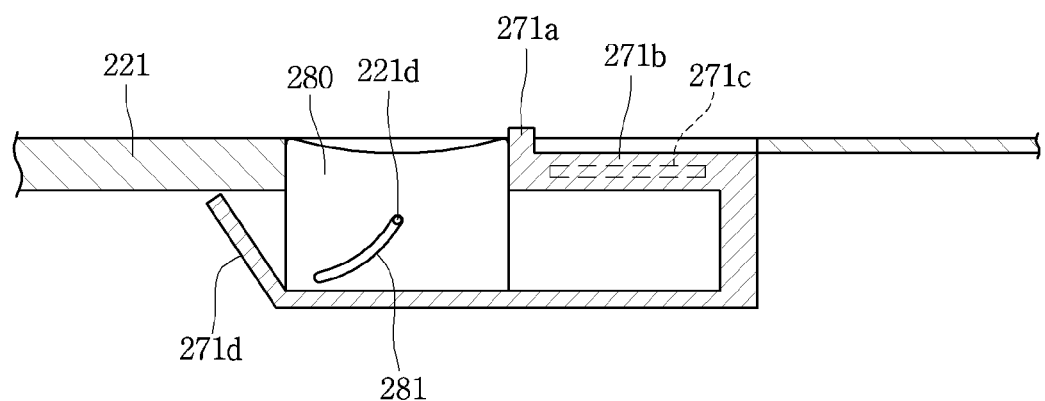
FIG. 10 is a longitudinal sectional view taken along a line I-I' of FIG. 8 and illustrates a state before the tilting of a front camera module.

Hereinafter, how the front camera module is tilted by the tilting module will be described in more detail with reference to the drawings. FIG. 10 is a longitudinal sectional view taken along a line I-I' of FIG. 8 and illustrates a state before the tilting of a front camera module.

Referring to FIG. 10, when the front camera module 280 is not tilted, the front surface (or top surface) of the front camera module 280 substantially forms the same plane as the front surface (or top surface) of the body part 220. That is, the upper housing 221 of the body part and the front surface (or top surface) of the front camera module 280 form the same plane.

Then, the guide protrusion 221d is positioned at the rear end part of the guide groove 281 while being inserted into the guide groove 281. Then, the lower end part of the front camera module 180 maintains a state of being seated at the pressing part 271d of the tilting member 271. Then, the front end part of the front camera module 180 is in a state of contacting a portion where an upward inclination of the pressing part 271d starts. Of course, the slide rib 271c of the tilting member 271 is being inserted into the slide groove 221c of the camera hole 221b.

Figure 11:
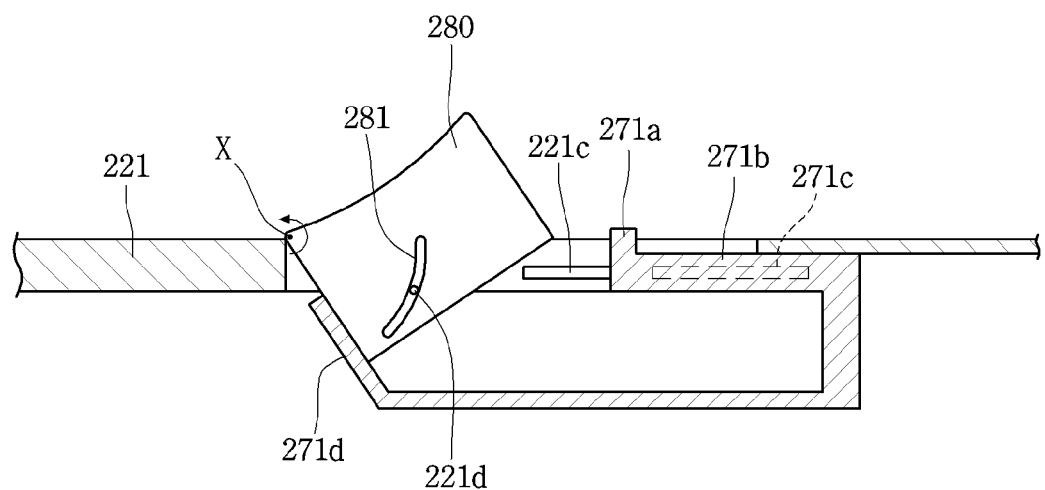
FIG. 11 is a longitudinal sectional view taken along a line I-I' of FIG. 8 and illustrates a state in which a front camera module is tilted.

FIG. 11 is a longitudinal sectional view taken along a line I-I' of FIG. 8 and illustrates a state in which a front camera module is tilted. Referring to FIG. 11, when a user grips the grip part 271a and pushes back the tilting member 271, the tilting member 271 moves slidingly. Then, the pressing part 271d pushes the front lower end part of the front camera module 280 as being retracted.

Then, the front camera module 180 does not move backward by the guide protrusion 221d and rotates. In more detail, when pushing force is applied to the front surface of the front camera module 180, the guide protrusion. 221d moves relatively along the guide groove 281. To be precise, since the guide protrusion 221d is in a fixed state, the guide groove 281 moves upwardly. Herein, since the guide groove 281 is formed to be rounded in an arc form, the front camera module 180 rotates counterclockwise on the drawing. Then, the rotation center X of the front camera module 280 is formed at the top surface edge of the front end part of the front camera module 280.

Since the rotation center X is formed at the top surface edge of the front end part of the front camera module 280, even if the front camera module 280 rotates, the top surface of the front end part of the front camera module 280 does not fall toward the lower side of the upper housing 221. That is, the front part of the front camera module 280 does not enter the inside of the body part 220. As a result, the angle of a lens part of the front camera module 280 is not narrowed.

If the rotation center X of the front camera module 280 is formed at a position spaced from the front edge of the front camera module 280 toward the center of the front camera module 280, the upper housing 221 may be taken during a capture process. That is, a camera angle becomes narrower.

It should be clarified that a tilting mechanism of the front camera module 280 according to an embodiment of the present invention is not limited to the above-mentioned structure. That is, the idea of the present invention is that the front camera module 280 is liftable toward the front and the above-mentioned tilting structure is just one embodiment to describe the idea for the tilting mechanism of the present invention. Accordingly, it should be clarified again that various forms of tilting mechanisms may be suggested.

Additionally, although it is described above that the front camera module 180 is tilted by a user's manual manipulation, the idea of automatically tilting the front camera module is not excluded. For example, in addition, a drive motor having the same form as a drive motor for rotating the rear camera module 290 is mounted and a rack/pinion structure is equipped, so that a structure in which the tilting member 271 is movable slidingly in a longitudinal direction is applicable.

As another tilting mechanism method, a structure is possible in which a hinge shaft is formed horizontally in the width direction at the top surface edge of the front end part of the front camera module 280 and the hinge shaft is connected to the rotation shaft of the drive motor through a gear assembly. The hinge shaft is identical to a tangent line passing through the top surface edge of the front end part of the front camera module 280 and is rotatably connected to the upper housing 221.

In such a way, when the front camera module 280 is automatically tiltable by a drive, motor, the tilting of the front camera module 280 may be adjusted through the mobile terminal 100 communicating with the wearable device 200. For example, as mentioned above shortly, when a camera capture application is installed in the mobile terminal 100 and is executed, a tilting command for the front camera module 280 may be input. Then, a command signal for a tilting operation may be generated through a control unit of the camera capture application and then may be transmitted to the wearable device 200 through a wireless communication unit. Then, since an operation of the drive motor is controlled based on the received command signal in the wearable device 200, the front camera module 280 may be tilted at an angle that a user wants. Hereinafter, an operation control of a camera module by using the application will be described with reference to the drawings.

Figure 12A:
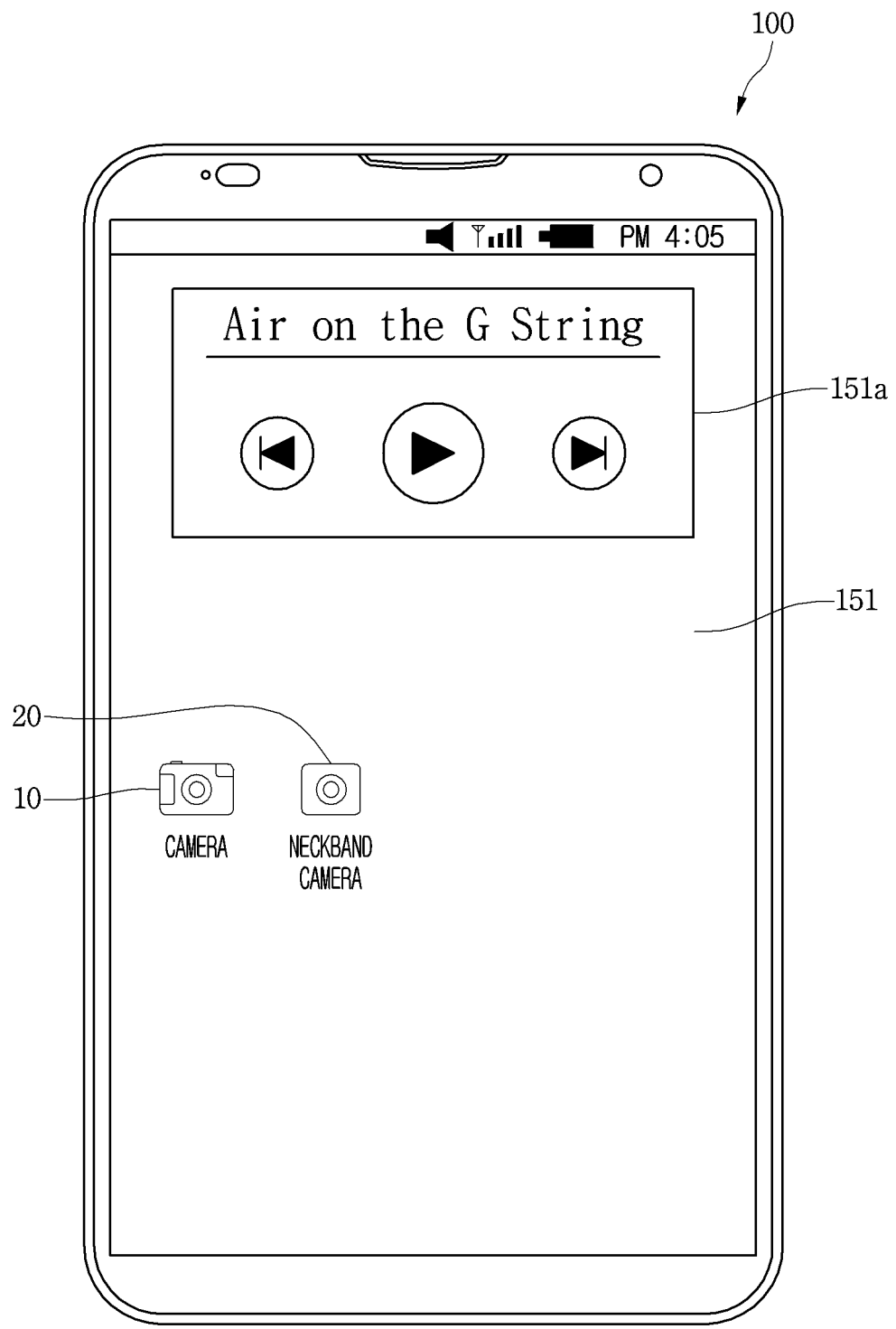
FIG. 12A is a view illustrating a display unit of a mobile terminal.

FIG. 12A is a view illustrating a display unit of a mobile terminal 100. Referring to FIG. 12A, a playback screen 151a where music information or radio information being played in the wearable device 200 is disposed may be displayed on the display unit 151 of the mobile terminal 100. The playback screen 151a may be disposed with a smaller size than the entire display unit 151 at the upper side. Then, a camera execution application may be disposed at the lower side of the playback screen 151a. The camera execution application may include a first capture application 10 and a second capture application 20.

The first capture application 10 is an application for capturing by using a camera module installed at the front and rear of the mobile terminal, and the second application 20 is a neckband camera application for capturing by using the front camera module 280 and rear camera module 290 installed at the wearable device 200. Then, the playback screen 151a and the camera execution applications 10 and 20 may be disposed in a lock state or an unlock state of the display unit 151.

Figure 12B:
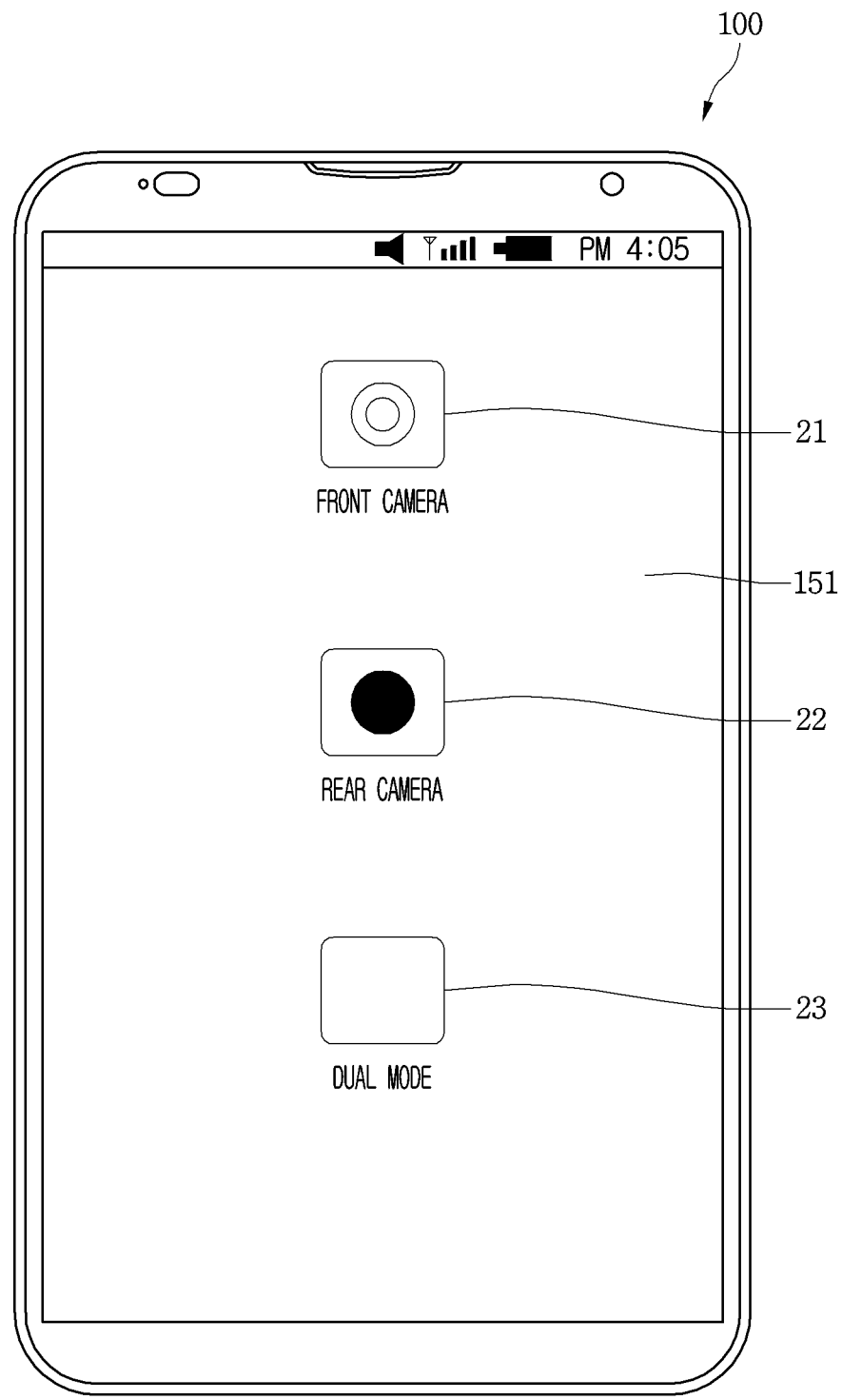
FIG. 12B is a view illustrating a screen state displayed when the second capture application is touched.

FIG. 12B is a view illustrating a screen state displayed when the second capture application is touched. Referring to FIG. 12B, when trying to capture an image by using a camera module installed at the wearable device 200 and input a capture command through the mobile terminal 100, the user touches the second capture application 20. Then, as the screen of the display unit 151 changes, a front camera icon 21, a rear camera icon 22, and a dual mode icon 23 may be displayed on the display unit 151.

The front camera icon 21 is touched by a user when capturing an image by using the from camera module 280 of the wearable device 200. Then, the rear camera icon 22 is touched by a user when capturing an image by using the rear camera module 290 of the wearable device 200. Then, the dual mode icon 23 is touched by a user when capturing an image by using the front camera module 290 and the rear camera module 290 at the same time. When the dual mode icon 23 is touched, a first subject forming at the front camera module 280 becomes a main subject, so that it is displayed on the entire display unit 151 and a second subject formed at the rear camera module 290 becomes a sub subject, so that it overlaps the front of the first subject and is displayed in a Picture In Picture form. Then, according to a user's selection, the first subject may change into a sub subject and the second subject changes into a main subject.

As another method, the display unit 151 may be divided into an upper area and a lower area and the first subject may be displayed one of the upper and lower areas and the second subject may be displayed on the other of the upper and lower areas. Then, the display areas of the first subject and the second subject may be switched according to a user's selection.

Figure 12C:
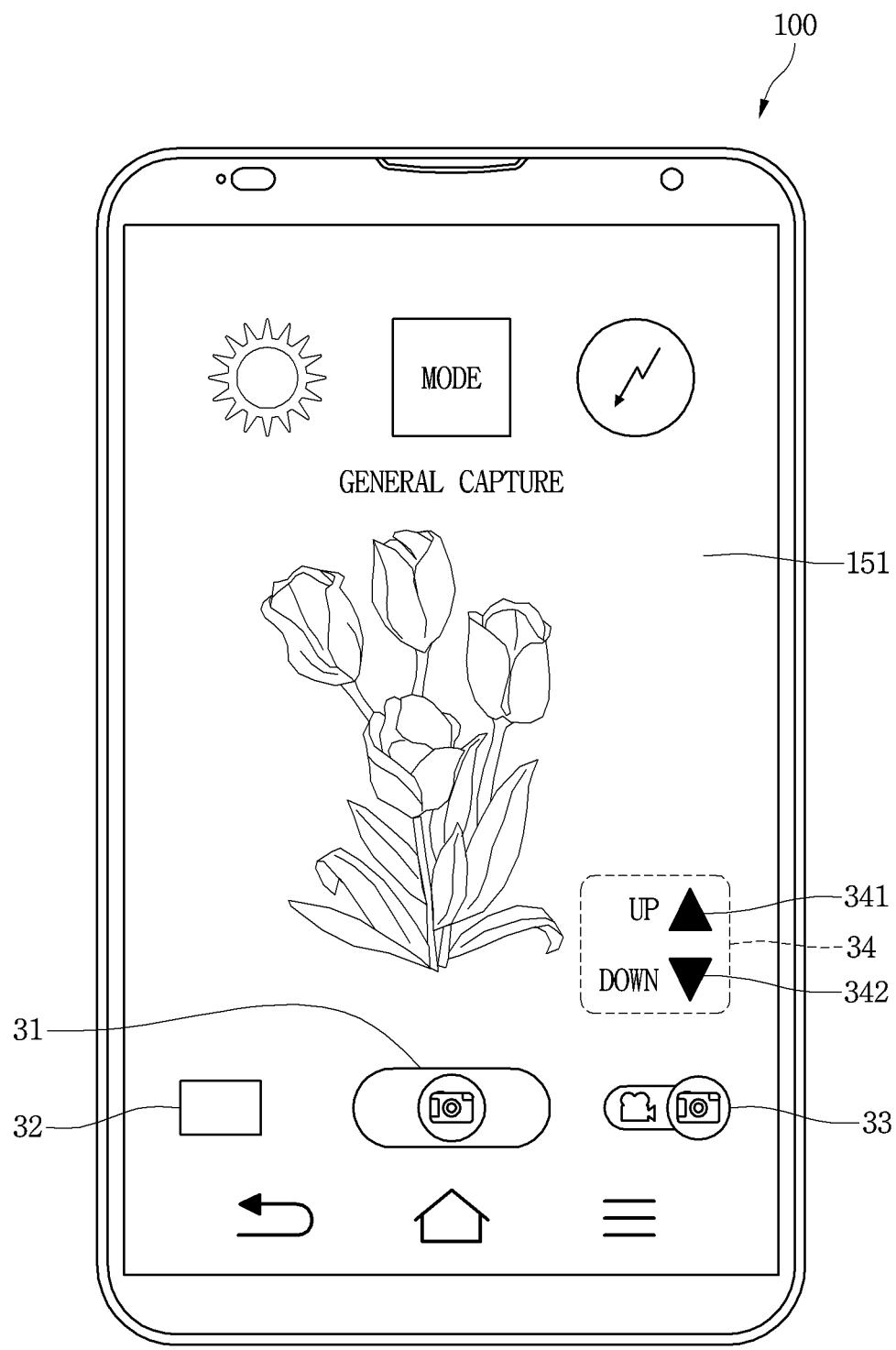
FIG. 12C is a view illustrating a display unit when a front camera icon is selected.

FIG. 12C is a view illustrating a display unit when a front camera icon is selected. Referring to FIG. 12C, when a user selects the front camera icon 21 in a state of FIG. 12B, the front camera module 280 is turned on to be a capture standby state. In more detail, an image of a subject formed at an image sensor of the front camera module 280 in a capture standby state is displayed on the display unit 151. Then, a capture icon 31, a confirm window 32, and a selection icon 33 may be displayed in a lower area of the display unit 151.

The capture icon 31 is a command input unit for allowing the from camera module 280 to perform a capture operation as a user touches it with a hand. Accordingly, when a user touches the capture icon 31, a subject displayed on the display unit 151 is captured with a capture sound. The confirm window 32 is a portion where a previously captured image is displayed small and when the confirm window 32 is touched, a previously capture image is displayed on the display unit 151.

The selection icon 33 is an icon for allowing a user to select one of capturing an image and capturing a video and when a user slides the selection icon 33 to the left or right while touching it, one of an image capture mode and a video capture mode is selected. The capture icon 31, the confirm window 32, and the selection icon 33 are functions equipped in existing mobile terminals and thus their detailed descriptions are omitted.

Moreover, an angle adjustment icon 34 may be displayed at a lower edge portion of the display unit 151 in the capture standby state. The angle adjustment icon 34 is a touch button for inputting a command to rotate the front camera module 280 upwardly or downwardly. The angle adjustment icon 34 may include an upward rotation button 341 and a downward rotation button 342.

By such a structure, a user can adjust the orientation angle of the front camera module 280 as touching the angle adjustment icon 34. As the orientation angle of the front camera module is changed, a subject displayed on the display unit 151 is changed so that a user can adjust the orientation angle of the front camera module 280 while checking the subject. Accordingly, a user can accurately capture a desired subject and check it without directly manipulating the body part 220 of the wearable device 200 with a hand.

Moreover, it should be clarified that the content described with reference to this drawing is identically applied to the rear camera icon 22 and the dual mode icon 23. Especially, when the dual mode icon 23 is selected, an angle adjustment icon for the front camera module and an angle adjustment icon for the rear camera module each needs to be displayed.

Additionally, among wearable devices according to other embodiments described below, cameral tilting available wearable devices 200 all are controllable identically by the camera execution application. Moreover, as suggested above, in addition to a method of controlling a capture operation of the front camera module 280 and/or the rear camera module 290 by touching and activating, by a user, a second capture application 20 installed in the user terminal 100, other methods may be suggested.

For example, when the power of the wearable device 200 is turned on it is possible for the camera modules 280 and 290 to perform a capture operation automatically. In more detail, when a user wears the wearable device 200 on the neck and turns on the power switch 229, short-range communication modules equipped in the mobile terminal 100 and the wearable device 200, for example, Bluetooth modules, are paired so that communication becomes possible. Herein, it is assumed that the mobile terminal 100 may be grabbed by the user's hand or may be received inside a bag that a user carries or a pocket equipped at a user's clothes so that the mobile terminal 100 is placed within a short-range communication available range with the wearable device 200.

Then, as pairing between the short-range wireless communication modules is completed, the camera modules 280 and 290 perform a capture operation periodically at a predetermined time interval. Then, the captured image information may be transmitted to the control unit of the mobile terminal 100 and then may be stored in a memory.

Alternatively, as soon as a user presses the play button 223 of the wearable device 200 to input a music playback command, the camera modules 280 and 290 may perform a capture operation periodically at a predetermined time interval. As another method, a vibration sensor or a touch sensor is equipped at the body part 220 of the wearable device 200 and by detecting that a user touches or taps the body part 220, the camera modules 280 and 290 may operate.

In more detail, in correspondence to the number of times that a user touches or taps the body part 220, an image capture module command or a video capture mode command is determined and when a corresponding mode execution command is input, the camera modules 280 and 290 may operate. For example, when a user touches the body part 220 two times, the control unit 208 of the wearable device 200 may recognize it as an image capture mode and when a user touches the body part 220 three times, may recognize it as a video capture mode. Then, when an image capture mode command is input, a predetermined number of image cuts may be taken within a predetermined time. That is, when a user touches the body part 220 two times, it is controllable that an image is taken three times at a one second interval.

Additionally, when a user touches the body part 220 three times to input a video capture module command, a video may be captured for a predetermined time and after the predetermined time, capturing may be automatically stopped. Then, the captured image or video may be stored in the memory 170 of the mobile terminal 100 through a short-range wireless communication module.

As another method, when the power of the wearable device 200 is turned on to turn on the location information module 201d including GPS and the input unit 202 including the microphone 202b is turned on to detect a specific event, it may be controlled to operate the camera modules 280 and 290.

The specific event may be as follows. First, when an input of specific sound or voice is detected through the microphone 202b, the camera modules 280 and 290 may perform a capture operation automatically. For example, when laughing sound or car crash sound is input, the camera modules 280 and 290 operate automatically to perform a predetermined number of image captures or perform a video capture for a predetermined time.

Second, when it is detected by the location information module 201d that the current location (or the user's current location) of the wearable device 200 is changed more than a predetermined distance, the camera modules 280 and 290 may operate automatically. Third, when it is detected by the proximity sensor 204a among the sensing units 204 of the wearable device 200 that an arbitrary object approaches within a predetermined distance range, the camera modules 280 and 290 may operate automatically. For example, when an object causing an accident approaches a user within a distance that affect the user, that is, a danger radius, the camera modules 280 and 290 may operate to capture an image or video. Then, it may be helpful to figure out the cause of the accident later.

Figure 13:
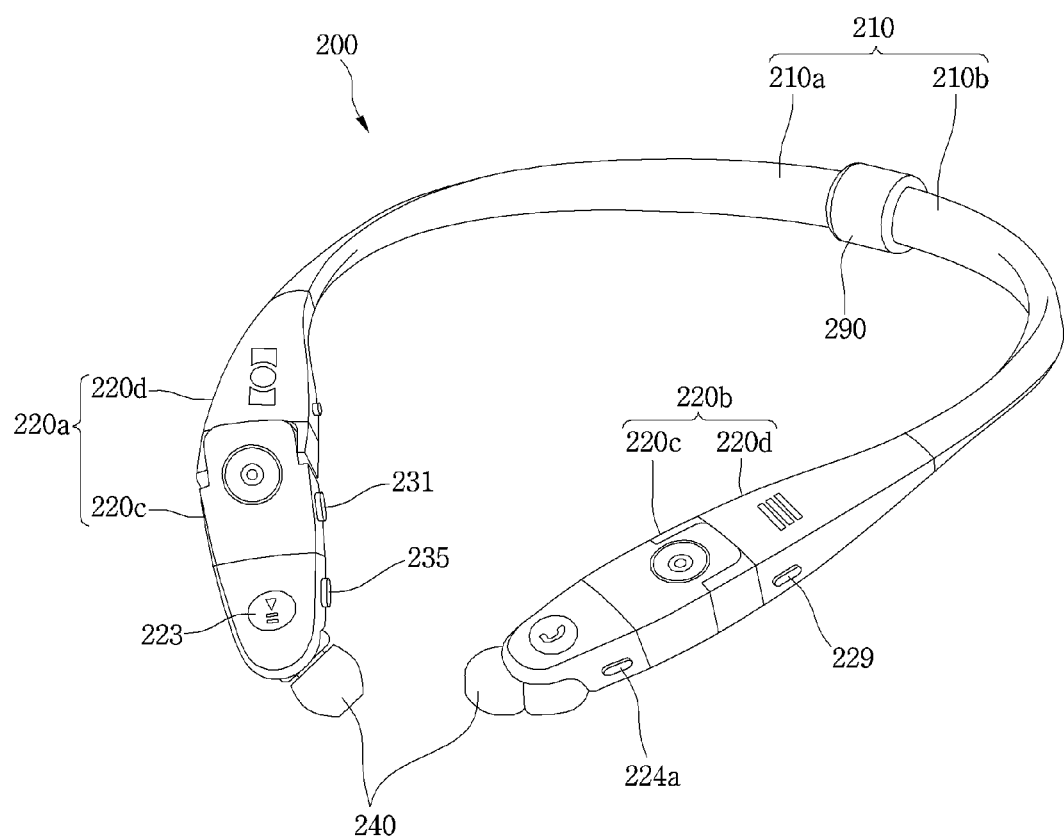
FIG. 13 is a perspective view of a wearable device according to a third embodiment of the present invention.

FIG. 13 is a perspective view of a wearable device according to a third embodiment of the present invention. Referring to FIG. 13, a wearable device 200 according to this embodiment has a configuration that is mostly identical to that of the wearable device 200 according to the third embodiment but there is a difference in that a portion of the body part 220 is tiltable. That is, according to third embodiment, the front camera module 280 itself is tilted in terms of structure but according to this embodiment, a portion of the body part 220 where the front camera module 280 is mounted is tilted.

In more detail, each of the one pair of body parts 220a and 220b may include a fixing part 220d fixed to the band part 210 and a rotation part 220c rotatably connected to the front end of the fixing part 220d. For example, as hinge shafts protrude at both sides of the rear end part of the rotation part 220c and are connected to the fixing part 220d, the rotation part 220 may be rotated at a desired angle.

Alternatively, by applying the above-mentioned drive motor and gear assembly structure to the hinge shaft, a user can allow the rotation part 220c to rotate automatically through the camera execution application of the mobile terminal 100 as described with reference to FIGS. 12A to 12C.

Figure 14:
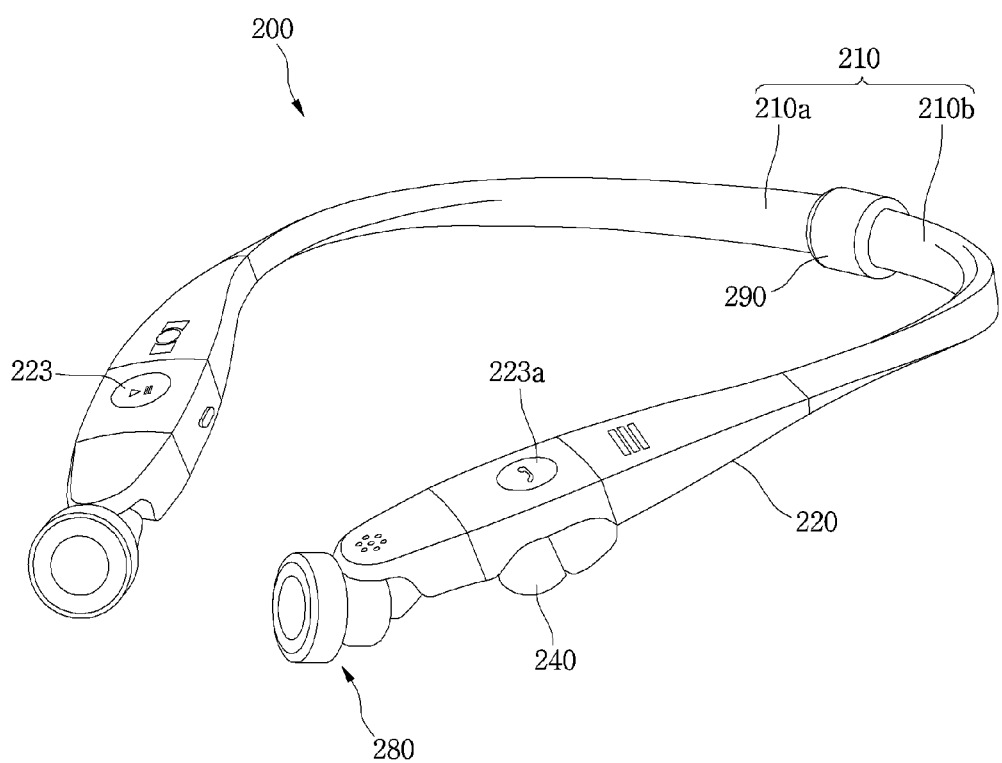
FIG. 14 is a perspective front view of a wearable device according to a fifth embodiment of the present invention.
Figure 15:
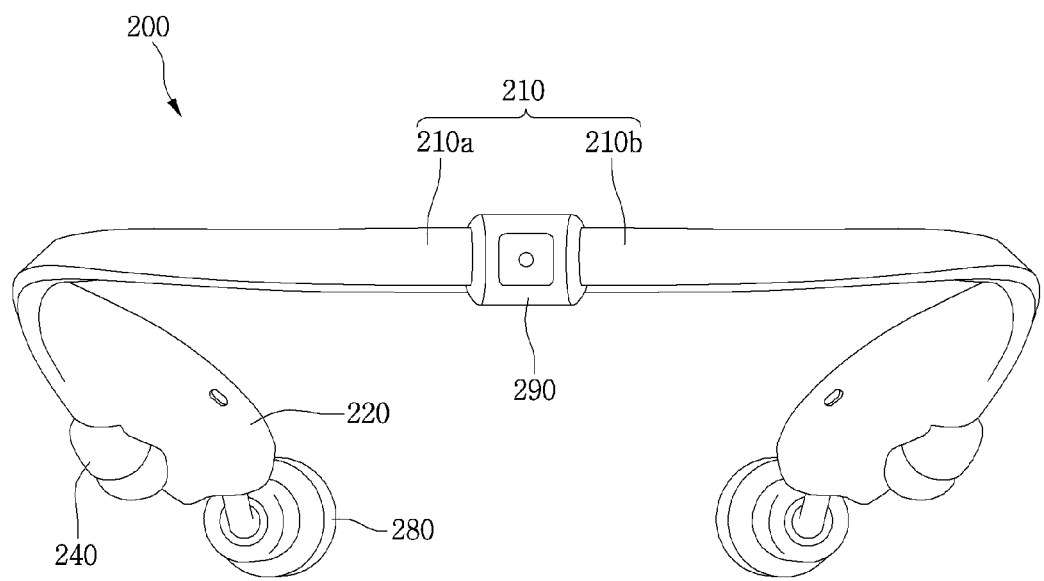
FIG. 15 is a perspective bottom view of a wearable device according to a fifth embodiment of the present invention.

FIG. 14 is a front perspective view of a wearable device according to a fifth embodiment and FIG. 15 is a rear perspective view of a wearable device according to a fifth embodiment of the present invention. Referring to FIGS. 14 and 15, a wearable device 200 according to this embodiment has a configuration that is mostly identical to that of the wearable device 200 according to the third embodiment but there is a difference in a mounting position and mounting method of the front camera module 280.

In more detail, in relation to the wearable device 200 according to the third embodiment, the front camera module 180 is mounted at the body part 220 and in relation to the wearable device 200 according to this embodiment, the front camera module 280 is separable from the body part 220. In more detail, the front camera, module 280 may be detachably mounted at the earphone holder 225 where the earphones 240*a* and 240*b* are mounted. Then, each front camera module 280 may be mounted at the left body part and the right body part or the front camera module 280 may be installed at any one of the left body part and the right body part.

Moreover, as the front camera module 280 is mounted at the front end part of the body part 220, the mounting positions of the earphones 240*a* and 240*b* are changed. In more detail, recession parts receiving the earphones 240*a* and 240*b* are formed at the bottom surface of the body part 220, that is, the bottom part of the lower housing 222, and the sound cable 245 penetrates the depression parts to be connected to the earphones 240*a* and 240*b*. Accordingly, a user can pull the earphones 240*a* and 240*b* seated at the bottom surface of the body part 220 to plug it into ears and press a reel button to wind the sound cable 245 of the earphones 240*a* and 240*b*, so that the earphones 240*a* and 240*b* may be seated at the recession parts again.

Figure 16:
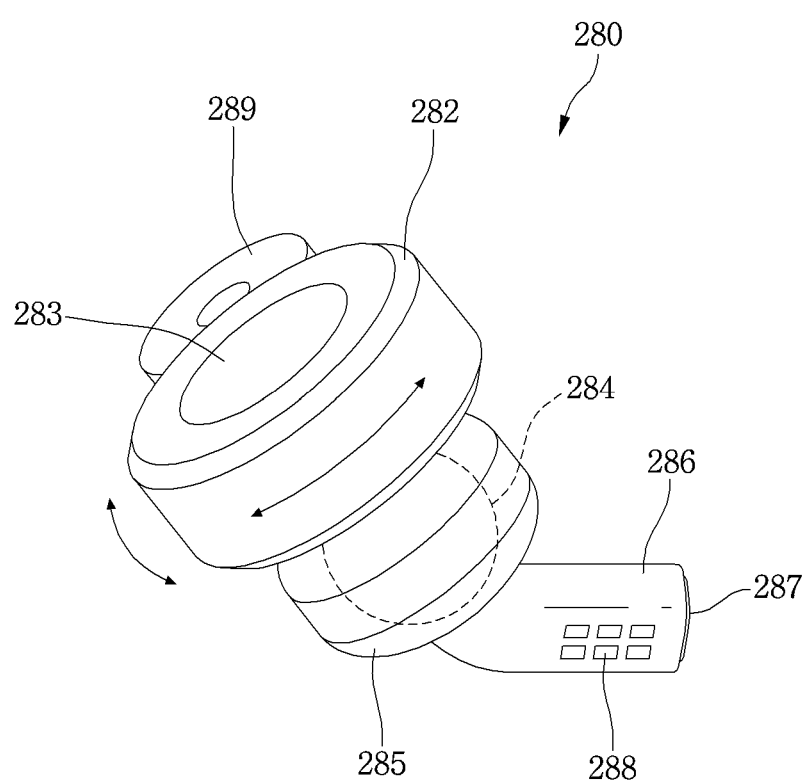
FIG. 16 is a perspective view of a front camera module mounted at a wearable device of FIG. 15.

FIG. 16 is a perspective view of a front camera module mounted at a wearable device of FIG. 15. Referring to FIG. 16, the front camera module 280 according to this embodiment of the present invention is separable from the wearable device 200. In more detail, the front camera module 280 includes a camera 282, a lens 283 coupled to the front of the camera 282, an auto focusing sensor 289 formed at a side part of the camera 282, a connection part 285 coupled to the rear of the camera 282, and an insertion unit 286 extending from the rear of the connection part 285.

A spherical bearing 284, that is, a journal bearing, may be formed at the rear of the camera 282 and a bearing groove where the bearing 284 is seated may be formed inside the connection part 285. Accordingly, as the bearing 284 is coupled to the connection part 284, the camera 282 may be rotatable in a three-axis direction.

Additionally, a terminal part 288 for power and electrical signal delivery may be formed at a side of the insertion part 286 and a magnet 287 may be mounted at the rear end of the insertion part 286. Then, an insertion groove where the insertion part 286 is inserted may be formed at the front end of the body part 220. Then, a terminal part contacting the terminal part 288 to be electrically connected thereto may be formed at the inner peripheral surface of the insertion groove. Then, a magnetic material may be attached to the insertion groove to be coupled with the magnet 287. Accordingly, as the insertion part 286 is inserted into the insertion groove formed at the front end of the body part 220, by magnetic force, the insertion part 286 is coupled to the body part 220 and the terminal part 288 is electrically connected to a terminal part where the insertion groove is formed.

Then, since the front camera module 280 is coupled to the body part 220 by magnetic force, a user can easily separate the front camera module 280. Then, the magnetic force of the magnet 287 has a degree of size that the front camera module 280 is not separated from the body part 220 by external impact. For example, even when a user runs with the wearable device 200 in a worn state, the front camera module 280 is not separated from the body part 220.

Additionally, when the front camera module 280 is coupled to the body part. 220, a user can adjust the camera 282 at a desired angle. Especially, since the bearing 284 has a spherical journal bearing structure, there is no angle limitation within a range that the rear of the camera 282 contacts the front of the connection part 285. That is, a directional angle range of the camera 282 forms a three-dimensional trajectory of a parabolic antenna form.

Figure 17:
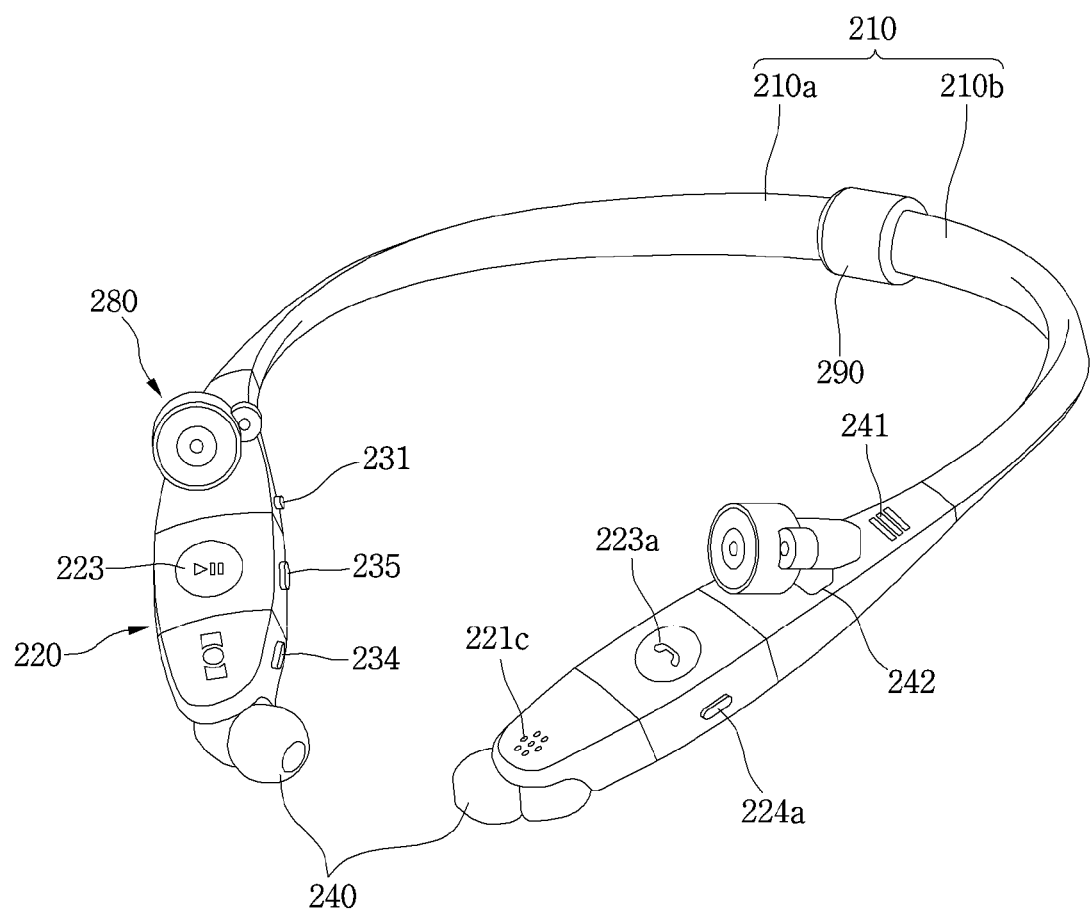
FIG. 17 is a perspective front view of a wearable device according to a sixth embodiment of the present invention.
Figure 18:
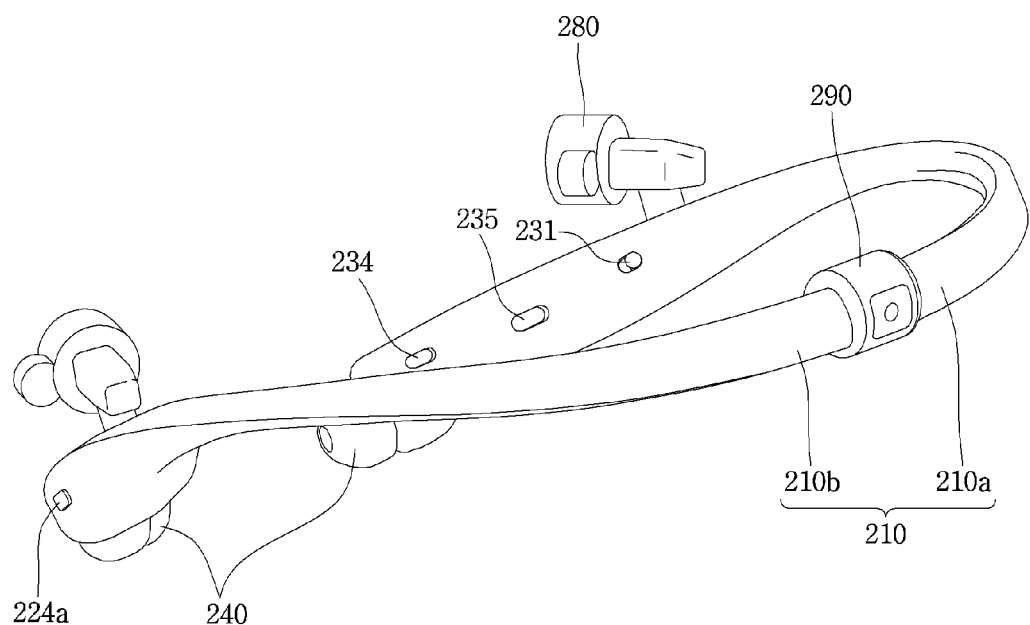
FIG. 18 is a perspective bottom view of a wearable device according to a sixth embodiment of the present invention.

FIG. 17 is a front perspective view of a wearable device according to a sixth embodiment and FIG. 18 is a rear perspective view of a wearable device according to a sixth embodiment of the present invention. Referring to FIGS. 17 and 18, a wearable device 200 according to this embodiment has a configuration that is mostly identical to that of the wearable device 200 according to the third embodiment but there is a difference in a mounting position of the front camera module 280.

In more detail, the front camera module 280 mounted at the wearable device 200 according to this embodiment is substantially identical to the front camera module 280 suggested in FIG. 16 and is mounted detachable from the body part 220. Additionally, although the detachable front camera module 280 is mounted at the top surface rear of the body part in this drawing, the present invention is not limited thereto. That is, in terms of structure, the detachable front camera module 280 according to this embodiment may be mounted at a position where the front camera module 280 of the wearable device 200 shown in FIG. 7 is mounted. Then, according to the mounting position of the detachable front camera module 280, the positions of various button parts may be changed appropriately.

In brief, the feature of the wearable device 200 according to the sixth embodiment is that the detachable front camera module 280 may be detachably coupled to the top surface in addition to the front end part of the body part 220. However, when the front camera module 280 is coupled to the top surface of the body part 220, in order to obtain a viewing angle, an angle formed by the connection part 285 and the insertion part 286 may need to be changed.

As another method, it is possible to obtain a sufficient viewing angle by adjusting a rotation angle range of the camera 282. For example, when a separation distance between the rear of the camera 282 and the connection part 285 is adjusted, a rotation angle range of the camera 282, that is, a widen angle of a parabolic trajectory, may be adjusted. Then, a rotation range of the camera 282 may become greater or less.

Figure 19:
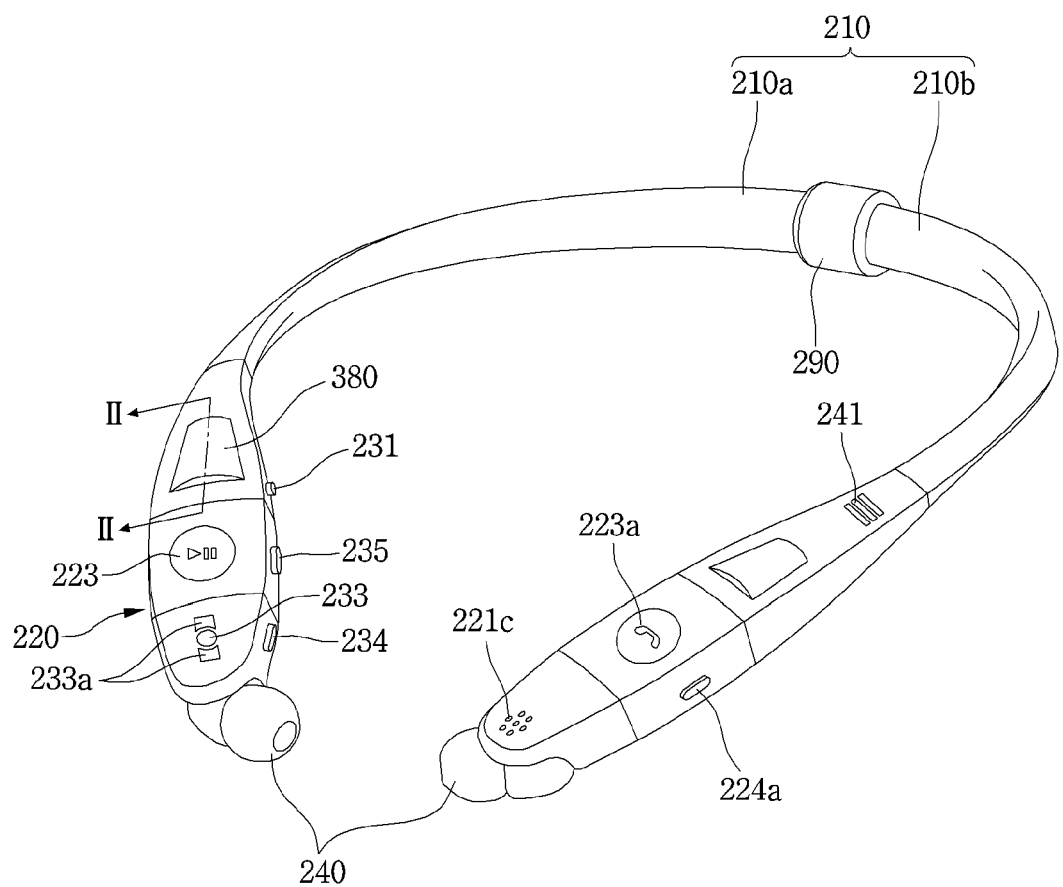
FIGS. 19 and 20 are perspective views of a wearable device according to a seventh embodiment of the present invention.
Figure 20:
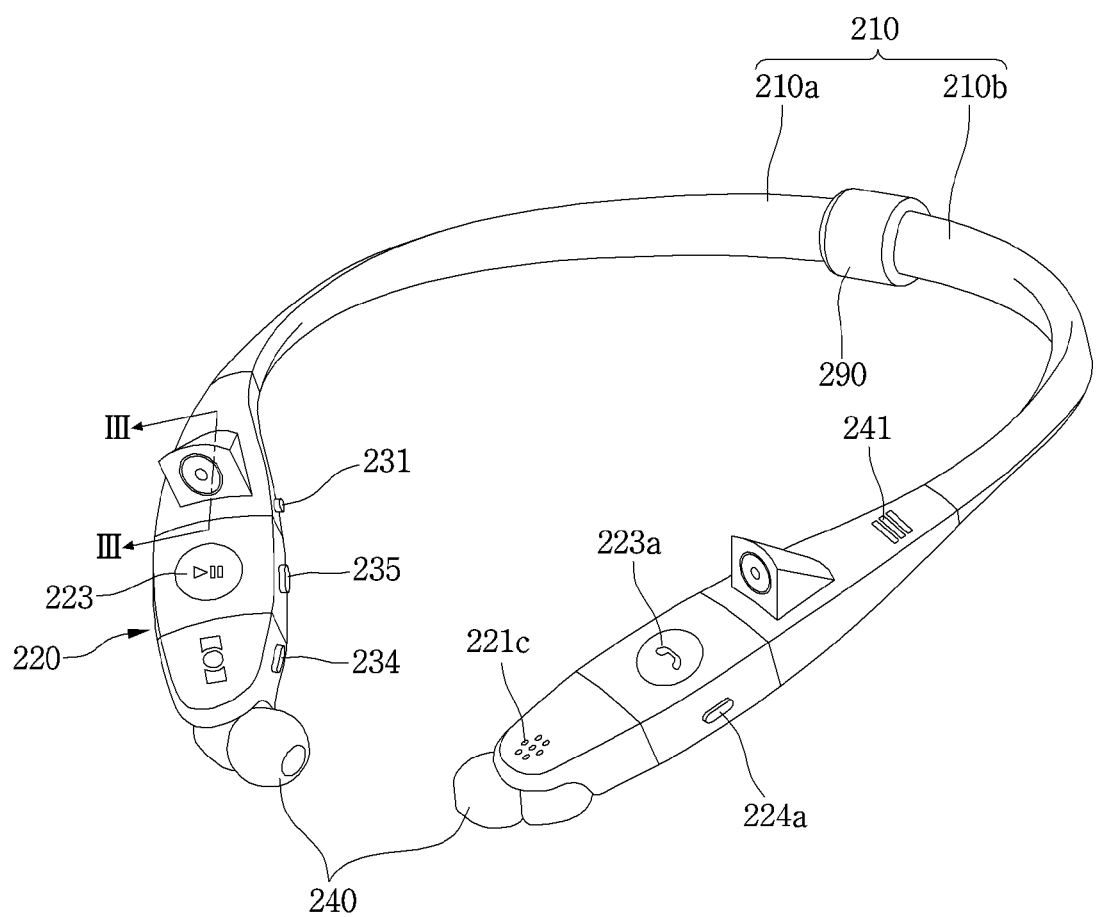

FIGS. 19 and 20 are perspective views of a wearable device according to a seventh embodiment of the present invention. Referring to FIGS. 19 and 20, a wearable device 200 according to the seventh embodiment of the present invention has a configuration that is substantially identical to that of the wearable device 200 according to the sixth embodiment but there is a difference in a structure and operation mechanism of a front camera module.

In more detail, the front camera module 380 equipped at the wearable device 200 according to this embodiment is mounted at the top surface of the body part 220 to allow pop-up. As shown in FIG. 19, when the front camera module 380 does not operate, the remaining portions except for the top surface of the front camera module 380 are maintained in a state of being hidden inside the body part 220. Then, it is possible to design that the top surface of the front camera module 300 and the top surface of the body part 220 form the substantially same plane.

As shown in FIG. 20, when a user tries to capture a subject at the front by using the front camera module 280, the front part of the front camera module 380 pops up toward the top by a predetermined angle. Then, the lens part of the front camera module 380 is exposed to the outside to face the front. Additionally, configurations of the wearable device 200 according to this embodiment are substantially identical to the configurations suggested in the previous embodiments and thus their overlapping descriptions are omitted.

Hereinafter, a specific configuration and operation method of the front camera module 380 will be described. It should be classified that a mechanism for pop-up operation of the front camera module 380 described below is just one embodiment and the idea of the present invention is not limited to a structure suggested below and additionally, other possible embodiments for pop-up operation are not excluded. That is, it should be clarified that a structural mechanism for implementing the idea of the present invention that the front camera module 380 is mounted at the body part 220 to allow pop-up is included in the idea of the present invention.

Figure 21:
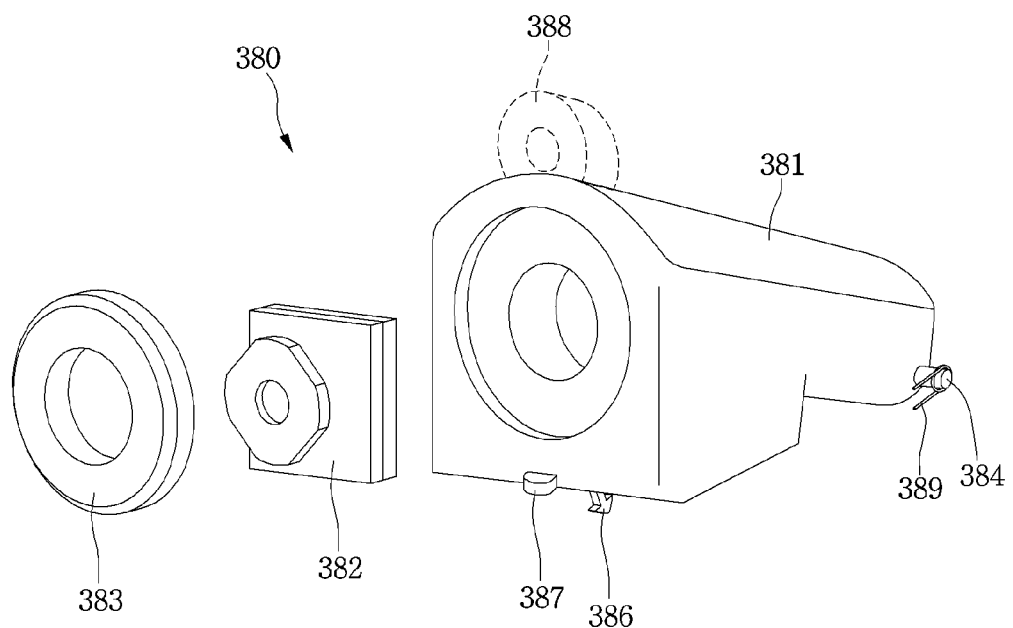
FIG. 21 is an exploded perspective view of a pop-up available front camera module according to an embodiment of the present invention.
Figure 22A:
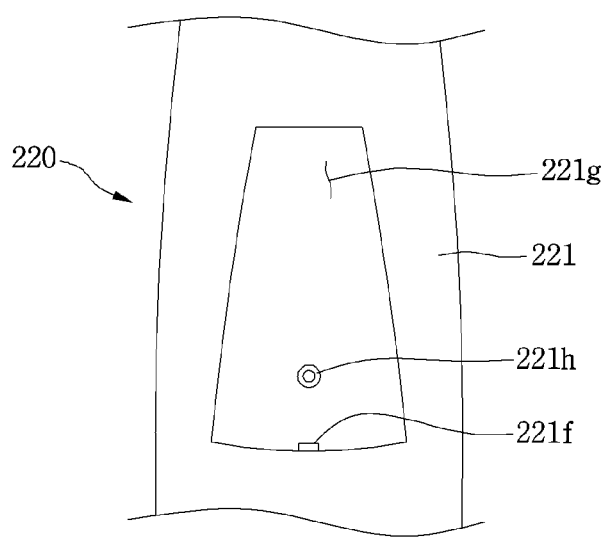
FIG. 22A is a partial plan view of a body part where the pop-up available front camera module is seated.

FIG. 21 is an exploded perspective view of a pop-up available front camera module according to an embodiment of the present invention and FIG. 22A is a partial plan view of a body part where the pop-up available front camera module is seated. Referring to FIG. 21, a pop-up available front camera module 380 according to an embodiment of the present invention may include a case 381, a camera 382 seated at the front of the case 381, and a lens 383 placed at the front of the camera 382.

In more detail, a hinge shaft 384 may be formed protruding at both sides of the rear end part of the case 381 and an elastic member 389 including a torsion spring may be mounted at the hinge shaft 384. The case 381 is rotatable based on the hinge shaft 384 by the restoring force of the elastic member 389. That is, it is possible to design that the force for the pop-up of the front camera module 380 becomes the restoring force of the elastic member 389. However, the present invention is not limited thereto.

Additionally, then, a protrusion 387 may be formed protruding toward the front at the lower end of the front part of the case 381. Then, a latch 387 may be protruding formed at the bottom of the case 381. Moreover, an auto focusing lens 388 may be mounted at the outer peripheral surface, for example, the surface, of the case 381 as shown by the dotted line.

Referring to FIG. 22A, a camera module receiving groove 221g where the front camera module 380 is seated may be formed to be recessed at the body part 220 of the wearable device 200, specifically, the upper housing 221. In More detail, a protrusion 221f may protrude at the front edge of the camera module receiving groove 221g and a latch receiver 221 may be formed at the bottom surface to allow the latch 386 to be selectively caught. A structure of the latch 386 and the latch receiver 221h may be a push and push bottom structure that is selectively coupled or separated by a user's manipulation. That is, while the latch 386 is coupled to the latch receiver 221h by pressing the case 381, as pressing and releasing the case 381, the latch 386 is separated from the latch receiver 221h in terms of structure. Additionally, the hinge shaft 384 protruding at the side surface of the case 381 is rotatably coupled to the housing 221.

Figure 22B:
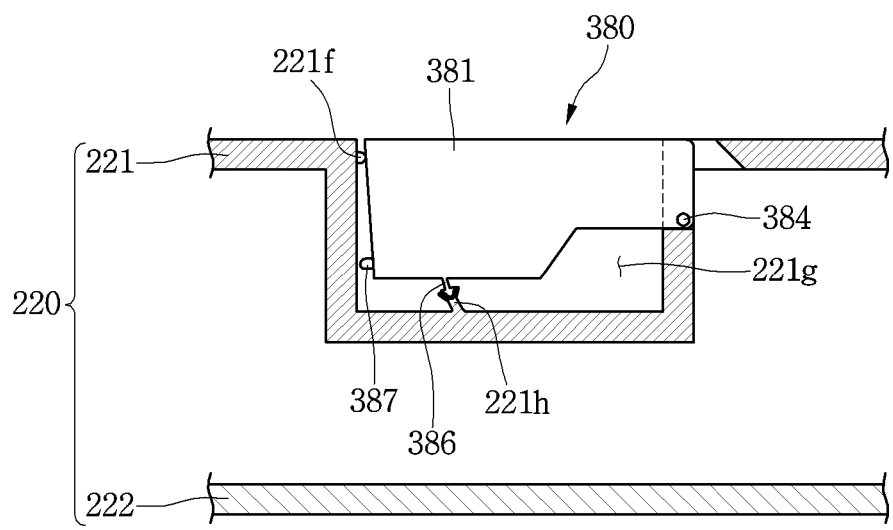
FIG. 22B is a sectional view taken along a line II-II of FIG. 19.

FIG. 22B is a sectional view taken along a line II-II of FIG. 19. Referring to FIG. 22B, while the front camera module 380 is received in the camera module receiving groove 221g, only the top surface of the front camera module 380 is exposed to the outside. Then, the top surface of the front camera module 380 and the upper housing 221 of the body part 220 may form the same plane. In more detail, when the front camera module 380 is received in the camera module receiving groove 221g, the latch is maintained in a state of being coupled to the latch receiver 221h and restoring force is accumulated in the elastic member 389.

Figure 22C:
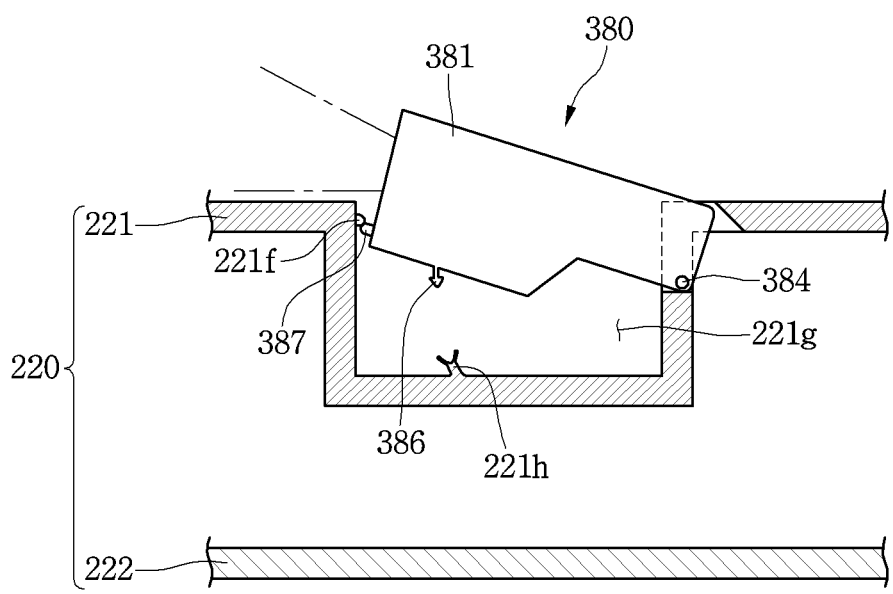
FIG. 22C is a sectional view taken along a line III-III of FIG. 20.

FIG. 22C is a sectional view taken along a line III-III of FIG. 20. Referring to FIG. 22C, in order to pop-up the front camera module 380, a user performs an operation of pressing and releasing the top surface of the front camera module 380. Then, the latch 386 is separated from the latch receiver 221h. Then, the case 381 rotates based on the hinge shaft 384 by the restoring force of the elastic member 389 so that the front of the front camera module 380 is pop-up toward the upper side of the upper housing 221.

In addition, the protrusion 387 protruding at the front lower end of the case 381 does not rotate any more as caught by the protrusion 221f protruding at the front upper end of the upper housing 221. That is, the protrusions 387 and 221f performs a stopper function. It should be clarified again that a pop-up mechanism of the front camera module 380 according to an embodiment of the present invention is suggested through various methods other than the above method.

Figure 23:
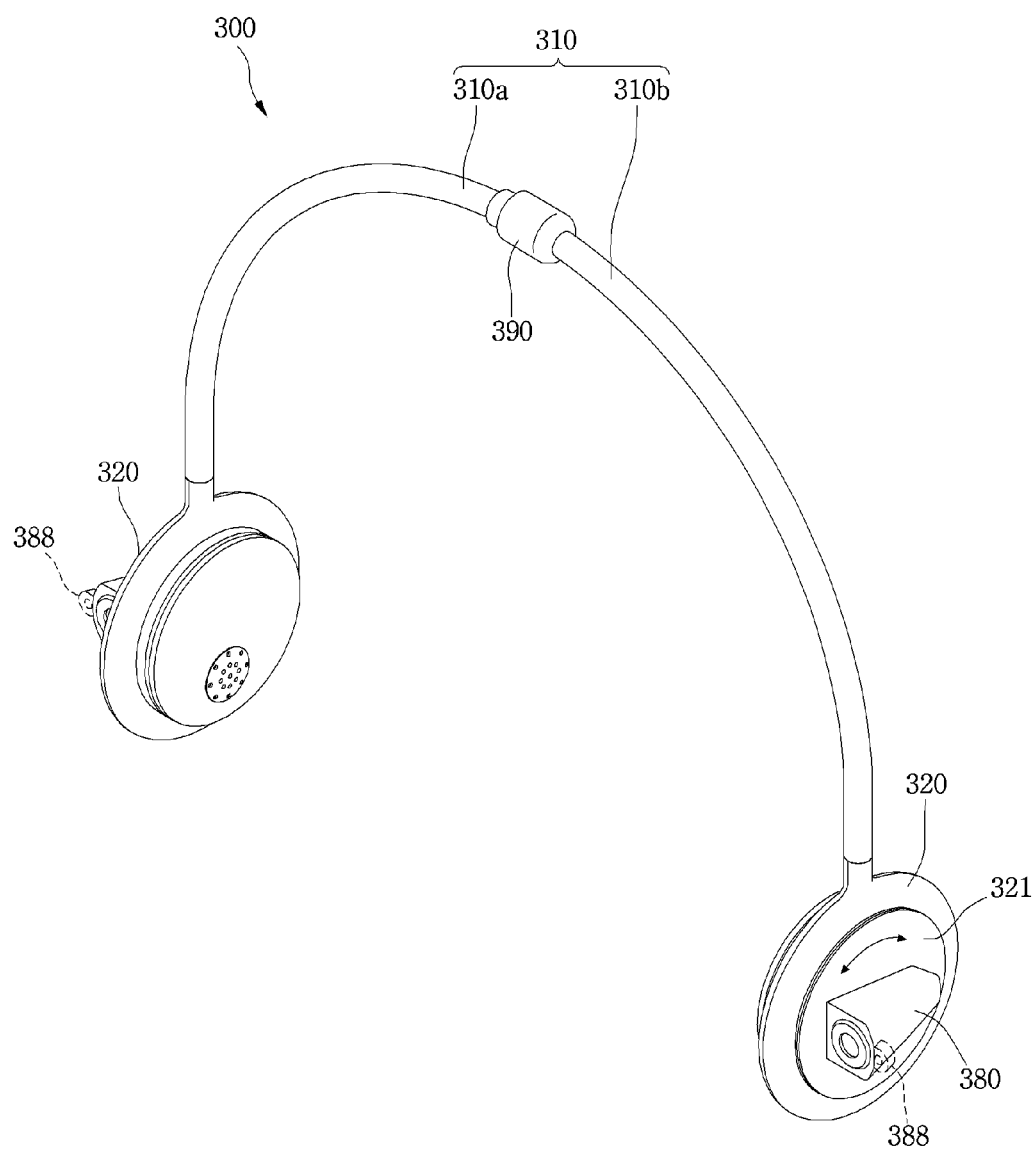
FIG. 23 is a perspective front view of a wearable device according to an eighth embodiment of the present invention.
Figure 24:
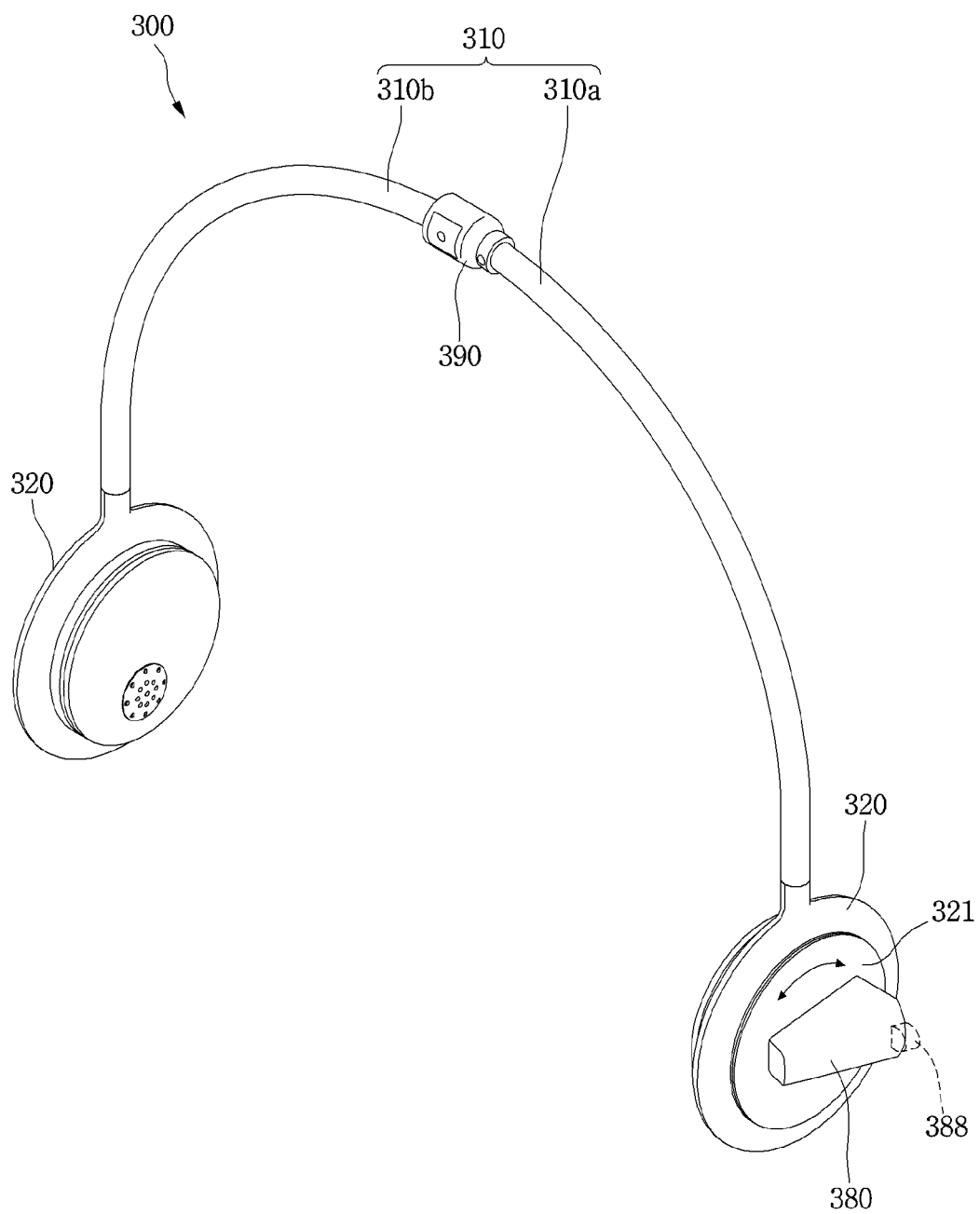
FIG. 24 is a perspective bottom view of a wearable device according to an eighth embodiment of the present invention.
Figure 25:
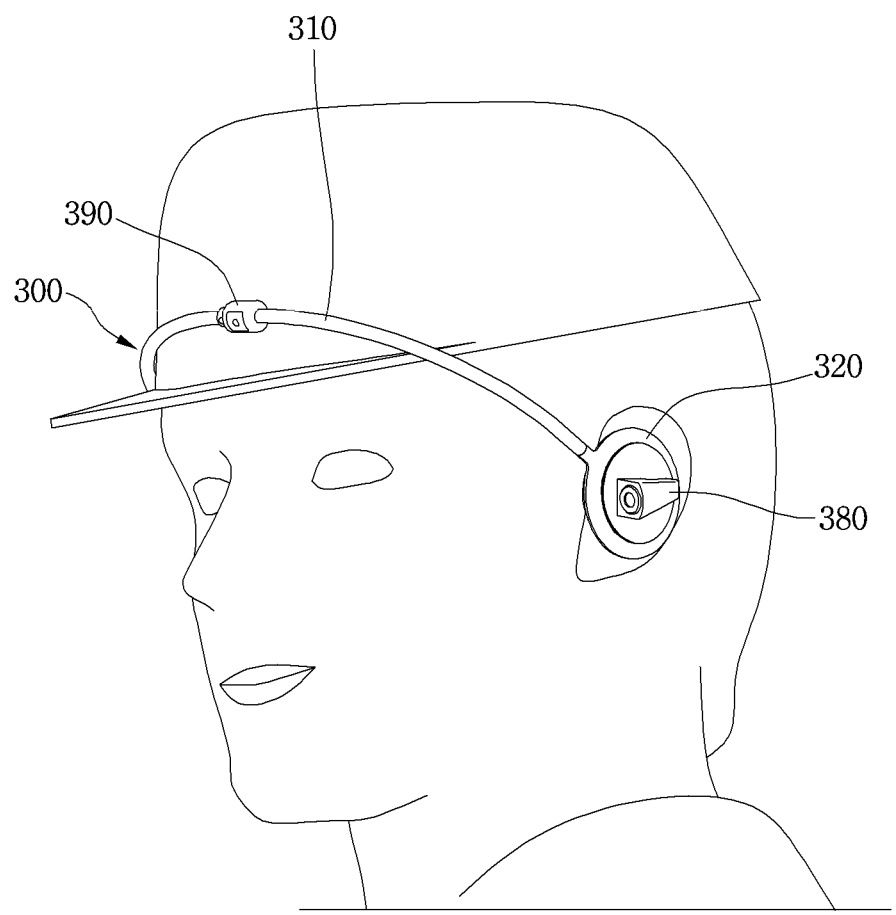
FIG. 25 is a view illustrating a wearing state of a wearable device according to an eighth embodiment of the present invention.

FIG. 23 is a front perspective view of a wearable device according to an eighth embodiment of the present invention and FIG. 24 is a rear perspective view of a wearable device according to an eighth embodiment of the present invention and FIG. 25 is a view illustrating a wearing state of a wearable device according to an eighth embodiment of the present invention.

Referring to FIGS. 23 to 25, a wearable device 300 according to the eighth embodiment of the present invention may be a wearable device in a headset or headphone form and a camera module may be mounted at the wearable device 300. Referring to FIG. 23, the wearable device 300 includes a band part 310, a body part 320 coupled to both end part of the band part 310, a front camera module 380 mounted at one or both of the one pair of body parts 320, and a rear camera module 390 mounted at the band part 310.

The wearable device 300 formed of the band part 310, the body part 320, and the camera modules 380 and 390 is identical to wearable devices according to a previous embodiment. In more detail, the band part 310 is formed of a first band 310a and a second band 310b and the body parts 320 are respectively mounted at one ends of the first band 310a and the second band 310b. Additionally, the other ends of the first band 310a and the second band 310b are connected to each other by the rear camera module 390. This is identical to the structure described in a previous embodiment. That is, the rear camera module 390 is rotatable upwardly and downwardly by a predetermined angle when it is mounted at the band part 310.

Additionally, the body part 320 may be a disc form of headphone and an outer cover 321 is rotatably mounted at the outer surface of the body part 320. Then, the front camera module 380 is mounted at the outer cover 321. Then, the front camera module 380, as shown in the drawing, may be fixed at the outer cover 321 or may be mounted at the body part 320 in a pop-up available structure while protruding from the body part 320. Then, the auto focusing sensor 399 may be mounted at the front camera module 380.

Referring to FIG. 25, a user can wear the wearable device 300 on the head. In more detail, the body part 320 adheres the body part 320 to the user's ear to allow a speaker hole equipped at the inner surface of the body part 320 to face the user's ear. Then, the band part 310 is positioned at the user's forehead to allow the rear camera module 390 to face the user's front. When a user wears a hat, as shown in the drawing, the band part 310 may be put on the brim of the hat. Then, the lens of the front camera module 380 is rotated to face the front. Then, while one pair of front camera modules 380 and the rear camera module 390 face the user's front, a subject may be captured. Then, an image captured by the plurality of camera modules 380 and 390 may be transmitted to the mobile terminal 100 and stored.

Additionally, a 3D image may be captured by operating the plurality of camera modules 380 and 390 simultaneously. As another form of a wearing method while the body part 320 adheres to the user's ear, a user rotates the band part 310 backwardly so that the rear camera module 390 faces the rear. Alternatively, when a user wears the band part 310 on the neck and puts the body part 320 on the user's upper chest, the front camera module 380 faces the user's front and the rear camera module 290 faces the user's rear.

Figure 26:
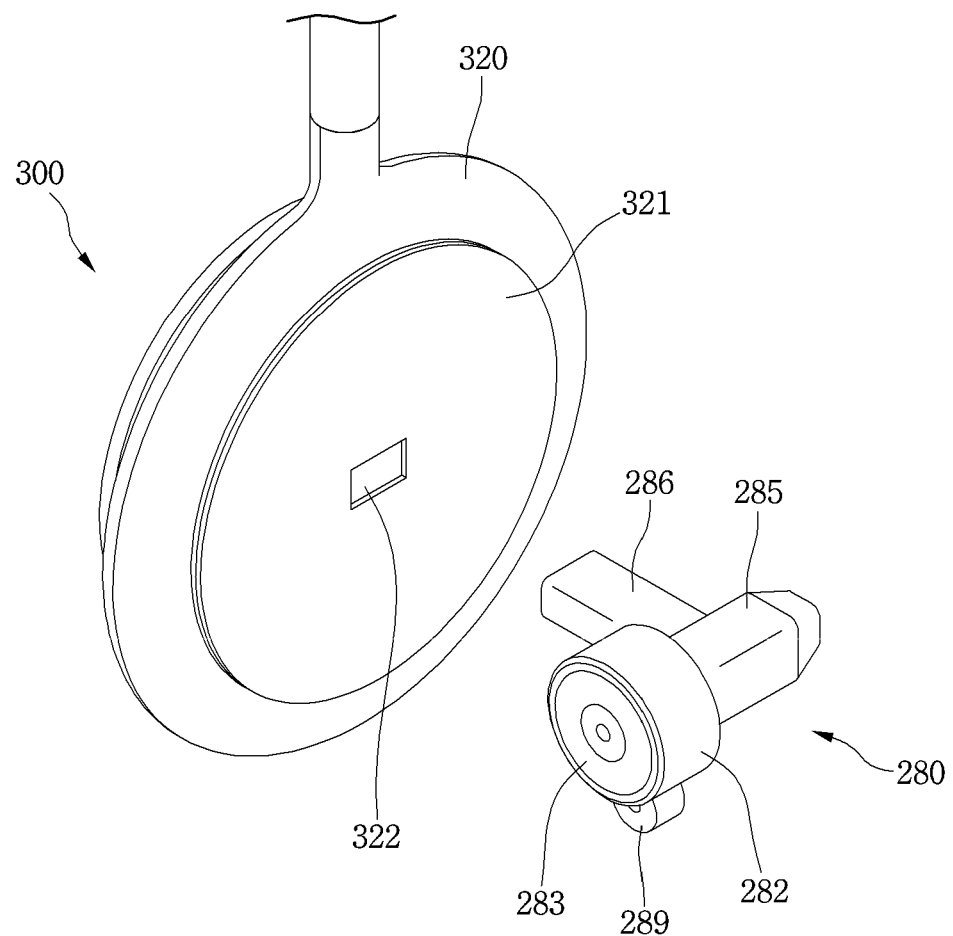
FIGS. 26 and 27 are partial perspective views illustrating a body part of a wearable device according to a ninth embodiment of the present invention.
Figure 27:
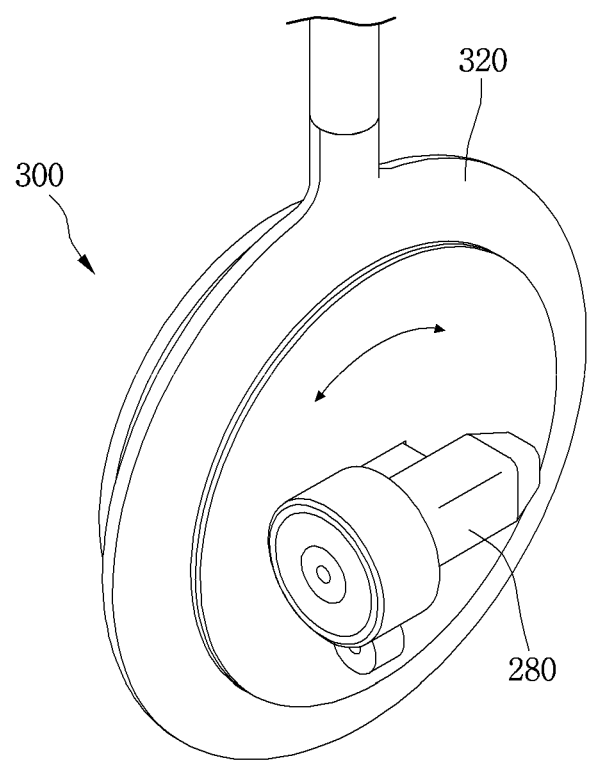

FIGS. 26 and 27 are partial perspective views illustrating a body part of a wearable device according to a ninth embodiment of the present invention. Referring to FIGS. 26 and 27, a wearable device 300 according to the ninth embodiment of the present invention has the same configuration as the wearable device 300 according to the eighth embodiment but there is a difference in that the front camera module 380 is separable from the body part 320.

In more detail, the out cover 321 is rotatably mounted at the outer surface of the body part 320 and an insertion groove 322 for mounting the detachable type front camera module 280 described with reference to FIG. 16 is formed at the center of the out cover 321. Then, the insertion part 286 of the detachable front camera module 280 is inserted into the insertion groove 322. A conductor is mounted at the bottom surface of the insertion groove 322 so that the magnet 287 coupled to the end part of the insertion part 286 may be attached thereto.

Additionally, then, a terminal part that electrically contacts the terminal pan 288 may be formed at the inner side of the insertion groove 322. By such a structure, a user can separate the front camera module 280 and keep it usually and if capture is necessary, the front camera module 280 may be coupled to the body part 320.

Figure 28:
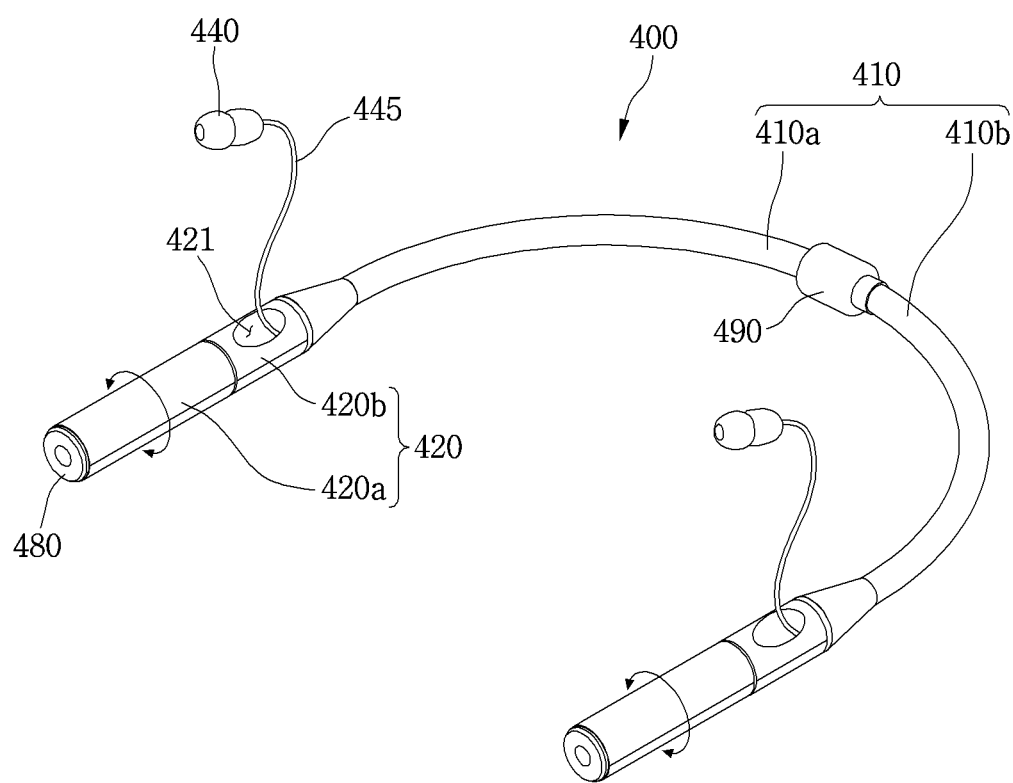
FIG. 28 is a perspective view of a wearable device according to a tenth embodiment of the present invention.

FIG. 28 is a perspective view of a wearable device according to a tenth embodiment of the present invention. Referring to FIG. 28, the wearable device 400 according to the tenth embodiment of the present invention includes a band part 410, one pair of body parts 420 coupled to both end parts of the band part 410, a front camera module 480 mounted at the front of the one pair of body parts 420, a rear camera module 490 rotatably mounted at the band part 410, and an earphone 440 withdrawingly coupled to the body part 420.

In more detail, likewise a previous embodiments, the band part 410 is formed of a first band 410a and a second band 410b and the first band 410a and the second band 410b are connected to each other by the rear camera module 490. The rear camera module 490 may have the same structure as the rear camera module 290 according to the first embodiment.

Additionally, the body part 420 may include a rear housing 420b fixed at the end parts of the first band 410a and the second band 410b and a front housing 420a rotatably coupled to the front end part of the rear housing 420b. Then, the various components described with reference to FIG. 4 are built in the body part 420 and are fixed at the inside of the body part 420 without being affected by the rotation of the front housing 420a.

In more detail, the rear housing 420b and the front housing 420a may have a cylindrical form with a predetermined diameter and length. While being connected to the rear housing 420b, the front housing 420a is configured to be rotatable toward the left and right based on a length direction center axis. Then, a focal distance of the front camera module 480 may be adjusted by the left or right direction rotation of the front housing 420a. This may correspond to the same principle of enlarging or reducing a screen while the thumb and the index finger contact the display unit of the mobile terminal. That is, when the front housing 420a rotates in one of the left and right directions, a focal distance becomes longer and when the front housing 420a rotates in the other direction, a focal distance becomes shorter, so that a subject may be enlarged or reduced for capture.

Additionally, an earphone receiving groove 421 may be recessingly formed at the rear housing 420b and a sound cable 445 may be withdrawn through the earphone receiving groove 421. Then, the earphone 440 is connected to the sound cable 445. Then, as described with reference to FIG. 4, a reel member is mounted at the inside of the body part 420 and the sound cable 445 is wound automatically in a withdrawn state so that the earphone 440 may be seated at the earphone receiving groove 421. Moreover, although not shown in the drawing clearly, the various buttons, the speaker hole, and the mike may be appropriately arranged at the outer peripheral surface of the rear housing 420b.

Figure 29:
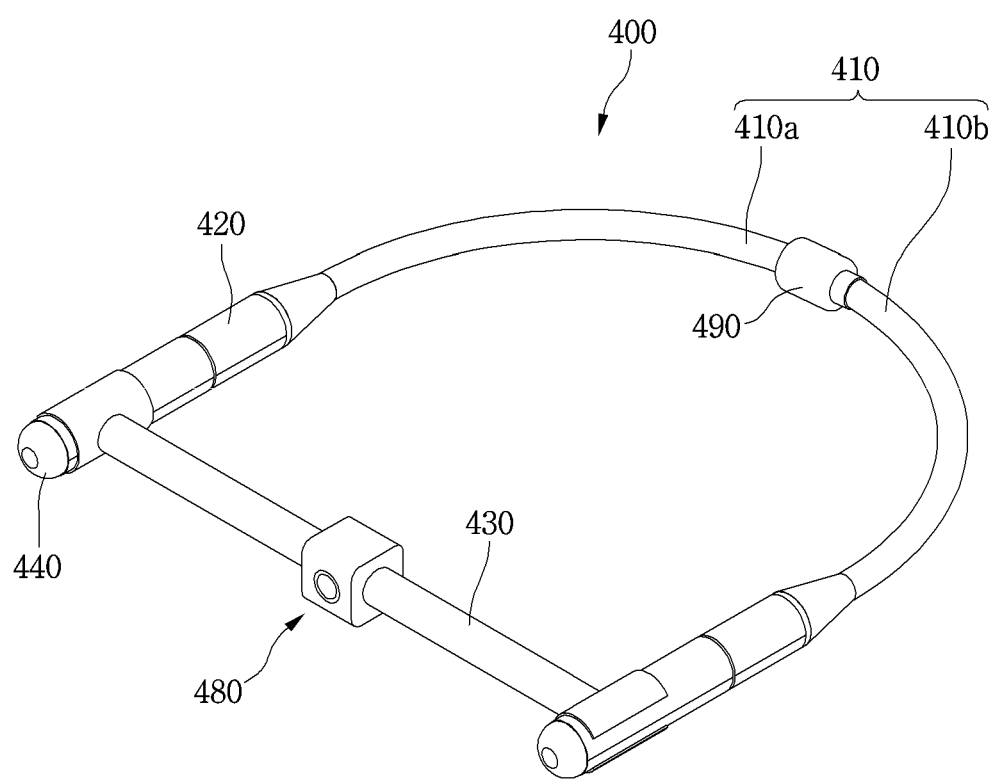
FIG. 29 is a perspective view of a wearable device according to an eleventh embodiment of the present invention.
Figure 30:
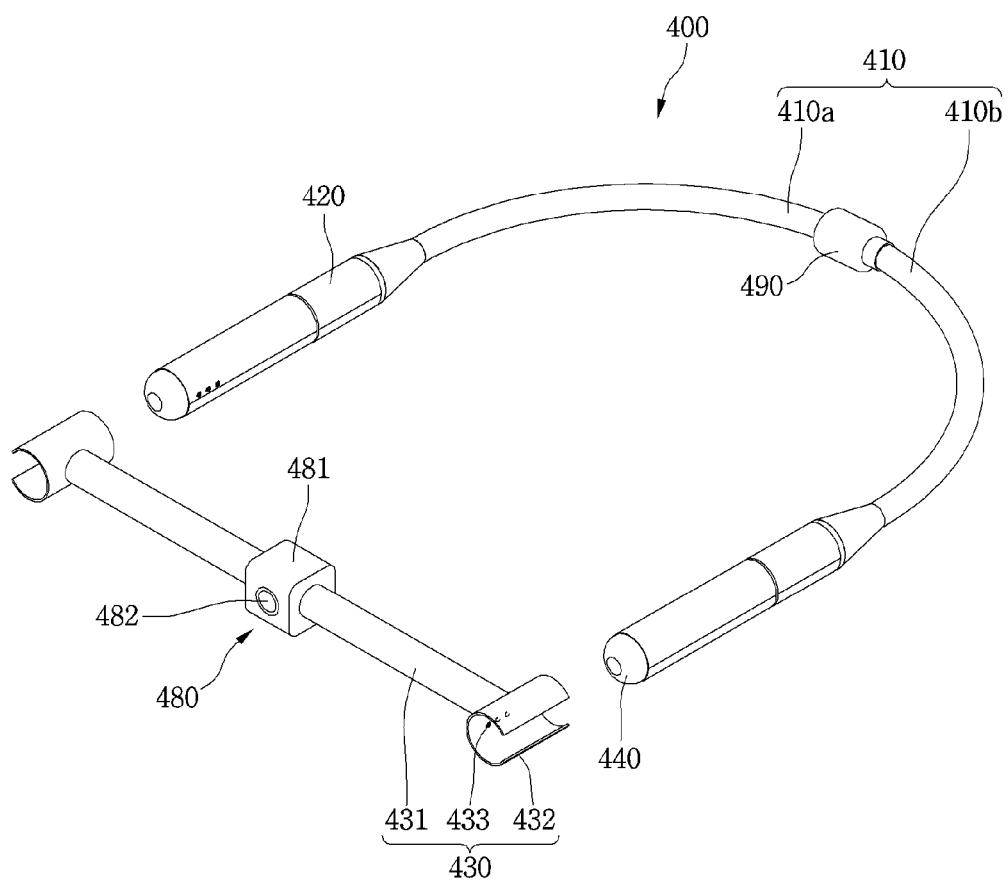
FIG. 30 is an exploded perspective view of a wearable device according to an eleventh embodiment of the present invention.

FIG. 29 is a perspective view of a wearable device according to an eleventh embodiment of the present invention and FIG. 30 is an exploded perspective view of a wearable device according to an eleventh embodiment of the present invention. Referring to FIGS. 29 and 30, a wearable device 400 according to the eleventh embodiment of the present invention has a configuration that is substantially identical to that of the wearable device according to the tenth embodiment but there is difference in that a front camera module is separably mounted at the wearable device 400 as in an additional unit form. Then, there is a difference in that the housing of the body part 420 is not divided into a rear housing and a front housing and is formed of a single cylindrical form. Then, unlike the tenth embodiment, the earphone 440 of the wearable device 400 may be withdrawingly mounted at the front of the body part 420.

The front camera module 480 according to this embodiment is not fixedly or separably mounted at the body part 420 and is separably connected to the body part 420 by an additional support 420. In more detail, the front camera module 480 includes a case 481, a camera 482 mounted at the front of the case 481, and a lens and although not shown in the drawing separately, an auto focusing lens may be mounted at one side of the case 481.

Additionally, the support 430 may include a support bar 431 and a support holder 432 formed at both end parts of the support bar 431. The support holder 432 may be formed to be rounded in a "C" form so that it may be inserted into the outer peripheral surface of the body part 420. Then, the support bar 431 penetrates the side of the case 481 so that the front camera module 480 is connected to the support bar 431. Then, as the support holder 432 is inserted into the body part 420, the front camera module 480 may be separably mounted at the wearable device 400.

Additionally, the front camera module 480 is rotatable upwardly and downwardly in a state of being connected to the support bar 431. In more detail, the front camera module 480 may be rotatable manually by a user or may be rotatable automatically by a drive motor as shown in FIG. 5.

Then, a power line, a signal line, and flexible boards extending from the front camera module 480 may be disposed in an inner space of the support bar 431 and a terminal part 433 may be formed at the inner peripheral surface of the support holder 432. Then, a terminal part 424 may be formed at the outer peripheral surface of the body part 420, specifically a portion adhering to the support holder 432. Accordingly, as the support holder 432 is mounted at the body part 420, the terminal part 433 and 424 contact each other so that the front camera module 480 and the control unit mounted in the body part 420 may be electrically connected to each other. That is, power transmission, data transmission/reception, and signal transmission/reception may be performed between the control unit and the front camera module 480 through the terminal parts 433 and 424.

Figure 31:
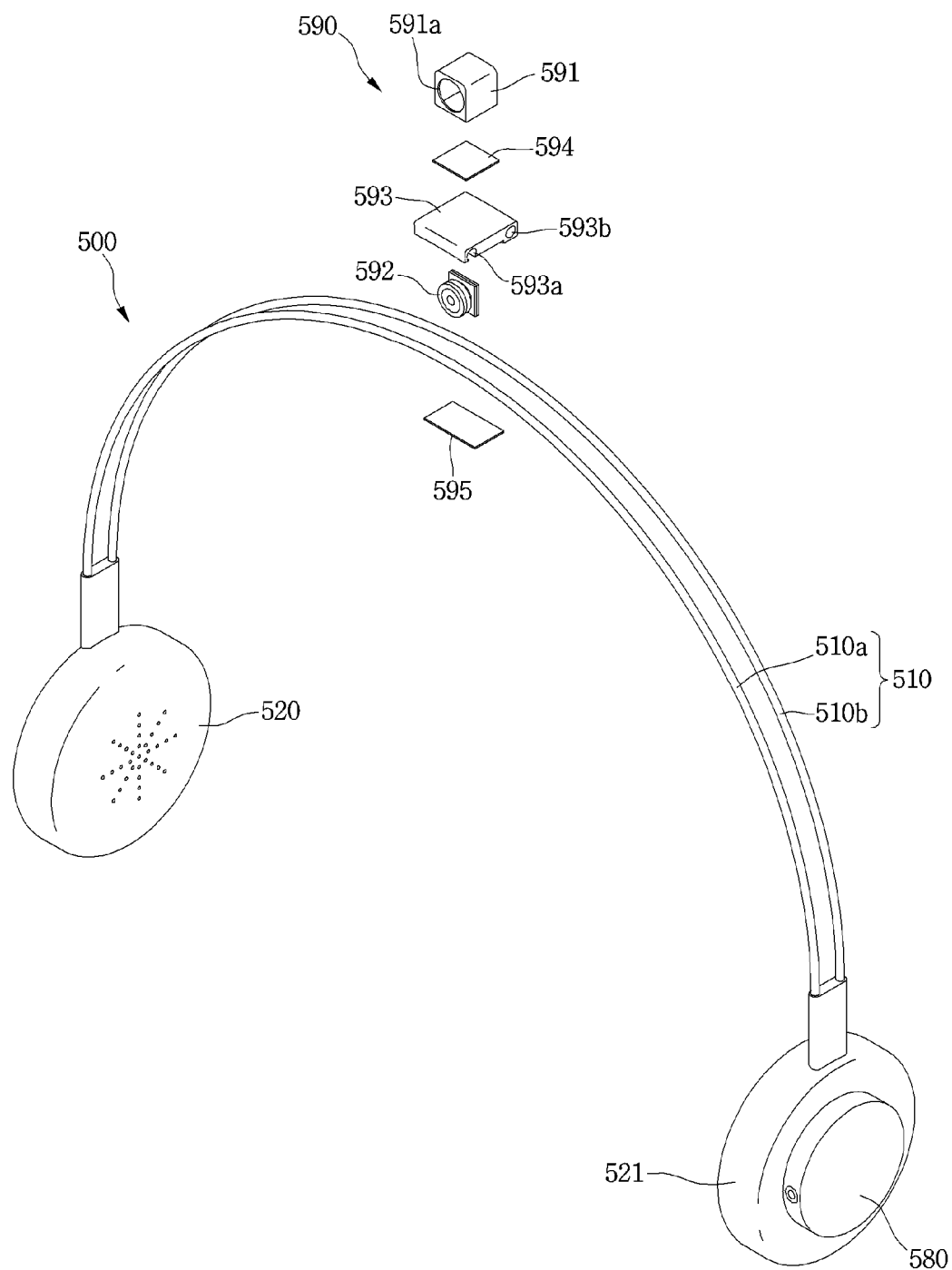
FIG. 31 is a perspective view of a wearable device according to a twelfth embodiment of the present invention.

FIG. 31 is a perspective view of a wearable device according to a twelfth embodiment of the present invention. Referring to FIG. 31, the wearable device 500 according to the twelfth embodiment of the present invention includes a band part 510, one pair of body parts 520 respectively coupled to both end parts of the band part 510, a front camera module 580 coupled to the outer peripheral surface of the body part 520, and a rear camera module 590 coupled to the band part 510.

In more detail, the wearable device 500 may be in a headset form identically to the wearable device 400 according to the eleventh embodiment. Then, the band part 510 may be formed to in a rounded form to surround the user's neck or head part. Then, the band part 510 may include a first rail 510a and a second rail 510b configured in a single body as being spaced apart from the first rail 510a. Then, in relation to the rails 510a and 510b, a wire having a predetermined diameter may be formed to be rounded in an arched form.

The body part 520 may be formed in a disc form and a speaker hole may be formed at the inside surface. Then, an out cover 521 may be rotatably mounted at the outer peripheral surface of the body part 520 and the front camera module 580 may be coupled to the out cover 521. As another method, the front camera module 580 may be rotatably mounted at the outer peripheral surface of the body part 520. Then, the front camera nodule 580, as shown in the drawing, may be formed of a cylindrical form and the front camera modules suggested in the previous embodiments may be mounted.

Additionally, the rear camera module 590 may include a case 591 where a camera hole 591a is formed at the front or the rear, a camera 592 received in the case 591, a circuit board 594 mounted in the case 591, a slider 593 coupled to the lower surface of the case 591, and a lower cover for covering the bottom surface of the slider 593.

In more detail, the camera 592 is inserted into the camera hole 591a to be installed to face the user's front or rear. Then, a slide groove 593a and a slide hole 593b may be formed at the lower surface of the slider 593. In more detail, the slide groove 593a is recessingly formed upwardly at the bottom surface of the front end part of the slider 593, and the first rail 510a is inserted into the slide groove 593a.

Additionally, the slide groove 593b is formed at the rear end part of the slider 593 and is formed penetrating the left end part to the right end part of the slider 593 and the second rail 510b is inserted into the slide hole 593a. As the second rail 510b is inserted into the slide hole 593a, the slider 593 and the band part 510 are formed as one body. Herein, the slide groove 593a may be formed at the rear end of the slider 593 and the slide hole 593b may be formed at the front end of the slider 593.

Figure 32:
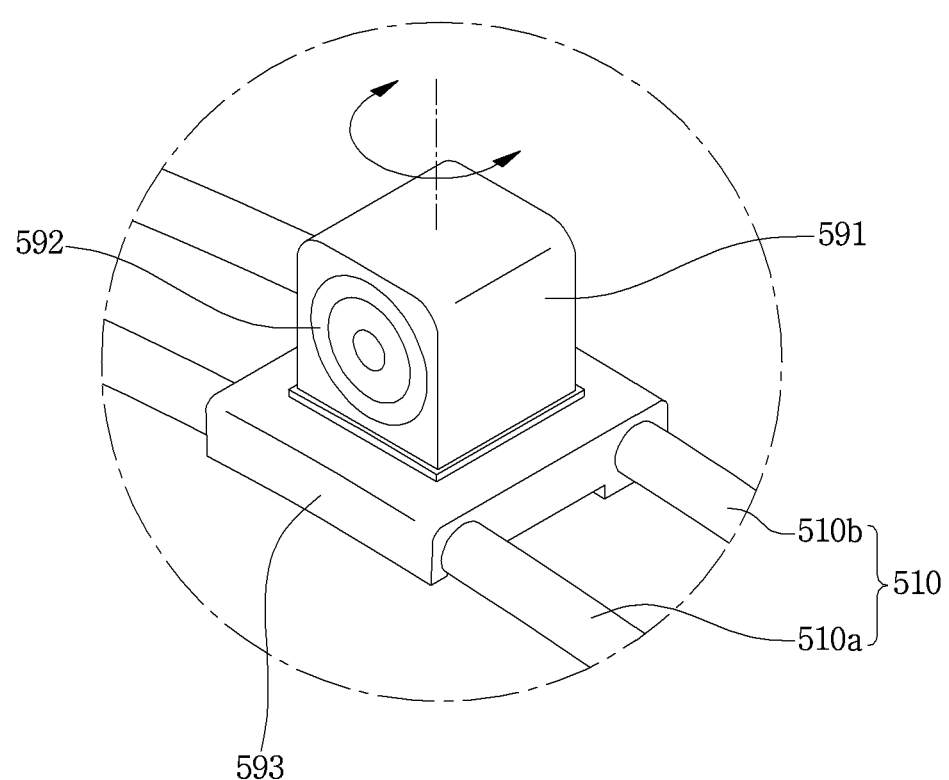
FIGS. 32 and 33 are views illustrating an operation of a rear camera module according to a twelfth embodiment of the present invention.
Figure 33:
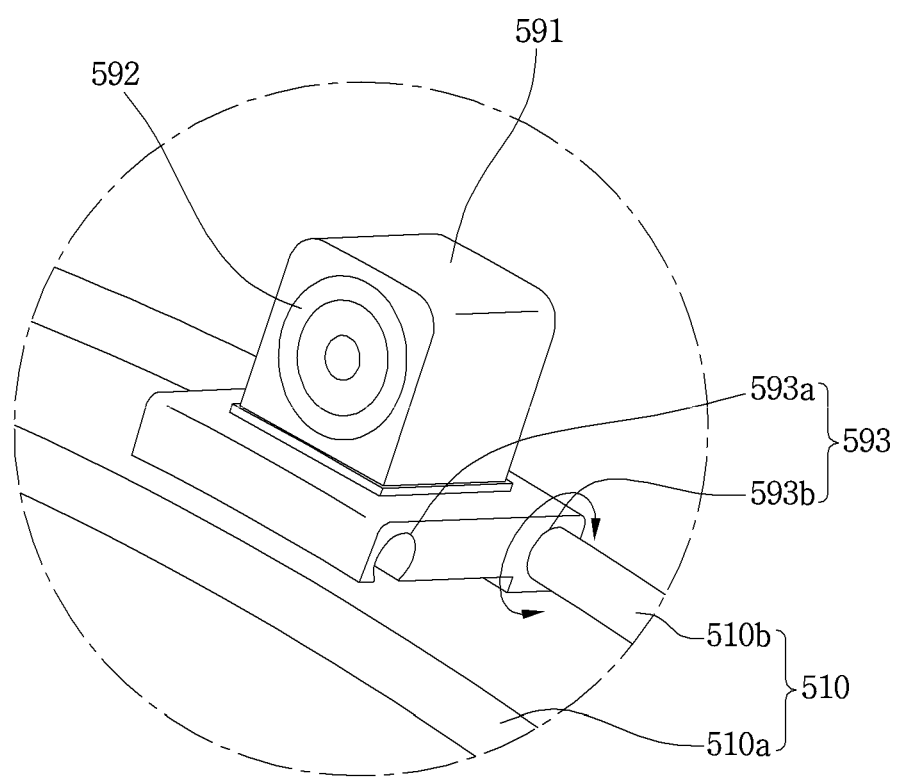

FIGS. 32 and 33 are views illustrating an operation of a rear camera module according to a twelfth embodiment. Referring to FIG. 32, the slider 593 of the rear camera module 590 may be slidingly moved along the band part 510 and may be slidingly movable from the left end part to the right end part of the band part 510.

Additionally, the case 591 may be installed to be rotatable clockwise or counterclockwise around a vertical axis at the top surface of the slider 593. For example, it may be designed that a vertical axis is provided to connect the lower surface of the case 591 and the slider 593 and the case 591 is rotatable around the vertical axis. Accordingly, while the wearable device 500 is worn on a user's head in a form that the band part 510 surrounds the user's head, the camera 592 may face the user's front or rear by rotating the case 591.

Referring to FIG. 33, the rear camera module 590 may be rotatable in a vertical direction by using the second rail 510b as a rotation center. In more detail, when the rear camera module 590 is rotated to allow the first rail 520a to be separated from the slide groove 593a, the slider 593 is connected to only the second rail 510b. Then, since the second rail 510b is inserted as penetrating the slide hole 593b, the rear camera module 590 is no separated from the band part 510. In this state, the orientation angle of the camera 592 may be adjusted by rotating the rear camera module 590 to the front or the rear.

<Control and User Interface Implementation Method of Mobile Terminal>

According to a wearable device of the present invention, when power is on, a music file stored in the memory 207 of the wearable device 200 is played through the playback button 223 of the wearable device 200 or a music file stored in the memory 170 of the mobile terminal 100 is delivered to the wearable device 200 wirelessly and output through a speaker of the wearable device 200.

According to a wearable device of the present invention, in relation to the camera modules 280 and 290 of the wearable device 200, at least one of the front camera module 280 and the rear camera module 290 may be turned on automatically without a user's manipulation according to a time period so that one or a plurality of pictures may be instantly captured and then the at least one may be turned off.

According to a wearable device of the present invention, when a location change is obtained through the location information module 201d, that is, GPS, of the wearable device 200, at least one of the front camera module 280 and the rear camera module 290 may be turned on and one or a plurality of pictures may be instantly captured and then the at least one may be turned off.

According to a wearable device of the present invention, when a surrounding situation is recognized through a sensor of the wearable device 200, for example, the proximity sensor 204a and/or an infrared sensor, at least one of the front camera module 280 and the rear camera module 290 may be turned on and one or a plurality of pictures may be instantly captured and then the at least one may be turned off. The surrounding situation may include detecting a size change of surrounding sound or detecting an approaching object.

According to a wearable device of the present invention, as another example. When a touch input (e.g., tap) of the wearable device 200 is detected through the touch sensor or geomagnetic sensor of the wearable device 200, a command for performing a capture may be given instantly. According to such a command, at least one of the front camera module 280 and the rear camera module 290 may be turned on and one or a plurality of pictures may be instantly captured and then the at least one may be turned off. According to a wearable device of the present invention, a surrounding situation may be captured by using the capture button equipped at the wearable device 200.

According to a wearable device of the present invention, while music is played, the front camera module 280 and/or the rear camera module 290 may capture an image automatically without user's manipulation. The captured image is not displayed on a screen largely and the information that there is a captured image in an edge area of the screen may be notified to a user through an alarm.

According to a mobile terminal of the present invention, when it interoperates with the wearable device 200, while a user moves, a preview screen for the rear camera of the mobile terminal 100 and a preview screen for the front camera of the wearable device 200 may be displayed on the mobile terminal 100.

According to a mobile terminal of the present invention, when it is recognized that the mobile terminal 100 is grabbed by the user's hand, preview screens for the front camera and/or rear camera of the wearable device 200 may be displayed on the mobile terminal 100 automatically.

According to a mobile terminal of the present invention, when a user cannot hear external sound or noise due to loud music, as an external sound is input to the microphone of the wearable device 200, a danger may be notified to a user through flashing warning lights (e.g., red flashing screen) on the screen of the mobile terminal 100. In addition, sensitivity according to external sound or noise may be adjusted by a user so that it may be adjustable to fit user's environment or preference.

Figure 34:
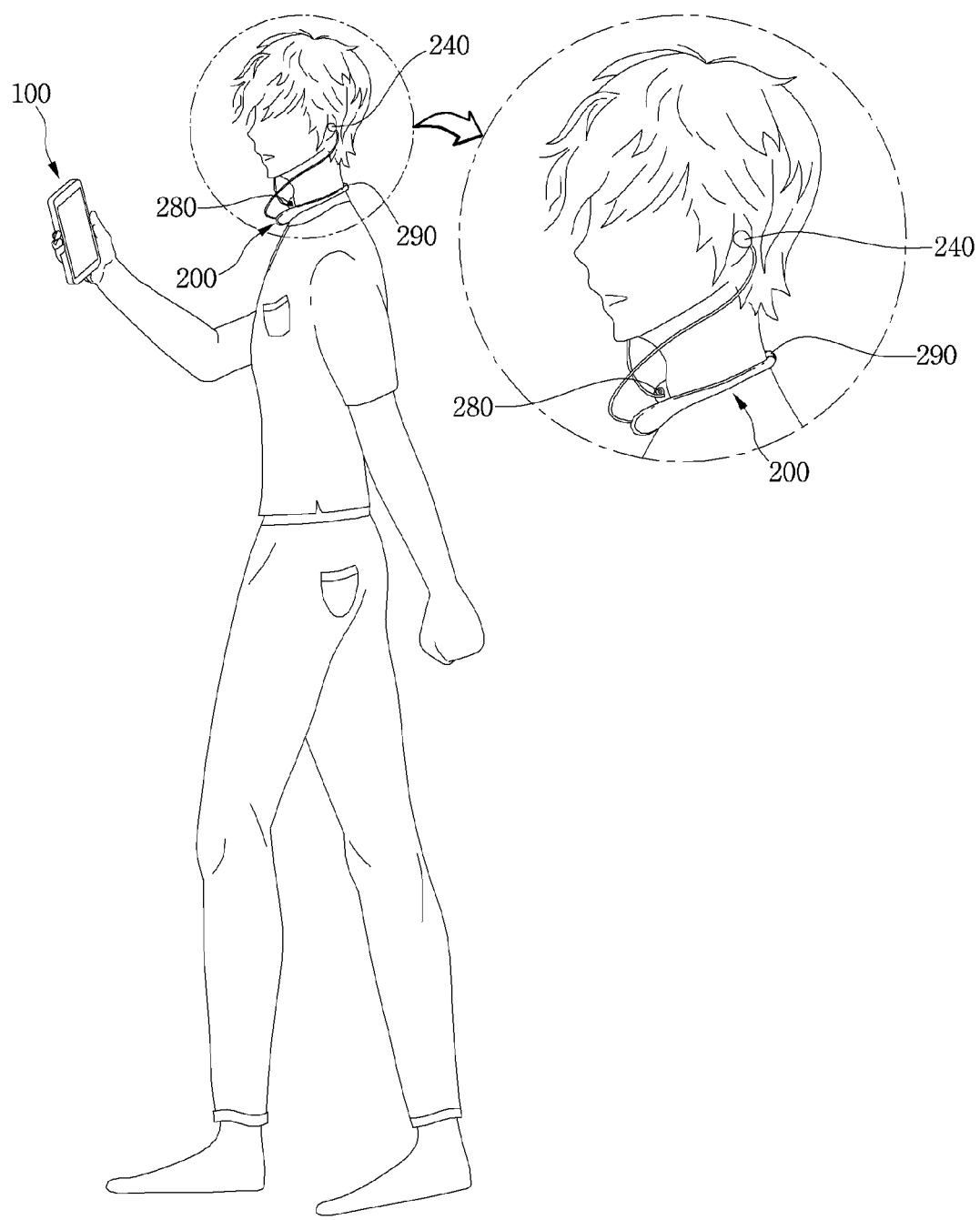
FIG. 34 is a view illustrating a usage aspect of a mobile terminal and a wearable device according to an embodiment of the present invention.

FIG. 34 is a view illustrating a usage aspect of a mobile terminal and a wearable device according to an embodiment of the present invention. As shown in FIG. 34, the mobile terminal 100 may be grabbed by a user's hand and the wearable device 200 may be put on the user's neck or fixedly mounted.

The wearable device 200 may perform various functions alone or by receiving a control of the mobile terminal 100. For example, after receiving a control of the mobile terminal 100, the wearable device 200 may stone a music file in its own memory 207 or may play a music file provided from the mobile terminal 100 or a specific server through network.

For example, after receiving a control of the mobile terminal 100, the wearable device 200 may receive a radio broadcast signal received by the mobile terminal to allow a user to listen to it. Alternatively, when a radio reception module is mounted in the wearable device 200, the wearable device 200 may receive a radio broadcast signal by itself to allow a user to listen to it without receiving a control of the mobile terminal 100. For example, after receiving a control of the mobile terminal 100, the wearable device 200 may drive the camera modules 280 and 290 mounted at the wearable device 200.

As mentioned above, the camera modules 280 and 290 mounted at the wearable device 200 may include a front camera module 280 for receiving an image for a front object, for example, picture image, or video and a rear camera module 290 for receiving an image for a rear object. In such a case, after receiving a control of the mobile terminal 100, the wearable device 200 may drive only the front camera module 280, only the rear camera module 290, or both the front camera module 280 and the rear camera module 280 at the same time.

The camera modules 280 and 290 described in this present invention may include accessories including a camera, for example, a housing, a circuit board and/or electronic components. Moreover, without receiving a control of the mobile terminal 100, the wearable device 200 may play music, receive a radio broadcast signal, or drive the camera modules 280 and 290 through the various buttons 223, 223a, 224, 224a, 232, 233, 233a, and 234 mounted at the wearable device 200.

According to an embodiment of the present invention, a user's safety may be obtained by checking and dealing a peripheral movement or risk in real time through a screen of a mobile terminal where a front image and/or a real image provided from the wearable device 200 is displayed while a user listens to music or radio broadcast.

According to an embodiment of the present invention, a significant evidence for vehicle accident or crime scene is provided as a front image and/or a rear image provided from a wearable device are/is recorded in real time so that a user views an image corresponding to a specific time slot at any time by using the recorded image.

According to an embodiment of the present invention, provided is a way of easily finding a business name that a user wants or a place where a user wants to go by using a front image and/or a rear image provided from the wearable device 200 and the user's current location information.

According to an embodiment of the present invention, provided are memories for a trip to a user by guiding a path that the user travels and providing picture images taken from a travel place based on a front image and/or a rear image provided from the wearable device 200.

Figure 35:
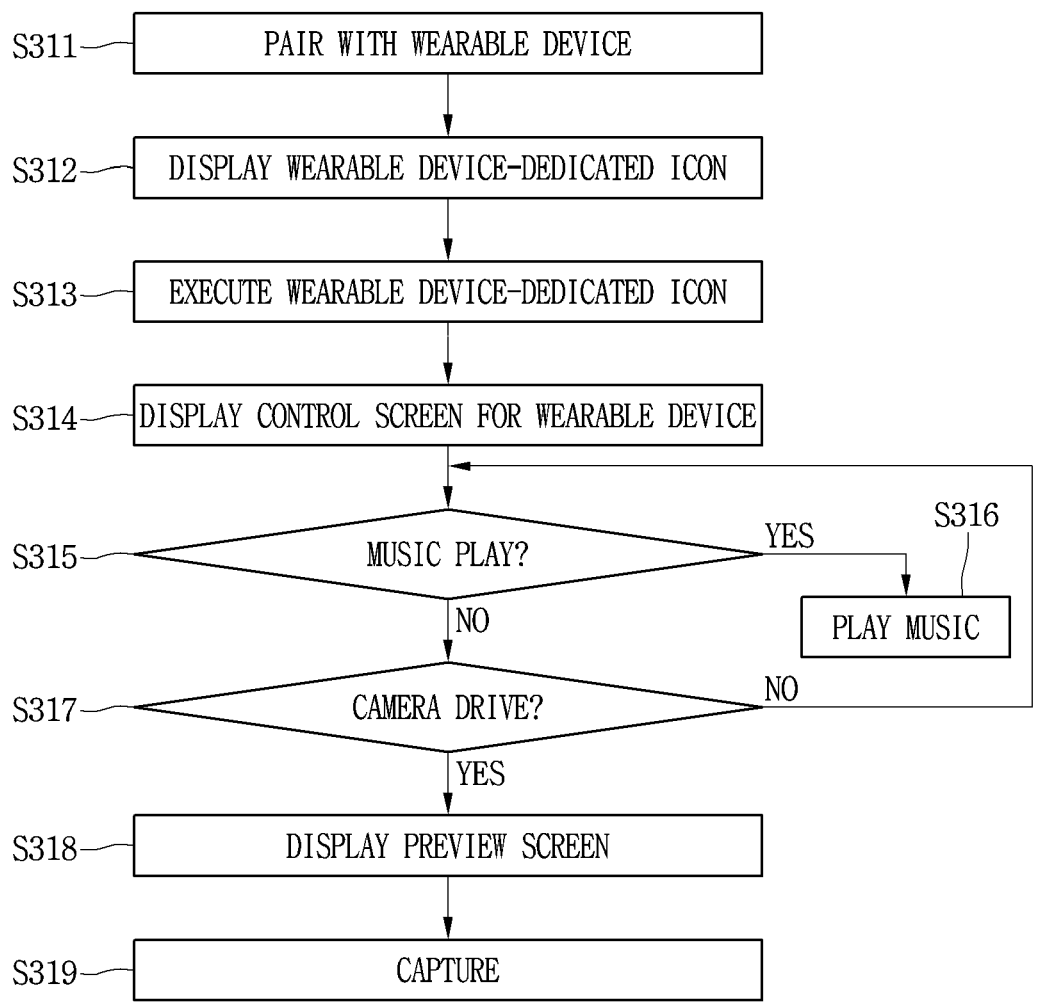
FIG. 35 is a flowchart illustrating a method of displaying a control screen for controlling a wearable device on a mobile terminal according to a thirteen embodiment of the present invention.

FIG. 35 is a flowchart illustrating a method of displaying a control screen for controlling a wearable device on a mobile terminal according to a thirteenth embodiment of the present invention. Referring to FIG. 35, the mobile terminal 100 may perform pairing with the wearable device 200 in operation S311. The wearable device 200 may be a component of the mobile terminal 100 but is not limited thereto.

As one embodiment, when the wearable device 200 approaches within a predetermined distance, the mobile terminal 100 may perform a control to automatically perform pairing between the mobile terminal 100 and the wearable device 200. As another embodiment, after activating a pairing function, the mobile terminal 100 may perform pairing between the mobile terminal 100 and the wearable device 200. Such an operation is to prevent an increase of the battery consumption in the mobile terminal 100 when a pairing function of the mobile terminal 100 is always activated.

As another embodiment, after the power of the wearable device 200 is turned on, pairing may be performed between the mobile terminal 100 and the wearable device 200. Such an operation is to prevent an increase of the battery consumption in the wearable terminal 200 when a pairing function of the wearable terminal 200 is always activated.

Moreover, a pairing operation may include an authentication process. Pairing may be performed on only the wearable device 200 of which identification information is pre-registered to the mobile terminal 100. If there is no pre-registration process in the mobile terminal 100, since the mobile terminal 100 attempts to pair with another adjacent mobile terminal 100 or wearable device, the battery consumption of the mobile terminal 100 may be increased.

In order to perform such a pairing operation, the mobile terminal 100 and the wearable device 200 may include communication modules 114 and 201e, respectively. Once pairing with the wearable device 200 is completed, the mobile terminal 100 controls the display unit 151, for example, thereby displaying a wearable device-dedicated icon 1009 of FIG. 36 in operation S312.

Herein, the pairing completion may mean a state in which authentication is successful and the mobile terminal 100 and the wearable device 200 are connected to each other. In such a way, when the pairing is completed, information or command are transmitted/received between the mobile terminal 100 and the wearable device 200. The wearable device-dedicated icon 1009 of FIG. 36 may be randomly displayed on an area of the display unit 151 of the mobile terminal 100 or may be displayed on a predetermined area. A wearable device-dedicated icon may be installed by a manufacturer but the present invention is not limited thereto.

Figure 36:
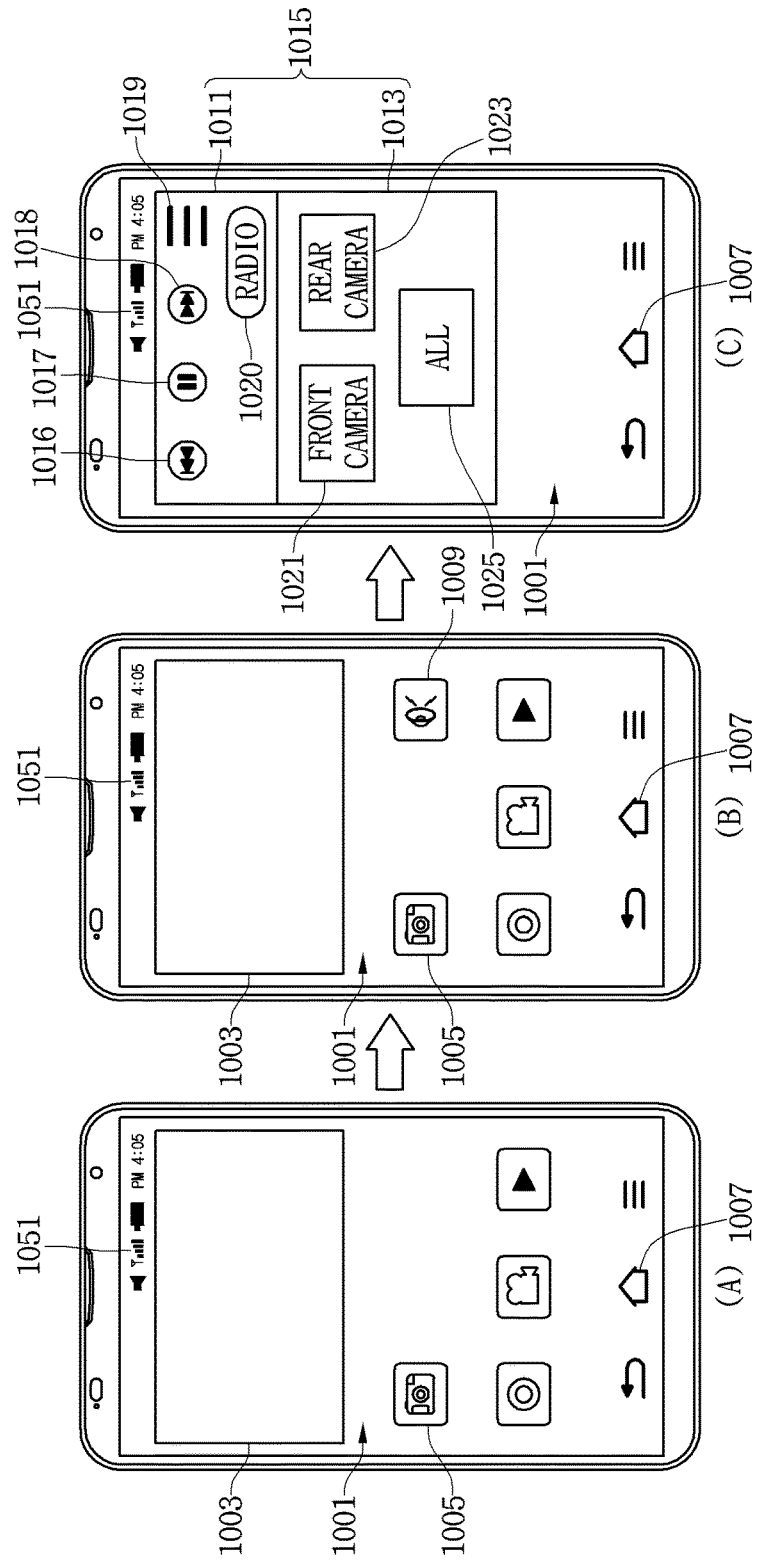
FIG. 36 is a screen illustrating a method of displaying a control screen for controlling a wearable device on a mobile terminal according to a thirteenth embodiment of the present invention.

If the pairing between the mobile terminal 100 and the wearable device 200 is released, the wearable device-dedicated icon 1009 of FIG. 36 may disappear from the display unit 151 of the mobile terminal 100 but the present invention is not limited thereto. The wearable device-dedicated icon 1009 of FIG. 36 may be an application for controlling the wearable device 200 by using the mobile terminal 100. In particular, the wearable device-dedicated icon 1009 of FIG. 36 may be an application for controlling the music playback of the wearable device 200 or the driving of the camera modules 280 and 290 by using the mobile terminal 100.

The mobile terminal 100 may execute the wearable device-dedicated icon 1009 of FIG. 36 in operation S313. For example, when a touch on the wearable device-dedicated icon 1009 of FIG. 36 is input from a user, the mobile terminal 100 may execute the wearable device-dedicated icon 1009 of FIG. 36. When the wearable device-dedicated icon 1009 of FIG. 36 is executed in such a way, the mobile terminal 100 may display a control screen for wearable device 1015 of FIG. 36 by controlling the display unit 151 in operation S314.

The control screen for wearable device 1015 of FIG. 36 may include a music control screen 1011 and a camera control screen 1013. The music control screen 1011 may be switched or into a radio control screen. That is, the music control screen 1011 and the radio control screen are switched into each other. The music control screen 1011 may be referred to a sound control screen. The sound control screen may play other sounds other than music.

The mobile terminal 100 checks Whether a music playback command is input in operation S315 and performs a control to play music according to its result in operation S316. For example, when a selection command for the stop and playback button 1017 displayed on the music control screen 1011 is input, the mobile terminal 100 may recognize such a selection command as a music playback command and may play music.

The mobile terminal 100 may perform a control to capture an image by using the front camera module 280 and/or the rear camera module 290 of the wearable device 200 through the control screen for wearable device 1015. That is, the mobile terminal 100 checks which one of buttons 1021, 1023, and 1025 of FIG. 36 displayed on the control screen for wearable device 1015 in order for the driving of the front camera module 280 and/or the rear camera module 290 is selected in operation S317. The buttons may include a front camera button 1021, a rear camera button 1023, and an all button 1025 for driving both the front camera and the rear camera.

If a selection command on at least one of the buttons 1021, 1023, and 1025 displayed on the wearable control screen 1015 is input, the mobile terminal 100 controls the wearable device 200 so that a camera 1021 and/or 1023 corresponding to the selection command is driven to display a preview screen on an image input from the camera 1021 and/or 1023 in operation S318. For example, when a selection command on the all button 1025 is input, both the front camera module 280 and the rear camera module 290 are driven so that a front preview screen 1024 of FIG. 37 for a front image input to the front camera module 280 and a rear preview screen 1026 of FIG. 37 for a rear image input to the rear camera module 290 may be displayed.

When a capture command is input from a user, the mobile terminal 100 performs a control on the wearable device 200 to capture an image input to a corresponding camera in operation S319. Moreover, when pairing is completed, a control bar may be displayed on a screen. The control bar may a touch state display area. The control bar is displayed on a display window that forms another layer through a touch drag operation from an upper or lower bezel. A control window for controlling the wearable device 200 may be displayed on the display window. For example, a window for controlling each of audio and camera of the wearable device 200 may be displayed on the control window.

FIG. 36 is a screen illustrating a method of displaying a control screen for controlling a wearable device on a mobile terminal according to a thirteenth embodiment of the present invention. As shown in FIG. 36A, a widget icon 1003 and a plurality of icons 1005 may be displayed on a home screen 1001 of the display unit 151 of the mobile terminal 100. Soft keys 1007 including a previous button, a home button, and a menu button are displayed on a lower end area of the home screen 1001 and a state display bar 1051 representing functions currently in use is displayed on an upper end area of the home screen 1001.

The previous button may be a member for switching the current screen to a previous screen, the home button may be a member for directly switching the current screen to the home screen 1001 and the menu button may be a member for executing various menus such as setting, save, move, and delete. When a drag touch input is input in a lower direction, the state display bar 1051, for example, a quick setting function icon, a state of a function currently in execution, various functions such as notification, or state information may be displayed. As the quick setting function icon, for example, Q memo, Q slide, vibration/sound mode, Wi-Fi, rotation, location information, Bluetooth, airplane mode, synchronization, NFC, Q voice, Q remote control, and edit may be displayed.

The widget icon 1003, for example, may include time information and weather information. The widget icon 1003 may exist diversely on network and these various widget icons 1003 are downloaded to be displayed on the mobile terminal 100. Accordingly, a user can change the widget 1003 displayed on the display unit 151 of the mobile terminal 100 into another widget icon. Icons 1005, as an application for executing a specific function, may include various icons such as phone icon, e-mail icon, game icon, map icon, camera icon, setting icon, shopping icon, and newspaper icon.

Herein, the camera icon may execute a camera 121 mounted at the mobile terminal 100, for example, a front camera mounted on the front of the mobile terminal 100 and a rear camera mounted on the rear of the mobile terminal 100. According to this present invention, the camera 121 amounted at the mobile terminal 100 may be driven and also the front camera module 280 and/or the rear camera module 290 mounted at the wearable device 200 may be driven. The front camera module 280 and/or the rear camera module 290 of the wearable device 200 may be driven by the wearable device 200 itself or a control of the mobile terminal 200.

As shown in FIG. 36B, once pairing between the mobile terminal 100 and the wearable device 200 is completed, a wearable device-dedicated icon 1009 may be displayed in an area or predetermined area of the home screen 1001 of the mobile terminal 100. The wearable device-dedicated icon 1009 may be processed differently from another icon 1005. For example, the wearable device-dedicated icon 1009 may be enlarged greatly than the other icon 1005 and displayed. For example, the frame of the wearable device-dedicated icon 1009 may highlighted to be distinguished from another icon 1005. For example, the wearable device-dedicated icon 1009 may be flashed at a predetermined period.

When a touch for the wearable device-dedicated icon 1009 is input, the wearable device-dedicated icon 1009 is executed and as shown in FIG. 36C, a control screen for wearable device 1015 may be displayed on the display unit 151 of the mobile terminal 100.

The control screen for wearable device 1015 may be a screen or window separated from the home screen 1001 but the present invention is not limited thereto. The control screen for wearable device 1015 may be displayed on a partial area of the home screen 1001 but the present invention is not limited thereto.

The control screen for wearable device 1015 may be displayed by replacing the widget icon 1003 displayed on the home screen. 1001 of the mobile terminal 100 but the present invention is not limited thereto. In such a way, when the control screen for wearable device 1015 is displayed in an area where the widget icon 1003 is displayed, as the icon 1005 is not interfered with the control screen for wearable device 1015, a user can control the wearable device 200 so that in addition to music playback or radio listening, a function assigned to a corresponding icon is used through the executions of a plurality of icons displayed on a screen while detecting the front and rear situations through the control screen for wearable device 1015. As a result, user's convenience may be maximized.

The control screen for wearable device 1015, for example, may include a music control screen 1011 and a camera control screen 1013. As one example, the sound control screen 1011 and the camera control screen 1013 may be displayed through a window separated from the home screen 1001. As another example, the home screen 1001 may be divided into a first control area and a second control area and the music control screen 1011 may be displayed on the first control area and the camera control screen 1013 may be displayed on the second control area. The first and second control areas may be divided along the left and right directions or the up and down directions or may be divided based on a diagonal line of the home screen 1001.

As one example, an entire area of the home screen 1001 may be filled with the first and second control areas. For example, the first control area may be disposed at the upper side of the home screen 1001 and the second control area may be disposed at the lower side of the home screen 1001. As another example, the first and second control areas may be disposed in a partial area of the home screen 1001. A partial area of the home screen 1001 may be divided into the first and second control areas.

The music control screen 1011 may include a previous button 1016, a next button 1018, a stop and playback button 1017, a list view button 1019, and a switch button 1020. The stop and playback button 1017 may stop music currently in playback or play music. The previous button 1016 may be a member displayed at the left of the stop and playback button 1017 and changing music currently in playback into previous music. The next button 1018 may be a member for changing music currently in playback to the next music. The list view button 1019 may be a member for searching for and selecting a music file list existing in a network server connected to the mobile terminal 100, the wearable device 200, or the mobile terminal 100 through network.

Although the previous button 1016, the stop and playback button 1017, the next button 1018, the list view button 1019, and the switch button 1020 are shown as general mark images in the drawing, a mark image different from the general mark image may be used. The switching button 1020 may change the music control screen 1011 into a radio control screen. For example, when a touch for the switching button 1020 is input, the music control screen 1011 may change into a radio control screen. When a touch for the switching button 1020 is input again in a state of being changed into the radio control screen, the radio control screen may change into the music control screen 1011.

When the music control screen 1011 is changed into the radio control screen, the previous button 1016 and the next button 1018 may have a function for finding a radio channel having a frequency that is lower or higher than a frequency of a currently listening radio channel. Moreover, the stop and playback button 1017 may stop the listening of the currently listening radio channel or start the listening again. The list view button 1019 may be a member for searching for and selecting a list of various national and international radio broadcast stations.

Moreover, the camera control screen 1013 may include a front camera button 1021, a rear camera button 1023, and an all button 1025. The front camera button 1021 is a member for driving only the front camera module 280 and the rear camera button 1023 is a member for driving only the rear camera module 290. The all button 1025 is a member for simultaneously driving the front camera module 280 and the rear camera module 290. If a right camera module 1503 of FIG. 71 and a right camera module 1501 of FIG. 71 in addition to the front camera module 280 and the rear camera module 290 are additionally mounted at the wearable device 200, a right camera button and a right camera button may be further displayed on the camera screen 1013.

For example, when a touch for the front camera button 1021 is input, the front camera module 280 is driven so that an image for an object at the front may be displayed in a preview state on the display unit 151 of the mobile terminal 100. For example, when a touch for the rear camera button 1023 is input, the rear camera module 290 is driven so that an image for an object at the rear may be displayed in a preview state on the display unit 151 of the mobile terminal 100.

For example, when a touch for the all button 1025 is input, an image for an object of each of the front camera module 280 and the rear camera module 290 may be displayed in a preview state on the display unit 151 of the mobile terminal 100. As one example, an image for an object at the front and a preview image for an object at the rear may be displayed through a window separated from the home screen 1001 but the present invention is not limited thereto. As another example, an image for an object at the front and a preview image for an object at the rear may be displayed on the camera control screen 1013.

Moreover, unlike FIG. 36C, only a camera button may be displayed on the camera control screen 1013 and according to the number of predetermines times that this camera button is touched, the front camera module 180, the rear camera module 290, or both the front camera module 280 and the rear camera module 290 may be driven. For example, when a one time touch for a camera button is input, only the front camera module 280 is driven so that an image for an object at the front may be displayed in a preview state. For example, when a two times touch for a camera button is input, only the rear camera module 290 is driven so that an image for an object at the rear may be displayed in a preview state. For example, when a three times touch for a camera button is input, both the front camera module 280 and the rear camera module 290 are driven, so that an image for an object at the front and an image for an object at the rear may be displayed in a preview state.

In addition to the above embodiments, various user interfaces for driving separately or simultaneously the front camera module 280 and the rear camera module 290 may be possible and it is apparent that such user interfaces are included in the technical idea of the present invention.

As one example, when the pairing between the wearing device 200 and the mobile terminal 100 is released or when a touch for a previous button or a home button of the soft key 1007 is input, the control screen for wearable device 1015 may disappear. As another example, when an end button is added on the control screen for wearable device 1015 and then a touch for the end button is input, the control screen for wearable device 1015 may disappear.

The previous button 1016, the stop and playback button 1017, the next button 1018, the list view button 1019, the switch button 1020, the front camera button 1021, the rear camera button 1023, and the all button 1025 may be opaque members, transparent members, or semi-transparent members. The buttons 1016, 1017, 1018, 10.19, 1020, 1021, 1023, and 1025 displayed on the control screen for wearable device 1015 may change from an opaque member into a transparent member or from a transparent member into an opaque member by the activation of a Q slide function.

As another example, an image simultaneous capture or a video simultaneous capture is possible by using the front camera button 1021, the rear camera button 1023, and the all button 1025 as one key and in the case of the wearable device 200 and when a camera is mounted at each 120°, the 360° panorama may be captured simultaneously.

As another example, GPS information may be additionally stored in a captured image or video. As another example an audio related control window is disposed in a first control area and a camera related control window may be disposed in a second control area. Additionally, the first control area may be disposed in an area close to the upper side where a status bar 1051 is displayed on the display unit 151 of the mobile terminal 100 and the second control area may be disposed in an area close the lower side of the display unit 151. Unlike this, the first control area may be disposed in an area close to the lower side and the second control area may be disposed in an area close to the upper side.

Figure 37:
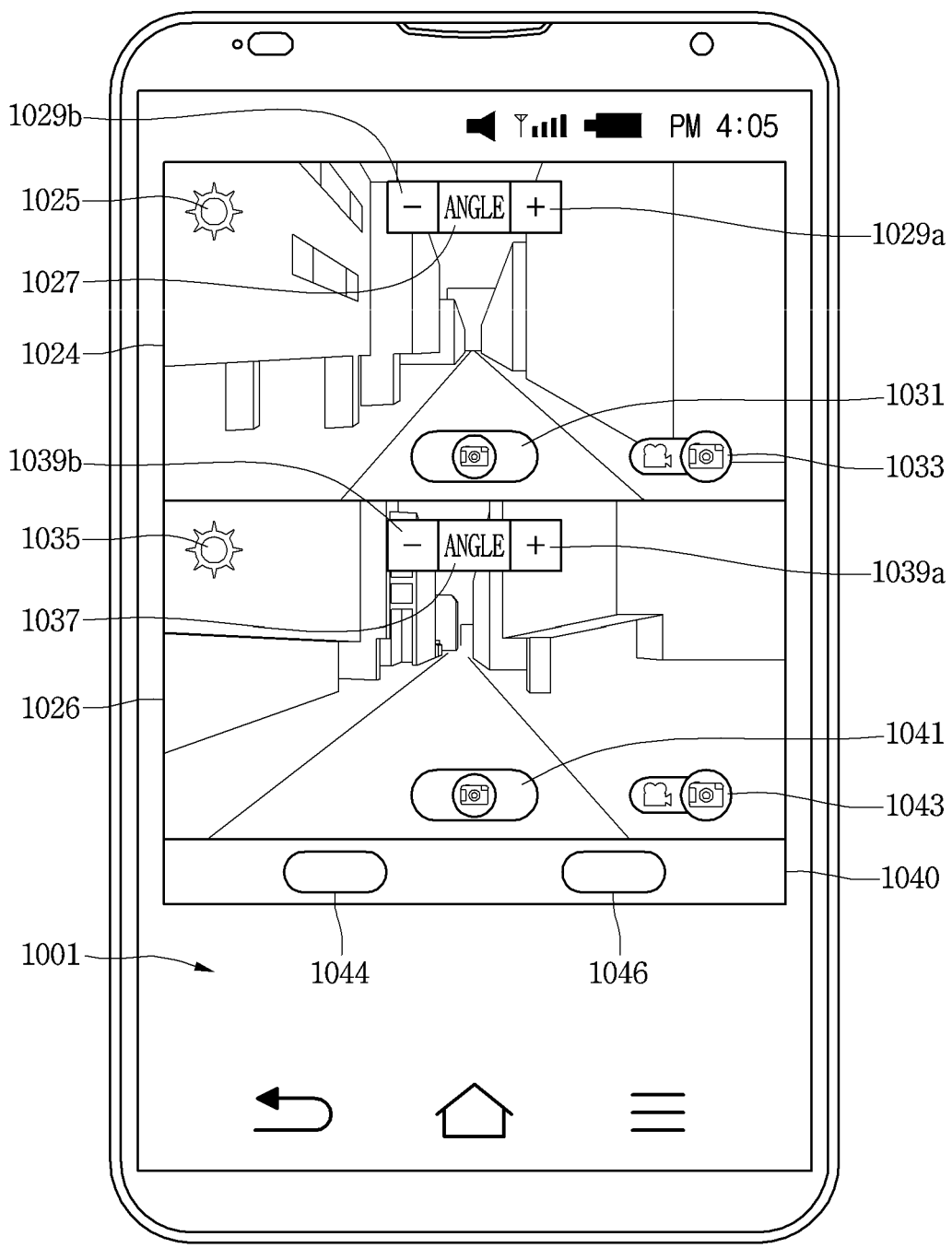
FIG. 37 is a first screen illustrating a preview screen displayed when the all button displayed on the camera control screen shown in FIG. 36C is selected.

FIG. 37 is a first screen illustrating a preview screen displayed when the all button 1025 displayed on the camera control screen 1013 shown in FIG. 36C. As shown in FIG. 37, for example, when a touch for the all button 1025 displayed on the camera control screen 1013 is input, the front camera module 280 and the rear camera module 290 are driven, so that a front preview screen 1024 and a rear preview screen 1026 may be displayed on the display of the mobile terminal 100.

Moreover, for example, a simultaneous capture button 1044 and a screen selection button 1046 may be displayed on an additional screen 1040 connected to and facing with the rear preview screen 1026. A front image and a rear image may be captured at the same time by a touch operation of the simultaneous capture button 1044. Only the front preview screen 1024 or the rear preview screen 1026 may be controlled to be displayed by a touch operation of the screen selection button 1046.

As the front camera module 280 is activated, a front preview image for an object at the front may be displayed on the front preview screen 1024. Furthermore, as the rear camera module 290 is activated, a rear preview image for an object at the rear may be displayed on the rear preview screen 1026.

Herein, the activation may mean a state in which the front camera module 280 and/or the rear camera module 290 are driven to allow an image for an object at the front or the rear to be input through the front camera module 280 and/or the rear camera module 290 and an image for an object at the front or the rear is captured by the front camera module 280 and/or the rear camera module 290 driven according to a user's capture command.

The rear preview screen 1026 may be disposed at the lower side of the front preview screen 1024 and the rear preview screen 1026 may be disposed at the upper side of the front preview screen 1024. The front preview screen 1024 and the rear preview screen 1026 may be a window separated from the control screen for wearable device 1015 or the home screen 1001 but the present invention is not limited thereto.

As another example, the home screen 1001 may be divided into a first control area and a second control area and a front preview screen may be displayed on the first control area and a rear preview screen 1026 may be displayed on a second control area. The first and second control areas may be divided along the left and right directions or the up and down directions or may be divided based on a diagonal line of the home screen 1001.

Each of the front preview screen 1024 and the rear preview screen 1026 may include a setting button 1025 or 1035, an angle adjustment button 1027 or 1037, a capture button 1031 or 1041, and an image switch button 1033 or 1043. It is possible to control an image capture and/or video capture corresponding to each of an image capture mode and a video capture mode switched by the image switch button 1033 or 1043 through the capture button 1031. In the same manner, it is possible to control an image capture and/or video capture by using one video capture button 1041.

The setting button 1025 or 1035 may be a member for setting various functions such as voice recording, brightness, focus, resolution, ISO, white balance, filter, tinter, location information display, volume key, capture sound, help, and initialization. The angle adjustment module 1027 or 1037 may adjust a viewing angle of the front camera of the front camera module 280 or the rear camera of the rear camera module 290.

A capture direction, GPS information, time, and weather may be displayed on the captured image. That is, information on whether it is forward a front direction or a rear direction from the captured location is displayed together. Or, which whether it is captured toward one direction of east, west, south, and north from the capture position is included in the capture image. The captured information may be displayed in addition to information on whether a capture is made instantly on the move or is made in a stop state.

Figure 38:
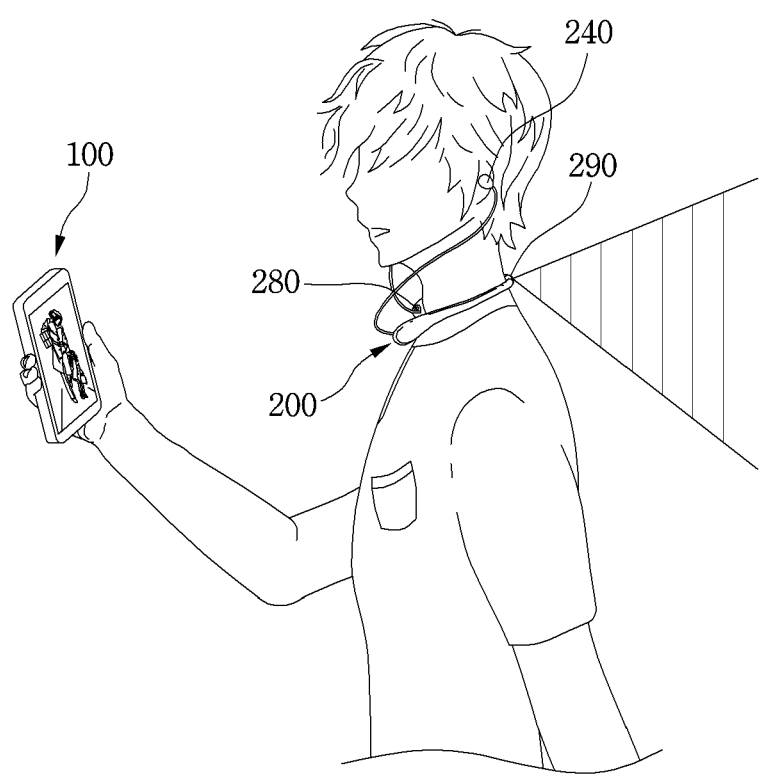
FIG. 38 is a view illustrating the current viewing angle of a rear camera of a rear camera module.

Information on music played during capture is stored together with the captured image. When a captured image is displayed on the display unit 151, related music may be played through the music information. Alternatively, when an icon representing that there is related music is displayed and is selected through an icon touch operation, a related music file may be played. For example, as shown in FIG. 38, the current viewing angle of the rear camera of the rear camera module 290 may face a horizontal direction.

Figure 39:
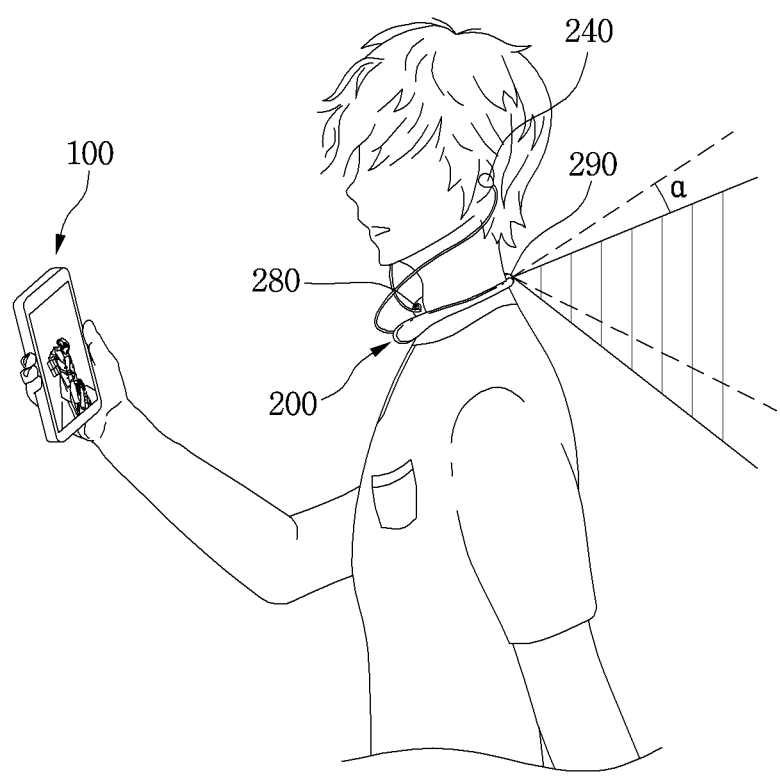
FIG. 39 is a view when a viewing angle is varied as a rear camera of a rear camera module is adjusted.

In such a case, as the first area 1039*a* of the angle adjustment button 1027 or 1037 displayed on the rear preview screen 1026 is pressed, as shown in FIG. 39, the viewing angle of the rear camera of the rear camera module 290 may be adjusted to be moved upwardly by a predetermined angle (α). The adjustment of the viewing angle may be possible as the front camera module 290 rotates in a clockwise or counterclockwise direction.

In addition, when the second area 1039*b* of the angle adjustment button 1027 or 1037 is pressed, the viewing angle of the rear camera of the rear camera module 290 may be adjusted to be moved downwardly. As another example, while a touch and hold gesture is input to the first area 1039*a* or the second area 1039*b* of the angle adjustment button 1027 or 1037, the viewing angle of the rear camera of the rear camera module 290 may be continuously moved upwardly or downwardly and when a hold gesture for the first area 1039*a* or the second area 1039*b* of the angle adjustment button 1027 or 1037 is released, a viewing angle movement for the rear camera of the rear camera module 290 may stop. Thus, an viewing angle is adjusted to a desired viewing angle by adjusting a press holding time to the first or second areas 1039*a* and 1039*b*.

In addition, the viewing angle of the front camera of the front camera module 280 may be adjusted through the same method as the rear camera of the rear camera module 290. That is, by a touch or press operation on the first area 1029*a* or the second area 1029*b* of the angle adjustment button 1027 displayed on the front preview screen 1025, the viewing angle of the front camera of the front camera module 280 may be adjusted.

In addition, as an automatic leveling sensor is mounted at the wearable device 200, even when the wearable device 200 is shaken during walking, the front camera module 280 of the wearable device 200 may be adjusted to uniformly display a front image displayed on the front preview screen 1024 and the rear camera module 290 may be adjusted to uniformly display a rear image displayed on the rear preview screen 1026.

The capture angle adjustment of the front camera module 280 or the rear camera module 290 may be adjusted by a button or may be adjusted through a manual angle adjustment. In addition to that, the front camera module 280 or the rear camera module 290 may be automatically adjusted in order to place a moving object at the center and capture it during a capture operation.

The capture buttons 1031 and 104*a* are used to capture an image or video for the front object or the rear object. For example, when a touch for the capture buttons 1031 and 1041 is input, an image for the front object or the rear object may be captured. For example, in the case of a video capture, when a touch for the capture buttons 1031 and 1041 is input, a video for the front object or the rear object may be captured and when a touch for the capture buttons 1031 and 1041 is input again, the video capture for the front object or the rear object may be terminated.

The image switch buttons 1033 and 1043 may change an image capture mode into a video capture mode or a video capture mode into an image capture mode. It is set to capture an image by default and changes to a video switch mode to capture video by a touch for the image switch buttons 1033 and 1043 but the present invention is no limited thereto.

The front preview screen 1024 and the rear preview screen 1026 contact each other in the drawing. However, the front preview screen 1024 and the rear preview screen 1026 may be displayed to be spaced from each other spatially. For example, the front preview screen 1024 may be displayed in the first control area of the home screen 1001, that is, the upper side, and the rear preview screen 1026 may be displayed in the second control area of the home screen 1001, that is, the lower side, and a portion of the home screen may be disposed in a third control area between the front preview screen 1024 and the rear preview screen 1026.

Figure 40:
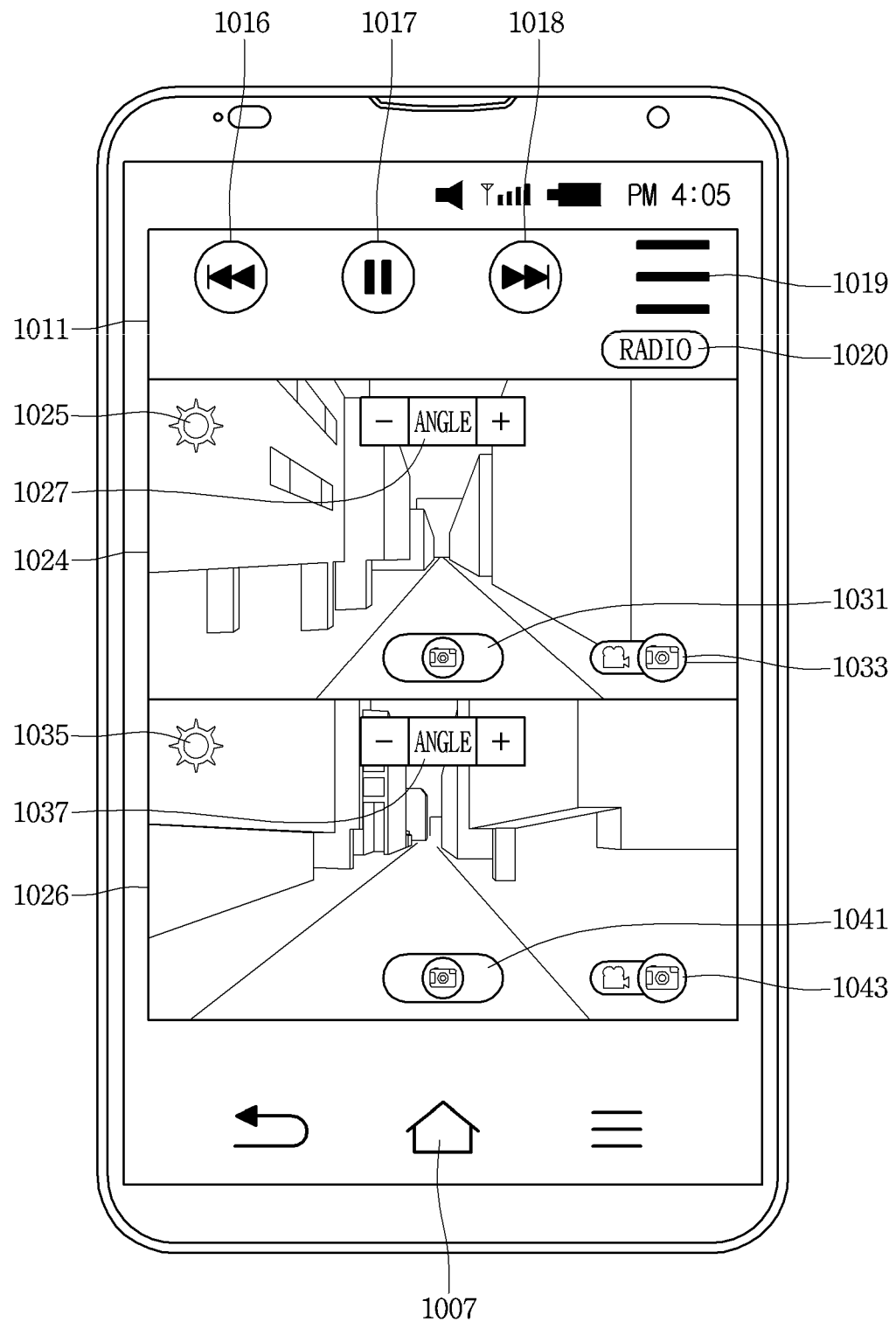
FIG. 40 is a second screen illustrating a preview screen displayed when the all button displayed on the camera control screen shown in FIG. 36C is selected.

FIG. 40 is a second screen illustrating a preview screen displayed when the all button 1025 displayed on the camera control screen shown in FIG. 36C is selected. As shown in FIG. 40, when a touch for the all button 1025 is input, a preview screen including the front preview screen 1024 and the rear preview screen 1026 may be displayed on the home screen 1001.

In addition, the front preview screen 1024 and the rear preview screen 1026 may be displayed on an area equal to or greater than the camera control screen 1013 unlike FIG. 36. The preview screen 1024 and 1026 shown in FIG. 37 is different from the preview screen 1024 and 1026 shown in FIG. 40.

That is, the front preview screen 1024 and the rear preview screen 1026 shown in FIG. 37 may be displayed in a new window separated from the control screen for wearable device 1015. Further, as shown in FIG. 40, the front preview screen 1024 and the rear preview screen 1026 may replace the camera control screen 1013 contacting the music control screen 1011 included in the control screen for wearable device 1015 and may be displayed in an area larger than that. That is, the front preview screen 1024 and the rear preview screen 1026 may be displayed in an area not separated from the control screen for wearable device 1015 and included in the control screen for wearable device 1015.

In such a way, as the front preview screen 1024 and the rear preview screen 1026 is not generated separated from the control screen for wearable device 1015 and generated in the control screen for wearable device 1015, driving complex and battery consumption increase occurring when the front preview screen 1024 and the rear preview screen 1026 are generated as an additional new window may be resolved. The music control screen 1011 may be disposed on the first control area of the home screen 1001 and the front preview screen 1024 and the rear preview screen 1026 may be disposed on the second control area of the home screen 1001.

Additionally, as shown in FIG. 40, since the front preview screen 1024 and the rear preview screen 1026 is disposed contacting the music control screen 1011, a user is not interrupted in operating music playback and captures a specific object or monitors the front or the rear through the front preview screen 1024 or the rear preview screen 1026, so that user's convenience is maximized. Moreover, a preview window (referred to as a first preview window) by the camera 121 mounted at the mobile terminal 100 itself, the front preview screen 1024 (hereinafter referred to as a second preview window) by the front camera module 280 and the rear camera module 290 mounted the wearable device 200, and a rear preview screen 1026 (referred to as a third preview window) may be displayed.

Figure 41:
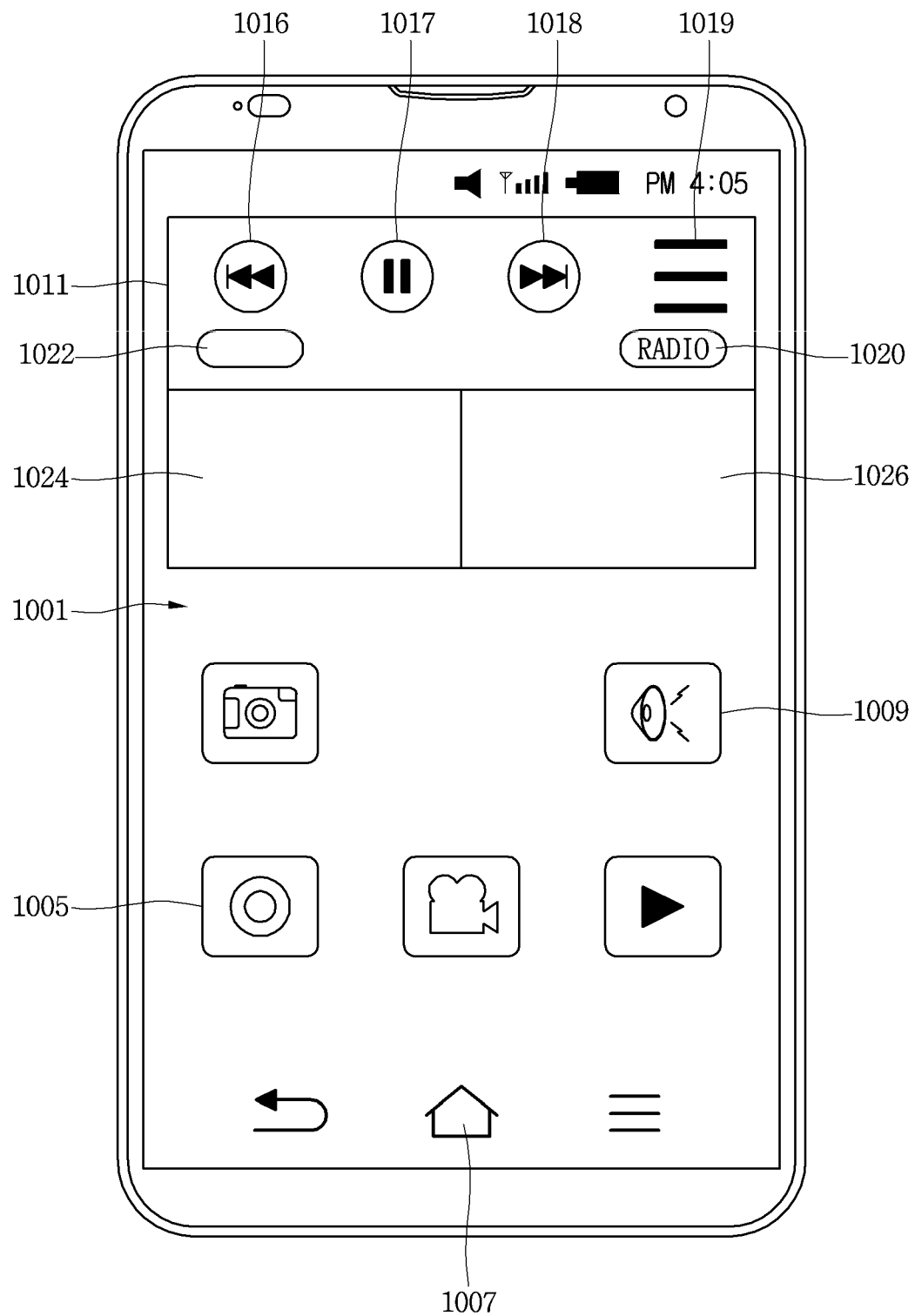
FIG. 41 is a third screen illustrating a preview screen displayed when the all button displayed on the camera control screen shown in FIG. 36C is selected.

In such a case, the first to third preview windows may be displayed simultaneously or only a specific preview window may be displayed to be seen with a large screen. For example, when the first preview window is enlarged greatly and displayed and a first gesture operation, for example, a touch drag operation, is input from a user, the first to third preview windows are displayed simultaneously and when a second gesture operation is input from a user, only the second preview window is enlarged greatly and displayed or only the first preview window is enlarged greatly and display. FIG. 41 is a third screen illustrating a preview screen displayed when the all button displayed on the camera control screen shown in FIG. 36C is selected. As shown in FIG. 41, the front preview screen 1024 and the rear preview screen 1026 may be displayed contacting the music control screen 1011. That is, both the front preview screen 1024 and the rear preview screen 1026 may be displayed contacting the lower side of the music control screen 1011.

The front preview screen 1024 and the rear preview screen 1026 may be displayed along the length direction of the music control screen 1011, that is, a horizontal direction. In such a way, as the front preview screen 1024 and the rear preview screen 1026 are displayed along the length direction of the music control screen 1011, that is, a horizontal direction, an area that the front preview screen 1024 and the rear preview screen 1026 occupy on the display unit 151 is reduced so that the icon 1005 may be seen to a user without being interfered with the front preview screen 1024 or the rear preview screen 1025. Therefore, since a user is capable of simultaneously performing music playback, front or rear image capture, front or rear monitoring, and icon execution, user's convenience may be increased.

Moreover, as shown in FIG. 41, a notification send button 1022 may be displayed on the music control screen 1011. The notification send button 1022 may be displayed on the front preview screen 1024 or the rear preview screen 1026. The notification send button 1022 may perform a function of sending a notification message for emergency situation or dangerous situation to a predetermined acquaintance or organization. The acquaintance may be a close friend, a parent, or a sibling and the organization may be a fire department or a police department.

For example, as facing an emergency situation or dangerous situation, when a user inputs a selection command for the notification send button 1022, a predetermined notification message may be transmitted to an acquaintance or organization. The dangerous situation may be a violence or a car accident by a third party. In relation to the emergency situation, if there is a fire while a user passes a specific region, as a selection command for the notification button 1022 is input, as soon as a corresponding notification message is transmitted, a fire engine may be dispatched.

The notification send button 1022 may interoperate with the location information module 115. In such a case, when a selection command for the notification send button 1022 is input, user's location information based on the location information module 115 may be included in a notification message and then, notification information including the location information may be transmitted an acquaintance or organization.

Figure 42:
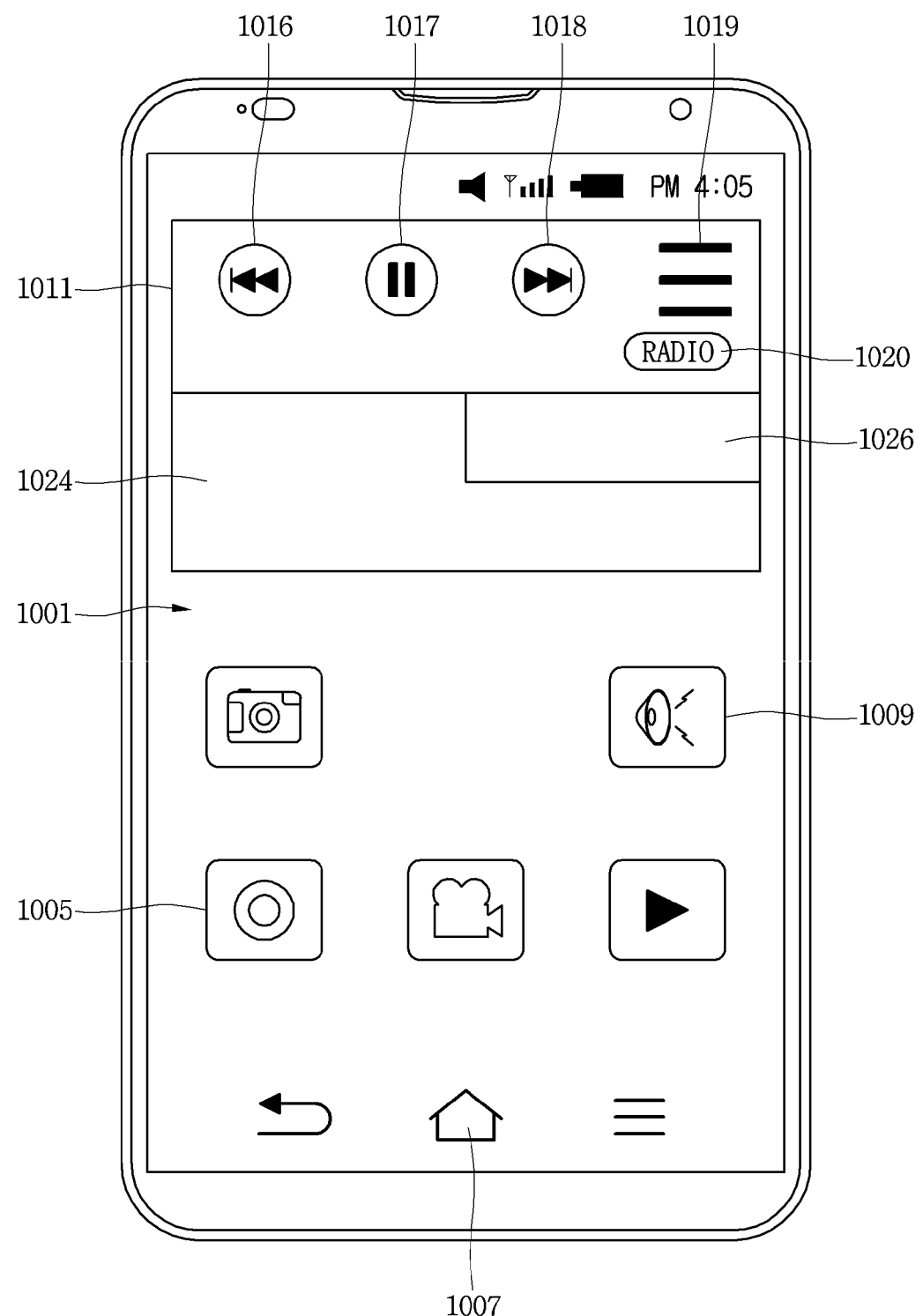
FIG. 42 is a fourth screen illustrating a preview screen displayed when the all button displayed on the camera control screen shown in FIG. 36C is selected.

FIG. 42 is a fourth screen illustrating a preview screen displayed when the all button displayed on the camera control screen shown in FIG. 36C is selected. As shown in FIG. 42, the front preview screen 1024 and the rear preview screen 1026 may be displayed contacting the music control screen 1011. That is, both the front preview screen 1024 and the rear preview screen 1026 may be displayed contacting the lower side of the music control screen 1011.

In more detail, for example, the size of the front preview screen 1024 may be displayed larger than the size of the rear preview screen 1026. The rear preview screen 1026 may be surrounded by the music control screen 1011 and the front preview screen 1024. The lower side length of the music control screen 1011 may be identical to the total length of the upper side length of the front preview screen 1024 and the upper layer of the rear preview screen 1026.

Figure 43:
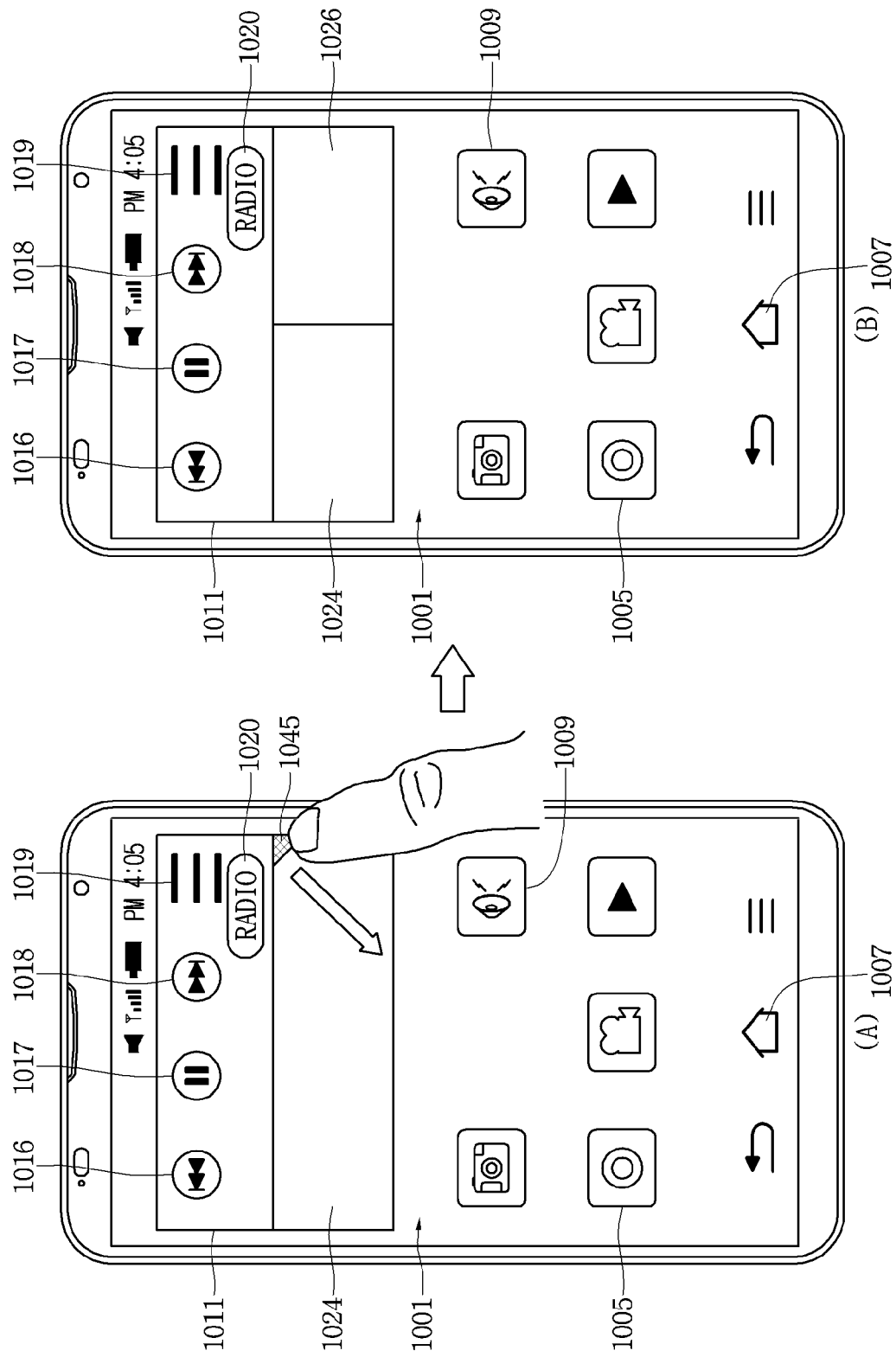
FIG. 43 is a fifth screen illustrating a preview screen displayed when the all button displayed on the camera control screen shown in FIG. 36C is selected.

FIG. 43 is a fifth screen illustrating a preview screen displayed when the all button 1025 displayed on the camera control screen shown in FIG. 36C is selected. As shown in FIG. 43A, the front preview screen 1024 may be displayed contacting the music control screen 1011. The size of the front preview screen 1024 may be identical to or greater than the size of the music control screen 1011 but the present invention is not limited thereto.

A queue 1045 may be displayed at one side of the front preview screen 1024. The queue 1045 may be an event command for displaying the rear preview screen 1026. The rear preview screen 1026 may be hidden by or in the queue 1045. The queue 1045 may be displayed at one edge area of the front preview screen 1024, that is, an upper right edge area. The queue 1045 is represented as a black color image in triangle form but the present invention is not limited thereto.

When a flick touch along a specific direction for the queue 1045, for example, a diagonal direction, is input from a user, as shown in FIG. 43B, the rear preview screen 1026 may be displayed on one area of the front preview screen 1024. That is, the rear preview screen 1026 may be slid-in on the front preview screen 1024 along a diagonal direction from the queue 1045. The slid-in rear preview screen 1026 may be displayed occupying a half of the size of the front preview screen 1024 but the present invention is not limited thereto.

As another example, the slid-in rear preview screen 1026, as shown in FIG. 42, may be surrounded by the front preview screen 1024 and the music control screen 1011 and may have a size less than the size of the front preview screen 1024. What size the slid-in rear preview screen 1026 is to have may be set by a manufacture or a user. Moreover, when a flick touch is input toward a direction where the queue 1045 is displayed initially from a specific point on the slid-in rear preview screen 1026, the rear preview screen 1026 may disappear and as shown in FIG. 43A, the queue 1045 may be displayed in one edge area of the front preview screen 1024.

Figure 72:
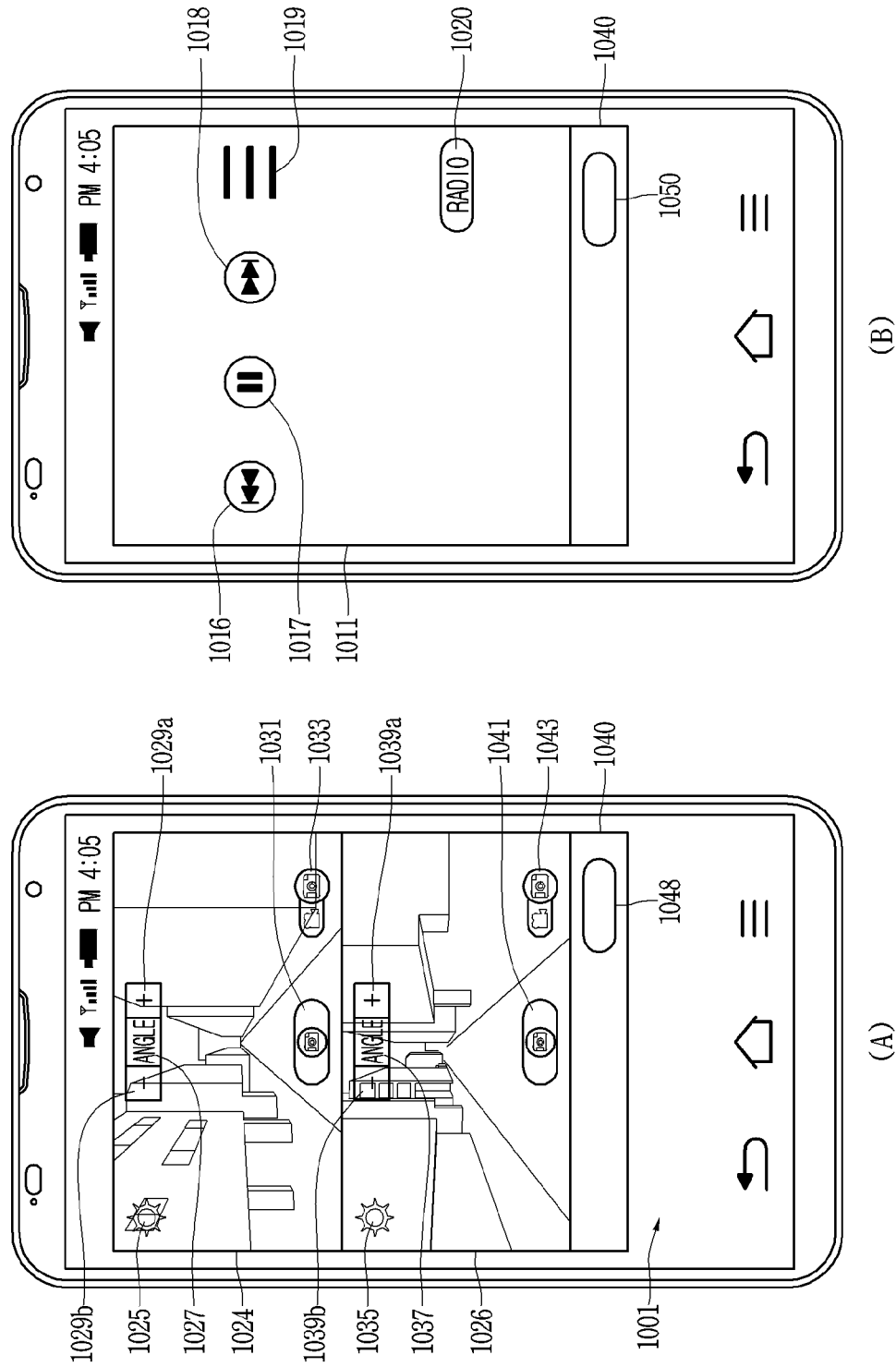
FIG. 72 is a screen illustrating a method of selectively displaying a music control screen and a preview screen.

As one example, as shown in FIG. 72A, although the front preview screen 1024 and the rear preview screen 1026 are displayed when music is not played, the music control screen 1011 may not be displayed and the music playback button 1048 may be displayed in an additional window 1040. Once a touch command for the music playback button 1048 is input, as shown in FIG. 40, in addition to the front preview screen 1024 and the rear preview screen 1048, the music control screen 1011 may be displayed. Accordingly, because the music control screen. 1011 is not displayed, the size of each of the front preview screen 1024 and the rear preview screen 1026 may be enlarged more by an area where the music control screen 1011 is displayed.

As another example, as shown in FIG. 72B, although the music control screen. 1011 is displayed, the front preview screen 1024 and the rear preview screen 1026 may not be displayed and the screen selection button 1050 may be displayed in the additional window 1040. In such a case, the size of the music control screen 1011 may be enlarged more by an area where the front preview screen 1024 and the rear preview screen 1026 are displayed. The front preview screen 1024 and/or the rear preview screen 1026 may be displayed according to a manipulation of the screen selection button 1050. For example, when a one time touch command for the screen selection button 1050 is input, only the front preview screen 1024 may be displayed. For example, when a continuous two times touch command for the screen selection button 1050 is input, only the rear preview screen 1026 may be displayed. For example, when a touch and hold command for the screen selection button 1050 is input, the front preview screen 1024 and the rear preview screen 1026 may be displayed simultaneously.

The size of each of the front preview screen 1024 and the rear preview screen 1026 may be identical to the size of the music control screen 1011 or the total size of the front preview screen 1024 and the rear preview screen 1026 may be identical to the size of the music control screen 1011 but the present invention is not limited thereto.

Figure 44:
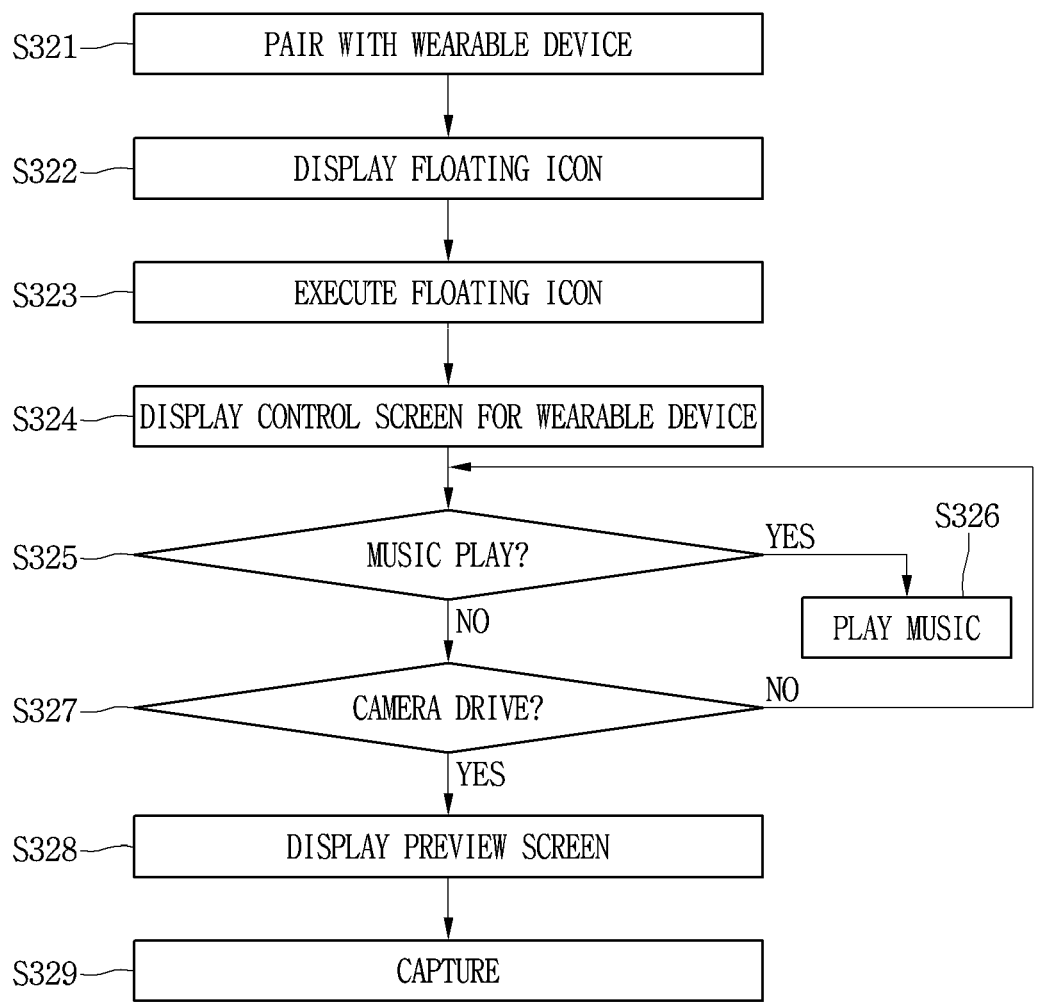
FIG. 44 is a flowchart illustrating a method of displaying a control screen for controlling a wearable device on a mobile terminal according to a fourteenth embodiment of the present invention.

FIG. 44 is a flowchart illustrating a method of displaying a control screen for controlling a wearable device on a mobile terminal according to a fourteenth embodiment of the present invention. Since the fourteenth embodiment is identical to the thirteenth embodiment of FIG. 35 except for displaying a floating icon in operation S322 and executing a floating icon in operation S323, operation S322 and operation S323 are mainly described.

Referring to FIG. 44, the mobile terminal 100 may perform pairing with the wearable device 200 in operation S321. When the identification information of the wearable device 200 is pre-registered in the mobile terminal 100 and the communication modules 114 and 201c are respectively equipped at the wearable device 200 and the mobile terminal 100, the wearable device 200 approaches within a predetermined distance from the mobile terminal 100, a pairing process may be performed between the mobile terminal 100 and the wearable device 200 but the present invention is not limited thereto.

Then, once the pairing with the wearable device 200 is completed, the mobile terminal 100 may perform on the display unit 151 to display a floating icon in operation S322. The floating icon is an icon for controlling the wearable device 200 and may have a combination of a specific character, for example, a camera character or a note character and a camera character.

The floating icon displayed on the display unit 151 of the mobile terminal 100 may not be fixed at one area differently from an icon fixed at one area and may randomly float in an entire area or a partial area of the display unit 151. For example, the floating icon may float in a clockwise or counterclockwise direction as being adjacent to the screen frame of the display unit 151. For example, the floating icon may be more enlarged than another icon fixed at one area and then by displayed. For example, the frame of the floating icon may be highlighted to be distinguished from another icon fixed at one area. For example, the floating icon may be flashed at a predetermined period.

When a touch for the floating icon that floats on the screen of the display unit 151 is input, the mobile terminal 100 may execute the floating icon. When the floating icon is executed in such a way, the mobile terminal 100 may display a control screen for wearable device 1015 by controlling the display unit 151 in operation S324.

The control screen for wearable device 1015 include a music control screen 1011 and a camera control screen 1013. The music control screen 1011 may be switched into a radio control screen. That is, the music control screen 1011 and the radio control screen are switched into each other. Since operation S325 and operation 329 are identical to operation S315 and operation S319 of the thirteenth embodiment of FIG. 35, description relating thereto is omitted.

Figure 45:
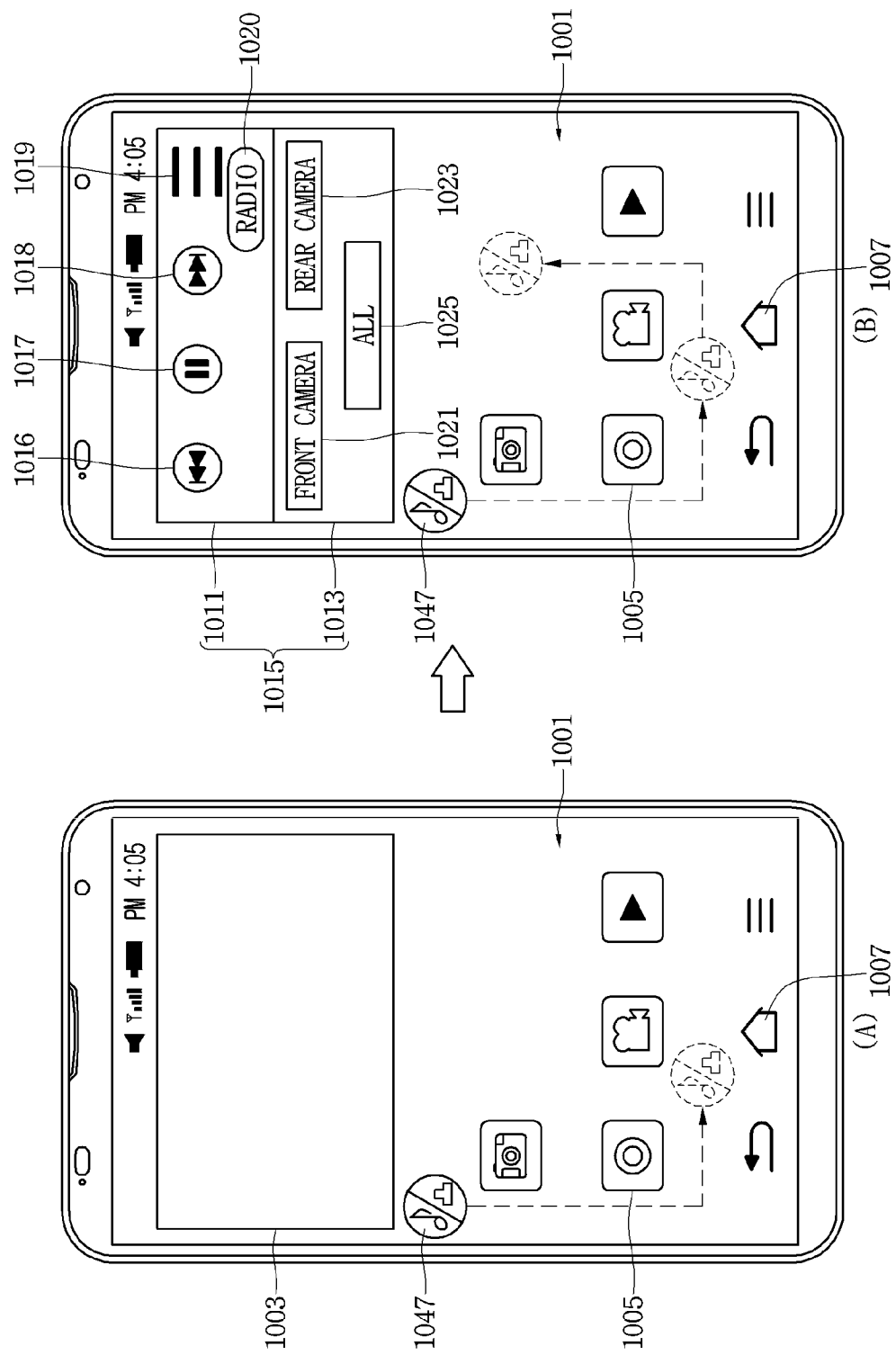
FIG. 45 is a screen illustrating a method of displaying a control screen for controlling a wearable device on a mobile terminal according to a fourteenth embodiment of the present invention.

FIG. 45 is a screen illustrating a method of displaying a control screen for controlling a wearable device on the mobile terminal 100 according to a fourteenth embodiment of the present invention. The description of FIG. 45 corresponding to that of FIG. 36 is omitted and such an omitted description may be easily understood from the description FIG. 36.

As shown in FIG. 45A, a home screen 1001 may be displayed on the display unit 151 of the mobile terminal 100 and a widget icon 1003, an icon 1005, and a soft key 1007 may be displayed on the home screen 1001. When the wearable device 200 is paired with the mobile terminal 100, a floating icon 1047 may be additionally displayed on the home screen 1001.

The floating icon 1047, as an icon for controlling the wearable device 200, may float randomly on the home screen 1001. For example, after the floating icon 1047 is generated from one area of the left frame of the home screen 1001 and then displayed, it may float in the right direction at the lower left edge while being adjacent to the left frame of the home screen 1001 and floating in the lower direction.

When the floating icon 1047 floats, the floating icon may or may not pass a status display bar displayed at the upper side of the icon 1005, the soft key 1007, or the home screen 1001. When a touch for the floating icon 1047 that floats in such a way is input, as shown in FIG. 45B, the control screen for wearable device 1015 may be displayed on the display unit 151 of the mobile terminal 100.

The control screen for wearable device 1015 may be a screen separated from the home screen 1001 but the present invention is not limited thereto. The control screen for wearable device 1015 may be displayed replacing the widget icon 1003 displayed on the home screen 1001 of the mobile terminal 100. That is, when the size of the control screen for wearable device 1015 is identical to the size of the widget 1004, the control screen for wearable device 1015 may be displayed on an area where the widget icon 1003 instead of the widget icon 1003 is displayed.

In such a way, when the control screen for wearable device 1015 is displayed in an area where the widget icon 1003 is displayed, as the icon 1005 is not interfered with the control screen for wearable device 1015, a user can control the wearable device 200 so that in addition to music playback or radio listening, a function assigned to a corresponding icon 1046 is used through the executions of the floating icon 1047 while detecting the front and rear situations through the execution of the control screen for wearable device 1015. As a result, user's convenience may be maximized.

The control screen for wearable device 1015, for example, may include a music control screen 1010 and a camera control screen 1013. The sound control screen 1011 and the camera control screen 1013 may be displayed through a window separated from the home screen 1001. As another example, the home screen 1001 may be divided into a first control area and a second control area and the music control screen 1011 may be displayed on the first control area and the camera control screen 1013 may be displayed on the second control area. The first and second control areas may be divided along the left and right directions or the up and down directions or may be divided based on a diagonal line of the home screen 1001.

Figure 46:
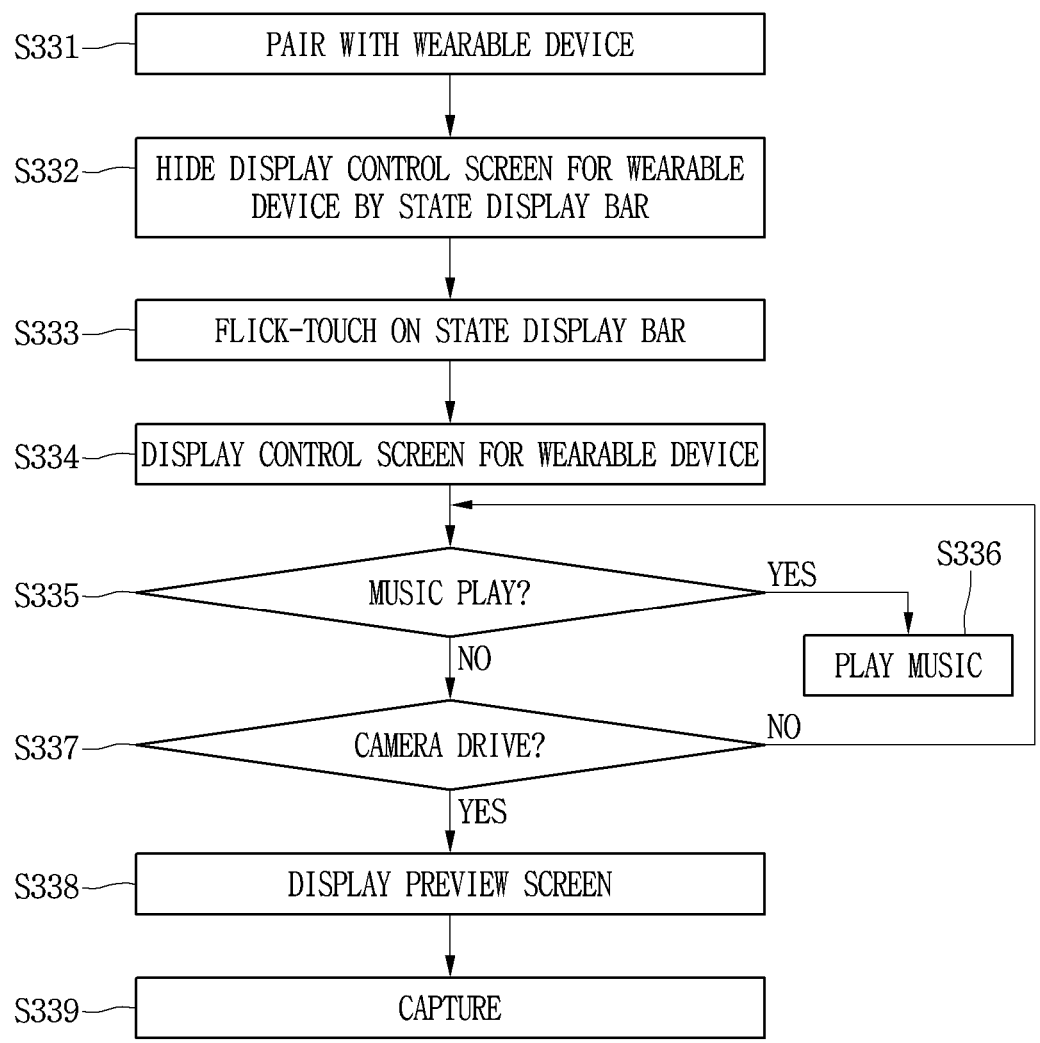
FIG. 46 is a flowchart illustrating a method of displaying a control screen for controlling a wearable device on a mobile terminal according to a fifteenth embodiment of the present invention.

FIG. 46 is a flowchart illustrating a method of displaying a control screen for controlling a wearable device on a mobile terminal 100 according to a fifteenth embodiment of the present invention. Referring to FIG. 46, the mobile terminal 100 may perform pairing with the wearable device 200 in operation S331.

Then, once the pairing with the wearable device 200 is completed, the mobile terminal 100 may control the display unit 151 to hide a control screen for wearable device 1015 in a state display bar in operation S332. While the control screen for wearable device 1015 is not displayed on a screen normally, as a specific command, for example, a drag touch, is input from a user, the control screen for wearable device 1015 may be displayed.

A state display bar may be displayed at the upper side of the display unit 151 of the mobile terminal 100 but the present invention is not limited thereto. Such a state display bar may be maintained at the upper side of the display unit 151 as it is even when screens are changed on the display unit 151.

When a flick touch for the state display bar is input in operation S333, the mobile terminal 100 may display the control screen for wearable device 1015 by controlling the display unit 151 in operation S334. For example, a flick touch may be input along a lower direction from the state display bar by a user. The state display window may be slid-in along a lower direction in response to such a flick touch and then may be displayed.

The control screen for wearable device 1015 may be displayed on such a state display window. The control screen for wearable device 1015 includes a music control screen 1011 for music playback or radio listening and a camera control screen 1013 for image capture or monitoring through the driving of the camera modules 280 and 290. Since operation S335 and operation 339 are identical to operation S315 and operation S319 of the thirteenth embodiment of FIG. 35, description relating thereto is omitted.

Figure 47:
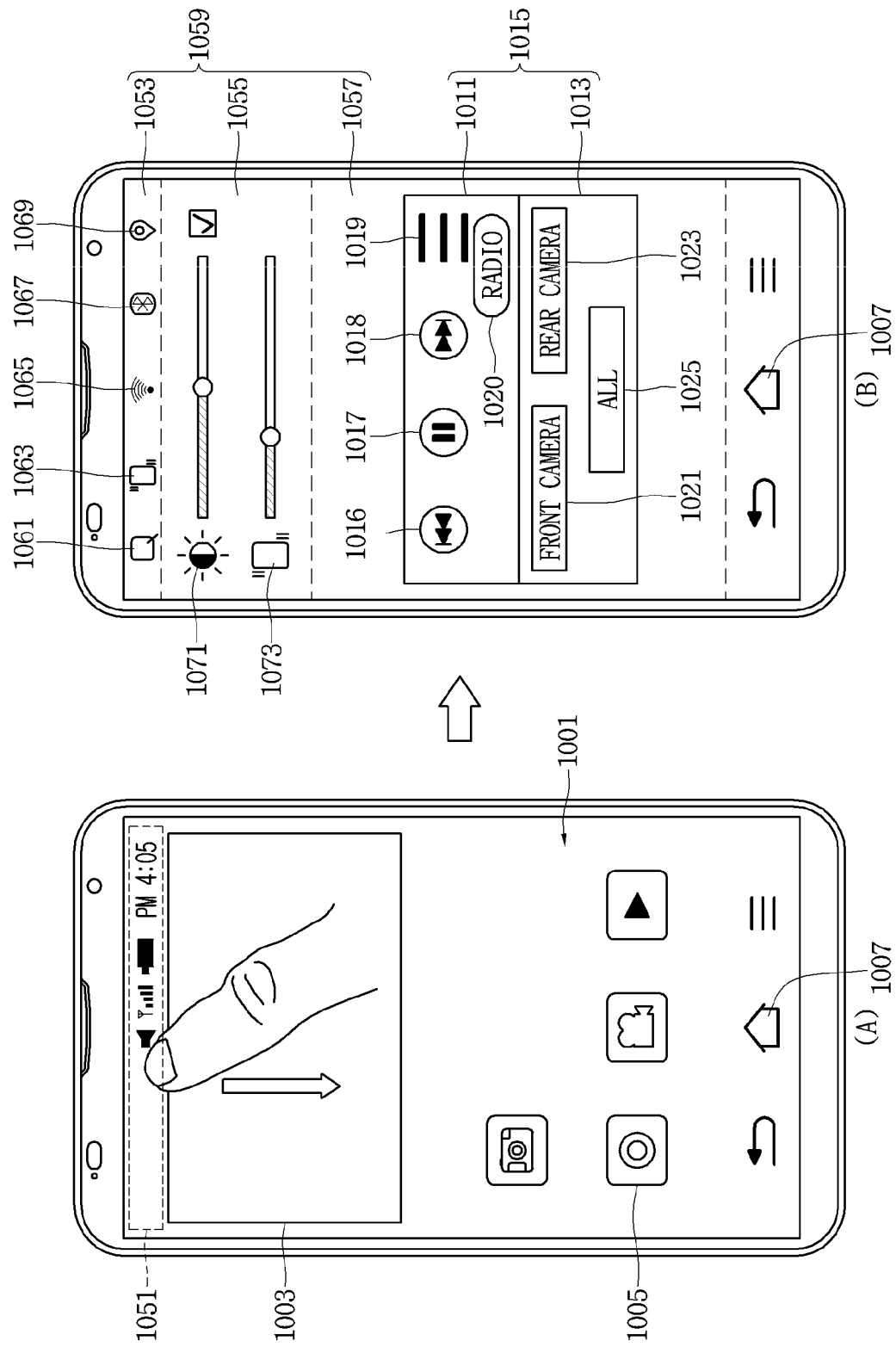
FIG. 47 is a screen illustrating a method of displaying a control screen for controlling a wearable device on a mobile terminal according to a fifteenth embodiment of the present invention.

FIG. 47 is a screen illustrating a method of displaying a control screen for controlling a wearable device on a mobile terminal according to a fifteenth embodiment of the present invention. As shown in FIG. 47A, a home screen 1001 may be displayed on a display unit 151 of a mobile terminal 100 and a widget icon 1003, a plurality of icons 1005, and a soft key 1007 may be displayed on the home screen 1001.

Furthermore, a state display bar 1051 may be displayed at the upper side of the display unit 151. A state display bar 1051 may be a member for displaying functions currently in use on the mobile terminal 100. For example, a vibration or bell sound display, a battery remaining display, a reception intensity display, and a time display may be included in the state display bar 1051.

When the wearable device 200 is paired with the mobile terminal 100, the control screen for wearable device 1015 may not be displayed on the display unit 151 but may be hidden by the state display bar 1051. When a drag touch is input in a lower direction from the display bar 1051, the state display window 1059 including first to third state areas 1053, 1055, and 1057 may be displayed. In such a case, a quick setting function icon may be displayed on the first state area 1053 of the state display window 1059 and a screen brightness/volume adjustment state bar may be displayed on the state area 1055 of the state display window 1059.

As a quick setting function icon, a Q memo icon 1061, a vibration icon 1063, a Wi-Fi icon 1065, a Bluetooth icon 1067, and a location information icon may be displayed. Each time theses icons 1061, 1063, 1065, 1067, and 1069 are touched, their functions or colors may be changed. For example, when a touch for the Q memo icon 1061 is input, a Q memo function may be activated and when the Q memo icon 1061 is touched again, the Q memo function may be deactivated.

For example, when a touch for the location information icon 1069 is input, location information tracking is activated and when the location information icon 1069 is touched again, the location information tracking is deactivated. A brightness adjustment unit 1071 and a vibration intensity adjustment unit 1073 may be displayed on the second state area 1055 of the state display window 1059. For example, the brightness of a screen may be varied by the adjustment of the brightness adjustment unit 1071.

The control screen for wearable device 1015 may be displayed on the third state area 1057 of the state display window 1059. The size of the control screen for wearable device 1015 may be smaller than the size of the state display window 1059. The control screen for wearable device 1015 may be fixed at the third state area 1057 of the state display window 1059 or may be displayed on the third state area 1057 as a window separated from the third state area 1057. Since detailed description of the control screen for wearable device 1015 is provided in relation to FIG. 36C, further description is omitted.

Figure 48:
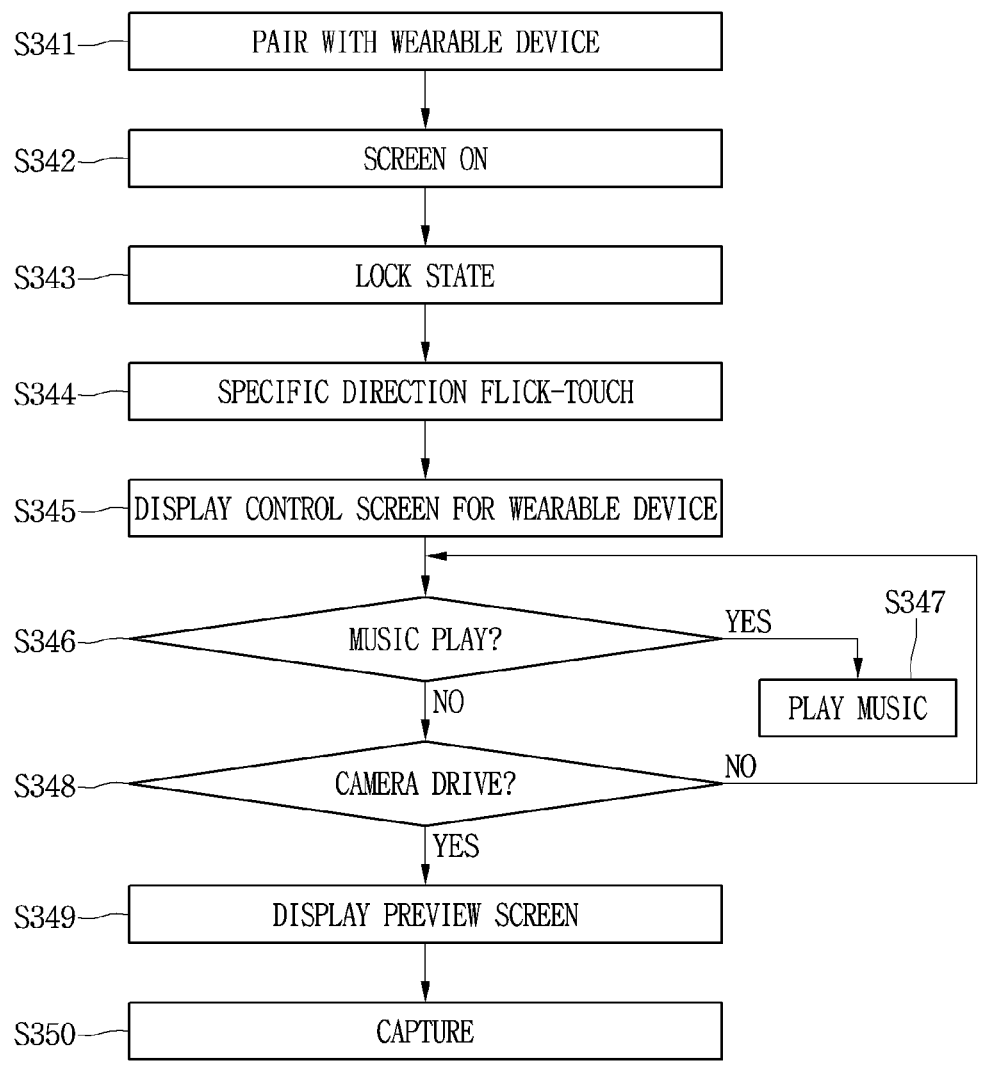
FIG. 48 is a flowchart illustrating a method of displaying a control screen for controlling a wearable device on a mobile terminal according to a sixteenth embodiment of the present invention.

FIG. 48 is a flowchart illustrating a method of displaying a control screen for controlling a wearable device on a mobile terminal according to a sixteenth embodiment of the present invention. Referring to FIG. 48, the mobile terminal 100 may perform pairing with the wearable device 200 in operation S341.

In addition, since power is not applied, the display unit 151 of the mobile terminal 100 may be in a screen off state. Even if the display unit 151 of the mobile terminal 100 is in a screen off state, since the communication module 114 of the mobile terminal is being activated, pairing between the mobile terminal 100 and the wearable device 200 may be performed normally.

Then, once the pairing with the wearable device 200 is completed, the mobile terminal 100 may not display the control screen for wearable device 1015 and may allow it to wait. This is because as the power applied to the display unit 151 of the mobile terminal 100 is cut off and it is in a screen off state, the control screen for wearable device 1015 cannot be displayed on the display unit 151.

If taps for two times tapping the display unit 151 of the mobile terminal 100 are input from a user, the mobile terminal 100 supplies power to the display unit 151 to change to a screen-on state in which a screen is displayed on the display unit 151 in operation S342.

Even when the screen is changed as an on state in such a way, the display unit 151 of the mobile terminal 100 may be maintained in a lock state in operation S343. That is, when a user set a lock state in the mobile terminal 100, even if it changes into a screen on state for the display unit 151 of the mobile terminal 100, a lock state may be maintained and after such a lock state is released, the home screen 1001 may be displayed on the display unit 151 finally.

When the screen of the display unit 151 is maintained in a lock state, once a flick touch in a specific direction is input from a user in operation S344, the mobile terminal 100 displays the control screen for wearable device 1015 by controlling the display unit 151 in operation S345.

Herein, the flick touch to a specific direction may mean a flick touch from an arbitrary point of the screen of the display unit 151 to the left direction but the present invention is not limited thereto. Since operation S346 and operation 350 are identical to operation S315 and operation S319 of the thirteenth embodiment of FIG. 35, description relating thereto is omitted.

Figure 49:
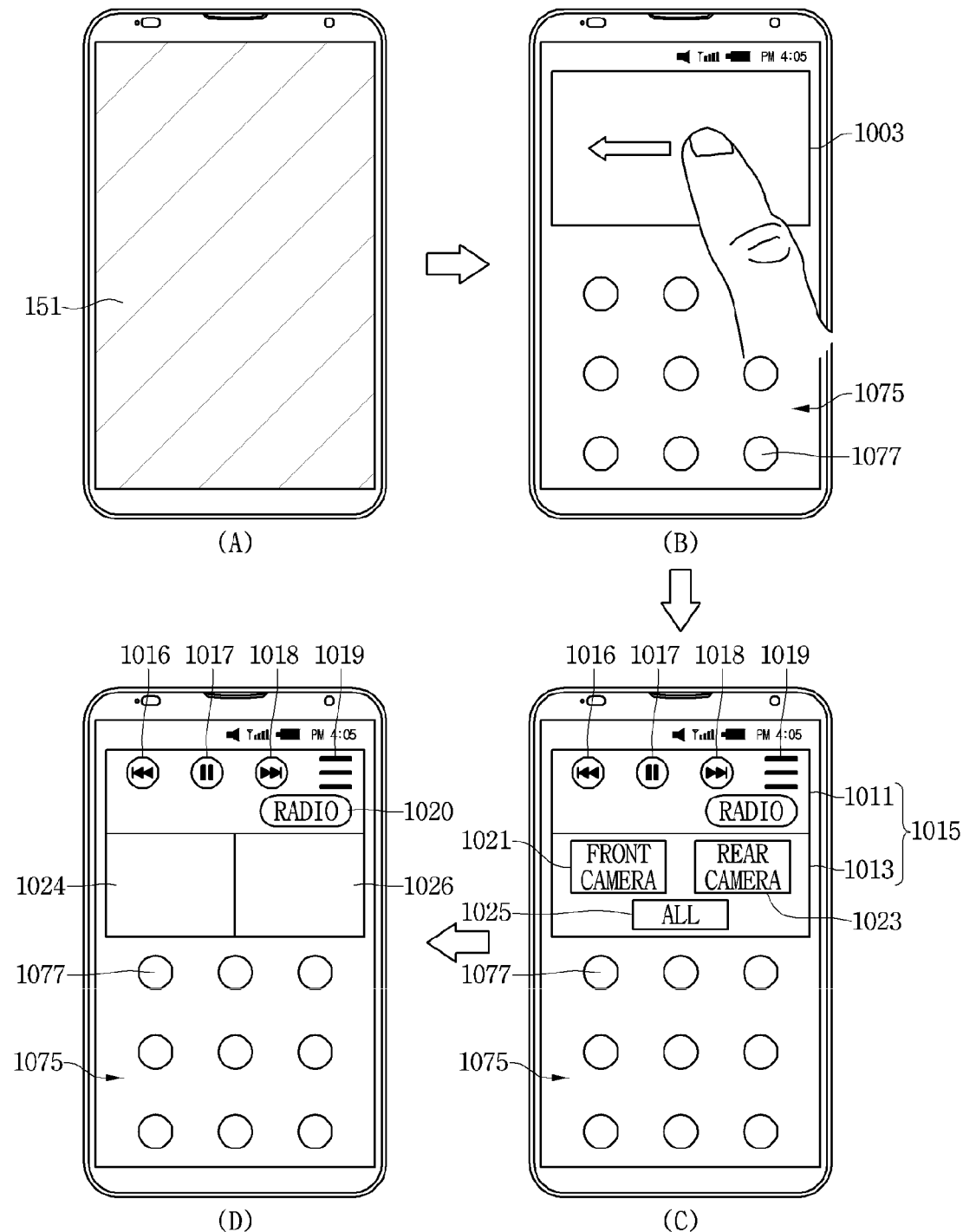
FIG. 49 is a screen illustrating a method of displaying a control screen for controlling a wearable device on a mobile terminal according to a sixteenth embodiment of the present invention.

FIG. 49 is a screen illustrating a method of displaying a control screen for controlling a wearable device on a mobile terminal according to a sixteenth embodiment of the present invention. As shown in FIG. 49A, the display unit 151 of the mobile terminal 100 may be in a screen off state in which power is not applied.

In the case of the screen off state, since the display unit 151 of the mobile terminal 100 has black color, any information is not displayed on the display unit 151. Even if the display unit 151 of the mobile terminal 100 is in a screen off state, since the communication module 114 of the mobile terminal is in an activation state, pairing between the mobile terminal 100 and the wearable device 200 may be performed.

That is, when the identification information of the wearable device 200 is pre-registered in the mobile terminal 100 and the wearable device 200 approaches within a predetermined distance of the mobile terminal 100, pairing between the mobile terminal 100 and the wearable device 200 may be performed.

In some situations, even when the wearable device 200 approaches within a predetermined distance of the mobile terminal 100, pairing between the mobile terminal 100 and the wearable device 200 may not be performed. That is, when a pairing function is not activated in the mobile terminal 100 or the power of the wearable device 200 is not turned on, pairing between the mobile terminal 100 and the wearable device 200 may not be performed. Accordingly, when a pairing function is activated in the mobile terminal 100 or the power of the wearable device 200 is turned on, pairing between the mobile terminal 100 and the wearable device 200 may be performed.

Since the display unit 151 of the mobile terminal 100 is in a screen off state, in this instance, when the power of the wearable device 200 is turned on, pairing between the mobile terminal 100 and the wearable device 200 may be performed.

As one example, the mobile terminal 100 may be in a lock state or an unlock state depending on whether a user is allowed to input a control command of the mobile terminal 100. When a screen changes from an off state into an on state, a lock screen in a lock state may be displayed by default. When a gesture operation with respect to such a lock screen is received from a user, the lock screen may be unlocked.

For example, when a user's touch input is performed in a specific direction with respect to a lock screen, based on the detected touch input on the lock screen, the execution screen of the first application displayed on the lock screen may disappear and the execution screen of the second application may be displayed.

After pairing between the mobile terminal 100 and the wearable device 200 is completed, it may be a screen on state in which power is applied to the display unit 151. That is, when a touch for a power button is input from a user, as shown in FIG. 49B, a corresponding power is applied to the display unit 151 so that a lock screen 1075 may be displayed on the display unit 151.

A widget icon 1003 and a lock pattern 1077 may be displayed on the lock screen 1075. As a sliding operation according to a predetermined lock pattern 1077 is input from a user, the lock state may be released. The present invention may easily control the driving of the music playback or the camera modules 280 and 290 of the wearable device 200 without releasing a lock state.

For example, when a flick touch is input from an arbitrary point of an area where the widget icon 1003 is displayed to the left direction, as shown in FIG. 49C, the control screen for wearable device 1015 may be displayed. The control screen for wearable device 1015 may be displayed on an area where the widget icon 1003 is displayed but the present invention is not limited thereto.

The size of the control screen for wearable device 1015 may be identical to or greater than an area where the widget icon 1003 is displayed. The control screen for wearable device 1015 includes a music control screen 1011 and a camera control screen 1013. The camera control screen 1013 may include a front camera button 1021, a rear camera button 1023, and an all button 1025.

For example, once a touch for the all button 1025 of the camera control screen 1013 is input, as shown in FIG. 49D, instead of the camera control screen 1013, the front preview screen 1024 and the rear preview screen 1048 may be displayed. That is, the camera control screen 1013 may be replaced by the front preview screen 1024 and the rear preview screen 1026.

The total size of the front preview screen 1024 and the rear preview screen 1026 may be identical to or greater than the size of the camera control screen 1013. As one example, the size of the front preview screen 1024 may be identical to the size of the rear preview screen 1026. As another example, the size of the front preview screen 1024 may be greater than the size of the rear preview screen 1026.

As another example, instead that the rear preview screen 1026 is not displayed first, a queue may be displayed in a partial edge area of the front preview screen 1024. When a flick touch is input from a queue along a diagonal direction, the rear preview screen 1026 may be displayed on the front preview screen 1024. That is, the rear preview screen 1026 may be slid-in on the front preview screen 1024 along a diagonal direction from the queue.

As shown in FIG. 49D, after the front preview screen 1024 or the rear preview screen 1026 is displayed in a lock state, even when it is unlocked, the front preview screen 1024 and the rear preview screen 1026 may be displayed on the home screen 1001 of the display unit 151 as they are but the present invention is not limited thereto.

According to the sixteenth embodiment of the present invention, the music playback, radio listening, capture for a front or rear object, and monitoring for the front or rear are possible in a lock state by using the music control screen 1011 or the camera control screen 1013, so that it is possible to improve the user's security reliability as it is unnecessary to control the wearable device 200 on the home screen 1001 through unlocking of the screen.

Although not described above, specifically, when a touch for the front camera button 1021 or the rear camera button 1023 of the camera control screen 1013 is input, the front preview screen 1024 or the rear preview screen 1026 may be displayed contacting the music control screen 1011.

A method of activating the camera modules 280 and 290 of the wearable device 200 is described above. Unlike this, the wearable device 200 may activate the camera modules 280 and 290 autonomously. As a first example, an activation button 250 (FIG. 51) for activating each of the front camera module 280 and the rear camera module 290 may be equipped at the top surfaces of the body parts 220a and 220b of the wearable device 200 of FIG. 34. As a user presses this activation button 250, the front camera module 280, the rear camera module 290, or both the front camera module 280 and the rear camera module 290 may be activated. Herein, the activation corresponds to driving the front camera module 280 and/or the rear camera module 290 to allow an image for an object at the front or the rear to be input through the front camera module 280 and/or the rear camera module 290 and an image for an object at the front or the rear is captured by the front camera module 280 and/or the rear camera module 290 according to a user's capture command.

As a user presses this activation button 250 again, the front camera module 280, the rear camera module 290, or both the front camera module 280 and the rear camera module 290 may be deactivated. As another example, when the activation button 250 is pressed one time, both the front camera module 280 and the rear camera module 290 may be deactivated. When the activation button 250 is pressed two times, only the front camera module 280 may be deactivated. When the activation button 250 is pressed three times, only the rear camera module 290 may be deactivated. When the activation button 250 is pressed for more than 0.5 see, the currently activated front camera module 280 and/or rear camera module 290 may be deactivated. However, the present invention is not limited thereto. That is, when the activation button 250 is pressed one time, the front camera module 280 may be activated and when the activation button 250 is pressed one more time, the rear camera module 290 may be activated. That is, in order to activate or deactivate the front camera module 280, the rear camera module 290, or both the front camera module 280 and the rear camera module 290, the number of times that the activation button 250 is pressed may vary.

Figure 50:
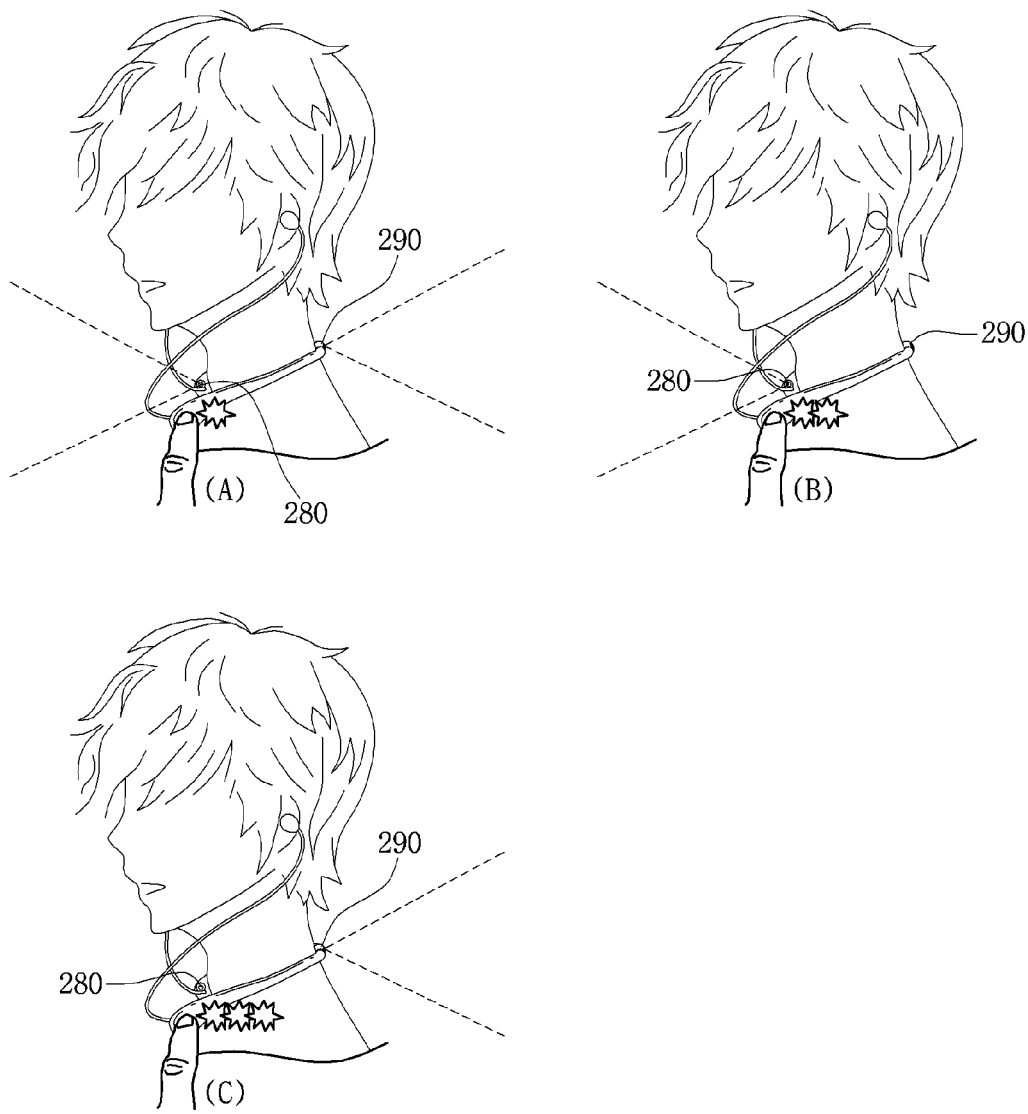
FIG. 50 is a screen illustrating a method of selectively activating a front camera module and a rear camera module according to the number of times that a wearable device is touched.

As a second example, when a specific number of touches are input to a vibration detection button equipped at the top surfaces of the body parts 220a and 220b of the wearable device 200, vibration due to such a touch is detected so that the front camera module 280 and the rear camera module 290 may be activated. For example, when a one time touch is input to the vibration detection button as shown in FIG. 50A, both the front camera module 280 and the rear camera module 290 may be activated. In another example, when a two times touch is input to the vibration detection button as shown in FIG. 50B, only the front camera module 280 may be activated. In still another example, when a three times touch is input to the vibration detection button as shown in FIG. 50C, only the rear camera module 290 may be activated. The present invention is not limited thereto.

Figure 51:
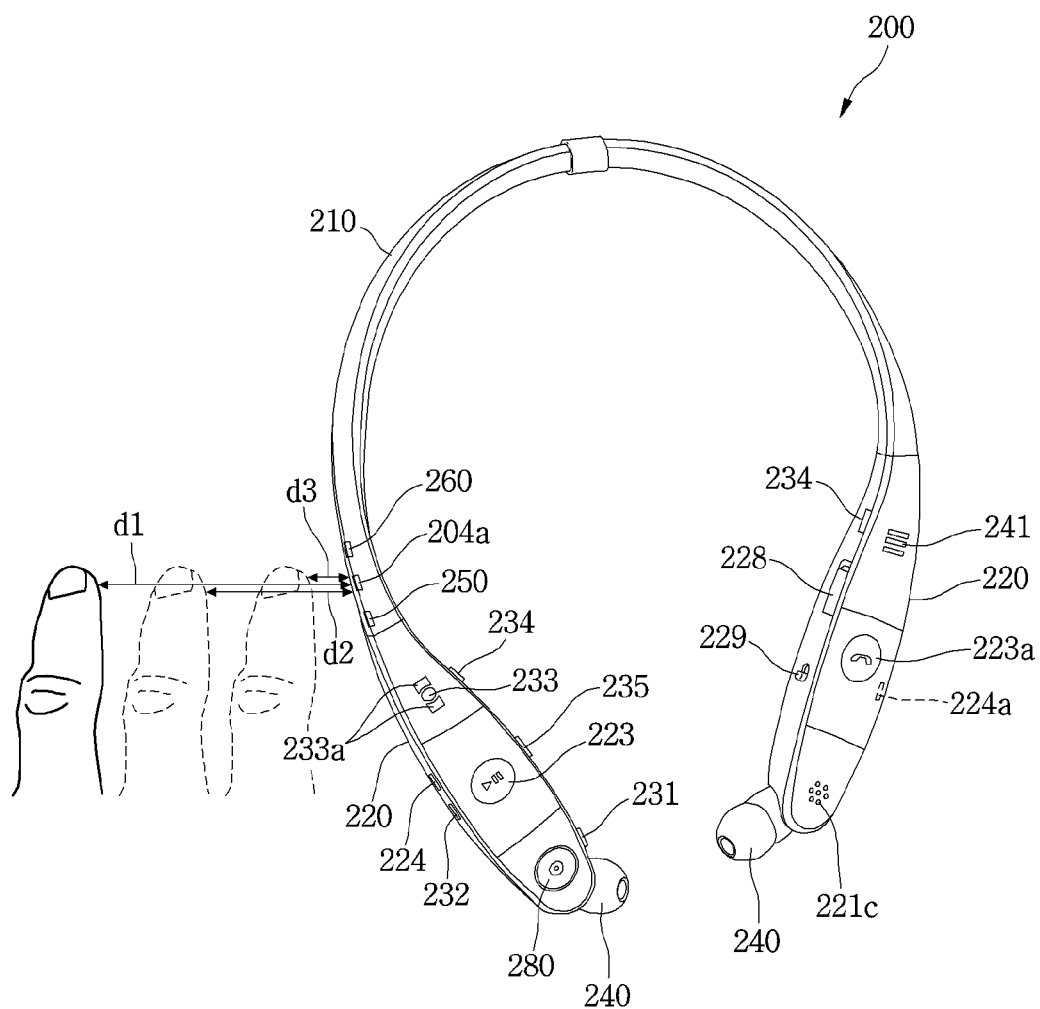
FIG. 51 is a screen illustrating a method of selectively activating a front camera module and a rear camera module according to a distance with a wearable device.

As a third example, the front camera module 280, the rear camera module 290, or both the front camera module 280 and the rear camera module 290 may be activated according to the approaching degree to the proximity sensor 204a equipped at the body parts. 220a and 220b of the wearable device 200. For example, as shown in FIG. 51, when a user's finger is positioned at the first distance d1 from the proximity sensor 204a of the wearable device 200, both the front camera module 280 and the rear camera module 290 may be activated. For example, when a user's finger is positioned at the second distance d2 from the proximity sensor 204a of the wearable device 200, the front camera module 280 may be activated. For example, when a user's finger is positioned at the third distance d3 from the proximity sensor 204a of the wearable device 200, the rear camera module 290 may be activated.

Figure 52:
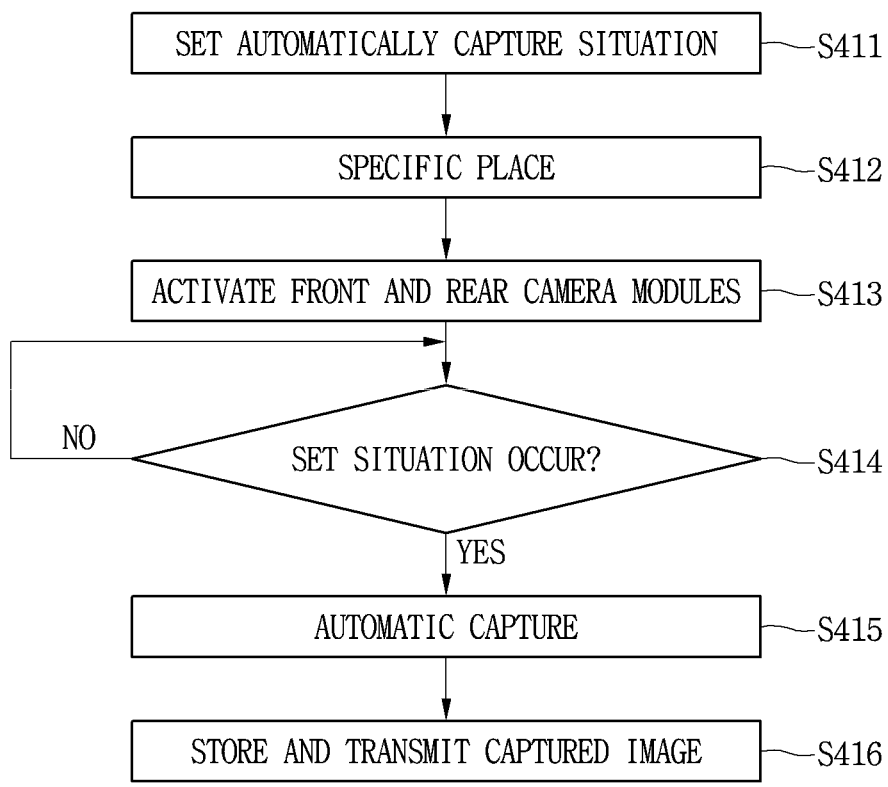
FIG. 52 is a flowchart illustrating a method of automatically capturing an image in a wearable device during a specific situation.

Hereinafter, various user interface implementations are described using the above described wearable device 200, mobile terminal 100, and system including the wearable device 200 and the mobile terminal 100. In particular, FIGS. 52 to 55 are views illustrating a method of automatically capturing an image in a wearable device during a specific situation. FIG. 52 is a flowchart illustrating a method of automatically capturing an image in a wearable device during a specific situation. Referring to FIG. 52, the wearable device 200 sets and registers a situation, which is input from a user, for automatically capturing an image in operation S411.

An automatic capture situation, for example, may be voice, sound, specific sensor value, location, and face recognition but the present invention is not limited thereto. That is, if the wearable device 200 recognizes any situation and a corresponding situation is set and registered in the wearable device 200, it is apparent that this is included in the scope of the present invention.

The voice may be a specific word that a person uses or its specific intensity. If a person's voice is more than a specific intensity, capturing an image may be performed automatically. The sound may be a specific sound from animals or inanimate objects or its intensity. The specific sensor value may be a specific sensor value in the proximity sensor 204a or the illumination sensor 204b or 260 of FIG. 51.

The location may be a specific location from the ground or a specific altitude value. For example, when a user climbs a mountain while wearing the wearable device 200, to more than at a specific altitude, for example, 1500 M capturing an image may be performed automatically by the front camera module 280 and/or the rear camera module 290 of the wearable device 200.

In order to detect such a location, an altitude sensor or a location sensor may be mounted at the wearable device 200. In relation to the face recognition, when a specific person's face or an animal's face is pre-registered in the wearable device 200, if a corresponding face is recognized by the wearable device 200, capturing an image may be performed automatically by the front camera module 280 and/or the rear camera module 290 of the wearable device 200.

For example, while walking with the wearable device 200 worn, for example, a user can see children laughing "hahaha" and playing. In such a case, when the word "hahaha" representing children laughing is pre-registered in the wearable device 200, capturing an image may be performed automatically by the front camera module 280 and/or the rear camera module 290 of the wearable device 200.

In another example, when walking with the wearable device 200, a user can hear the scream of a person from the back. In addition, when the screaming sound is more than a predetermined intensity, capturing an image may be performed automatically by the front camera module 280 and/or the rear camera module 290 of the wearable device 200.

In still another example, when a certain object including a person approaches within a predetermined distance, if a specific value of the proximity sensor 204a at that point is greater than a critical value that is pre-registered in the wearable device 200, capturing an image may be performed automatically by the front camera module 280 and/or the rear camera module 290 of the wearable device 200. The critical value may be set by a manufacturer or a user. While an automatic capture situation is set and registered, a user wearing the wearable device 200 may be in a specific place in operation S412.

Herein, the specific place is a place where an automatic capture situation occurs. Accordingly, the specific place may correspond to any place in the world and for example, may be homes, companies, streets, restaurants, mountains, and seas. When a user is in a specific place, in response to a user's request, the control unit 208 of the wearable device may activate the front camera module 280 and/or the rear camera module 290 mounted at the wearable device 200 worn on the user's neck in operation S413.

The user's request may be made by a press operation on the activation button 250 of FIG. 51 mounted at the wearable device 200 or a touch operation on the all button 1025 on the camera control screen 1003 of FIG. 36 displayed on the mobile terminal 100. When a touch operation on the all button 1025 on the camera control screen 1013 of FIG. 36 displayed on the mobile terminal 100 is input, the mobile terminal 100 transmits an activation command corresponding to such a touch operation to the wearable device 200 and in response to such an activation command, the control unit 208 of the wearable device 200 can activate the front camera module 280 and/or the rear camera module 290.

When a user is in a specific place and a situation set and registered in the wearable device 200 occurs in operation S414, the control unit 208 of the wearable device automatically captures an image input to the front camera module 280 and/or the rear camera module 290 by controlling the front camera module 280 and/or the rear camera module 290 in operation S415.

If the left camera module 1503 and the right camera module 1501 (FIG. 71) are further equipped, an image may be captured through the camera modules 1501 and 1503. An automatic capture time may be a time at which it is recognized that a situation set and registered in the wearable device 200 occurs but the present invention is not limited thereto. The automatic capture may be a still image capture, a video capture, a continuous capture, and a panorama capture. The video capture may continue while a set and registered situation occurs or for a predetermined time.

During the panorama capture, the front camera module 280 and/or the rear camera module 290 may rotate from a first direction to a second direction. For example, the front camera module 280 and/or the rear camera module 290 may rotate from the left direction to the right direction in relation to the automatic capture, when a situation set and registered in the wearable device 200 occurs, only the front camera module 280 may be performed, only the rear camera module 290 may be performed, or both the front camera module 280 and the rear camera module 290 may be performed.

An automatic capture may be set to be available by default in the front camera module 280 and the rear camera module or by a user only in the front camera module 280 or only in the rear camera module 290. The wearable device 200 may store an automatically captured image in the memory 207 in operation S416. Additionally, the wearable device 200 may transmit an automatically captured image to the mobile terminal 100 of a user, the mobile terminal 100 of another user, a specific server, or a related organization and store it therein.

Additionally, the mobile terminal 100 of a user, the mobile terminal 100 of another user, a specific server, or a related organization may be set and registered in the wearable device 200 in advance to receive an automatically captured image. In such a case, an automatically captured image may be automatically transmitted to the mobile terminal 100 of a user, the mobile terminal 100 of another user, a specific server, or a related organization and then stored therein without a user's additional request.

For example, when a user is in a specific place while wearing the wearable device 200, if there is a collision accident between cars in the specific place, an image for such a collision accident may be automatically captured so that an automatic capture image may be obtained. In such a case, the automatic capture image may be transmitted to a police station, a traffic control center, or an insurance company, which are close to the specific place, without a user's additional request. In addition, the transmitted automatic capture image may include information on the specific place, for example, location, address name and/or famous building around. Herein, the location and address name may be obtained by the location information module 201d.

Accordingly, a corresponding police station, traffic control center, or insurance company may easily identify the place where the car collision accident occurs and instantly control the site of the accident through information on the specific place in addition to the automatic capture image transmitted from the user's wearable device 200. For example, when a user is in a specific place while wearing the wearable device 200, if there is an injury caused by a weapon at the specific place and an image for such an injury accident is captured automatically, the automatically captured image may be transmitted to a police station or a security control center, which are close to the specific place. In addition, the transmitted automatic capture image may include information on the specific place, for example, location, address name and/or famous building around. Accordingly, a corresponding police station or security control center may easily identify the place where the injury accident occurs and arrest a criminal as soon as possible through information on the specific place in addition to the automatic capture image transmitted from the user's wearable device 200. Even when the criminal runs away from the crime scene, arresting the criminal may become easy based on the criminal's face included in the automatic capture image.

Figure 53:
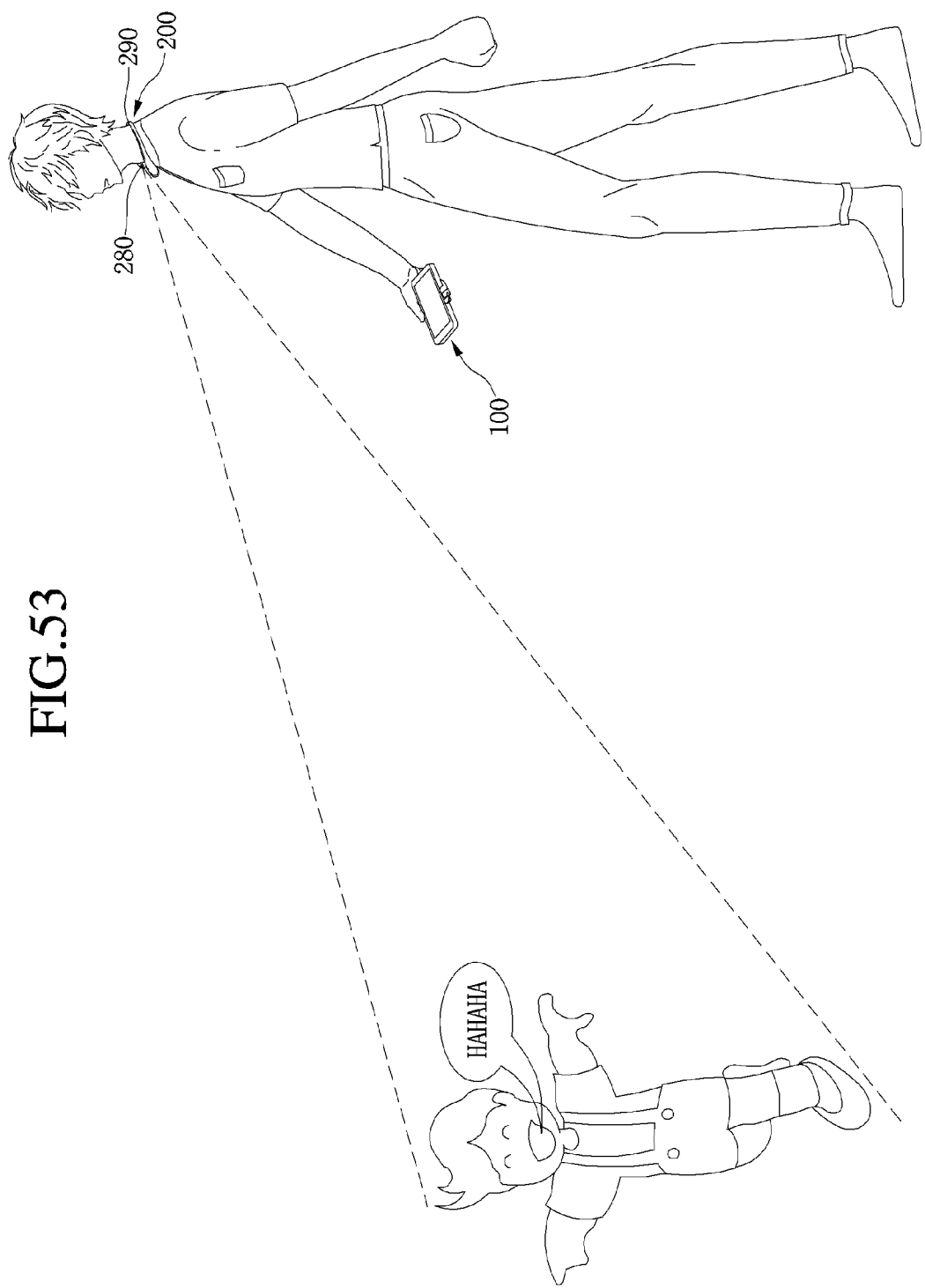
FIG. 53 is a first screen illustrating a method of automatically capturing an image in a wearable device during a specific situation.

FIG. 53 is a first screen illustrating a method of automatically capturing an image in a wearable device during a specific situation. As shown in FIG. 53, a user wearing the wearable device 200 on the neck walks in a specific place.

As one example, if a situation set and registered in advance in the wearable device 200 occurs at the front during walking, that is, a person's laughing sound such as "hahaha" is heard, an image for an object at the front may be automatically captured by the front camera module 280 of the wearable device 200. As another example, when a person's laughing sound such as "hahaha" is heard from the front and a user turns the eyes toward the direction that the laughing is heard to see an object generating the laughing sound, an image for the front object may be automatically captured by the front camera module 280 of the wearable device 200.

For example, the position of the front camera module 280 of the wearable device 200 may correspond to the user's eye in a vertical direction. In such a case, when the user's face turns toward the direction that the user's eye sees and a corresponding image is captured automatically at that time, an image for an object that the user wants can be obtained.

Before a situation set and registered in the wearable device 200 in advance occurs, the front camera module 280 and/or the rear camera module 290 may be activated. Both the front camera module 280 and the rear camera module 290 are activated simultaneously by default and according to a user's setting change command, only the front camera module 280 or only the rear camera module 290 may be activated.

As another example, when a sound detection sensor is mounted at the wearable device 200, and when a person's laughing sound set and registered in the wearable device 200 is heard from the front, the sound detection sensor detects the person's laughing sound and the control unit 208 controls the front camera module 180 thereby rotating the front camera module 280 to allow the viewing angle of the front camera module 280 to face the direction that the person's laughing sound is heard. Then, the control unit 208 of the wearable device 200 may perform a control on the front camera module 280 to automatically capture an image for the front object.

The automatically captured image may be stored in the wearable device 200 and may be transmitted to the mobile terminal 100 paired with the wearable device 200, another mobile terminal 100 connected via network, or a specific server and then be stored therein.

Figure 54:
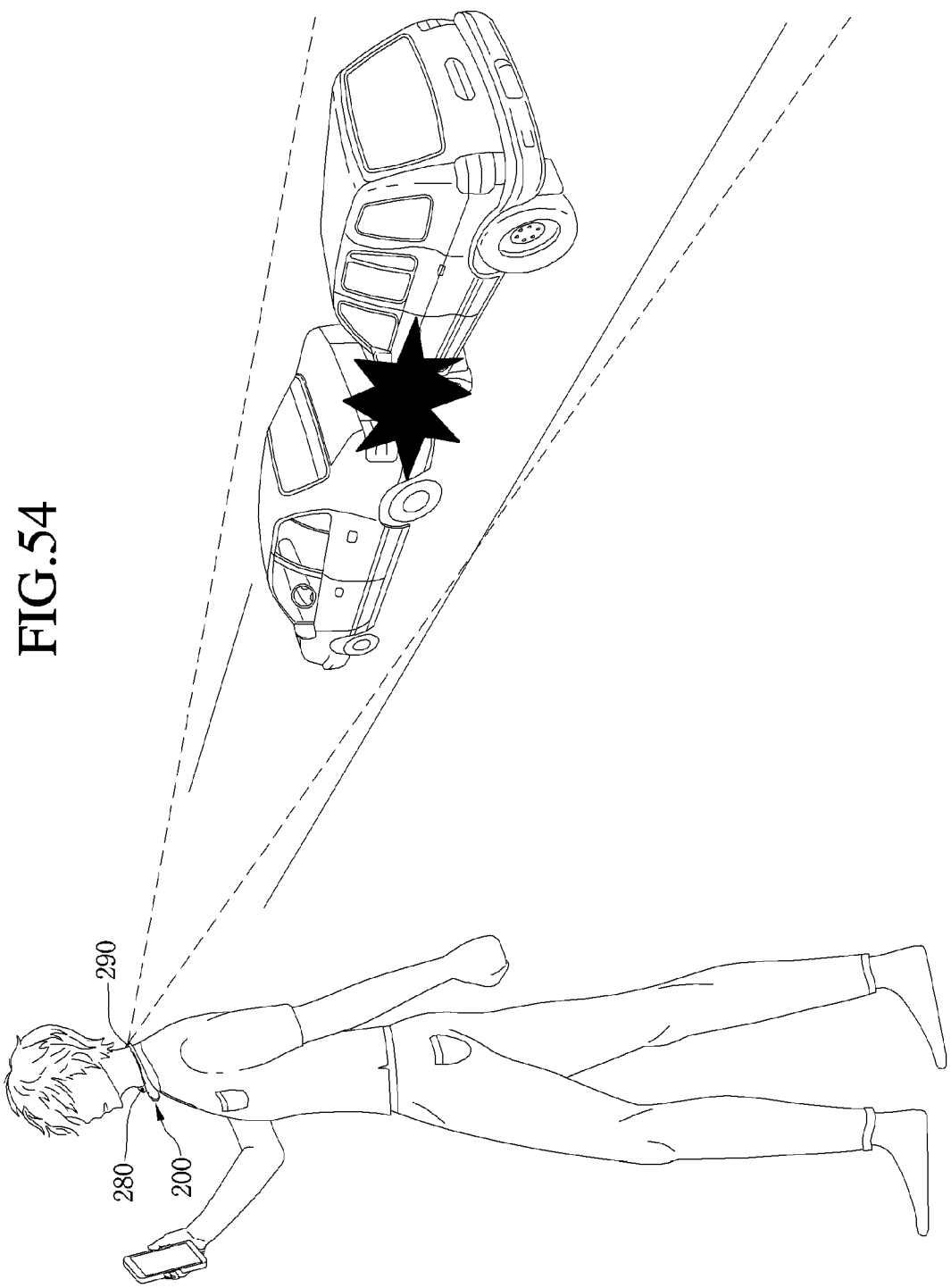
FIG. 54 is a second screen illustrating a method of automatically capturing an image in a wearable device during a specific situation.

FIG. 54 is a second screen illustrating a method of automatically capturing an image in a wearable device during a specific situation. As shown in FIG. 54, a user wearing the wearable device 200 on the neck walks in a specific place. As one example, if a situation set and registered in advance in the wearable device 200 occurs at the rear during walking, that is, the crashing sound "bang" of cars is heard, an image for an object at the rear may be automatically captured by the front camera module 280 of the wearable device 200.

A situation set and registered in advance may share data between on-line markets and users and a reaction for hard-to-hear heterogeneous sounds may be set in a specific situation or business environment that a user faces. As another example, in the case that a sound detection sensor is mounted at the wearable device 200, when a clashing sound of cars set and registered in the wearable device 200 is heard from the front, the sound detection sensor detects the car's crashing sound and the control unit 208 of the control unit 208 controls the rear camera module 290 thereby rotating the rear camera module 290 to allow the viewing angle of the rear camera module 290 to face the direction that the car's clashing sound is heard. Then, the control unit 208 of the wearable device 200 may control the rear camera module 290 to automatically capture an image for the rear object.

The automatically captured image may be stored in the wearable device 200 and may be transmitted to the mobile terminal 100 paired with the wearable device 200, a police station, a traffic control sensor, or an insurance company, and then be stored therein. An image captured when cars collide with each other may be used as a very important evidence for estimating the damage and negligence between drivers so that this prevents the drivers from being unjustly accused.

Figure 55:
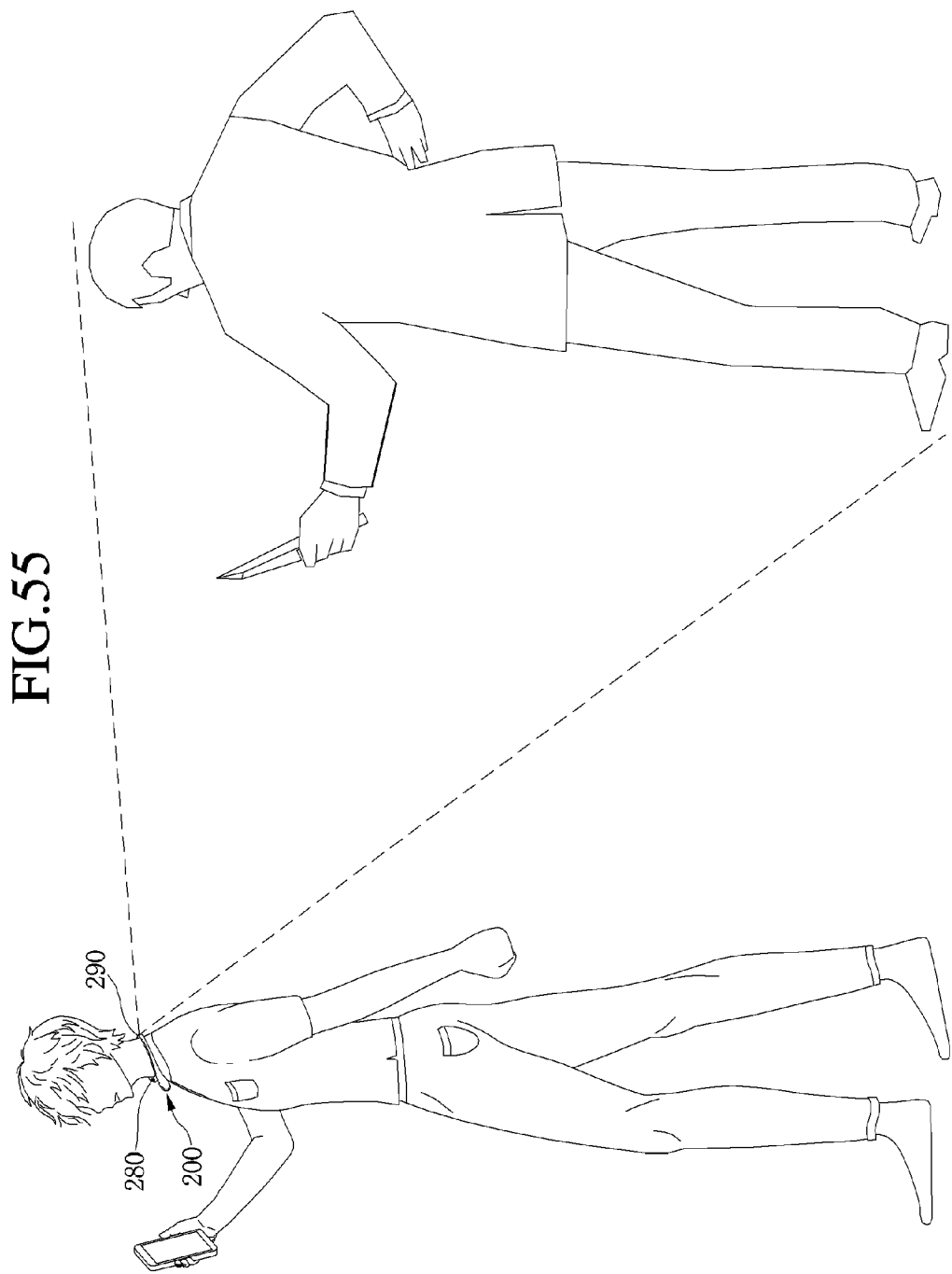
FIG. 55 is a flowchart illustrating a method of automatically capturing an image in a wearable device during a specific situation.

FIG. 55 is a third screen illustrating a method of automatically capturing an image in a wearable device during a specific situation. As shown in FIG. 55, when a criminal with a knife approaches a user wearing the wearable device 200 on the neck from the rear, an image for an object at the rear may be automatically captured by the rear camera module 290 of the wearable device 200. That is, the rear object may be a criminal approaching with a knife.

As soon as a criminal with a knife approaches from the rear, an image for the criminal is captured automatically and also an alarm sound such as voice or vibration may be notified to the user through the wearable device 200. That is, a warning sound or whistle sound may be generated to give awareness to the criminal and induce other people's attentions. Additionally, when the wearable device 200 is taken away from the user's neck suddenly, the above operation may be performed.

The automatically captured image may be stored in the wearable device 200 or may be transmitted to the mobile terminal 100 paired with the wearable device 200 and then stored therein. Additionally, the automatically captured image may be transmitted to a related person or a related organization, for example, a user's Emily or a police department. An automatic capture method of a wireless sound device according to an embodiment of the present invention may be applied to various fields in addition to the fields shown in FIGS. 53 to 55.

Figure 56:
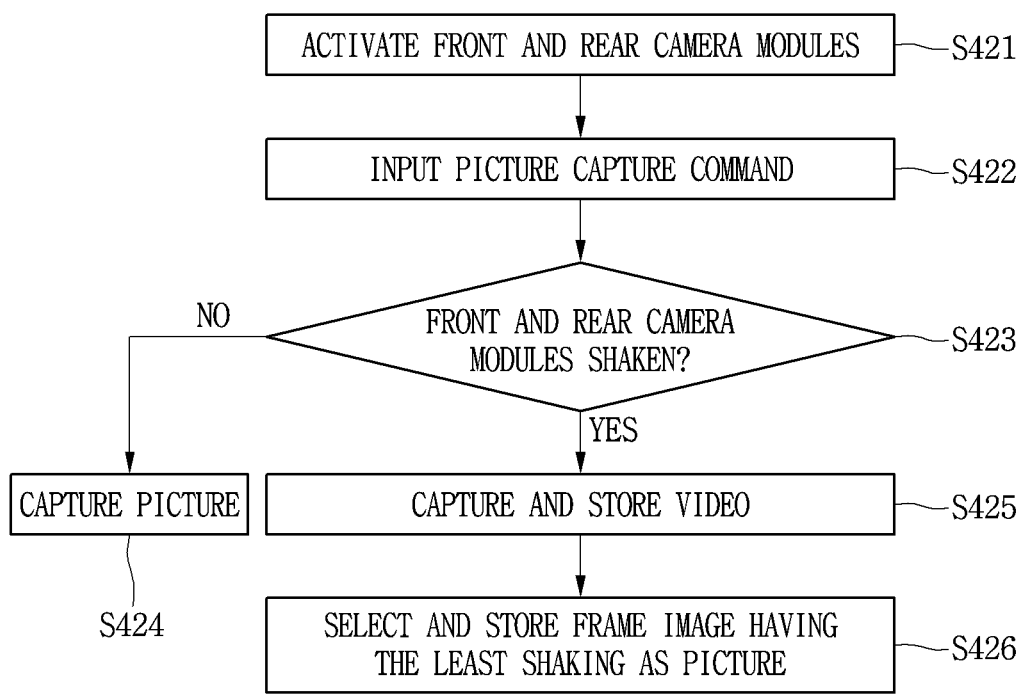
FIG. 56 is a flowchart illustrating a method of capturing an image in a wearable device when a camera module is shaken.
Figure 57:
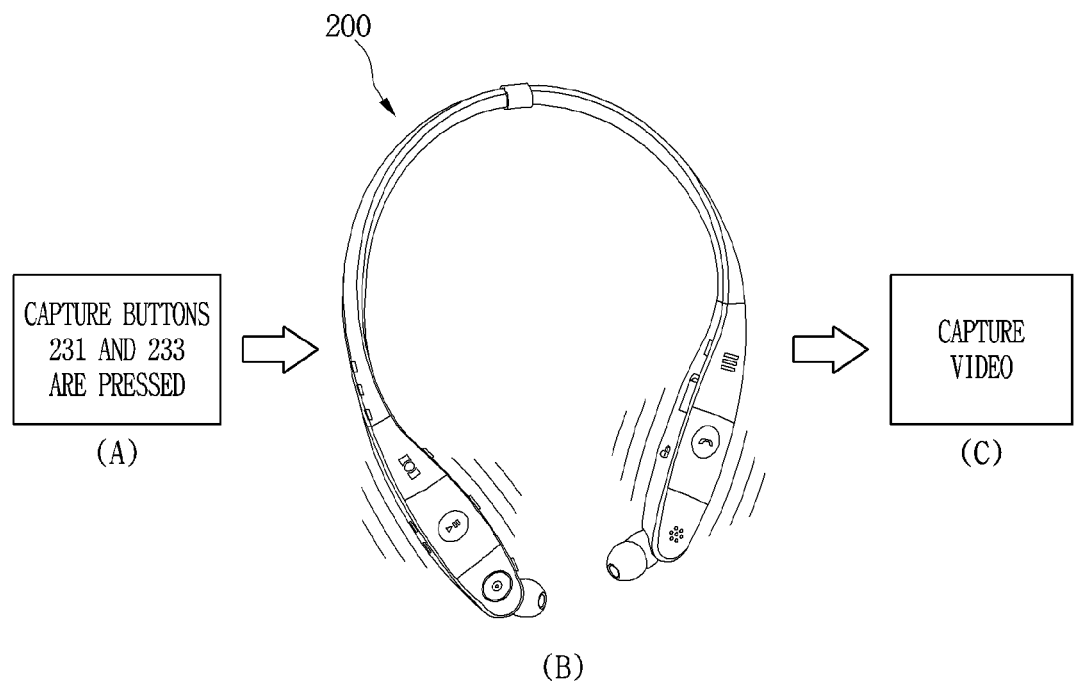
FIG. 57 is a screen illustrating a method of capturing an image in a wearable device when a camera module is shaken.
Figure 58:
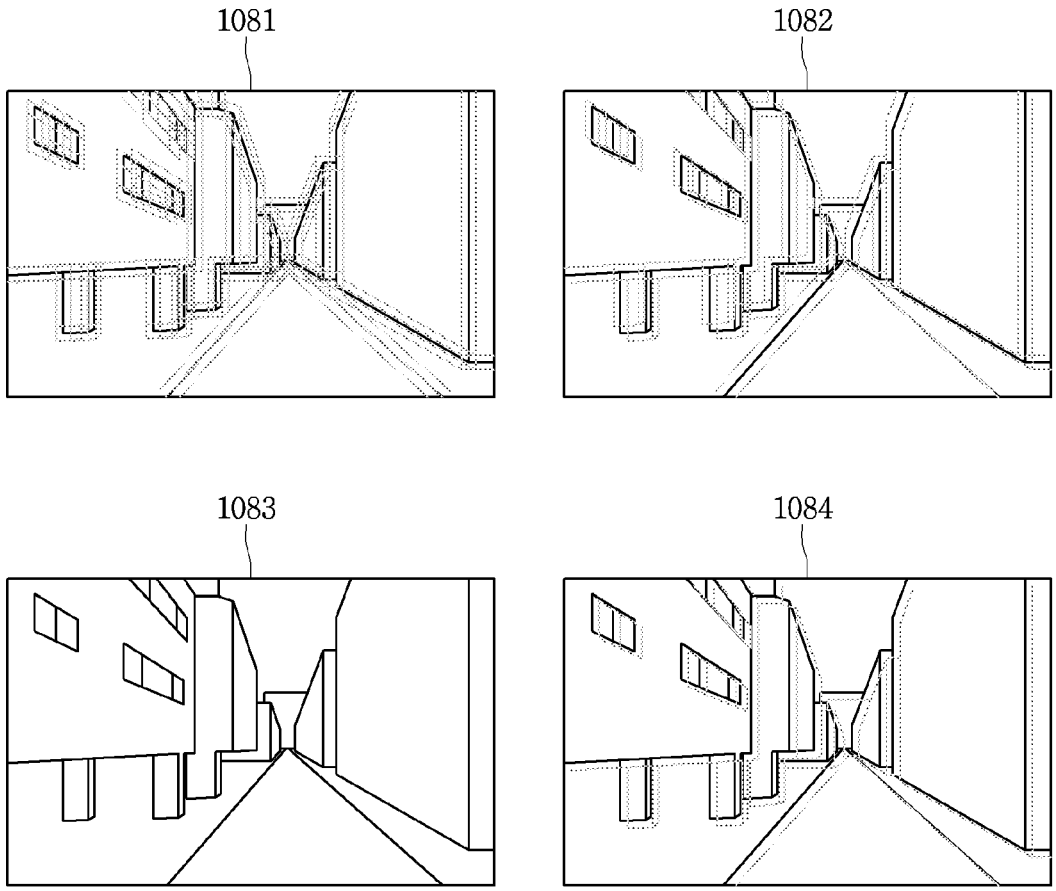
FIG. 58 is a view illustrating a video configured with a plurality of frames.

FIGS. 56 to 58 are views illustrating a method of capturing an image when a camera module is shaken in a wearable device. FIG. 56 is a flowchart illustrating a method of capturing a picture image when a camera module is shaken in a wearable device according to an embodiment of the present invention. FIG. 57 is a screen illustrating a method of capturing a picture image when a camera module is shaken in a wearable device according to an embodiment of the present invention.

Referring to FIGS. 56 and 57, the wearable device 200 activates the front camera module 280 and the rear camera module 290 in operation S421. As one example, when an activation button 250 mounted at the wearable device 200 is pressed, the front camera module 280 and the rear camera module 290 may be activated. Accordingly, an image for the front object and an image for the rear object are respectively input to the front camera module 280 and the rear camera module 290 so that the images are formed at the lens equipped at each of the front camera module 280 and the rear camera module 290.

As another example, when a touch operation on the all button 1025 of FIG. 36 on the camera control screen 1013 of FIG. 36 displayed on the mobile terminal 100 is input, the mobile terminal 100 transmits an activation command corresponding to such a touch operation to the wearable device 200 and in response to such an activation command, the control unit 208 of the wearable device 200 can activate the front camera module 280 and/or the rear camera module 290.

When a picture image capture command is input from a user in operation S422, the wearable device 200 detects whether the front and rear camera modules 280 and 290 are shaken in operation S423. The picture image capture command, as shown in FIG. 57A, may be generated as the capture buttons 231 and 233 mounted at the wearable device 200 are pressed by the user. Herein, the picture image may be a still image representing an image of one frame.

When the capture buttons 231 and 233 are pressed by a user, as shown in FIG. 57B, the wearable device 200 where the capture buttons 231 and 233 are mounted may be shaken and also the front camera module 280 and/or the rear camera module 290 mounted at the wearable device 200 may be shaken.

The shaking of the wearable device 200 or the front camera module 280 and/or the rear camera module 290 may be detected by the haptic module 205*b* of the wearable device 200. Then, the control unit 208 of the wearable device 200 may identify the shaking intensity of the wearable device 200 or the front camera module 280 and/or the rear camera module 290 and may determine whether such a shaking intensity is greater than a predetermined setting value. The predetermined setting value may be set by a manufacturer or a user.

If the shaking intensity of the front camera module 280 and/or the rear camera module 290 is less than the predetermined setting value, the control unit 208 of the wearable device 200 can perform a control on the front camera module 280 and/or the rear camera module 290 to capture a picture image for an image input to the front camera module 280 and/or the rear camera module 290 in operation S424.

If the shaking intensity of the front camera module 280 and/or the rear camera module 290 is greater than the predetermined setting value, the control unit 208 can perform a control on the front camera module 280 and/or the rear camera module 290 to capture a video for an image input to the front camera module 280 and/or the rear camera module 290 in operation S425. If a picture image is captured while the front camera module 280 and/or the rear camera module 290 are/is shaken in correspondence to the shaking of the wearable device 200, the form of an object of a corresponding picture image is displayed unclearly. Accordingly, since such a captured picture image is discarded, precious memory may be lost.

When the shaking intensity of the front camera module 280 and/or the rear camera module 290 is greater than the predetermined setting value, as shown in FIG. 57C, a picture image capture mode changes into a video capture mode so that video may be captured instead of picture image capture. The captured video may be stored in the memory 207 temporarily.

A corresponding video may be captured for a predetermined time, for example, approximately 5 sec to approximately 10 sec. When video is captured for approximately 5 sec to approximately 10 sec in such a way, the shaking of the front camera module 280 and/or the rear camera module 290 may be reduced during this period so that there may be a frame image 1083 of FIG. 58 for an object without shaking in some frames of a corresponding video.

A video captured in the video capture mode, as shown in FIG. 58, may include a plurality of frame images 1081, 1082, 1083, and 1084. Herein, each of the frame images 1081, 1082, 1083, and 1084 may be a still image. A specific frame area 1084 in a plurality of frame images 1081, 1082, 1083, and 1084 may be a clear image without shaking.

The control unit 208 of the wearable device 200 may select the frame image 1083 with the smallest shaking among the plurality of frame images 1081, 1082, 1083, and 1084 shown in FIG. 58 as a picture image that a user wants to capture in operation S426. Then, the control unit 208 of the wearable device 200 may store the selected picture image 1083 in the memory 207 or may transmit it to the mobile terminal 100. Moreover, the video temporarily stored in the memory 207 may be deleted automatically after a predetermined period, for example, one day, but the present invention is not limited thereto.

Figure 59:
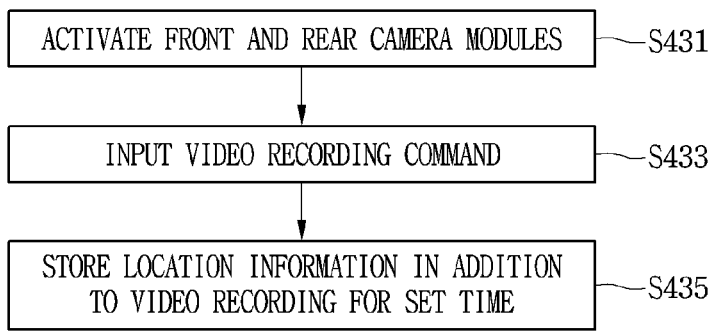
FIG. 59 is a flowchart illustrating a method of recording a front image and a rear image by using a wearable device according to an embodiment of the present invention.

FIG. 59 is a flowchart illustrating a method of recording a front image and a rear image by using a wearable device according to an embodiment of the present invention. Referring to FIG. 59, the control unit 208 of the wearable device 200 activates the front camera module 280 and the rear camera module 290 in operation S431.

The activation of the front camera module 280 and the rear camera module 290 may be performed by pressing the activation button 250 mounted at the wearable device 200 or performing a touch operation on the all button 1025 on the camera control screen 1013 of FIG. 36 displayed on the mobile terminal 100. In more detail, this may be easily understood by the above description relating to FIG. 56.

When an image recording command is input in operation S433, the control unit 208 of the wearable device 200 records a front image and a rear image for a set time and also stores location information on each of the front image and the rear image in operation S435.

The front image may be recorded by the front camera module 280 and the rear image may be recorded by the rear camera module 290. Although the front image and the rear image are recorded simultaneously by default, only the front image or only the rear image may be recorded according to a user's selection.

The location information on the front image and/or the rear image may be obtained by the location information module 201d. For example, when a user drives a car while wearing the wearable device 200, an image of a car front and rear may be recorded while the car is in progress. In another example, when a user walks while wearing the wearable device 200, an image of a user's front and rear may be recorded during walking.

The recording time of a front image and/or a rear image may be set to one day, for example. If a storage space allocated for recording is sufficient in the memory 207 of the wrearable device 200, unless a user turns off the wearable device 200 compulsively, a front image and/or a rear image may be recorded for several days. If a storage space allocated for recording in the memory 207 is completely filled during the recording of a front image and/or a rear image, the first recorded image is deleted and the front image and/or the rear image may be recorded and stored in the deleted area of the memory 207.

When the recorded image is played later, such location information may be used as configuring a path map. The recording image and the location information stored in the wearable device 200 may be transmitted to the mobile terminal 100 and stored therein automatically or by a user's selection. Additionally, when the recording image and the location information are set in advance in the mobile terminal 100, they may be transmitted to an external server and stored therein.

Figure 60:
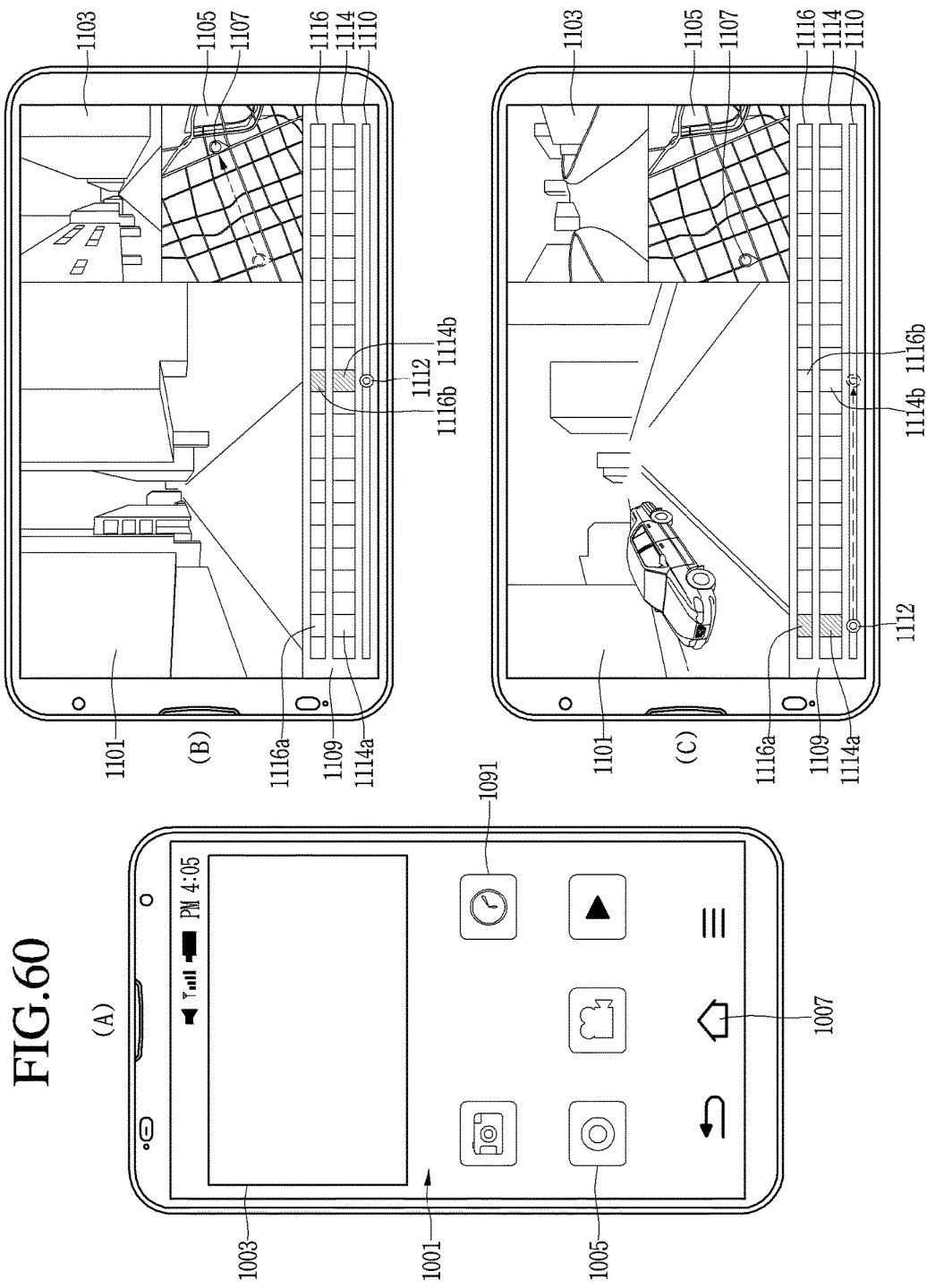
FIG. 60 is a screen illustrating a method of displaying an image recorded by a wearable device on a mobile terminal according to an embodiment of the present invention.

FIG. 60 is a screen illustrating a method of displaying an image recorded by a wearable device on a mobile terminal according to an embodiment of the present invention. As shown in FIG. 60A, a specific icon for playing a recording image that is recorded and transmitted by the wearable device 200 may be displayed on the home screen 1001 of the mobile terminal 100.

The specific icon may be generated when the recording image is received from the wearable device 200 but the present invention is not limited thereto. The specific icon may be a time machine icon 1091 but the present invention is not limited thereto. When a touch for the time machine icon 1091 is input, as shown in FIG. 60B, the recorded image may be displayed on the display unit 151 of the mobile terminal 100.

The image may be recorded in the wearable device 200 and transmitted to the mobile terminal 100 in addition to the location information and then may be stored in the memory 170 of the mobile terminal 100. The recording image may include a front image recorded by the front camera module 280 and a rear image recorded by the rear camera module 290.

The screen of the display unit 151 of the mobile terminal 100 may include a front image playback area 1101, a rear image playback area 1103, a recording image control area 1109, and a path map display area 1105. The front image playback area 1101 can display a front image where the front is recorded and the rear image playback area 1103 can display a rear image where the rear is recorded.

The size of the front image playback area 1101 may be greater than the size of the rear image playback area 1103 but the present invention is not limited thereto. The rear image playback area 1103 and the path map display area 1105 are disposed on the right of the front image playback area 1101 and the recording image control area 1109 may be disposed on the lower side of each of the front image playback area 1101 and the path map display area 1105. Additionally, the path map display area 1105 may be disposed between the rear image playback area 1103 and the recording image control area 1109 but the present invention is not limited thereto.

A user's location may be displayed on the path map display area 1105 in a front image displayed on the front image playback area 1101 and a rear image displayed on the rear image playback area 1103 currently based on location information transmitted in addition to a recoding image from the wearable device 200. For example, when a user's moving path included in a recording area moves from the A position to the B position, map information including at least A position and B position may be displayed on the path map display area 1105. Moreover, when a front image is displayed on the front image playback area 1101 when a user is at the A position and a rear image is displayed on the rear image playback area 1103 when a user is at the A position currently in the same manner, a user's current location marker 1107 may be displayed at the A position on map information displayed on the path map display area 1105.

A user can easily identify his/her path through the user's current location marker 1107 displayed on the path map display area 1105 in addition to the front image displayed on the front image playback area 1101 and the rear image displayed on the rear image playback area 1103.

The recording image control area 1109 may include a progress state guide 1110 for guiding a temporally progressing playback progress state of a recording image, that is, a front image and a rear image, and a progressing state bar 1112 displayed on the progress state guide 1110 for displaying the current playback progress positions of a front image displayed on the front image playback area 1101 and a rear image displayed on the rear image playback area 1103.

The progress state bar 1112 may move from the left to the right of the progress state guide 1110 as a recorded image, that is, a front image and a rear image, is displayed temporally. The leftmost point of the progress state bar 1112 may represent the start time of the recording image and the rightmost point of the progress state bar 1112 may represent the end time of the recording image.

In the recording image control area 1109, a thumbnail image 1114 of a first group may be displayed at the upper side of the progress state guide 1110 and a thumbnail image 1116 of a second group may be displayed at the upper side of the thumbnail image 1114 of the first group. The thumbnail image 1114 of the first group may be a frame image corresponding to a predetermined section among a plurality of frame images configuring the front image. The thumbnail image 1116 of the second group may be a frame image corresponding to a predetermined section among a plurality of frame images configuring the rear image.

Referring to FIG. 60, each thumbnail image 1114 of the first group and the thumbnail image 1116 of the second group includes 22 sheets of frame images but the present invention is not limited thereto. The thumbnail image 1114 of the first group and the thumbnail image 1116 of the second group may not be displayed usually and when a touch and hold operation on the progress state bar 1112 is input from a user, may be displayed at the upper side of the progress state guide 1110 in the recording image control area 1109 but the present invention is not limited thereto.

If a hold release on the progress state bar 1112 is input from a user, the thumbnail image 1114 of the first group and the thumbnail image 1116 of the second group may disappear. A frame image 1114*a* of the thumbnail image 1114 of the first group and a frame image 1116*a* of the thumbnail image 1116 of the second group corresponding to a point where the progress state bar 1112 is disposed, for example, may be highlighted or flashed or displayed with a specific color to be distinguished from another frame image.

Moreover, when a touch release is input from a user after a drag and touch is made to a time point that a user wants along the right direction during a touch and hold on the progress state bar 1112, as shown in FIG. 60C, the progress state bar 1112 is moved to a time point that a user wants. In such a case, the front image corresponding to a time point where the progress state bar 1112 is moved is displayed in the front image playback area 1101 and the rear image corresponding to a time point where the progress state bar 1112 is moved is displayed in the rear image playback area 1103.

Additionally, the current location marker 1107 may be moved to the location of a user in the front image and the rear image corresponding to a point where the progress state bar 1112 is moved and may be displayed on the path map display area 1105. A frame image 1114*b* of the thumbnail image 1114 of the first group and a frame image 1116*b* of the thumbnail image 1116 of the second group corresponding to a point where the progress state bar 1112 is disposed, for example, may be highlighted or flashed or displayed with a specific color to be distinguished from another frame image. Further, a frame image 1114*a* of the thumbnail image 1114 of the first group and a frame image 1116*a* of the thumbnail image 1116 of the second group, which are highlighted or flashed or displayed with a specific color, may be identical to another frame image.

Figure 61:
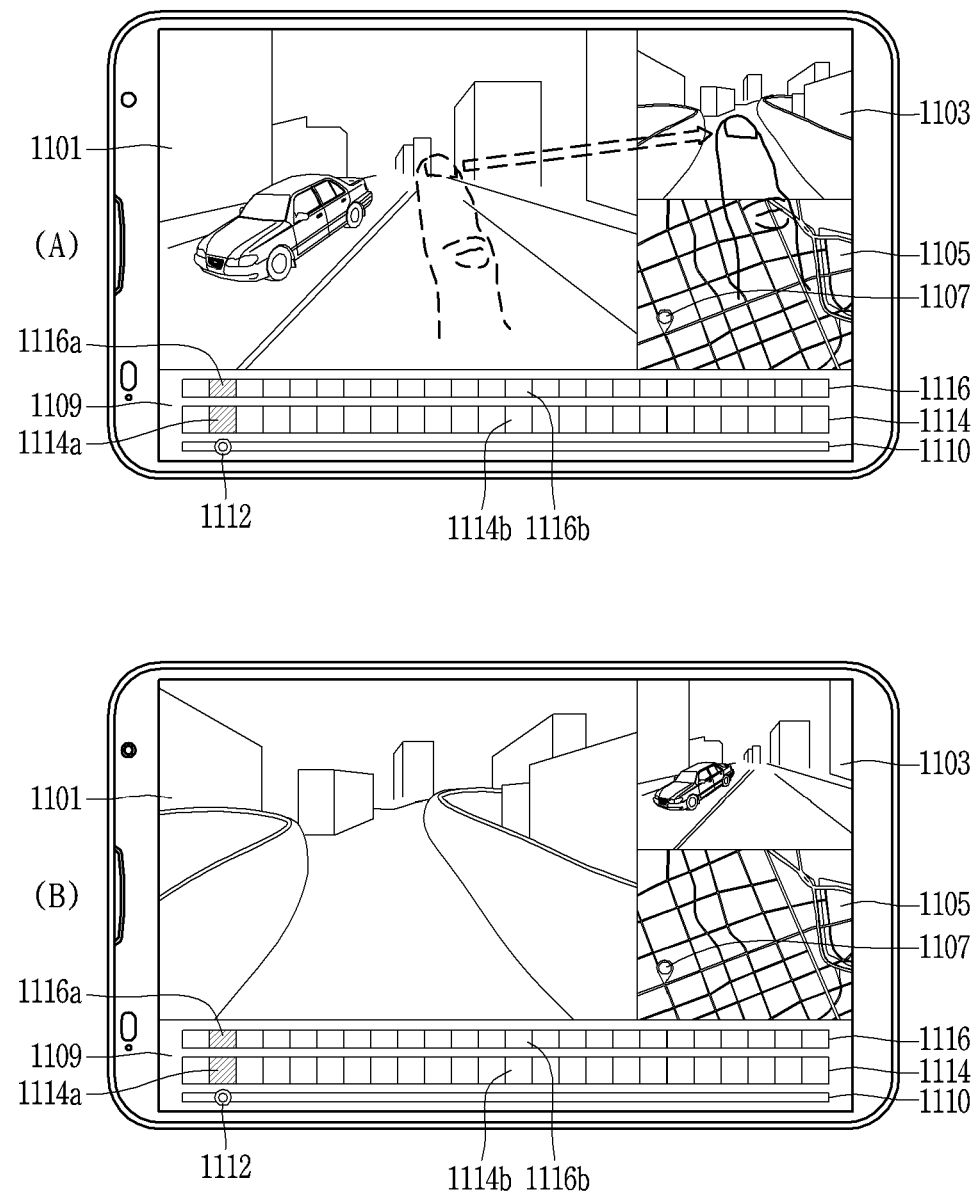
FIG. 61 is a screen illustrating a method of switching a front image playback area and a rear image playback area shown in FIG. 60.

FIG. 61 is a screen illustrating a method of switching a front image playback area and a rear image playback area shown in FIG. 60. When a touch and drag operation is input from an arbitrary point of the front image playback area 1101 to an arbitrary point of the rear image playback area 1103 as shown in FIG. 61A, the front image playback area 1101 and the rear image playback area 1103 may be switched to each other as shown in FIG. 61B. In such a case, the front image playback area 1101 is newly defined as a rear image playback area 1103 and a rear image may be displayed on the newly defined rear image playback area 1103. The rear image playback area 1103 is newly defined as a front image playback area 1101 and the front image playback area 1101 may be displayed on the newly defined rear image playback area 1103.

FIG. 62 is a first screen illustrating a method of varying a front image playback area shown in FIG. 60. When a touch and drag operation is input from an arbitrary point of the front image playback area 1101 to an arbitrary point of the path map display area 1105 as shown in FIG. 62A, instead that the recording image control area 1109 disappears in addition to the rear image playback area 1103 and the path map display area 1105 as shown in FIG. 62B, the front image playback area 1101 may extend to the rear image playback area 1103, the path map display area 1105, and the recoding image control area 1109. That is, the front image playback area 1101 may extend to the entire screen area of the display unit 151.

In such a way, when a single tap that taps one time or a double tap that taps two times on an arbitrary point of the front image playback area 1101 is input when the front image playback area 1101 extends to the entire screen area of the display unit 151, it may be restored to the original area as shown in FIG. 62C. That is, the front image playback area 1101 extending to the entire screen area of the display unit 151 is reduced to its original size and also, each of the rear image playback area 1103, the path map display area 1105, and the recording image control area 1109, which disappear from the screen of the display unit 151, may be displayed on the original area of the display unit 151.

Figure 63:
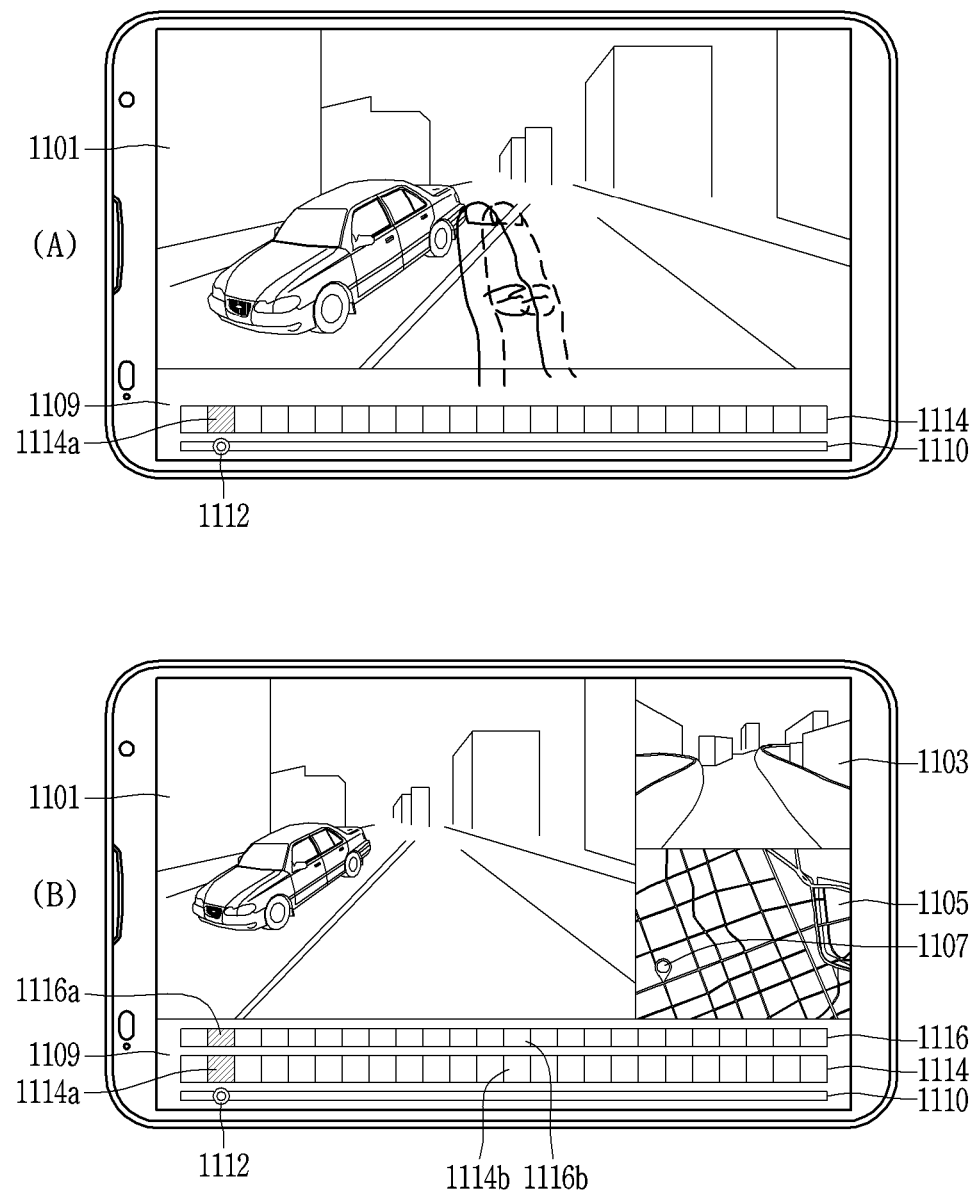
FIG. 63 is a second screen illustrating a method of varying a front image playback area shown in FIG. 60.

FIG. 63 is a second screen illustrating a method of varying a front image playback area shown in FIG. 60. When a touch and drag operation is input from an arbitrary point of the front image playback area 1101 to an arbitrary point of the path map display area 1105 as shown in FIG. 62A, instead that the rear image playback area 1103 and the path map display area 1105 disappear as shown in FIG. 63A, the front image playback area 1101 may extend to the rear image playback area 1103 and the path map display area 1105.

In such a case, since the rear image is not displayed after the rear image playback area 1103 where the rear image is displayed disappears, the thumbnail image 1116 of the second group displayed in the recording area control area 1109 may also disappear from the recording image control area 1109. The front image playback area 1101 further extends by an area where the thumbnail image 1116 of the second group disappears so that user can see the front image with larger size.

In such a way, when a single tap that taps one time or a double tap that taps two times on an arbitrary point of the front image playback area 1101 is input when the front image playback area 1101 extends, it may be restored to the original area as shown in FIG. 62B. That is, the extended front image playback area 1101 is reduced to its original size and also, each of the rear image playback area 1103 and the path map display area 1105, which disappear from the screen of the display unit 151, may be displayed on the original area of the display unit 151.

Furthermore, the thumbnail image 1116 of the second group that disappears in correspondence to the disappeared rear image playback area 1103 may be displayed on the recording image control area 1109. A user can see an image of a desired point at any time through an image recording and recording image playback method shown in FIGS. 59 to 63.

Figure 64:
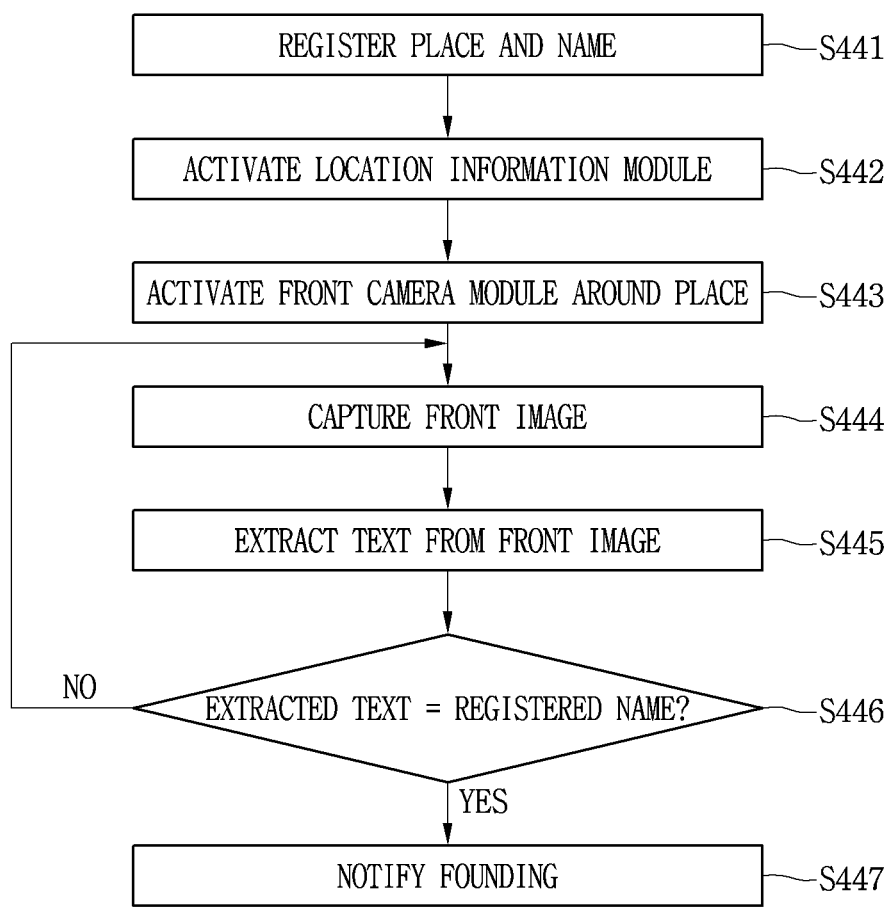
FIG. 64 is a flowchart illustrating a method of a user to easily find a building in a specific place by using a wearable device according to an embodiment of the present invention.

FIG. 64 is a flowchart illustrating a method of a user to easily find a building in a specific place by using a wearable device according to an embodiment of the present invention. Referring to FIG. 64, the wearable device 200 registers destination information including a place and a name, received from the mobile terminal 100, in the memory 207 in operation S441.

Since there no input mechanism for inputting characters to the wearable device 200, destination information including a place and a name may be received from the mobile terminal 100. In more detail, as shown in FIG. 65A, a destination search icon 1118 may be displayed on the home screen 1001 of the mobile terminal 100.

Figure 65:
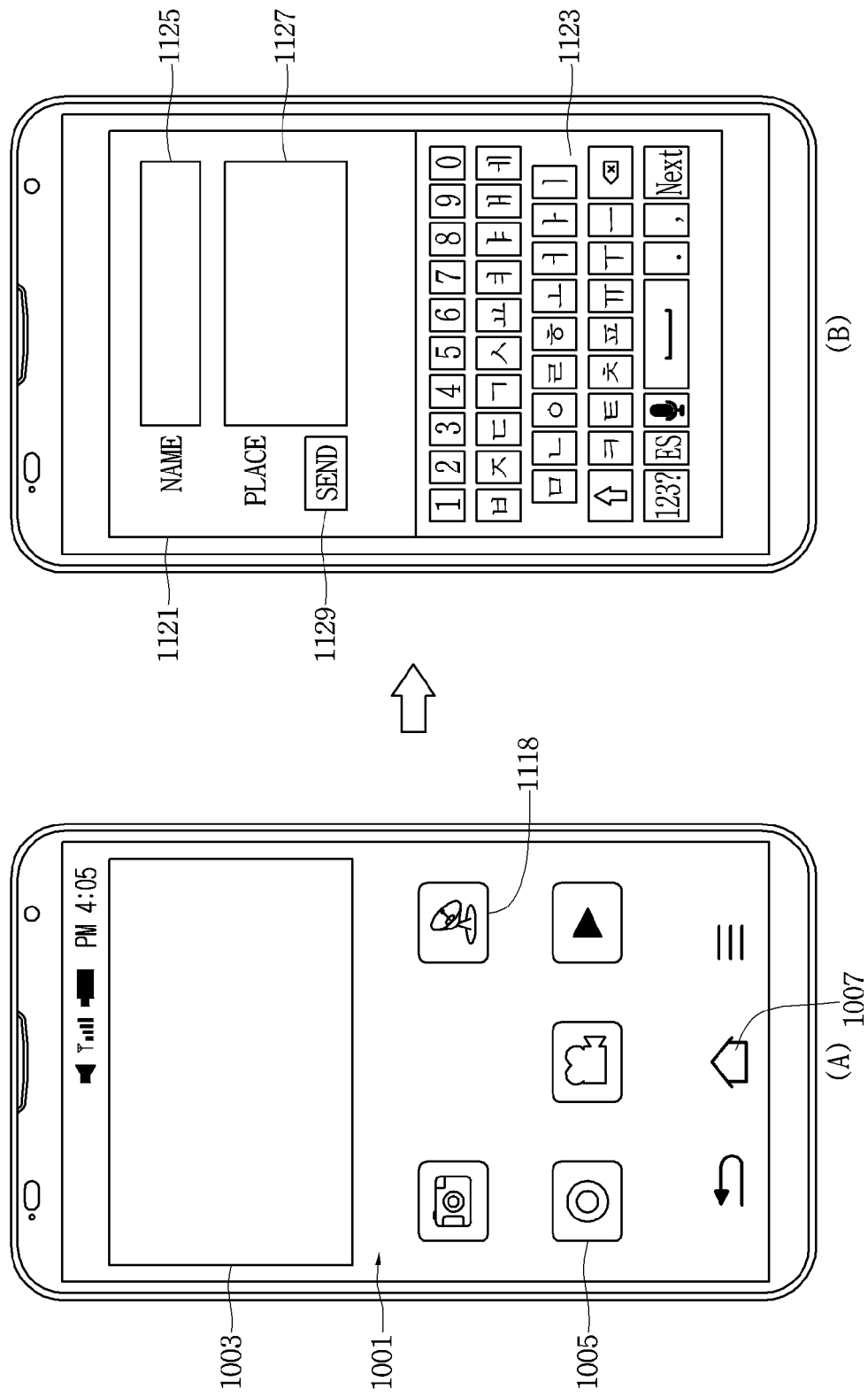
FIG. 65 is a screen illustrating a method of registering a destination including a place and a name.

When a touch for the destination search icon 1118 is input from a user, as shown in FIG. 65B, an input window 1121 and a keyboard 1123 for inputting characters, numbers, and special characters may be displayed. The input window 1121 may include a name input window 1125 for inputting a name and a place input window 1127 for inputting a place. A user can input a name to the name input window 1125 and a place to the place input window 1127 by using the keyboard 1123.

The name may be a building name or a store name that a user wants to find. The place may be a location that a user wants to go, for example, an address. After a name is input to the name input window 1125 and a place is input to the place input window 1127, when a touch for a send button 1129 is input from a user, destination information including the place and name input from the user can be transmitted to the wearable device 200.

As another example, representing building names and place names in the surrounding areas may be automatically input without inputting the above information by a user. The wearable device 200 may register destination information including a place and a name, received from the mobile terminal 100, in the memory 207.

Referring to FIG. 64 again, the wearable device 200 activates the location information module 201*d* in operation S442. When a user's movement is detected by the wearable device 200 or the mobile terminal 100, the location information module 201*d* may be activated but the present invention is not limited therein.

As the location information module 201*d* of the wearable device 200 is activated, the wearable device 200 may identify the location of a user by using the location information module 201*d*. When the user's location is near a pre-registered place, the control unit 208 of the wearable device 200 may activate the front camera module 280 in operation S443.

If a user does not press the activation button 250 even when the activation button 250 is equipped at the wearable device 200, as the user's location is near a pre-registered place, the front camera module 280 may be activated. Herein, "near" may be a radius separated from the pre-registered place. The radius may be about 500 m or about 1 km. Such a radius may be set in advance by a user.

As the front camera module 280 is activated, the control unit 208 of the wearable device 200 may perform a control on the front camera module 280 to capture a front image input to the front camera module 280 in operation S444. A user looks around to find a pre-registered name near a place and a front image having a different viewing angle input to the front camera module 280 may be captured as the user looks around.

Figure 71:
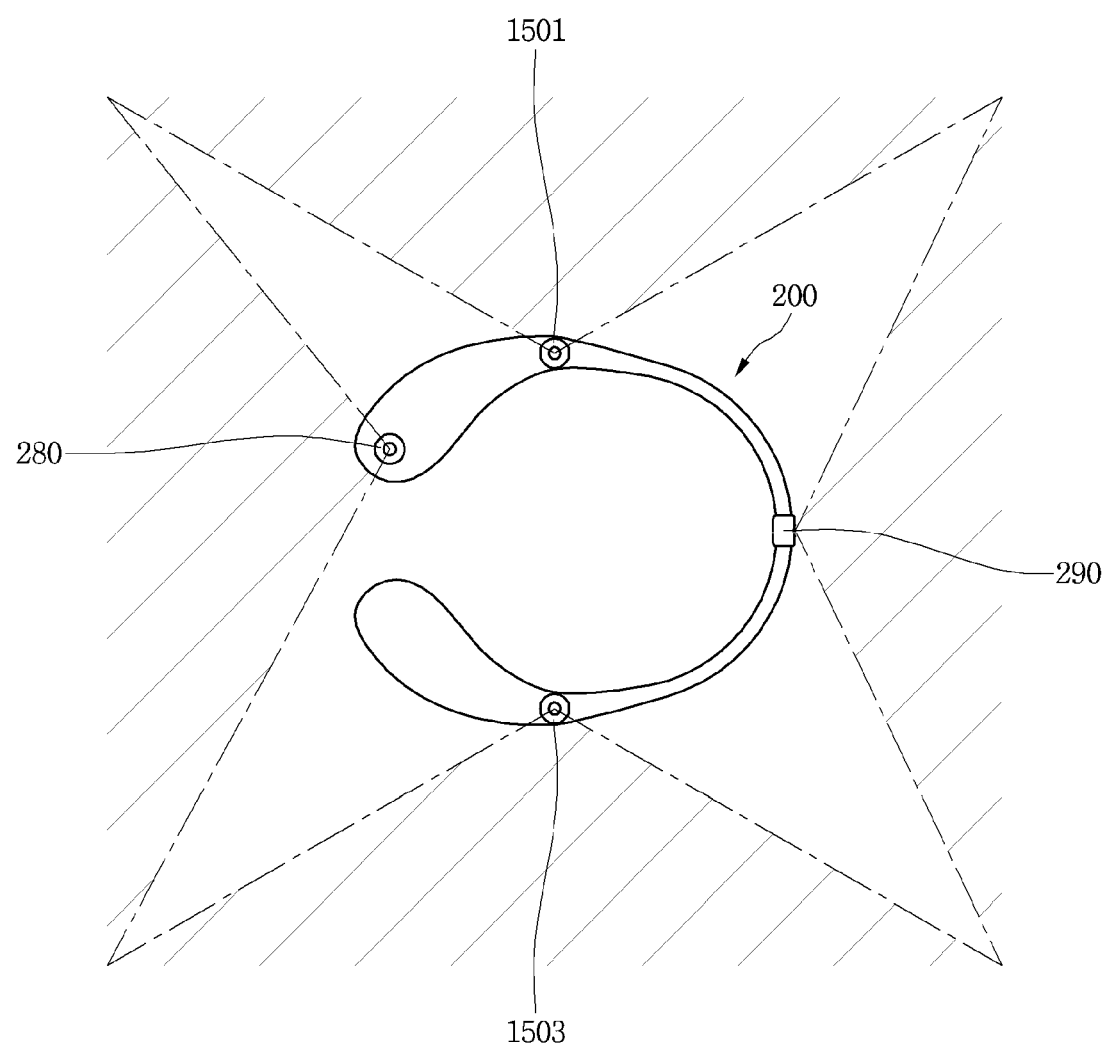
FIG. 71 is a view when a left camera module and a right camera module are additionally mounted at a wearable device in addition to a front camera module and a rear camera module.

As another example, the rear camera module 290, the left camera module 1503 of FIG. 71, and the right camera module 1501 are activated in addition to the front camera module 280 so that corresponding images may be captured from the camera modules 280, 290, 1501, and 1503. The control unit 208 of the wearable device 200 extracts a text from the captured front image in operation S445. The captured front image may include a plurality of texts, characters, images, and figures. The control unit 208 of the wearable device 200 may extract a text from them.

Since a method of extracting text from an image is easily understood from a normal cycle technique, further description thereof is omitted. The control unit 208 of the wearable device 200 compares the text extracted from the captured front image with a pre-registered name to check whether the extracted text is identical to the pre-registered name in operation S446.

If the extracted text is not identical to the pre-registered name, the control unit 208 proceeds to operation S444 and performs operation S445 and operation S446 repeatedly. If the extracted text is identical to the pre-registered name, the control unit 208 of the wearable device 200 notifies a user that the destination is found in operation S447.

As one example, the control unit 208 of the wearable device 200 may notify that the destination is found through the sound output unit 205*a* of the wearable device 200 or the optical output unit 205*c* of the wearable device 200. As one example, the control unit 208 of the wearable device 200 may notify that the destination is found through text message using the display unit 151 of the mobile terminal 100, through the sound output unit 152 of the mobile terminal 100, or through the optical output unit 154 of the mobile terminal 100.

Figure 66:
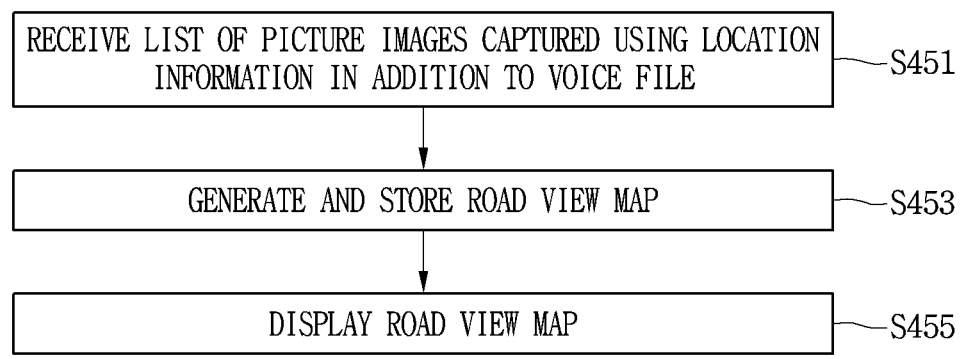
FIG. 66 is a flowchart illustrating a method of displaying a list of picture images captured by a wearable device on a mobile terminal as a road view map according to an embodiment of the present invention.

FIGS. 66 to 68 are views illustrating a method of displaying a list of picture images captured by a wearable device on a mobile terminal as a road view map according to an embodiment of the present invention. FIG. 66 is a flowchart illustrating a method of displaying a list of picture images captured by a wearable device on the mobile terminal 100 as a road view map according to an embodiment of the present invention.

Referring to FIG. 66, the mobile terminal 100 receives the list of picture images captured by using location information from the wearable device 200 in addition to a voice file in operation S451. In order to capture a picture image, the front camera module 280 and/or the rear camera module 290 of the wearable device 200 may be activated. For example, when a press operation on the activation button 250 is input from a user, the front camera module 280 and/or the rear camera module 290 may be activated and also may be activated by the mobile terminal 100 as mentioned above.

Moreover, when a picture image is captured by the wearable device 200, the location information module 201d and the microphone 202b of the wearable device 200 may be activated. The location information module 201d and the microphone 202b may be activated by a user's button manipulation or may be activated in linkage with the activation of the front camera module 280 and/or the rear camera module 290.

In addition, when a left camera module and a right camera module are further mounted on the wearable device 200 in addition to the front camera module 280 and/or the rear camera module 290, the left camera module and the right camera module may be activated in addition to the front camera module 280 and/or the rear camera module 290.

In such a case, as the front camera module 280, the rear camera module 290 the left camera module, and the right camera module capture an image simultaneously, a panorama picture image or a road view picture image may be generated. That is, an image for an object in 360 degree all directions around a user can be generated as a picture image of one frame unit.

According to an embodiment of the present invention, the front camera module 280 and/or the rear camera module 290 may be mounted on the wearable device 200, or the front camera module 280, the rear camera module 290, the left camera module 1503, and the right camera module 1501 may be mounted on the wearable device 200 (see FIG. 71).

Hereinafter, for convenience of description, the case that the front camera module 280, the rear camera module 290, the left camera module 1503, and the right camera module 1501 are mounted on the wearable device 200 will be described. Once a press operation on the capture button 231 or 233 is input front a user, as shown in FIG. 67, the wearable device 200 captures images input to the front camera module 280, the rear camera module 290, the left camera module 1503, and the right camera module 1501 to generate a picture image 1033 of one frame including first to fourth areas 1134, 1135, 1136, and 1137 based on the images captured from the camera modules 180, 290, 1501, and 1503.

For example, the first area 1134 may be a front image captured by the front camera module 280 and the second area 1135 may be a right image captured by the right camera module 1501. The third area 1136 may be a rear image captured by the rear camera module 290 and the fourth area 1137 may be a left image captured by the left camera module 1503. How to set the images captured by each of the camera modules 180, 290, 1501, and 1503 in which area of the first to fourth areas 1134, 1135, 1136, and 1137 may be preset by a manufacturer or set by a user.

In such a case, as shown in FIG. 67A, the first area 1134 of the picture image 1133 may be displayed on a single screen of the mobile terminal 100. Once a touch drag is input along the left direction from a user when the first area 1134 of the picture image 1133 is displayed, as shown in FIG. 67B, the first area 1134 of the picture image 1133 may switch to the second area 1135 of the picture image 1133 and be displayed. Once a touch drag is input along the left direction from a user when the second area 1135 of the picture image 1133 is displayed, as shown in FIG. 67C, the second area 1135 of the picture image 1133 may switch to the third area 1136 of the picture image 1133 and be displayed. Once a touch drag is input along the left direction from a user when the third area 1136 of the picture image 1136 is displayed, as shown in FIG. 67D, the third area 1136 of the picture image 1136 may switch to the fourth area 1137 of the picture image 1136 and be displayed.

Further, once a touch drag is input along the right direction from a user when the fourth area 1137 of the picture image 1133 is displayed, the second area 1137 may switch to the third area 1136, the third area 1136 may switch to the second area 1135, and the second area 1135 may switch to the first area 1134 and may be displayed.

Accordingly, a user can see a road view image through the picture image 1133. That is, a user can see picture images furthermore in all directions simultaneously in comparison to seeing only a typical front picture image simply through the picture image 1133, so that this gives users the viewing pleasure of a picture image. That is, ordinary persons see only an object in the front direction during viewing pictures but are curious about a situation of another direction other than the front at that time that a picture is taken. However, since only an object in the front direction is seen as a picture typically, this does not eliminate the user's curiosity.

According to an embodiment of the present invention, since an image for an object in all directions is seen in addition to the front direction at that time that the picture is taken, this may eliminate the curiosity for a user's surrounding situation.

Although it has been described as limited to a picture image in the above, the present invention may be identically applied to a video simultaneously captured by the front camera module 280, the rear camera module 290, the left camera module 1503, and the right camera module 1501. For example, with respect to first to fourth videos simultaneously captured by the front camera module 280, the rear camera module 290, the left camera module 1503, and the right camera module 1501, the first video may be played on a single screen of the mobile terminal 100. In such a case, each time another drag touch is input from a user in the left direction, the first video may switch to the second video, the second video may switch to the third video, and the third video may switch to the fourth video, and then may be displayed.

Referring to FIG. 66 again, a picture image list may include a plurality of pictures images that a user captures in several places and accumulates. Such a picture image list may be stored in the memory 207 of the wearable device 200 and may be transmitted to the mobile terminal 100.

A voice file may be linked with each picture image. For example, there may be person's voice, animal sound, or surrounding noise at that time of capturing a picture. Those may be recorded at the time of capturing a picture and may be generated as a voice file. The generated voice file may be linked to a picture image and stored in the memory 207 of the wearable device 200 and then may be transmitted to the mobile terminal 100 in addition to a picture image list.

For example, when a specific picture image is touched in the mobile terminal 100, a voice file linked with the specific picture image may be played but the present invention is not limited thereto. Moreover, a picture image may include location information. That is, when each of the camera modules 280, 290, 1501, and 1503 and the location, information module 201d are activated, the wearable device 200 may identify the location of a user always and check whether a picture is taken by each of the camera modules 280, 290, 1501, and 1503.

When a press operation on the capture button 231 or 233 is input from a user, the wearable device 200 may detect this and reflect the currently identified location information to a picture image generated from images captured by each of the camera modules 280, 290, 1501, and 1503. Based on the location information included in picture images when a road view map is generated in the mobile terminal 100, each picture image may be arranged at a corresponding location on the road view map.

The mobile terminal 100 generates a road view map based on a picture image list received from the wearable device 200 and stores the generated road view map in the memory 170 in operation S453. As mentioned above, the picture image list may include a plurality of one frame picture images and each picture image may include location information.

Figure 68A:
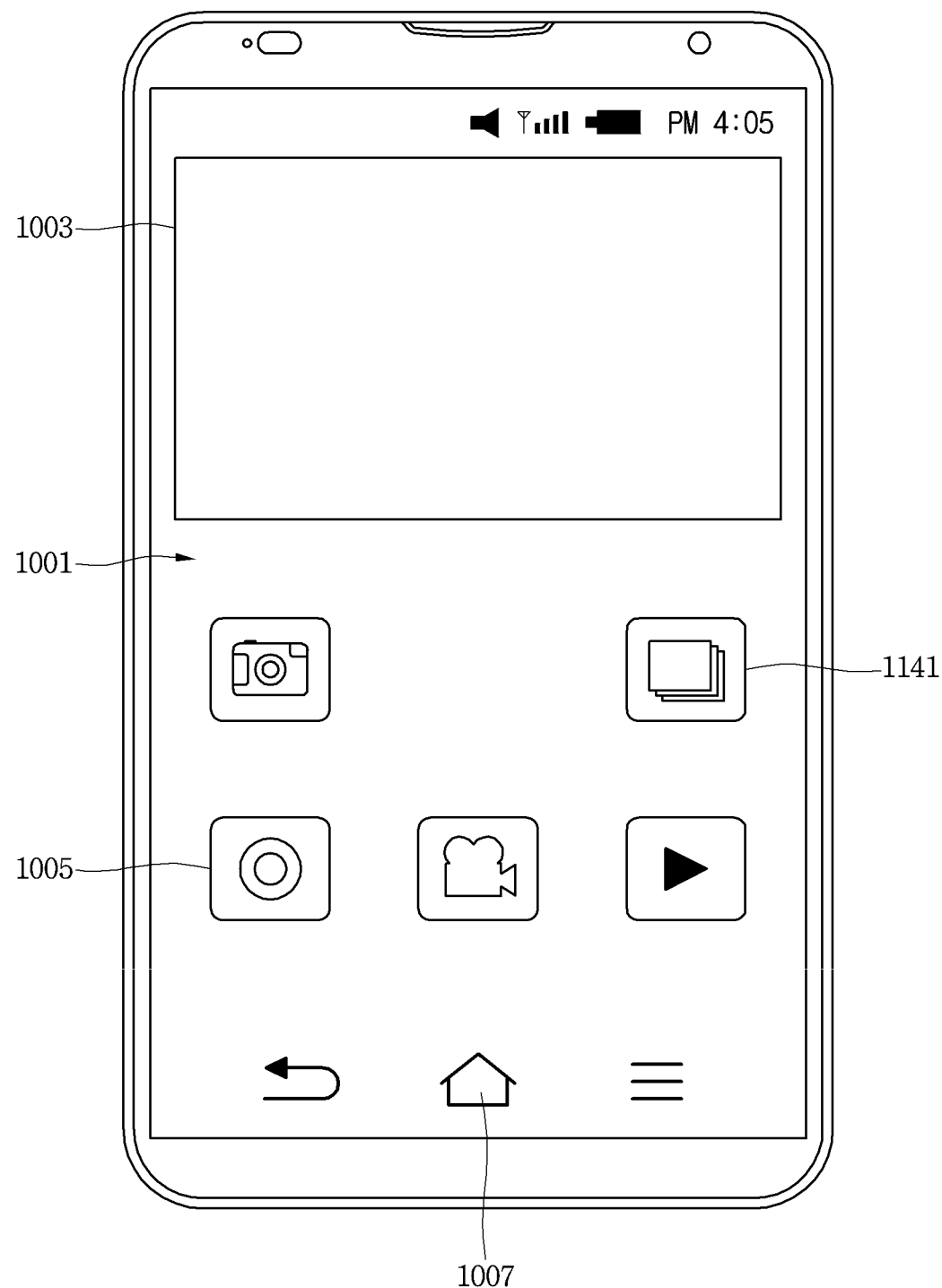
FIGS. 68A and 68B are screens illustrating a method of displaying a road view map in a mobile terminal.

The mobile terminal 100 may generate a road view map that arranges each picture image according to the location information based on map data provided in advance. The mobile terminal 100 displays the road view map by controlling the display unit 151 in operation S455. For example, as shown in FIG. 68A, a road view gallery icon 1141 may be displayed on the home screen 1001 of the mobile terminal 100.

Figure 68B:
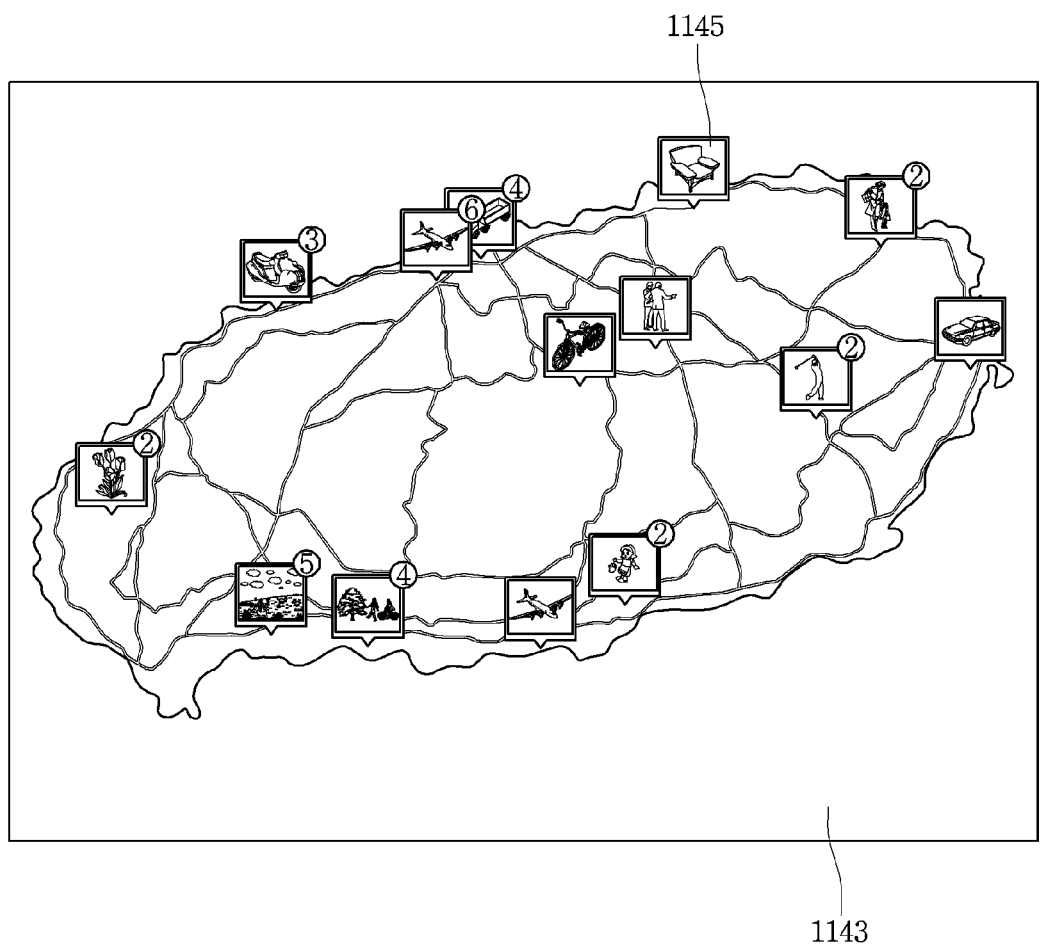

When a touch for the road view gallery icon 1141 is input from a user, as shown in FIG. 68B, the road view map 1143 may be displayed on the screen of the mobile terminal 1143. In addition, the screen may be divided into a first area and a second area. Map information may be displayed in the first area and a picture image corresponding to a specific location of map information may be displayed in the second area. When a corresponding picture image is displayed, if there is music that a user listen at the time of capturing the corresponding picture image, corresponding music may be played. Moreover, the screen may further include a third area and a place name or a famous place obtained from the displayed map information, for example, information on a store, a restaurant, and a historic place, may be displayed in the third area. These famous places may be obtained from a web server, for example.

The road view map 1143 may include a thumbnail picture image 1145 disposed at the place that a user visits and captures a picture. When at least one image is captured at a specific place, the thumbnail picture image 1145 disposed at a corresponding place may have a form in which at least one picture image overlaps each other. A number mark representing the number of the captured picture images may be displayed on the thumbnail picture image 1145.

In addition, a path that a user moves may be displayed on the road view map 1143 and this path may have a different or hatching than a road. An arrow representing a progressing direction may be displayed on a path to provide a moving direction. For example, when a touch on a specific thumbnail image is input, picture images corresponding to a number mark displayed on a specific thumbnail image are unfolded and when the touch is moved to a specific picture image through drag touch, the specific picture image is displayed through an additional window and also a music file linked to the specific picture image is played, so that a user can listen to the surrounding sound at that time of capturing the specific picture image while viewing the specific picture image.

In addition, the specific picture image may correspond to the first area of the picture image shown in FIG. 61A. That is, a specific picture image captured by the front camera module 280 may be displayed. In such a case, as mentioned above, each time a drag touch is input along the left direction from a user, another picture image captured by the right camera module 1501, another picture image captured by the rear camera module 290, and another picture image captured by the left camera module 1503 may be displayed sequentially.

Accordingly, a user can see other picture images captured by the right camera module 1501, the rear camera module 290, and the right camera module 1503 in addition to a specific picture image captured by the front camera module 280, so that it is like a road view picture. For example, the front camera module 280, the rear camera module 290, the left camera module 1503, and the right camera module 1501 may capture an image according to a time period or distance. A picture image captured in such a way is transmitted to the mobile terminal 100 and stored. In such a case, when a road view map is displayed on the mobile terminal 100, a time bar may be displayed together. When a specific time is selected by using the time bar, a distance moved at a specific time and a picture image captured at the specific time may be displayed as a window or thumbnail image.

Moreover, in addition to the captured picture image, GPS information at the time of capture, user's moving direction information, listening music information at the time of capture, weather information, and a surrounding sound at the time of capture may be stored as tag information and the tag information may be displayed as an image or an icon. In such a case, when a corresponding icon is selected, the captured picture image may be displayed and also GPS information, moving direction information, and weather information may be displayed, and a music file corresponding to music information may be played and the surrounding sound at the time of capture may be played. Music at the time of capture may be stored in the memory 170 of the mobile terminal 100 or may exist on a web server.

As another example, listening to music at the time of capture may be stored in relation to a picture image. In such a case, picture image tag information may be added to a music file. Accordingly, when a corresponding music file is played, picture images captured at the time that a user listens to corresponding music may be displayed. The picture images may be displayed as slides.

As another example, pictures captured at the time that a user listens to a specific music are linked with the specific music, so that corresponding pictures may be displayed when listening to the specific music. If one picture is captured when listening to a specific music, a corresponding picture may be displayed as an additional window when listening to the specific music. If a plurality of pictures are captured when listening to a specific music, corresponding pictures may be displayed as slides when listening to the specific music.

Figure 69:
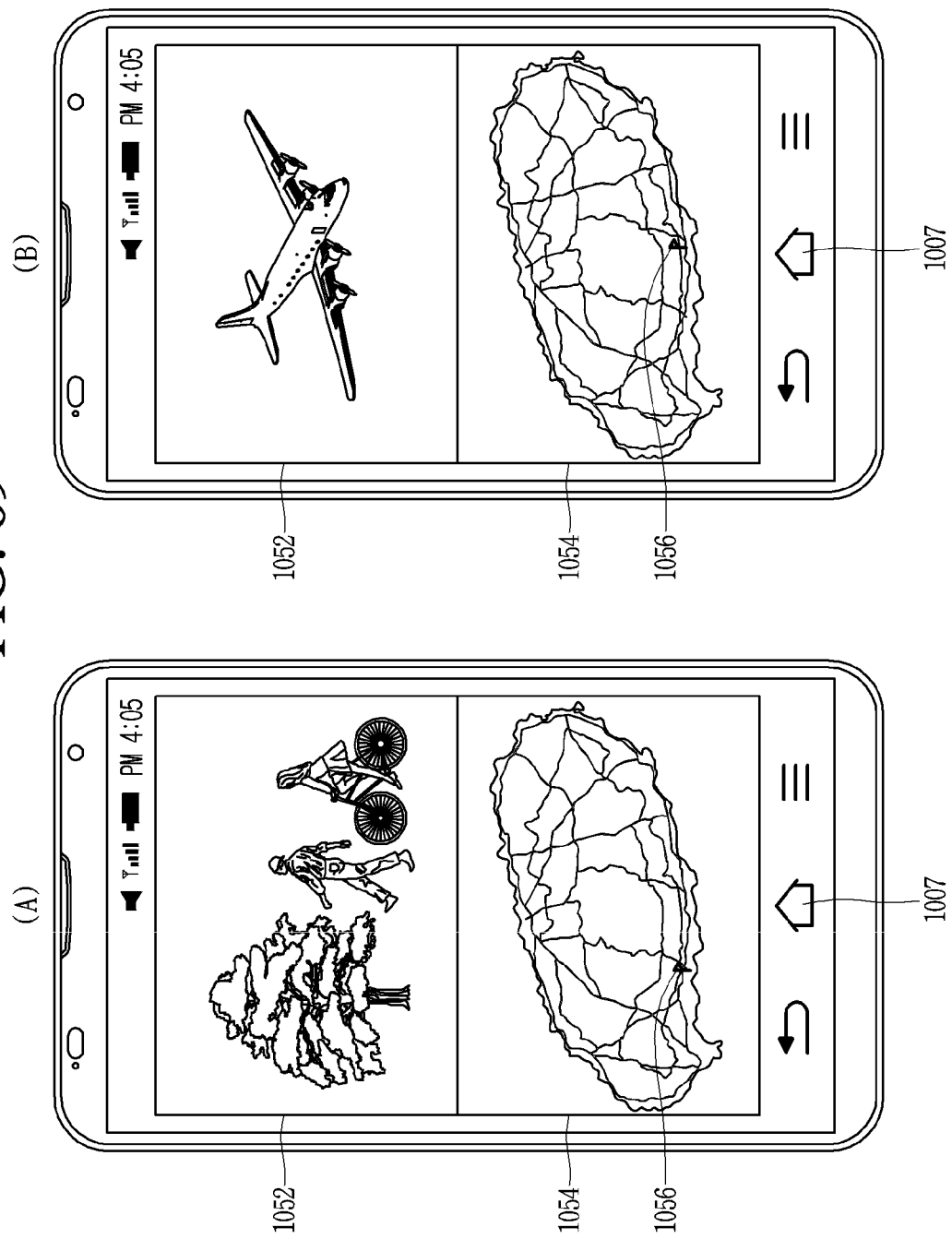
FIG. 69 is another screen illustrating a method of displaying a road view map in a mobile terminal.

FIG. 69 is another screen illustrating a method of displaying a road view map in a mobile terminal. As shown in FIG. 69A, the screen of the display unit 151 of the mobile terminal 100 is divided into first and second areas 1502 and

1054 and an image display window may be displayed in the first area 1052 and a map display window may be displayed in the second area 1054.

Picture images may be displayed as slides in an image display window and map information may be displayed in a map display window. For example, when first picture image is displayed in an image display window, a marker 1056 may be disposed at a first location of a map displayed in a map display window. Therefore, it is seen that the first picture image displayed in the image display window is captured at the first location of the map.

For example, as shown in FIG. 69B, when a second picture image is displayed in the image display window, the marker 1056 displayed in the map display window may be moved to a second location and then may be displayed. Therefore, it is seen that the second picture image displayed in the image display window is captured at the second location of the map.

According to this present embodiment, locations or places where picture images are captured may be checked through a map in real time. The above embodiments may be applied to a glass device.

Figure 70:
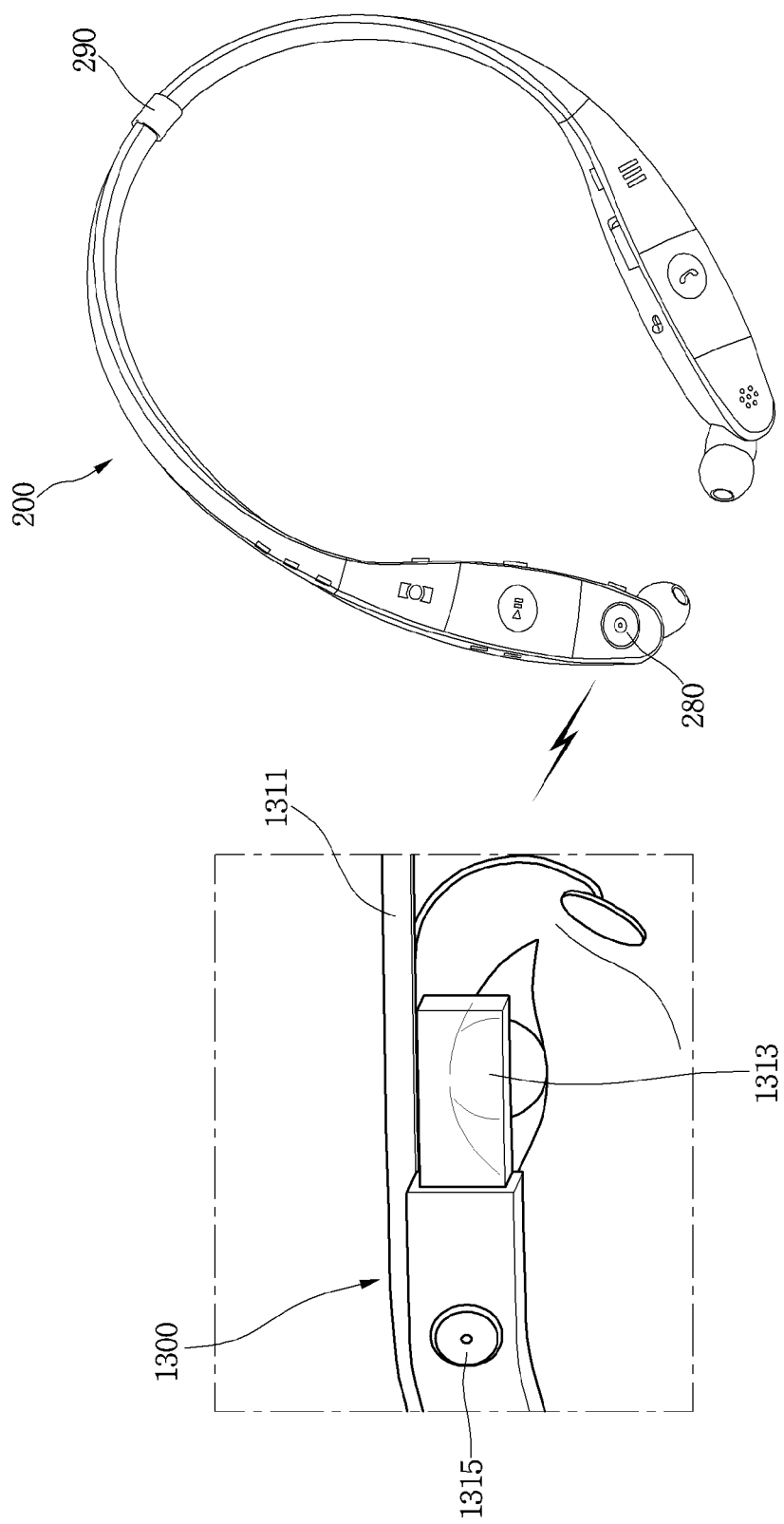
FIG. 70 is a schematic view illustrating a system including a wearable device and a glass device according to an embodiment of the present invention.

FIG. 70 is a schematic view illustrating a system including a wearable device and a glass device according to an embodiment of the present invention. As shown in FIG. 70, an image input to the front camera module 280 and/or the rear camera module 290 mounted at the wearable device 200 may be captured.

If the left camera module 1503 and the right camera module 1501 of FIG. 71 in addition to the front camera module 280 and the rear camera module 290 are additionally mounted at the wearable device 200, an image input to the front camera module 280, the rear camera module 290, the left camera module 1503, and the right camera module 1501 may be captured.

In addition, an image may be a still image, a video, a picture image list, and a panorama. An image captured in such a way may be transmitted to a glass device 1300 through the communication module 114 of the wearable device 200. Since the glass device 1300 is equipped with a communication module, the captured image transmitted from the wearable device 200 may be received through the communication module. The glass device 1300 may include a prism 1313 for displaying an image.

The prism 131 may be fixed to be supported by the body 1311. The prism 1313 may include a transparent optical device. An image is formed on the prism 131 so that a user can see the image. The glass device 1300 may additionally include a light source for irradiating an image to the prism 1313. Moreover, the glass device 1300 may include a camera 1315 for capturing a front image.

The glass device 1300 may irradiate a corresponding image on the prism 1313 to allow a user to see the image received from the wearable device 200. Before an image captured by the wearable device 200 is transmitted to the glass device 1300, pairing between and wearable device 200 and the glass device 1300 may be performed. An image captured by the wearable device 200 may be transmitted to the glass device 1300 in real time or at a predetermined period.

While wearing the glass device 1300 and the wearable device 200, a user can see an image captured by each of the camera modules 280, 290, 1501 FIG. 71, and 1503 of FIG. 71 of the wearable device 200 through the prism 1313 of the glass device 1300, so that a dangerous situation around may be easily dealt with.

Figure 73:
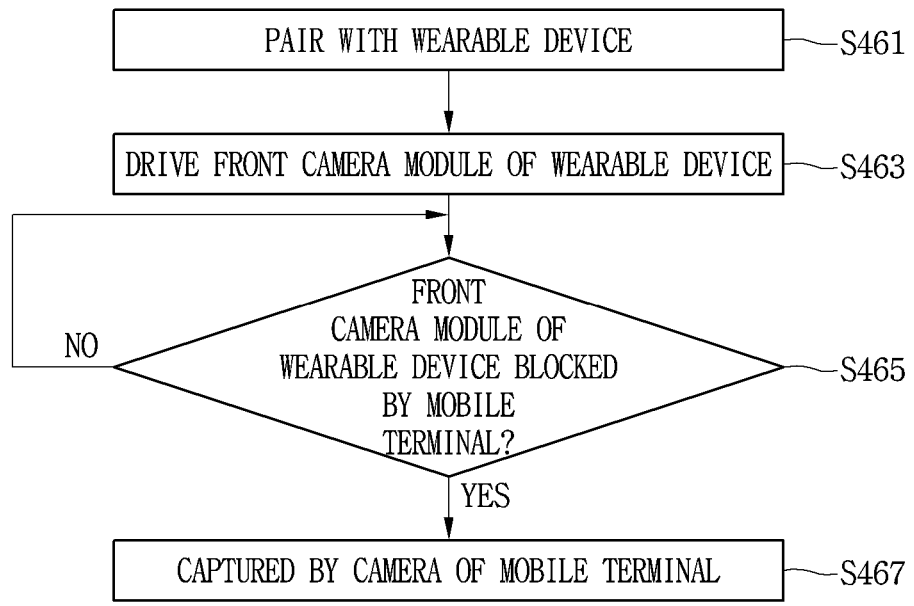
FIG. 73 is a flowchart illustrating a method of capturing a picture by using a mobile terminal instead of a wearable device.

FIG. 73 is a flowchart illustrating a method of capturing a picture by using a mobile terminal instead of a wearable device. Referring to FIG. 73, the mobile terminal 100 may perform pairing with the wearable device 200 in operation S461. Once the pairing is complete, the front camera module 280 of the wearable device 200 may be driven in operation S463. The front camera module 280 may be driven by a control of a mobile terminal and, when pairing is completed, may be driven by the wearable device 200.

Figure 74:
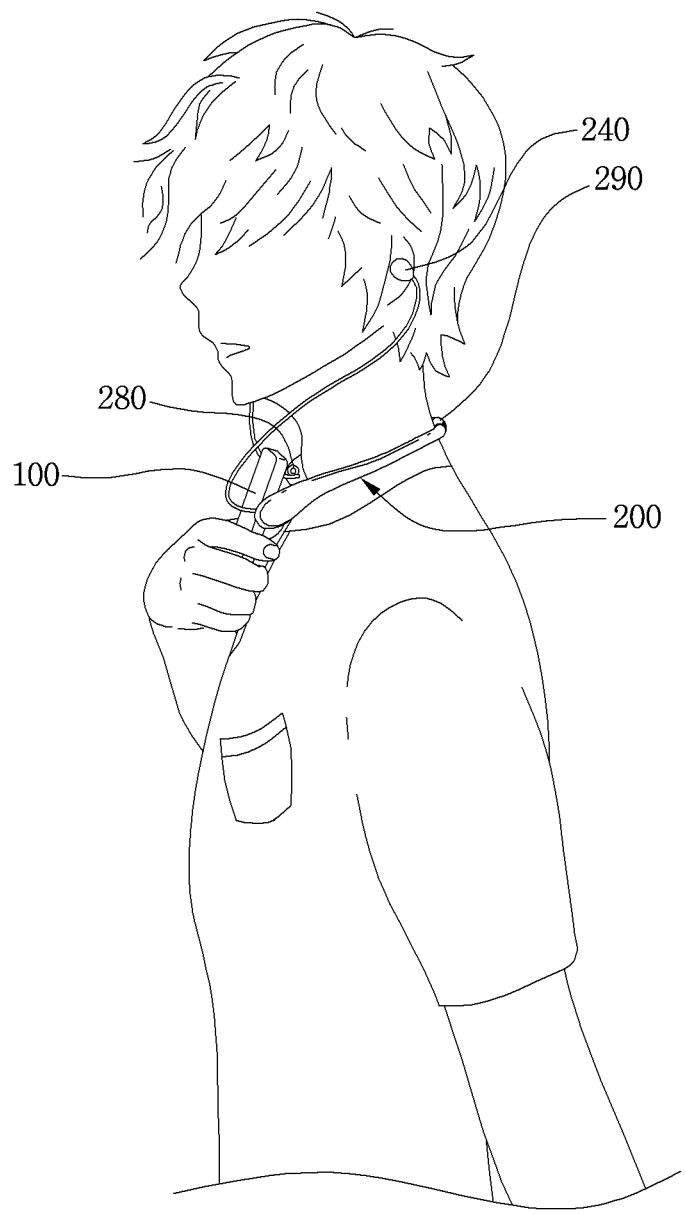
FIG. 74 is a screen when a front camera module of a wearable device is blocked by a motile terminal.

As shown in FIG. 74, when the front camera module 280 of the mobile terminal 100 is blocked by the front camera module 280 of the wearable device 200 in operation S465, the front image may be captured by the camera 121 of the mobile terminal 100 in operation S467. In more detail, the wearable device 200 may detect whether the front camera module 280 is blocked by the mobile terminal 100 by using a brightness change of a front image input to the front camera module 280. When the front camera module 280 is blocked by the mobile terminal. 100, the wearable device 200 may transmit a picture capture command to the mobile terminal 100. The mobile terminal 100 receiving the picture capture command may perform a control on the camera 121 to capture a front image.

According to a wearable device of the present invention, a widget icon for driving the wearable device 200 may be displayed on the mobile terminal 100. The wearable device 200 may be driven according to a touch command for a widget icon. In addition, the driving of the wearable device 200 may mean the driving of the front camera module 280 and the rear camera module 290 but the present invention is not limited thereto. The widget icon may be an application that is capable of immediately executing a specific function in the mobile terminal 100 without using a web browser.

Moreover, when viewing a movie, a picture image, or a broadcast program by using the mobile terminal 100 during walking, bumping into a front obstacle or getting hurt by tripping over an obstacle due to an invisible front may be prevented. That is, while a user views a movie, a picture image, or a broadcast program by using the mobile terminal 100 during walking, if a front obstacle approaches within a predetermined distance, the proximity sensor 204a of the wearable device 200 detects this to provide sound effect or alarm to a user. In addition, as the front obstacle becomes closer, sound effect or alarm sound may be louder.

Such sound effect or alarm sound may be generated from the wearable device 200 itself. Alternatively, obstacle information detected by the proximity sensor 204a of the wearable device 200 may be transmitted to the mobile terminal 100 to generate sound effect of alarm sound by the mobile terminal 100. Obstacles correspond to stairs, walls, doors, cars, bikes, people, and animals, which may damage a user.

As a method of evading an obstacle while viewing the mobile terminal 100 during walking, as shown in FIGS. 37 to 43, there is a method of displaying a preview image input to the front camera module 280 and/or the front camera module 290 on the front preview screen 1024 and/or the rear preview screen 1026 in a partial area of the display unit 151 of the mobile terminal 100. In such a way, even when viewing a movie or a broadcast program by using the mobile terminal 100 during walking, a user can easily check the presence of a front/rear obstacle to evade a corresponding obstacle by checking a front preview image and/or a rear preview image sometimes displayed on the front preview screen 1024 and/or the front preview screen 1026.

According to an embodiment of the present invention, it is described as limited to obtaining a front image and a rear image by mounting the front camera module 280 and the rear camera module 290 at the wearable device. However, the present invention is not limited thereto. As shown in FIG. 71, the left camera module 1503 mounted at the left of the wearable device 200 and the right camera module 1501 mounted at the right of the wearable device 200 are further added so that an image in the right direction of the user and an image in the left direction of the user are obtained addition to the front image and the rear image and images in all directions around the user are obtained. As a result, user's convenience may be maximized furthermore. Camera modules more than the four camera modules 280, 290, 1501, and 1503 shown in FIG. 71 of the present invention may be mounted at a sound device and used.

The invention can also be embodied as computer readable codes on a computer readable recording medium. The computer readable recording medium is any data storage device that can store data which can be thereafter read by a computer system. Examples of the computer readable recording medium include magnetic storage media (e.g., ROM, floppy disks, hard disks, etc.) and optical recording media (e.g., CD-ROMs, or DVDs) and carrier waves (e.g., transmission through the Internet). Additionally, the computer may include the control unit 180 of the mobile terminal 100. Accordingly, the detailed description is not construed as being limited in all aspects and should be considered as illustrative. The scope of the invention should be determined by reasonable interpretation of the appended claims, and all modifications within equivalent ranges of the present invention are included in the scope of the present invention.

What is claimed is:

1. A sound system, comprising:
a wearable device put on a user's neck; and
a mobile terminal communicating with the wearable device,
wherein the wearable device comprises:
a band part hung on the user's neck;
a body part coupled to both ends of the band part;
one pair of earphones coupled to be drawn from the body part;
a plurality of cameras including a first camera and a second camera, wherein the first camera is mounted at the body part and captures an object of a front of the user, wherein the second camera is mounted at a center part of the band part and captures an object of a rear of the user;
a vibration detection button installed at the body part, wherein the vibration button detects a vibration occurring as the user taps the vibration detection button;
a capture button installed at the body part;
a vibration sensor installed at the body part, wherein the vibration sensor detects that the user taps the body part;
a microphone to receive an audio input;
a location information module to obtain a location of the wearable device;
a proximity sensor to detect approach of an object;
a module detecting shaking of the first camera and the second camera;
a first wireless communication unit installed at the body part, wherein the first wireless communication unit communicates with the mobile terminal; and
a controller installed at the body part, wherein the controller controls operation of the plurality of cameras and transmits an image captured by the plurality of cameras to the mobile terminal,
wherein the mobile terminal comprises:
a second wireless communication unit configured to perform wireless communication with the wearable device via the first wireless communication unit;
a touch screen configured to display information; and
a control unit configured to:
perform pairing between the mobile terminal and the wearable device,
display a lock screen on the touch screen, if the touch screen is changed from an off state into an on state,
display a control screen including both a first control screen including at least one sound control object for controlling sound output through the one pair of earphones of the wearable device and a second control screen including at least one camera control object for controlling the plurality of cameras of the wearable device on the lock screen,
transmit an activation command to the wearable device,
display a front preview screen and a rear preview screen for the plurality of cameras on the lock screen,
display a home screen including a plurality of executable icons, the front preview screen and the rear preview screen, if a lock state is released after the front preview screen and the rear preview screen are displayed on the lock screen,
receive at least one image captured by the plurality of cameras of the wearable device,
store the at least one image captured by the plurality of cameras of the wearable device and information relating to music played at the time of capturing the at least one image, and
if a specific music is played, display at least one image captured when the specific music has been played,
wherein the controller of the wearable device determines the number of times that the user taps the body part, recognizes one of an image capture mode and a video capture mode based on the number of times that the user taps the body part, captures a predetermined number of images within a predetermined time in the image capture mode, and captures a video for a predetermined time in the video capture mode,
wherein the controller of the wearable device determines the number of times that the user taps the vibration detection button,
wherein the controller of the wearable device activates both the first camera and the second camera, or activates the first camera, or activates the second camera, based on the number of times that the user taps the vibration detection button,
wherein the controller of the wearable device determines whether the first camera and the second camera are shaken when the capture button is pressed by the user, and identifies a shaking intensity of the first camera and the second camera,
wherein the controller of the wearable device captures a picture image for an image input to the first camera and the second camera if the shaking intensity is less than a predetermined setting value,
wherein the controller of the wearable device captures a video for an image input to the first camera and the second camera if the shaking intensity is greater than the predetermined setting value, and stores the video in the memory, wherein the video includes a plurality of frame images,
wherein the controller of the wearable device selects a frame image with a smallest shaking among the plurality of frame images as a picture image, transmits the selected frame image to the mobile terminal, and deletes the video stored in the memory,
wherein the controller of the wearable device detects whether the first camera is blocked by the mobile terminal by using a brightness change of an image input to the first camera, and transmits a picture capture command to the mobile terminal,
wherein the control unit of the mobile terminal captures an image when the picture capture command is received, wherein the controller of the wearable device activates both the first camera and the second camera when the user's finger is positioned at a first distance from the proximity sensor of the wearable device, activates the first camera when the user's finger is positioned at a second distance from the proximity sensor of the wearable device, and activates the second camera when the user's finger is positioned at a third distance from the proximity sensor of the wearable device, wherein the controller of the wearable device captures an image or a video when an input of a specific sound or voice is detected through the microphone, wherein the controller of the wearable device captures an image or a video when a current location of the wearable device is changed more than a predetermined distance, wherein the controller of the wearable device captures an image or a video when an arbitrary object approaches within a predetermined distance range, wherein the control unit of the mobile terminal is configured to display the control screen including the second control screen enlarged to an area where the first control screen is displayed, if the sound is not output through the wearable device, and wherein the control unit of the mobile terminal is further configured to display an image captured by the plurality of cameras of the wearable device and a marker indicating a location at which the image was captured.

2. The sound system of claim 1, wherein the at least one camera control object includes an angle adjustment button for adjusting a rotation angle of the plurality of cameras.

3. The sound system of claim 1, wherein the at least one camera control object includes a first camera button for controlling the first camera and a second camera button for controlling the second camera.

4. The sound system of claim 3, wherein the control unit of the mobile terminal is further configured to display at least one of a first preview screen corresponding to the first camera in response to the first camera button being selected and a second preview screen corresponding to the second camera in response to the second camera button being selected.

5. The sound system of claim 4, wherein the controller is further configured to display the at least one of the first and second previews screen on the second control area of the control screen or as a window separated from the second control area of the control screen.

6. The sound system of claim 5, wherein the at least one of the first and second preview screens is displayed along a vertical direction or a horizontal direction with respect to the first control area.

7. The sound system of claim 5, wherein the first preview screen is displayed first on the second control area and then the second preview screen is displayed on the second control area in response to a flicking touch action on the displayed first preview screen.

8. The sound system of claim 1, wherein the icon displayed on the first control area comprises at least one of a wearable device-dedicated icon and a floating icon.

9. The sound system of claim 1, wherein the control unit of the mobile terminal is further configured to:
   display a time bar representing a plurality of images captured by the plurality of cameras, and
   display a specific image among the plurality of images corresponding to a movement and position of the time bar.

10. The sound system of claim 9, wherein the control unit of the mobile terminal is further configured to:
   tag information relating to music played at a time the specific image was captured,
   display an icon relating to the tag information, and
   play the music played at the capture time in response to a selection of the icon.

* * * * *